US006427453B1

(12) United States Patent
Holtzapple et al.

(10) Patent No.: US 6,427,453 B1
(45) Date of Patent: Aug. 6, 2002

(54) VAPOR-COMPRESSION EVAPORATIVE AIR CONDITIONING SYSTEMS AND COMPONENTS

(75) Inventors: Mark T. Holtzapple, College Station; Richard Davison, Bryan; G. Andrew Rabroker, College Station, all of TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/126,325

(22) Filed: Jul. 31, 1998

(51) Int. Cl.[7] .............................................. F25D 17/06
(52) U.S. Cl. ............................. 62/92; 62/305; 62/476; 62/502
(58) Field of Search ........................... 62/305, 92, 476, 62/502

(56) References Cited

U.S. PATENT DOCUMENTS

| 4,199,305 A | | 4/1980 | Pareja |
| 4,352,296 A | | 10/1982 | Wendler et al. ................. 74/55 |
| 4,519,755 A | | 5/1985 | Hanson ........................... 418/9 |
| 4,603,559 A | * | 8/1986 | Wu .............................. 62/434 |
| 4,638,570 A | | 1/1987 | Soeters, Jr. .................... 33/562 |
| 4,674,960 A | | 6/1987 | Rando et al. |
| 4,730,462 A | * | 3/1988 | Rogers .......................... 62/171 |
| 4,733,686 A | | 3/1988 | Cosselmon, Jr. ............. 137/203 |
| 4,958,997 A | | 9/1990 | Harwath |
| 4,976,595 A | | 12/1990 | Taniguchi |
| 5,003,789 A | * | 4/1991 | Gaona et al. .................. 62/304 |
| 5,035,590 A | | 7/1991 | Steffens ....................... 418/206 |
| 5,086,767 A | | 2/1992 | Legal ...................... 128/205.18 |
| 5,097,677 A | | 3/1992 | Holtzapple |
| 5,160,252 A | | 11/1992 | Edwards |
| 5,277,564 A | | 1/1994 | Tamura et al. ............. 418/55.6 |
| 5,582,020 A | * | 12/1996 | Scaringe et al. ............... 62/102 |
| 5,628,626 A | | 5/1997 | Hansen ....................... 418/61.3 |
| 5,709,094 A | * | 1/1998 | Ooyabu et al. ................ 62/126 |
| 5,713,210 A | | 2/1998 | Jirnov et al. ................... 62/87 |
| 5,901,567 A | * | 5/1999 | Suzki et al. ................ 62/324.2 |
| 5,992,171 A | * | 11/1999 | Bacchus ....................... 62/305 |

FOREIGN PATENT DOCUMENTS

| AU | 20406 | 5/1929 | |
| DE | 3500917 A1 | 12/1985 | ......... F04C/18/344 |
| EP | 0 150 014 | 7/1985 | ............ F24J/03/00 |
| EP | 0 682 181 A2 | 11/1995 | ........... F04C/18/02 |
| FR | 2 742 196 | 6/1997 | ........... F16C/11/06 |
| GB | 2 040 361 A | 8/1980 | ........... F04B/49/00 |
| JP | 579464 | 3/1993 | |
| JP | 06257890 | 9/1994 | ........... F25B/29/00 |

OTHER PUBLICATIONS

Thermal Storage Applications Research Center of the University of Wisconsin, The Use of Water as a Refrigerant, Report No. TSARC 92–1, pp. 1–114 (Mar. 1992).

Reducing Energy Coats in Vapor–Compression Refrigeration and Air Conditioning Using Liquid Recycle—Part II: Performance, Mark Holtzapple, ASHRAE Transactions, vol. 95, Part 1, pp. 187–198 (1989).

Reducing Energy Costs in Vapor–compression Refrigeration and Air Conditioning Using Liquid Recycle—Part I: Comparison of Ammonia and R–12, Mark Holtzapple ASHRAE Transactions, vol. 95, Part 1, pp. 179–186 (1989).

(List continued on next page.)

*Primary Examiner*—William Doerrler
*Assistant Examiner*—Mark Shulman
(74) *Attorney, Agent, or Firm*—Baker Botts L.L.P.

(57) ABSTRACT

Novel vapor compression evaporative cooling systems which use water as a refrigerant are provided, as are methods for using same. Also provided are novel compressors, compressor components, and means for removing noncondensibles useful in such cooling systems.

48 Claims, 83 Drawing Sheets

OTHER PUBLICATIONS

CFCs: Today There Are Answers, CFC–Article–1, The Trane Company, 3600 Pammel Creek Rd., La Crosse, WI, 54601–7599, pp. 1–16 (1994).

The Institute of Refrigeration, Binary Ice—Technologies for the production of Pumpable Ice–Slurries (10 pages.)(1993).

Joachim Paul and Ernst Jahn, Natural Refrigerants, Practical Experiences with Cooling Plants (10 pages.)(prior to Mar. 11, 1994).

PCT Written Opinion (PCT Rule 66), mailed Apr. 25, 2000, re PCT/US99/16882 filed Jul. 27, 1999, Applicant's reference: 017575.0320.

*The Use of Water as a Refrigerant–An Exploratory Investigation*, by Dirk Van Orshoven, a thesis submitted in partial fulfillment of the requirements for the degree of Master of Science (Mechanical Engineering), University of Wisconsin–Madison, 1991.

\* cited by examiner

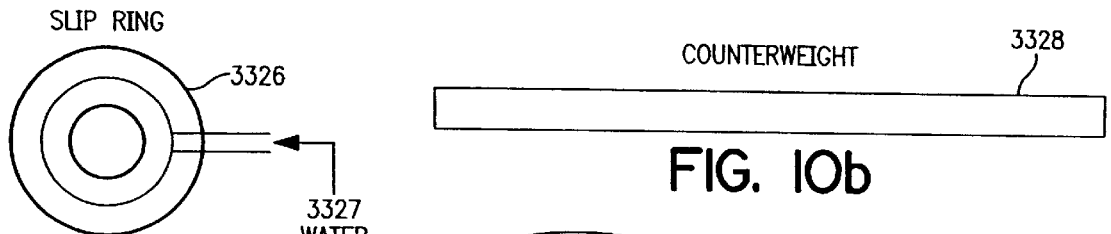
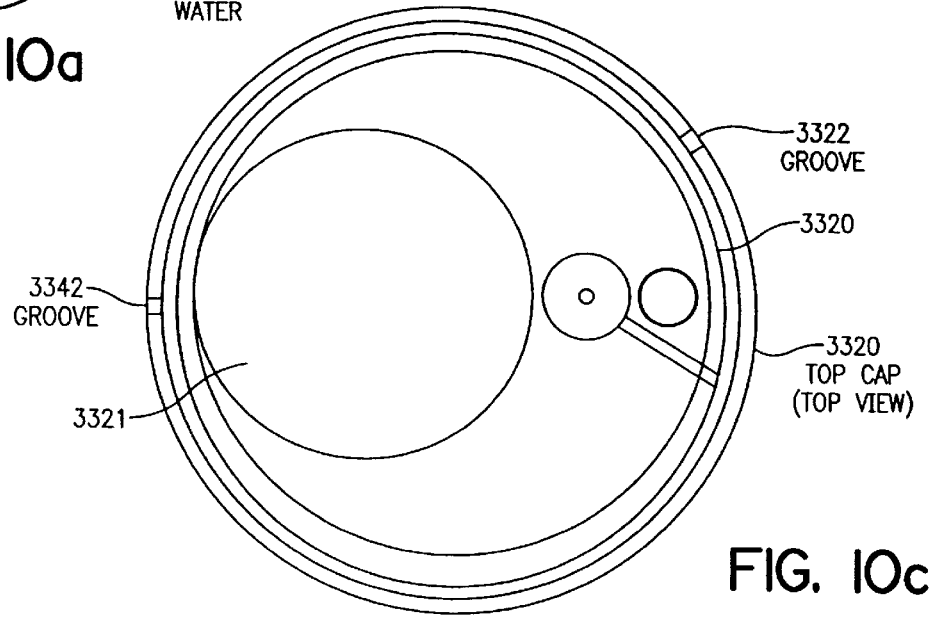
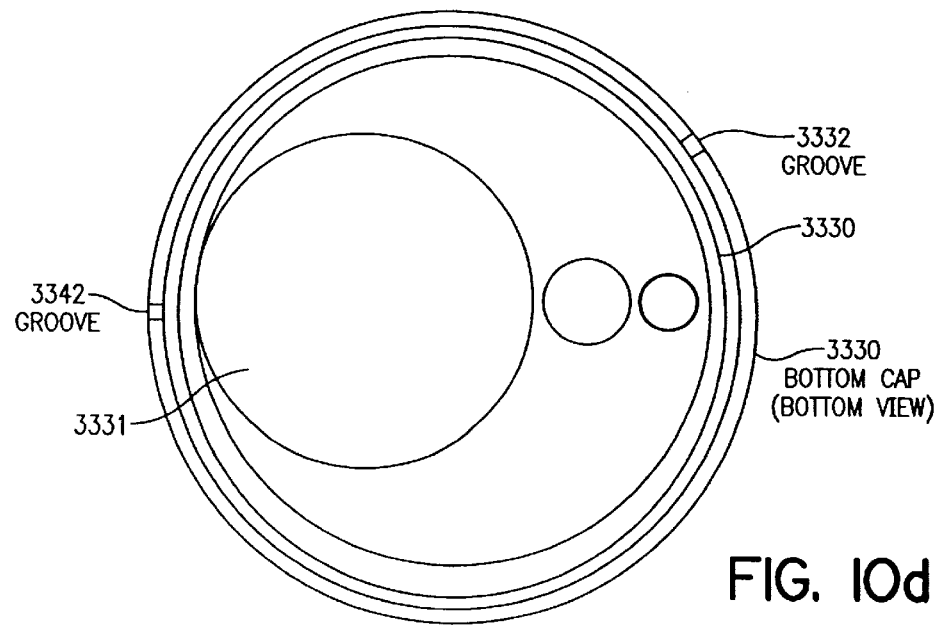

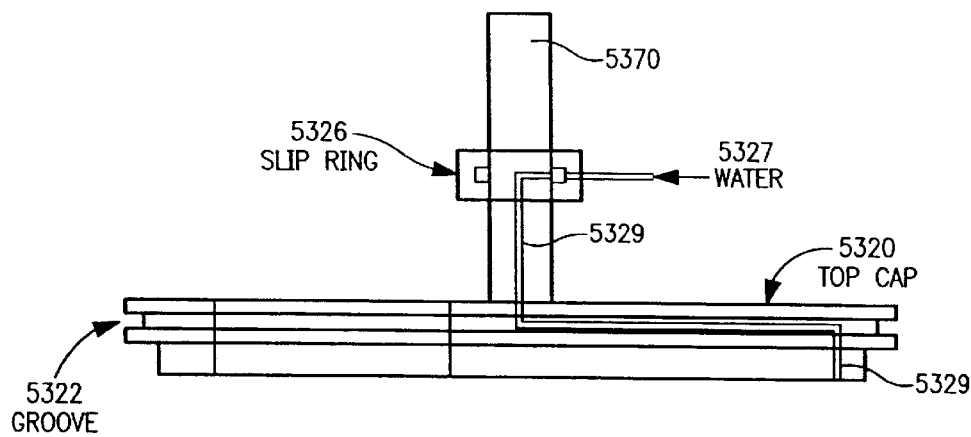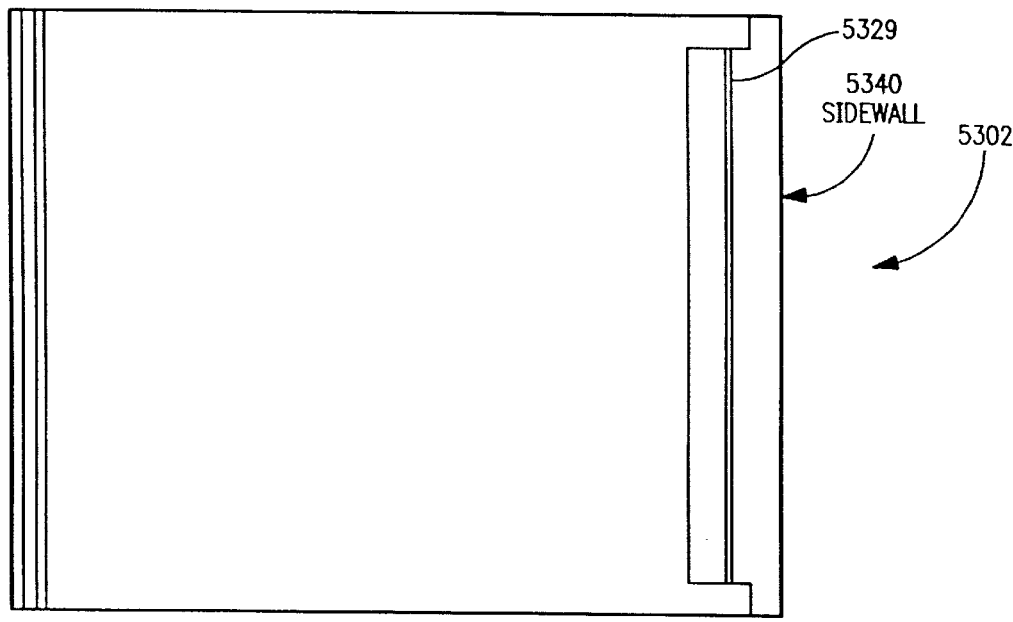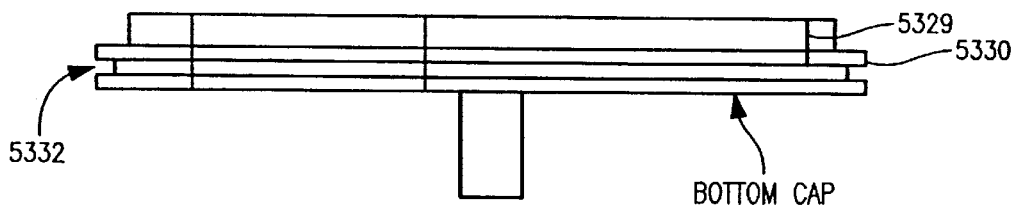
FIG. 26

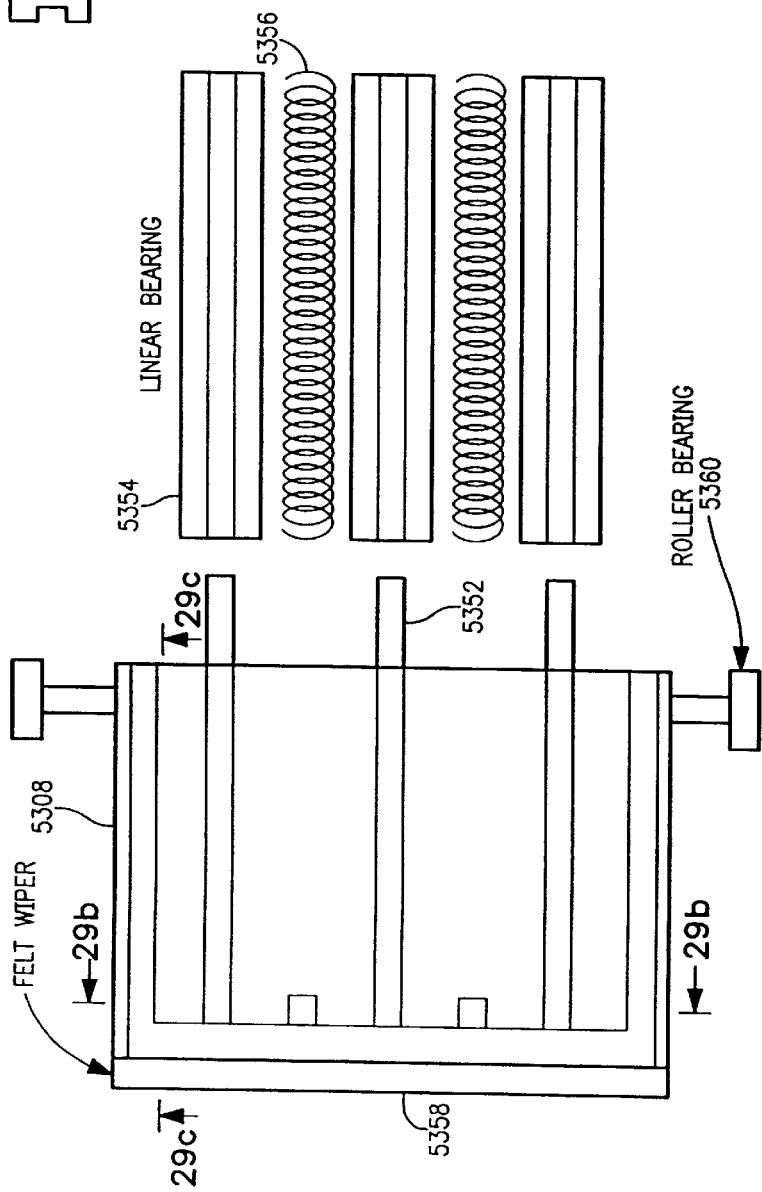
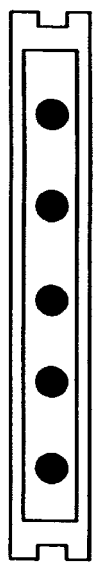

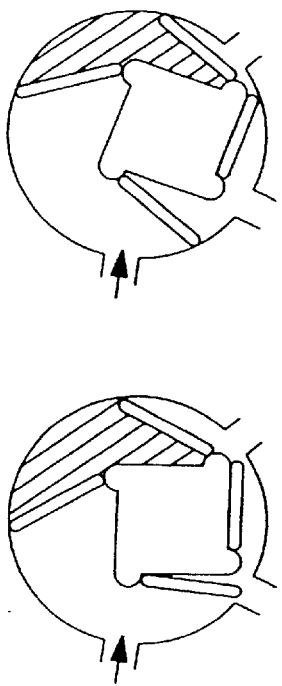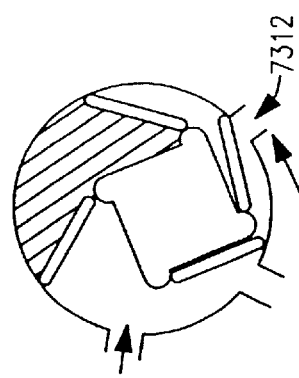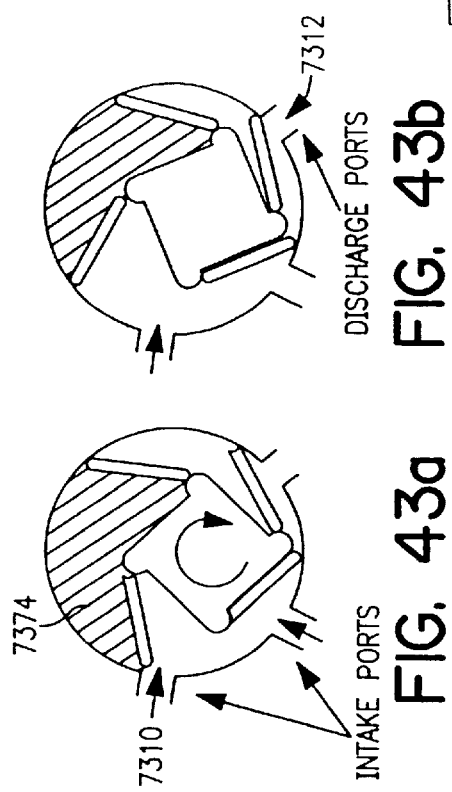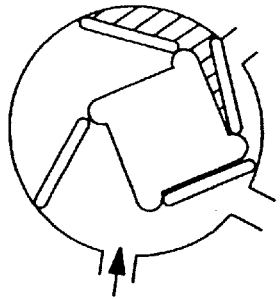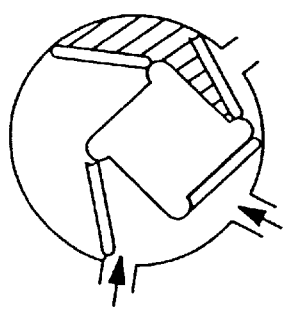

*ROTATION IS CLOCKWISE

*PROGRESSION IS RIGHT TO LEFT

DISCHARGE

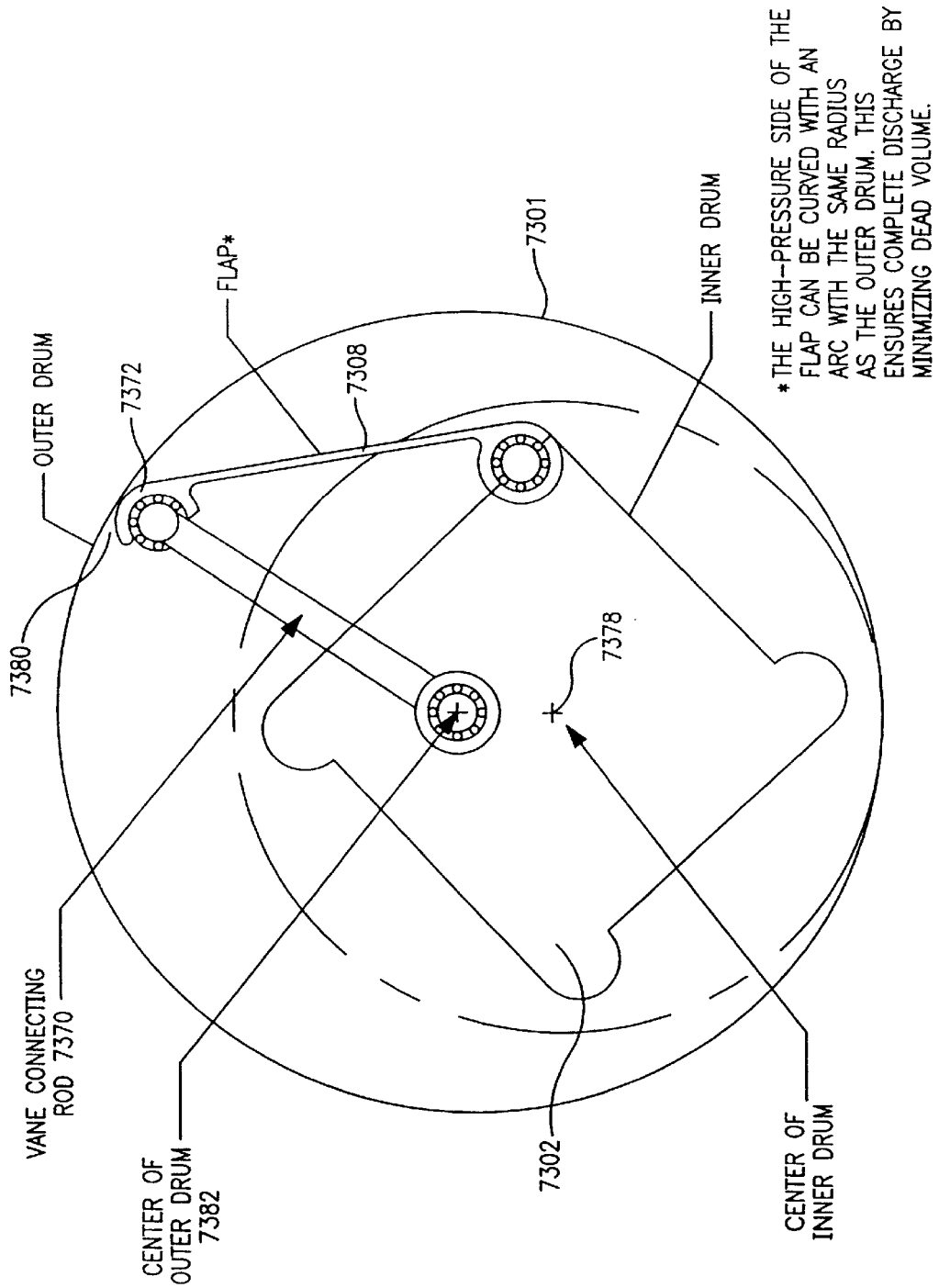

GEAR ARRANGEMENT FOR CREATING ORBITING MOTION.

| Table 1. Results of low-pressure compressor analysis. | | | | | |
|---|---|---|---|---|---|
| Number of Stages | Compression Ratio per Stage | Head (ft-lbf/lbm) | Rotation (rpm) | Diameter (ft) | Tip Speed (ft/s) |
| 1 | 1.540 | 20,077 | 3,598 | 4.73 | 890 |
| 2 | 1.241 | 9,774 | 2,097 | 5.66 | 621 |
| 3 | 1.155 | 6,458 | 1,537 | 6.27 | 505 |
| 4 | 1.114 | 4,823 | 1,234 | 6.75 | 436 |
| 5 | 1.090 | 3,848 | 1,042 | 7.14 | 390 |
| 6 | 1.075 | 3,201 | 908 | 7.48 | 355 |
| 7 | 1.064 | 2,740 | 808 | 7.77 | 329 |
| 8 | 1.055 | 2,395 | 730 | 8.04 | 308 |
| 9 | 1.049 | 2,127 | 668 | 8.28 | 290 |
| 10 | 1.044 | 1,913 | 617 | 8.51 | 275 |

VAPOR-COMPRESSION EVAPORATIVE AIR CONDITIONING SYSTEMS AND COMPONENTS

BACKGROUND OF THE INVENTION

1. Field of the Invention

This invention relates to vapor-compression evaporative cooling systems that use water as a refrigerant in an open system, and in particular, to vapor-compression evaporative cooling systems capable of processing large volumetric flow rates of water vapor and removing noncondensibles from the system and to methods using such systems. This invention also relates to low-friction, positive-displacement compressors useful in such cooling systems and to means for removing noncondensibles from such cooling systems.

2. Description of the Background

Conventional vapor-compression air conditioning systems employ a working fluid such as chlorofluorocarbons (CFCs). Liquid CFC is introduced into a low-pressure heat exchanger where it absorbs heat at a low temperature and vaporizes. A compressor repressurizes the vapors that are introduced to a high-pressure heat exchanger where heat is rejected to the environment and the vapors condense. The condensate is reintroduced into the low-pressure heat exchanger, thus completing the cycle.

The use of CFCs raises two important environmental concerns. First, CFCs are stable enough to enter the stratosphere where they decompose to chlorine free radicals that catalyze the destruction of ozone. This is unfortunate because ozone absorbs ultraviolet radiation which damages DNA in plants and animals. Second, CFCs absorb infrared radiation which contributes to global warming.

Because CFCs cannot be released into the environment, they must be contained within the air conditioning system. The evaporator and condenser heat exchangers have a sizable temperature difference between the ambient environment and the working fluid (about 10 to 15° C.) which greatly reduces the Carnot efficiency. Further limiting the efficiency is the fact that the condenser rejects heat at the dry-bulb temperature. The wet-bulb temperature is generally about 5–30° C. less than the dry-bulb temperature. Thus, if heat were rejected at the wet-bulb temperature, the Carnot efficiency could be improved even more.

In addition, compressors used in conventional systems typically have compressing components that are in direct contact with each other. The close fit between components has heretofore been necessary to prevent blow-by of high-pressure compressed vapors. However, the friction resulting from the close contact between components reduces efficiency, creates heat and causes wear on the components.

Although the use of water in place of CFCs as the air-conditioning working fluid has been considered, proposed systems have been generally unworkable because the vapor density is very low requiring large volumes of water vapor to be compressed.

One study by the Thermal Storage Applications Research Center of the University of Wisconsin, *The Use of Water as a Refrigerant*, Report No. TSARC 92-1, March 1992, studied the use of water as a refrigerant. This study concluded that for water-based air conditioning, positive displacement compressors are not suitable for use in such systems. Rather, only dynamic compressors are suitable.

Although "swamp cooler" air conditioners are employed in arid regions of the United States that have low wet-bulb temperatures, they have limited usefulness. In swamp coolers, ambient air is contacted with water which evaporates and cools the air. No external power is required other than for air-handling blowers. Unfortunately, these simple devices are restricted to regions of low humidity (e.g., Arizona, New Mexico) and are not suitable for many regions of the world. Further, although the air is cooler, it has increased humidity which can make the air feel "clammy."

SUMMARY OF THE INVENTION

There is therefore a need for an environmentally friendly, efficient and economical means for air conditioning in all types of climates. The present invention overcomes the above noted deficiencies in the art by providing air conditioning systems that use water as the working fluid rather than CFCs, thus eliminating potential CFC emissions. These systems are not limited to regions of low humidity. The present invention is directed to cooling systems that are 1.7 to 3.9 times more efficient than conventional air conditioning systems and that have manufacturing costs less than, or competitive with, conventional air conditioning systems.

In addition, unlike the teachings of the literature, it has been discovered that high-volume, low-pressure positive displacement compressors can be utilized in cooling systems that use water as the working fluid. It has further been discovered that because of the relatively low pressures (i.e., 0.2–0.7 psia) in the compressors of the cooling systems of the present invention, the gaps between the compressing components can be comparatively large, and that such large gaps are not only acceptable, but actually can be beneficial from both an efficiency and wear standpoint. Because of the low friction, the novel compressors can be scaled up to the necessary size. For example, such a gap-containing, positive displacement compressor can process the 1400 ft$^3$/min of low-pressure water vapor needed to produce 3 tons of cooling.

In addition, it has been discovered that water, with or without suitable wicking material, cat be used to fill the gaps between the components, and thereby create an effective, but low-friction seal between the compressing components. Thus, the present invention is also directed to novel positive displacement compressors which are useful in air conditioning systems using water as the working fluid. These compressors include novel compressors which are useful in the disclosed systems as well as in other applications. The present invention is also directed to novel pumps useful for removing noncondensibles from the disclosed cooling systems as well as in other applications. Finally, the present invention is directed to novel seals and mounting apparatus useful in the disclosed compressors.

In accordance with one embodiment of the present invention, a vapor-compression evaporative air conditioning system is provided that comprises: an evaporator; a room air contactor for directly exchanging heat between room air and a quantity of water from the evaporator; means for compressing a volume of water vapor, thereby creating a vacuum on the water in the evaporator, the means for compressing comprising a positive displacement compressor, the compressor comprising an inlet and an outlet, wherein low-pressure water vapors from the evaporator enter the inlet and compressed water vapors exit the outlet; a condenser for receiving the compressed water vapors; means for reducing a water content of the vapors exiting the condenser; means for removing noncondensibles from the condenser, and an ambient air contactor for directly exchanging heat between the ambient air and water from the condenser. The positive displacement compressor is preferably a low-friction compressor comprising at least two compressing components, which do not substantially contact one another. The advantages of this system include that it is an efficient low-friction system capable of functioning in humid environments.

The compressing components may comprise an inner gerotor, an outer gerotor and a housing; an orbiting (or mobile) scroll, a stationary (or fixed) scroll and a housing; a housing and a piston a housing, a rotor, and a flap; an inner drum, an outer drum and a swinging vane; or a housing, a rotor and a sliding vane. In a preferred embodiment there is a gap between at least two of the compressing components. Water or water and a wick may be used as a sealant in the gap.

In one embodiment of this system, the means for compressing water vapor comprises a gerotor compressor comprising an inner gerotor and an outer gerotor, the inner gerotor disposed within the outer gerotor, each gerotor comprising a plurality of teeth. The inner gerotor has one less tooth than the outer gerotor, thereby creating a void volume between the inner gerotor and the outer gerotor. An inlet port and a discharge port communicate with the void volume. The discharge port may have a variable port mechanism that changes the position of a leading edge of the discharge port. This variable port mechanism may be positioned using electrically actuated means controlled by a thermocouple signal.

The variable port mechanism may comprise an electrically controlled servo motor, the motor rotating a threaded rod, a bellows, and a non-rotating nut coupled to the bellows, the rod axially positioning the non-rotating nut. Alternatively, the variable port mechanism may comprise a plurality of plates disposed adjacent to the discharge port and means for sequentially moving the plates to vary the leading edge of the discharge port. The variable port mechanism may be positioned using a bellows, actuated by a bulb containing a liquid, wherein the liquid in the bulb has a vapor pressure proportional to the condenser temperature which acts on the bellows.

The gerotor compressor may further comprise an electric motor for driving the gerotor compressor, a first pump for pumping cooled water from the evaporator to a packing in the room air contactor, a filter disposed between the room air contactor and the evaporator, wherein water from the room air contactor flows through the filter to the evaporator, a second pump for pumping water from the condenser to a packing in the ambient air contactor, and a fan for driving ambient air countercurrently against the packing.

Because of the low action between when compressing components of the compressors of the present invention, the compressors of the present invention use novel actuation means to actuate the gerotors.

For instance, one embodiment uses a low-friction gerotor compressor in which a first drive shaft drives the outer gerotor, and the actuation means comprises an internal gearbox containing a plurality of spur gears, the plurality being an odd number. One of the spur gears is coupled to the first drive shaft and another of the spur gears is coupled to a second drive shaft, the second drive shaft being offset from the first drive shaft, thereby suspending the gearbox between the first drive shaft and the second drive shaft. The first drive shaft is coupled to the outer gerotor through a plate that comprises a plurality of prongs in contact with a plurality of holes in the outer gerotor. The second drive shaft is coupled to the inner gerotor.

In another embodiment, a different novel actuated gerotor compressor is used. In this compressor, a first shaft drives the outer gerotor and the actuation means comprises a spur gear set comprised of a large gear coupled to the outer gerotor, the large gear containing a plurality of teeth on an inside diameter, and a small gear coupled to the inner gerotor, the small gear containing a plurality of teeth on an outside diameter, the large gear meshing with the small gear, and further comprised of a second shaft about which the inner gerotor spins, wherein the second shaft contains a crook establishing an offset between the first shaft and the second shaft. Preferably, for cooling and lubrication purposes, the gears are immersed in liquid water. A gear set may be attached to a bottom portion of the inner gerotor allowing for power take off.

In an alternative embodiment using still another novel actuated gerotor compressor, the actuation moans may comprise a plurality of rollers attached to the inner gerotor, wherein the rollers extend beyond a plurality of walls of the inner gerotor and are in contact with the outer gerotor, and wherein the outer gerotor drives the inner gerotor through the rollers. In this embodiment, the inner gerotor may be mounted on a rotating shaft and the rotating shaft extends outside of the compressor housing.

In still another embodiment using a novel actuated gerotor compressor, the actuation means comprises a large gear coupled to the outer gerotor, the large gear comprising a plurality of teeth on an inside diameter, a small gear coupled to the inner gerotor, the small gear comprising a plurality of teeth on an outside diameter, the large gear meshing with the small gear, and a stationary central shaft, wherein the stationary central shaft contains two crooks that create an offset between an axis of the inner gerotor and an axis of the outer gerotor, and wherein the stationary shaft comprises a first end and a second end, the first end of the stationary shaft affixed to a first perforated housing end plate through a pivotable mount that prevents rotation of the stationary shaft and the second end of the stationary shaft located in a rotating bearing cup coupled to the outer gerotor. In this embodiment, the gerotor compressor may further comprise a second perforated housing plate, a first perforated rotating plate and a second perforated rotating plate, such that both the rotating plates are connected to the outer gerotor, and a first stationary plate and a second stationary plate adjacent to both gerotors, the first stationary plate containing an inlet port and the second stationary plate containing a discharge port. Alternatively, the inlet and outlet port can be placed in one of the plates. Preferably, the gears are immersed in liquid water to provide cooling and lubrication.

In the novel air conditioning system disclosed herein, the system may further comprise means for inhibiting microorganisms in the water in the room air contactor, such as an ozone generator or UV radiation. In addition, the means for removing noncondensibles may comprise an aspirator or a vacuum pump, such as the novel pumps disclosed below.

In other embodiments of the disclosed system, the compressor means may comprise a novel low-friction scroll compressor.

In yet another embodiment of the disclosed system, the compressor means comprises a novel actuated flap compressor. This compressor comprises: a compressor housing, the housing having an interior wall, an inlet, and an outlet; a rotor disposed in the housing; a flap, the flap having a first end and a second end, the first end being coupled to the rotor and the second end being propelled in an outward direction during rotation of the rotor; and means for preventing the second end of the flap from touching the interior wall of the housing.

In still another embodiment, the compressor means comprises a novel multi-vane actuated flap compressor. This compressor preferably comprises: an outer drum having an axis; an inner drum rotatably disposed in the outer drum; a plurality of vanes, each vane having a first end and a second end opposite the first end, the vanes pivotally attached to the inner drum at the first end and having a vane tip at the second end, the vane tips being propelled radially outward during rotation of the inner drum; a connecting rod coupled to each vane tip, the rods maintaining a gap between the vane tips and the outer drum; and coupling means for causing the connecting rods to rotate about the axis of the outer drum.

Alternatively, the compressor means may be a novel low-friction reciprocating compressor comprising: a compressor housing; an oscillating center shaft disposed partly within the housing, the shaft comprising a top end and a bottom end, the top end comprising a protrusion which rides in a sinusoidal groove in a rotating cam driven by a motor; and at least one plate disposed in the housing and attached to the shaft and oscillating therewith, the at least one plate having a groove through which water flows to make a seal between the compressor housing and the plates. In one embodiment of the reciprocating compressor, the cam contains a plurality of sinusoidal grooves.

In the novel air conditioning systems disclosed herein, the components may be disposed in three concentric chambers. In one such embodiment the ambient air contactor is disposed in an outermost chamber of the concentric chambers, the compressor means and the evaporator are disposed in an innermost chamber of the concentric chambers, and the condenser is disposed in a middle concentric chamber. In another system, comprising two concentric chambers, the ambient air contactor is disposed in an outermost chamber of the concentric chambers, and the compressor means, the evaporator and the condenser are disposed in an innermost concentric chamber.

The novel systems disclosed herein may further comprise means for providing makeup water to the evaporator and condenser, which is preferably accomplished using one or more float valves. In addition, the room air contactor may comprise a spray tower to place water from the evaporator in direct contact with the room air. The room air contactor may comprise a packing, such that the water from the evaporator passes over the packing, and the room air passes through the packing. The packing preferably comprises corrugated chlorinated polyvinyl chloride. In the disclosed embodiments, the condenser may be a spray condenser, jet condenser, or may comprise a packing.

The present invention is also directed to a novel method for cooling air comprising the steps of: compressing a large volume of low-pressure water vapor with a compressor, thereby creating a vacuum on a quantity of water in an evaporator and causing evaporation and the water to be cooled; pumping cooled water from the evaporator and contacting the cooled water countercurrently with room air in a room air contactor, thereby cooling room air; routing water from the room air contactor to the evaporator, causing the water to flash and cool; sending compressed water vapors exiting the compressor to a condenser for condensation; countercurrently directly contacting the water vapors exiting the condenser with a stream of chilled water from the evaporator to reduce the water content from air; removing noncondensibles from the condenser; routing liquid water from the condenser to an ambient air contactor, where ambient air is contacted countercurrently with liquid water pumped from the condenser; providing make-up water to replace evaporated water; and draining salt water.

Preferably, the compressor is a positive displacement compressor. More preferably, the compressor is a low-friction positive displacement compressor comprising at least two compressing components, in which the compressing components do not substantially contact each other, i.e., although some contact can occur without departing from the spirit and scope of the invention, generally there are clearance gaps, which preferably may be a few thousandths of an inch, between components. The method may further comprise the step of spraying water into the compressor to prevent temperature increase during the compression stage.

In one embodiment of the method, water from the room air contactor may flow countercurrently through a plurality of evaporators. Alternately, condensation may occur in multiple stages. In still another embodiment of the invention, both evaporation and condensation take place in multiple stages. Noncondensibles may be removed by one or a plurality of compressors.

The present invention is also directed to novel methods of cooling air using multistage systems. One such method comprises the steps of: compressing a large volume of low-pressure water vapor in a plurality of compressor stages, thereby creating a vacuum on a quantity of water in a plurality of evaporators and causing the water to be cooled; pumping cooled water from the evaporators and contacting the cooled water countercurrently with room air in a room air contactor, thereby cooling room air; routing water from the room air contactor to the evaporators, causing the water to flash and cool; sending compressed water vapors exiting the last compressor stage to a condenser for condensation; countercurrently directly contacting the water vapors exiting the condenser with a stream of chilled water from at least one of the evaporators to reduce the water content from air; removing noncondensibles from the condenser; routing liquid from the condenser to an ambient air contactor, wherein ambient air is contacted countercurrently with liquid water pumped from the condenser; providing make-up water to replace evaporated water; and draining salt water. Condensation may take place in a single stage or in multiple stages. The compressor stages preferably comprise one or more positive displacement compressors or one or more dynamic compressors. However, in the multistage systems disclosed herein, the compressor stages may be either positive displacement compressors, or dynamic compressors, or a mixture of each.

The present invention is also directed to novel low-friction positive displacement compressors useful in the cooling systems of the present invention as well as in other applications. They have the advantage of low friction and high efficiency. These compressors comprise at least two compressing components, such that the compressing components do not substantially contact one another. The compressing components may comprise: an inner gerotor, an outer gerotor and a housing; an orbiting scroll, a stationary scroll and a housing; a housing and a piston; a housing, a rotor and a sliding vane; a housing, a rotor and a flap; or an inner drum, an outer drum and a swinging vane, and there is a gap between at least two of the compressing components. Water, or water and a wick may be used as a sealant in the gap.

One such novel compressor comprises a gerotor compressor comprising an inner gerotor and an outer gerotor, the inner gerotor disposed within the outer gerotor, each gerotor comprising a plurality of teeth. The inner gerotor has one less tooth than the outer gerotor, thereby creating a void volume between the inner gerotor and the outer gerotor. In addition, there is a gap between the inner gerotor and outer gerotor. The gerotor compressor further comprises an inlet port and a discharge port; the ports communicate with the void volume.

The discharge port may have a variable port mechanism that changes the position of a leading edge of the discharge port. In one embodiment, the variable port mechanism comprises an electrically controlled servo motor, the motor rotating a threaded rod, a bellows, and a non-rotating nut coupled to the bellows, the rod axially positioning the non-rotating nut. The variable port mechanism may be positioned using electrically actuated means. In another embodiment, it may be positioned using a bellows, the bellows being actuated by a bulb containing a liquid, the liquid ill the bulb having a vapor pressure proportional to the condenser temperature which acts on the bellows. In yet another embodiment, the variable port mechanism comprises a plurality of plates disposed adjacent to the discharge port and means for sequentially moving the plates to vary the leading edge of the discharge port.

The present invention is also directed to novel low-friction gerotor compressors which use actuation means to actuate the gerotors allowing for reduced friction. In one such embodiment, a first drive shaft drives the outer gerotor and the actuation means comprises an internal gearbox containing a plurality of spur gears, the plurality being an odd number, and wherein one of the spur gears is coupled to the first drive shaft and another of the spur gears is coupled to a second drive shaft, the second drive shaft being offset from the first drive shaft thereby suspending the gearbox between the first drive shaft and the second drive shaft, and the first drive shaft is coupled to the outer gerotor tough a plate that comprises a plurality of prongs in contact with a plurality of holes in the outer gerotor. A second drive shaft is coupled to the inner gerotor.

In another novel actuated gerotor compressor, a first drive shaft drives the outer gerotor and the actuation means comprises a spur gear set comprised of a large gear coupled to the outer gerotor, the large gear containing a plurality of teeth on an inside diameter, and a small gear coupled to the inner gerotor, the small gear containing a plurality of teeth on an outside diameter. In this embodiment the large gear meshes with the small gear, and there is a second shaft about which the inner gerotor spins. This second shaft contains a crook establishing an offset between the first shaft and the second shaft.

In another embodiment of a novel actuate a gerotor compressor, the actuation means comprises a plurality of rollers attached to the inner gerotor, wherein the rollers extend beyond a plurality of walls of the inner gerotor and are in contact with the outer gerotor, and the outer gerotor drives the inner gerotor through the rollers.

In another embodiment, the inner gerotor and outer gerotor are disposed in a housing, a first drive shaft drives the outer gerotor, and the actuation means comprises a spur gear set comprised of a large gear, coupled to the outer gerotor, the large gear containing a plurality of teeth on an inside diameter, and a small gear coupled to the inner gerotor, the small gear containing a plurality of teeth on an outside diameter. In this embodiment, the large gear meshes with the small gear, and there is a second shaft attached to the inner gerotor which spins on a bearing means, such as bearings affixed to the housing.

In still another embodiment, a first drive shaft drives the inner gerotors, and the actuation means comprises a spur gear set comprised of a large gear coupled to the outer gerotor, the large gear containing a plurality of teeth on an inside diameter, and a small gear coupled to the inner gerotor, the small gear containing a plurality of teeth on an outside diameter, wherein the large gear meshes with the small gear, and further comprises a second nonrotating shaft about which the outer gerotor spins, wherein the second shaft contains a crook establishing an offset between the first and the second shafts.

In still another embodiment, the actuation means comprises a large gear coupled to the outer gerotor, the large gear comprising a plurality of teeth on an inside diameter, a small gear coupled to the inner gerotor, the small gear comprising a plurality of teeth on an outside diameter, the large gear meshing with the small gear, and a stationary central shaft, wherein the stationary central shaft contains two crooks that create an offset between an axis of the inner gerotor and an axis of the outer gerotor, and wherein the stationary shaft comprises a first end and a second end, the first end of the stationary shaft affixed to a first perforated housing end plate through a pivotable mount that prevents rotation of the stationary shaft and the second end of the stationary shaft located in a rotating bearing cup coupled to the outer gerotor. Preferably, the pivotable mount prevents the stationary central shaft from rotating, but allows for angular and axial variation.

In this embodiment, the pivotable mount may comprise a ring, spokes and a hub, which are coupled to the shaft. The ring has a spherical outer diameter which is disposed within an inlet of the first perforated housing end plate. In addition, the gerotor compressor may further comprise a second perforated housing plate, a first perforated rotating plate and a second perforated rotating plate, wherein both the rotating plates are connected to the outer gerotor, and a first stationary plate and a second stationary plate which are adjacent to the inner and outer gerotors, the first stationary plate containing an inlet port and the second stationary plate containing a discharge port.

The present invention is also directed to novel low-friction scroll compressors. One such compressor comprises a stationary scroll having flutes and an orbiting scroll having flutes, the orbiting scroll orbiting around the stationary scroll. The flutes of the scrolls are separated by a gap.

The scroll compressor of the present invention may have novel means for creating orbiting motion. This compressor comprises a stationary scroll, an orbiting scroll, and means for causing the orbiting scroll to orbit around the stationary scroll, the means comprising a first gear affixed to the stationary scroll, an orbiting arm affixed to the first gear, a second intermediary gear attached to the orbiting arm, and a third gear attached to the orbiting scroll, wherein the second intermediary gear drives the third gear.

Still other embodiments of the invention are directed to novel sliding vane compressors which comprise a rotor, a sliding vane and a housing, and means for reducing friction between the vane, the rotor and the housing. In one such embodiment, the compressor comprises: a compressor housing, the housing having an interior wall, an inlet, and an outlet; a rotor disposed in the housing; a flap, the flap having a first end and a second end, the first end being coupled to the rotor and the second end being propelled in an outward direction during rotation of the rotor; and means for preventing the second end of the flap from touching the interior wall of the housing.

In still another embodiment, a novel multi-vane compressor comprises: an outer drum having an axis; an inner drum rotatably disposed in the outer drum; a plurality of vanes, each vane having a first end and a second end opposite the first end, the vanes pivotably attached to the inner drum at the first end and having a vane top at the second end, the vane tips being propelled radially outward during rotation of the inner drum; a connecting rod coupled to each vane tip, the rods maintaining a gap between the vane tips and the outer drum and coupling means for causing the connecting rods to rotate about the axis of the outer drum. In this embodiment, the inner drum is preferably rotatably driven by a first shaft, and the coupling mean comprises an offset shaft to which the connecting rod is coupled, the offset shaft being coaxial with the axis of the outer drum; and a torque coupler for transmitting rotational force to the offset shaft. Preferably, water is used as a sealant in the gaps.

Still another embodiment is directed to a novel low-friction reciprocating compressor, comprising: a compressor housing, an oscillating center shaft disposed partly within the housing, the shaft comprising a top end and a bottom end; and at least one plate disposed in the housing and attached to the shaft and oscillating therewith, the at least one plate having a groove through which water flows to make a seal between the compressor housing and the plates. In a preferred embodiment, the top end of the shaft has a protrusion which rides in a sinusoidal groove in a rotating cam driven by a motor. Alternately, the cam may contain a plurality of sinusoidal grooves.

The present invention is also directed to novel pumps useful in removing noncondensibles. Possible methods for purging noncondensibles include: 1) periodically flooding the condenser with liquid water to push out accumulated noncondensibles, 2) employing an aspirator in which the vacuum at the throat of the venturi draws out noncondensibles, and 3) employing a mechanical vacuum pump. One such embodiment comprises a vacuum pump which comprises a cylinder, a piston disposed in the cylinder, an inlet valve disposed in the cylinder, a sprayer that draws water into the cylinder, and a vent disposed in the cylinder for discharging noncondensibles and excess water. The vacuum pump is driven by a gear mounted on a main drive shaft, the gear connected to a plurality of reduction gears, wherein a first cam surface and a second cam surface are mounted on one of the reduction gears, a first roller rides on the first cam surface and a second roller rides on the second cam surface, and the first roller drives the piston and the second roller drives the inlet valve.

Another novel vacuum pump comprises a cylinder, piston disposed in the cylinder, a crank, a check valve disposed in the cylinder, and means for spraying water into the cylinder of the vacuum pump, wherein the piston is driven by the crank in a first and a second direction opposite the first direction, the piston comprising a first end, a second end, a plurality of notches, a plurality of perforations extending from the first end to the second end, and a flexible flap attached to the second end of the piston and covering one or more of the perforations, wherein the flap opens when the piston moves in the first direction and closes when the piston moves in the second direction.

Still another novel vacuum pump comprises: a first column and a second column, the columns being partially filled with liquid and having a vapor space; means for causing the liquid to oscillate in the columns; inlet means for allowing uncompressed gas to enter each of the columns; outlet means for discharging compressed gas from each of the columns; and means for spraying a fine mist of liquid into the vapor space of the first and the second columns. Preferably, the means for causing oscillation comprise a chamber connecting the first and the second columns and a reciprocating piston disposed in the chamber. The outlet means for each column preferably comprises a check valve. This oscillating pump has the ability to isothermally compress a mixture of noncondensible and condensible gases to a very high compression ratio.

Another novel vacuum pump is a gerotor vacuum pump comprising an outer gerotor and a center gerotor disposed within the outer gerotor, wherein the center gerotor is mounted on a main drive shaft and the outer gerotor is positioned by a plurality of guide rollers. Alternatively, the center gerotor is mounted on a main drive shaft and the outer gerotor is mounted within a single ball bearing.

The volumetric load on the aspirator or vacuum pump can be greatly reduced by condensing most of the water and increasing the partial pressure of the noncondensibles. The present invention employs a novel method for removing water vapor from noncondensibles in a stream of air and water vapor comprising passing the stream through a packed column with chilled water flowing countercurrently. Preferably, the packed column comprises structured packing (e.g., corrugated polyvinyl chloride) or dumped packing (e.g., ceramic saddles).

Still another embodiment is directed to a novel pivotable mounting apparatus for mounting a stationary shaft to a housing, which prevents rotation of the shaft, but allows for angular and axial variation. This apparatus comprises a ring, spokes and hub, coupled to the shaft. The ring has a spherical outer diameter, which is disposed within a cylindrical shaped opening in the housing.

Still another embodiment is directed to a novel low-friction rotary shaft seal comprising: a journal for receiving a rotary shaft, the journal configured to create a gap between the shaft and the journal, the journal further comprising a journal face; means for supplying water to the gap; and a bellows seal, the seal resting on the journal face when the shaft is stationary and lifting off the face when the shaft rotates.

DESCRIPTION OF THE DRAWINGS

FIG. 10 (a) Top view of slip ring 3326 of rotor 3302 of compressor 3300; (b) top view of counterweight 3328 of rotor 3302; (c) top view of top cap 3320 of rotor 3302; and (d) bottom view of bottom cap 3330 of rotor 3302.

FIG. 26 Exploded side view of rotor 5302 of compressor 5300.

FIG. 29 (a) Side view of sliding vane 5308 of compressor 9160; (b) cross sectional view of sliding vane 5308 taken along plane A—A of (a); and (c) cross sectional view of sliding vane 5308 taken along plane B—B of (a).

FIG. 44 Top view of inner drum 7302 and vane connecting rod 7370 of compressor 7300.

DESCRIPTION OF THE INVENTION

This invention is directed to highly efficient and economical vapor compression evaporative coolers that use water rather than CFCs as a coolant, Such coolers can assume various configurations such as the following novel cooling systems described herein:

1. The two cooling systems depicted in FIGS. 1 and 2 which use a compressor to pressurize water vapors, followed by a jet condenser or spray condenser;
2. Cooling systems having three concentric chambers such as cooler 200 depicted in FIG. 5 and cooler 3200 depicted in FIG. 16;
3. Cooling systems such as coolers 8800, 8801 and 8802 depicted in FIGS. 48, 49, and 52 with condenser on top and compressor discharge port at the top;
4. Cooling systems such as coolers 10000, 11000, and 12000 depicted in FIGS. 71,73, and 79 with condenser on bottom and compressor discharge port on bottom; and
5. Multistage systems, such as the three systems 13000, 13100, and 13200 depicted in FIGS. 83, 88 and 89.

The invention is also directed to novel low-friction, positive displacement compressors that can be incorporated into one or more of the foregoing cooling systems, including systems having three concentric chambers, such as cooler 3200 or cooler 200. These compressors include:

1. The piston compressor 230 depicted in FIG. 5;
2. Sliding vane compressor 3300 depicted in FIGS. 6–16;
3. Sliding vane compressor 4300 depicted in FIGS. 17–24;
4. Actuated sliding vane compressor 5300 depicted in FIGS. 25–31;
5. Actuated flap compressor 6300 depicted in FIGS. 32–42; and
6. Activated flap compressor, multi-vane configuration 7300, depicted in FIGS. 43–46.

Figure 48:
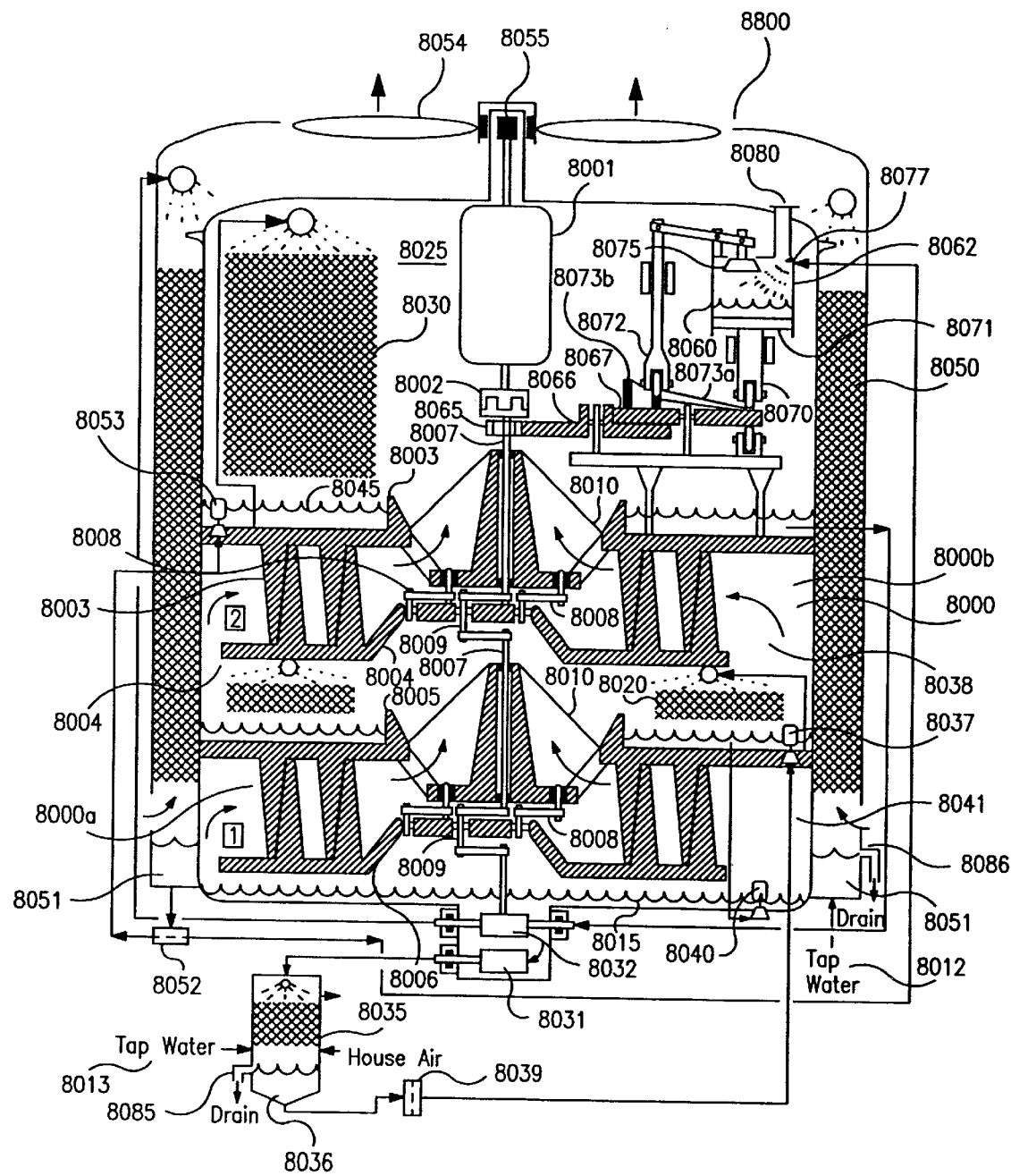
FIG. 48 Schematic cross sectional view of scroll compressor 8000 incorporated into cooler 8800.

This invention is also directed to the use of novel low-friction, positive displacement compressors in one or more of the above-described cooling systems, including systems having two concentric chambers, such as cooler 8800 depicted in FIG. 48. These compressors include:

1. Scroll compressors such as the three embodiments depicted in FIGS. 48, 49, and 52 (8000, 8400, and 8500); and
2. Gerotor compressors such as the three embodiments depicted in FIGS. 56, 63, and 65 (9300, 9400, and 9500).

This invention is also directed to the use of novel low-friction, positive displacement compressors that can be used in one or more of the above-described cooling systems, such as coolers 10000, 11000, and 12000. These compressors include gerotor compressors having novel means for actuating said compressors such as:

1. Gerotor compressor 10300, depicted in FIGS. 68 and 71;
2. Gerotor compressor 10400, depicted in FIG. 72; and
3. Gerotor compressor 11400, depicted in FIG. 73.

Figure 80A:
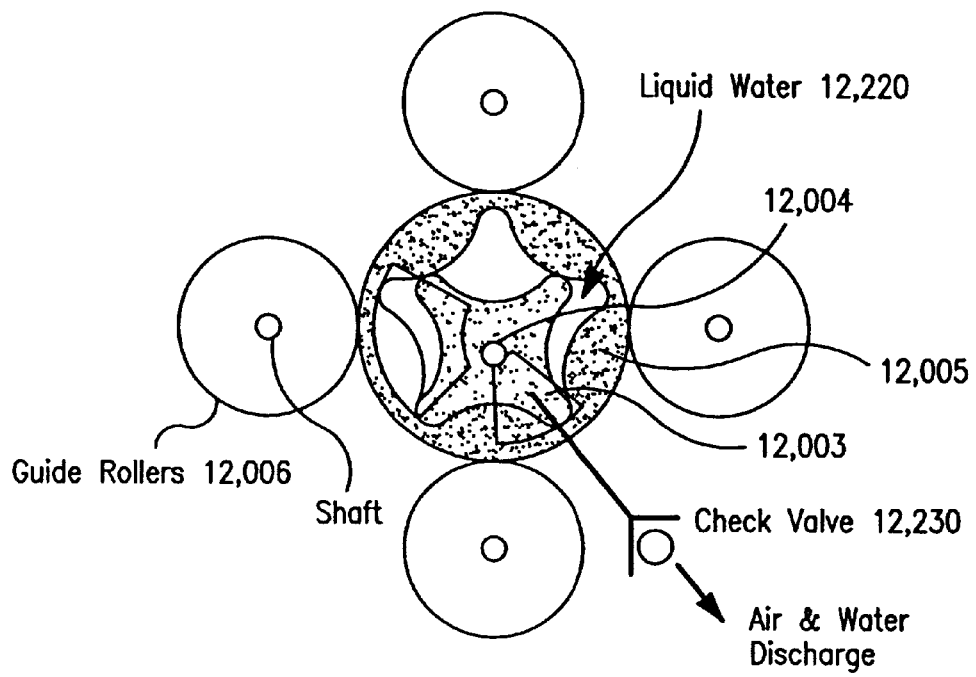
FIG. 80 (a) Top view of gerotor vacuum pump 12060; and (b) side view of gerotor vacuum pump 12060.

The present invention is also directed to novel means for removing noncondensibles from vapor compression evaporative coolers. These means include the use of vacuum pumps such as:

1. Vacuum pump 10060 depicted in FIGS. 69 and 70, which removes noncondensibles from the condenser;
2. Gerotor vacuum pump 12060 depicted in FIG. 80*a*;
3. The noncondensible vacuum pumps 12402 and 12403 depicted in FIGS. 81 and 82; and
4. Pump 8060 depicted in FIG. 48.

Figure 1:
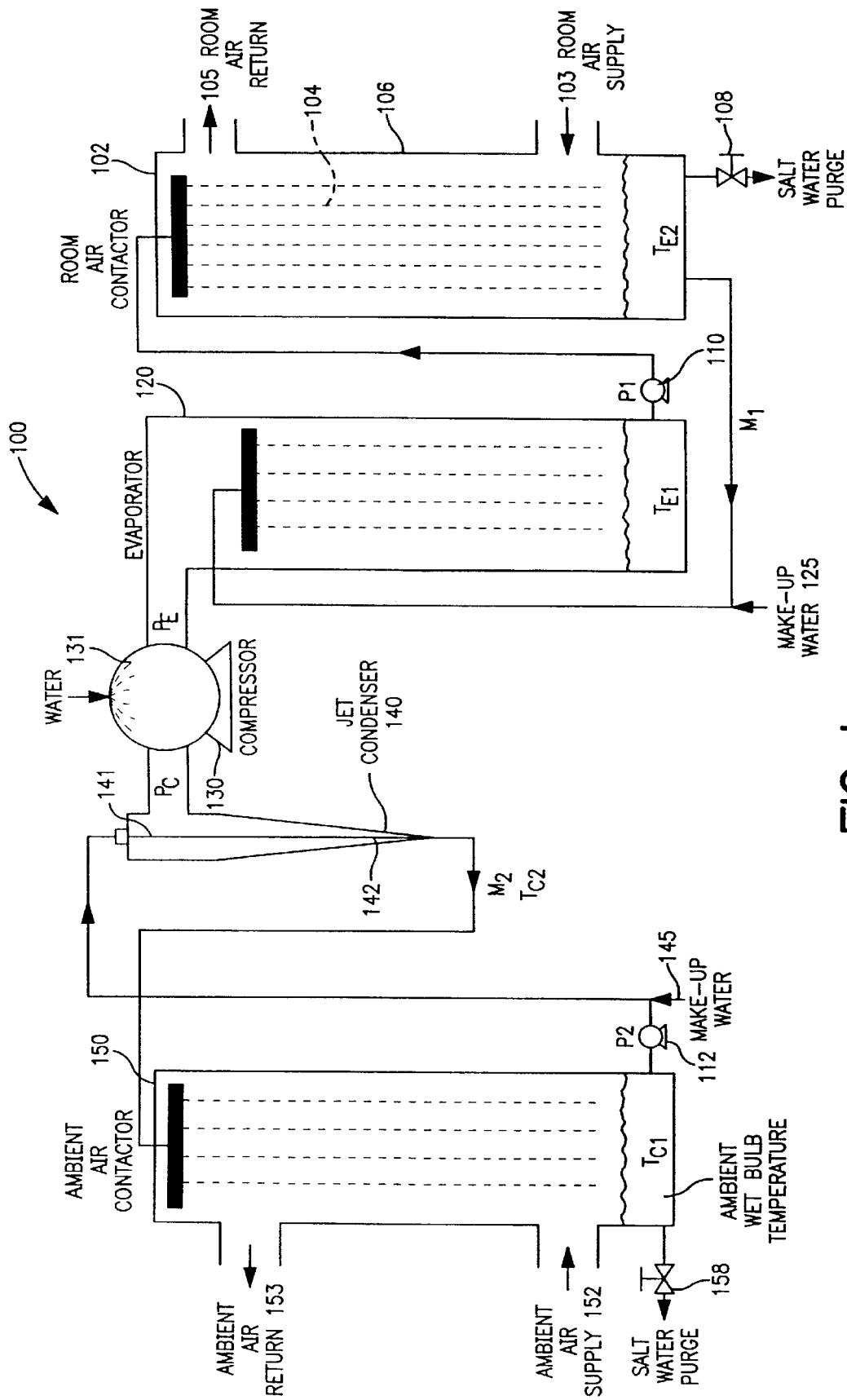
FIG. 1 Schematic of vapor compression evaporative cooler 100.
Figure 89:
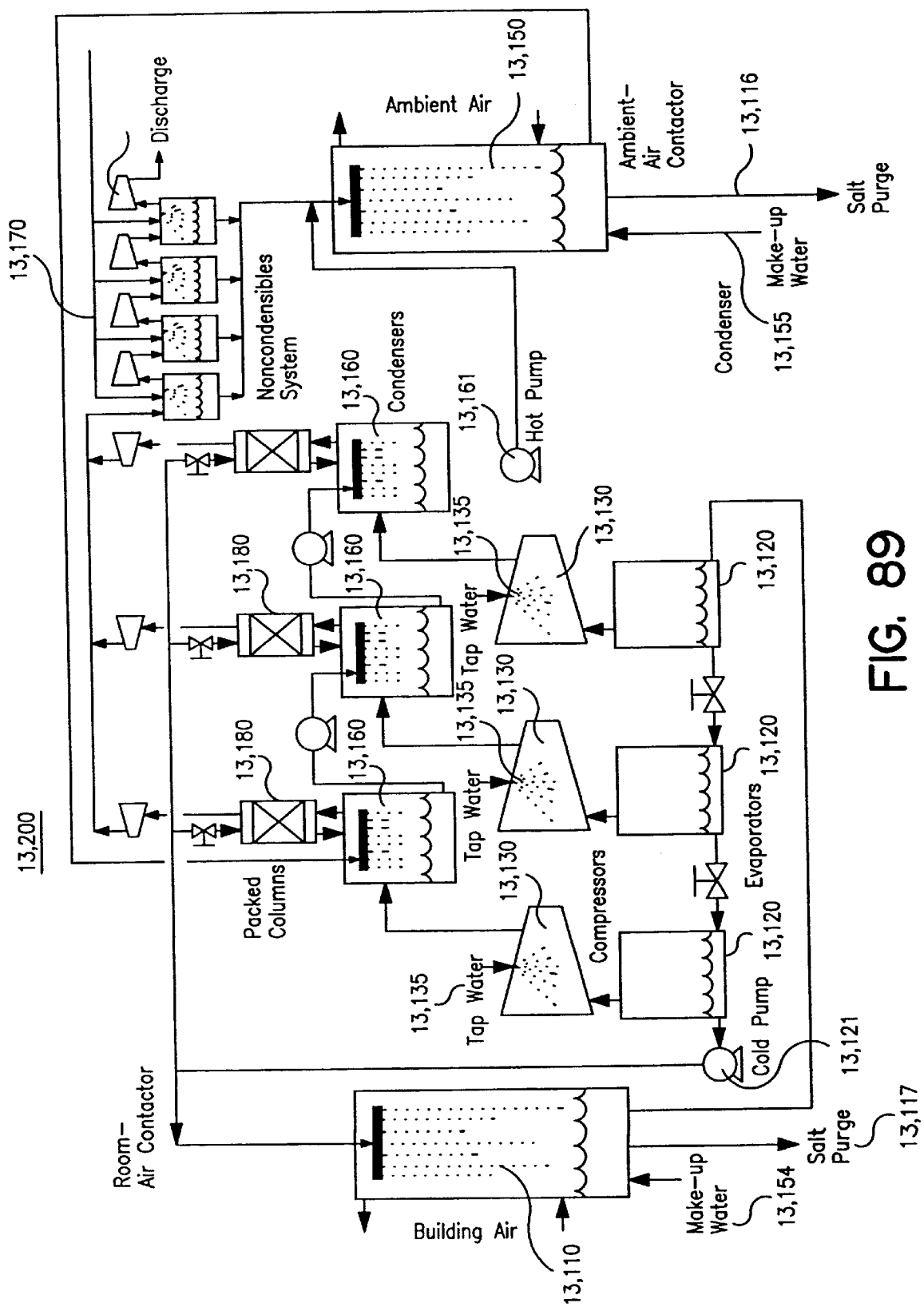
FIG. 89 Schematic of vapor compression evaporative cooler 13200 which employs multistage evaporators and condensers.

The embodiments of the present invention are illustrated in FIGS. 1–89, wherein like numerals are used to denote like elements.

FIG. 1 depicts vapor-compression evaporative cooler 100 in accordance with a first embodiment of the present invention. This Cooler can be used in any region of the country regardless of the humidity; however, its performance is enhanced in regions with particularly low humidity.

As depicted in FIG. 1, room air (about 25° C. dry-bulb temperature, 55% relative humidity, 15° C. dew point) enters room air contactor 102 through room air inlet 103. Cold water 104 (about 13° C.) is sprayed inside room air contactor 102. Room air contactor 102 has a room air contactor return 105. The room air becomes chilled due to the direct contact with cold water spray 104. Further, the room air is also dehumidified because the cold water temperature is less than the air dew point. FIG. 1 depicts room air contacting water in a spray tower 106; however, contact could also be accomplished by blowing room air through a packed tower. In a preferred embodiment, structured packing is employed consisting of corrugated chlorinated polyvinyl chloride (CPVC) sheets that are arranged with open channels allowing chilled water to flow down and room air to flow up. CPVC is a preferred material because it is inexpensive, lightweight, and resists degradation by ozone, which may be introduced to kill potential microorganisms, Alternatively, a fibrous mat may be employed with cold water trickling over the fibers, or using any other suitable means, such as random packing made of ceramic, metal, or plastic.

Evaporator 120 in FIG. 1 is preferably held at a low pressure preferably about 0.015 atm) using compressor 130, or any positive displacement compressor. Water from the room air contactor 102 is drawn into the evaporator 120 where it flashes and cools. This cold water is pumped out of evaporator 120 into room air contactor 102 using pump 110.

Compressor 130 pressurizes the water vapors and discharges them to a condenser, such as jet condenser 146. When compressed, the water vapor superheat which increases the work requirement. This can be overcome by spraying liquid water 131 directly into compressor 130 as described in U.S. Pat. No. 5,097,077 assigned to Texas A&M University, and incorporated herein by reference. Because it takes time for the water to evaporate and cool the vapors, it is best to perform the compression in a series of small steps, or to operate the compressor slowly, or to employ very fine water droplets. The compression is preferably done using a low-friction positive displacement compressor (piston, vane, flap, scroll, gerotor) such as those disclosed herein, or any suitable means. Because of the large volume of water vapors that must be compressed, the compressor is necessarily large. To achieve high efficiency, it is essential that the compressor have low friction.

The compressed water vapors exiting compressor 130 are sent to jet condenser 140. Jet condenser 140 operates like a venturi. High-pressure liquid water enters jet condenser 140. The throat 141 of jet condenser 140 narrows causing the water velocity to increase. The kinetic energy needed to accelerate the water comes at the expense of pressure energy, so a vacuum is produced. The high-velocity, low-pressure water is colder than the water vapors exiting compressor 130. When these vapors contact the high-velocity water stream, they condense onto the water stream and are swept out with the water. The diameter of lower throat 142 of the pipe exiting jet condenser 140 increases so the water velocity decreases. This converts the kinetic energy back into pressure energy so the water can exit at atmospheric pressure. Any noncondensibles are also swept out of the system.

The liquid exiting jet condenser 140 is sent to ambient air contactor 150. Ambient air contactor 150 has an ambient air inlet 152 and an ambient air return 153. In a preferred embodiment, it has a salt water purge 158. As water evaporates into the ambient air, it cools to approach the wet-bulb temperature. Because the wet-bulb temperature is usually significantly less than the dry-bulb temperature, heat is rejected at a much lower temperature than with conventional vapor-compression air conditioners. In addition, because direct contact heat exchange is employed, the ΔT is much less. Cooled water is returned from the ambient air contactor to the condenser via pump 112.

Because heat is ultimately rejected by water evaporation, make-up water is required. Make-up water 131, 145 and 125 may be added to compressor 130, jet condenser 140, and evaporator 120, respectively, as needed.

Some water will condense out of the room air, but this is insufficient to meet the total water requirement. If ordinary city water is employed, salts will accumulate, therefore, salt water purge 108 is used. As indicated in FIG. 1, salt water purge 108 may be located at the bottom of the room air contactor 102. In addition, means for removing microorganisms from the water in the system, particularly the room air contactor may be used, such as an ozone generator, UV radiation source, antimicrobial chemicals or other means known in the art.

Figure 2:
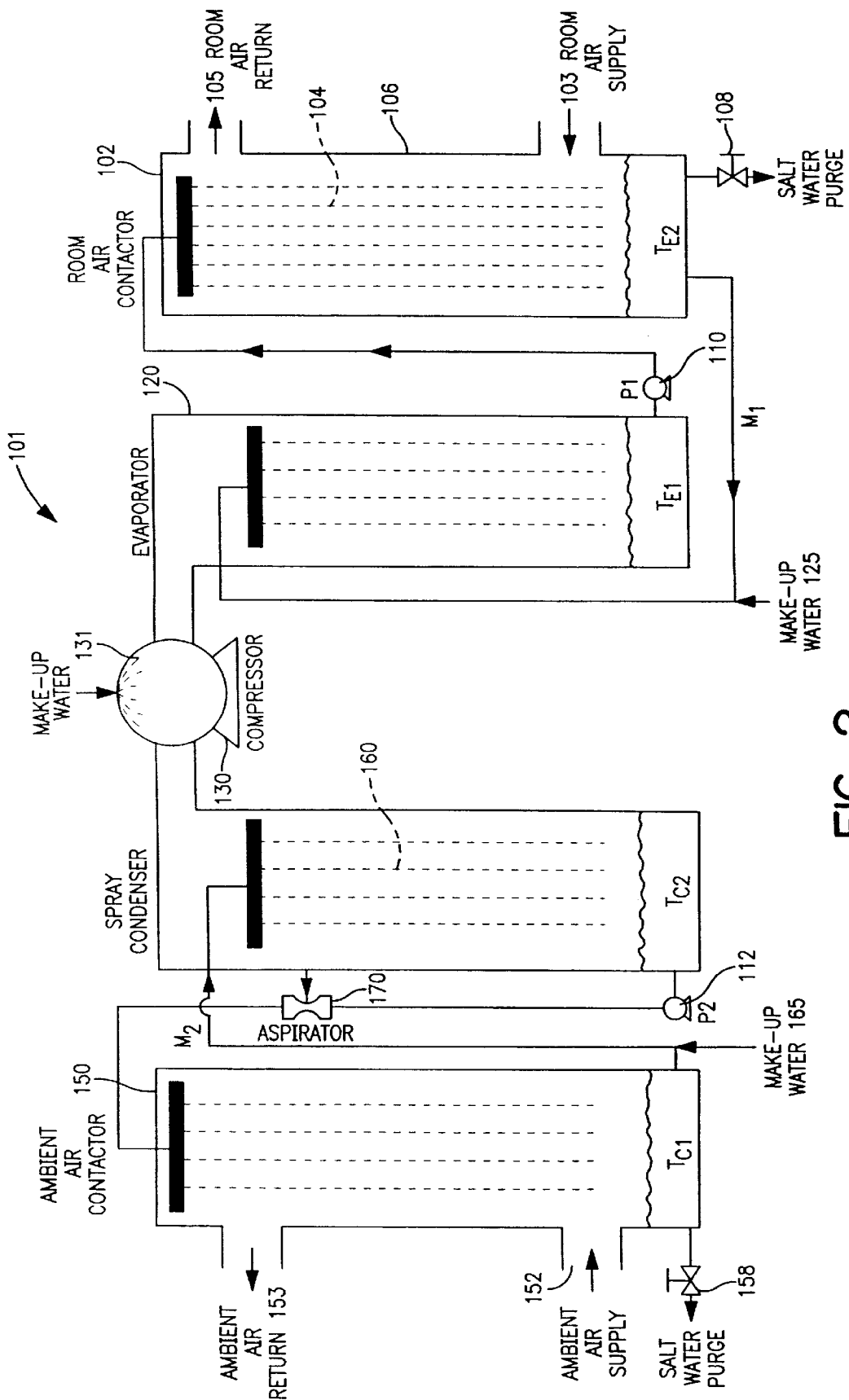
FIG. 2 Schematic of vapor compression evaporative cooler 101.

FIG. 2 depicts an alternative embodiment of the present invention. Reference numerals in this embodiment refer to like elements or features in the embodiment of FIG. 1, so that a further description thereof is omitted. Vapor compression evaporative cooler 101 is identical to the cooler in FIG. 1, except that spray condenser 160 is employed rather than a jet condenser. Make-up water 165 may be added to the spray condenser. Additionally, there is a small aspirator 170, which operates as a venturi; the reduced pressure at the venturi throat draws noncondensibles out of the condenser.

The embodiment shown in FIG. 2 is easier to analyze than that in FIG. 1 because actual performance data is needed for the jet condenser. Therefore, the following analysis is for FIG. 2.

The coefficient of performance, COP, is defined as the heat removed in the evaporator divided by the total work required to operate the system $$COP = \frac{Q_{evap}}{W_{comp} + W_{P1} + W_{P2}} \quad (1)$$

where $Q_{evap}$=heat removed in the evaporator $W_{comp}$=compressor work $W_{P1}$=work of pump 1

$W_{P2}$=work of pump 2.

This expression can be inverted as $$\frac{1}{COP} = \frac{W_{comp}}{Q_{evap}} + \frac{W_{P1}}{Q_{evap}} + \frac{W_{P2}}{Q_{evap}} \quad (2)$$

$$= \frac{1}{COP_{comp}} + \frac{1}{COP_{P1}} + \frac{1}{COP_{P2}}$$

Figure 21:
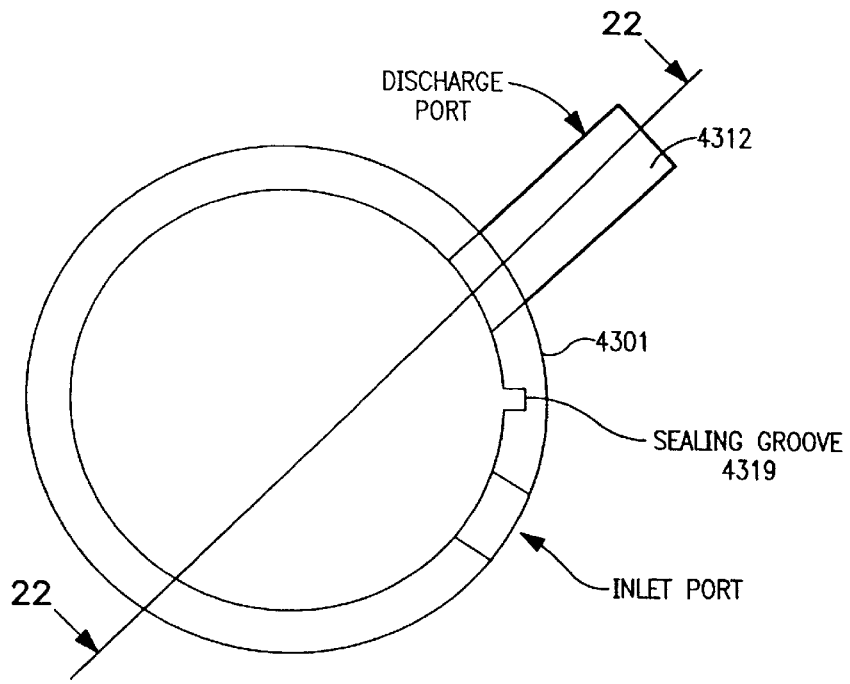
FIG. 21 Top view of compressor housing 4301 of compressor 4300.

The compressor $COP_{comp}$ is $$COP_{comp} = \frac{Q_{evap}}{W_{comp}} = \eta_{ref}\eta_{compressor}\eta_{motor}COP_C \quad (3)$$

where $\eta_{ref}$=refrigeration efficiency relative to Carnot efficiency (FIG. 21, Reducing Energy Costs in Vapor-Compression Refrigeration and Air Conditioning Using Liquid Recycle—Part II: Performance, Mark Holtzapple, ASHRAE Transactions, Vol. 95, Part 1, 187–198 (1989)

Figures 86, 87:
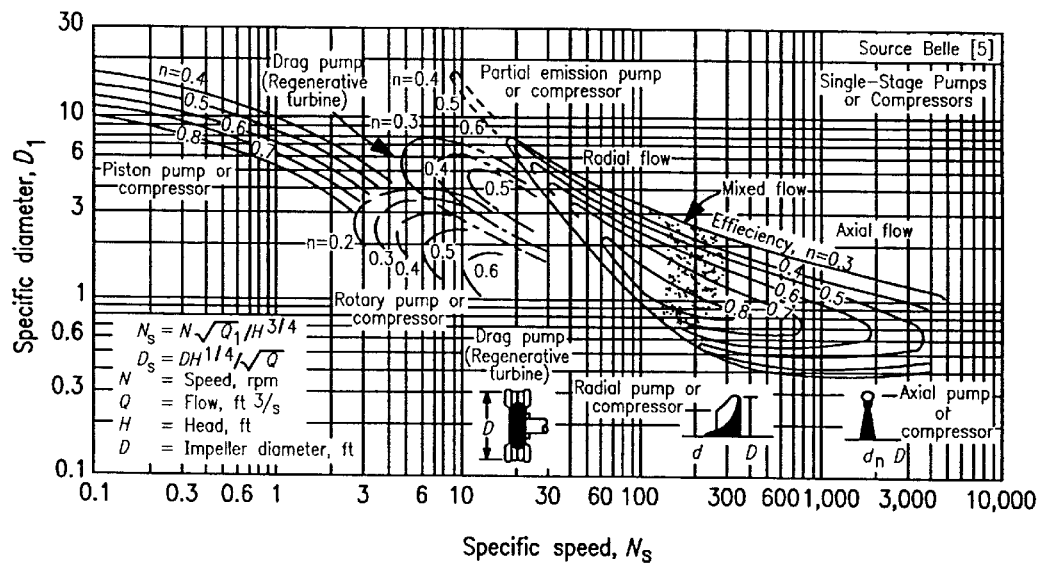
FIG. 86 Generalized compressor chart.
FIG. 87 Table depicting results of a centrifugal compressor analysis.

$\eta_{compressor}$=compressor efficiency (60–70% according to FIG. 86)

$\eta_{motor}$=motor efficiency (80%, although higher is possible)

$$COP_C = \frac{T_{E1}}{T_{C2} - T_{E1}} = \text{Carnot coefficient of performance} \quad (4)$$

$T_{E1}$=water temperature exiting evaporator (absolute temperature)

$T_{C2}$=water temperature exiting spray condenser (absolute temperature)

The pump coefficient of performance, $COP_{P1}$ is given by $$COP_{P1} = \frac{Q_{evap}}{W_{P1}} \quad (5)$$

The pump work is $$W_{P1} = \frac{m_1 \Delta P_1}{\eta_{pump} \rho} \quad (6)$$

where $m_1$=mass flow of water through pump 1

$\Delta P_1$=pressure increase from pump 1

$\rho$=water density $\eta_{pump}$=pump efficiency (assumed to be 50% with motor losses included)

The mass flow of water is determined by performing an energy balance $$m_1 C_p (T_{E2} - T_{E1}) = Q_{evap} \quad (7)$$

$$m_1 = \frac{Q_{evap}}{C_p(T_{E2} - T_{E1})} \quad (8)$$

where $C_p$=heat capacity of liquid water $T_{E2}$=water temperature exiting room air contactor Equation 8 can be substituted into Equation 6 which in turn is substituted into Equation 5 to give the pump coefficient of performance $$COP_{P1} = \frac{\eta_{pump} C_p (T_{E2} - T_{E1}) \rho}{\Delta P_1} \quad (9)$$

A similar expression can be derived for the coefficient of performance for pump 2

$$COP_{P2} = \frac{\eta_{pump} C_p (T_{C2} - T_{C1}) \rho}{\Delta P_2} \quad (10)$$

where $T_{C1}$=water temperature exiting ambient air contactor

Equations 3, 9 and 10 may be substituted into Equation 2 to determine the coefficient of performance of the entire system $$COP = \left[ \frac{T_{C2} - T_{E1}}{\eta_{ref} \eta_{compressor} \eta_{motor} T_{E1}} + \frac{\Delta P_1}{\eta_{pump} C_p (T_{E2} - T_{E1}) \rho} + \frac{\Delta P_2}{\eta_{pump} C_p (T_{C2} - T_{C1}) \rho} \right]^{-1} \quad (11)$$

The room air is assumed to have the following properties:

dry bulb temperature=25° C.

relative humidity=55% dew point=15° C.

The following parameters were used to determine the COP according to Equation 11:

$\eta_{ref}$=0.97 (from FIG. 21, Reducing Energy Costs in Vapor-Compression Refrigeration and Air Conditioning Using Liquid Recycle—Part II: Performance, Mark Holtzapple, ASHRAE Transactions, Vol. 95, Part 1, 187–198 (1989)

$\eta_{comp}$=0.7 (from FIG. 86)

$\eta_{motor}$=0.8

$\eta_{pump}$=0.5

$C_p$=4188 J/(kg·°C.)

$\rho$=1000 kg/cm$^3$ $\Delta P_1$=1 bar=10$^5$ N/m$^2$ $\Delta P_2$=1 bar=10$^5$ N/m$^2$ $T_{E1}$=13° C.=286.15 K $T_{E2} - T_{E1} = \Delta T$ (for simplicity)

$T_{C2} - T_{C1} = \Delta T$ (for simplicity)

$T_{C2} - T_{C1} + \Delta T$

Figure 3:
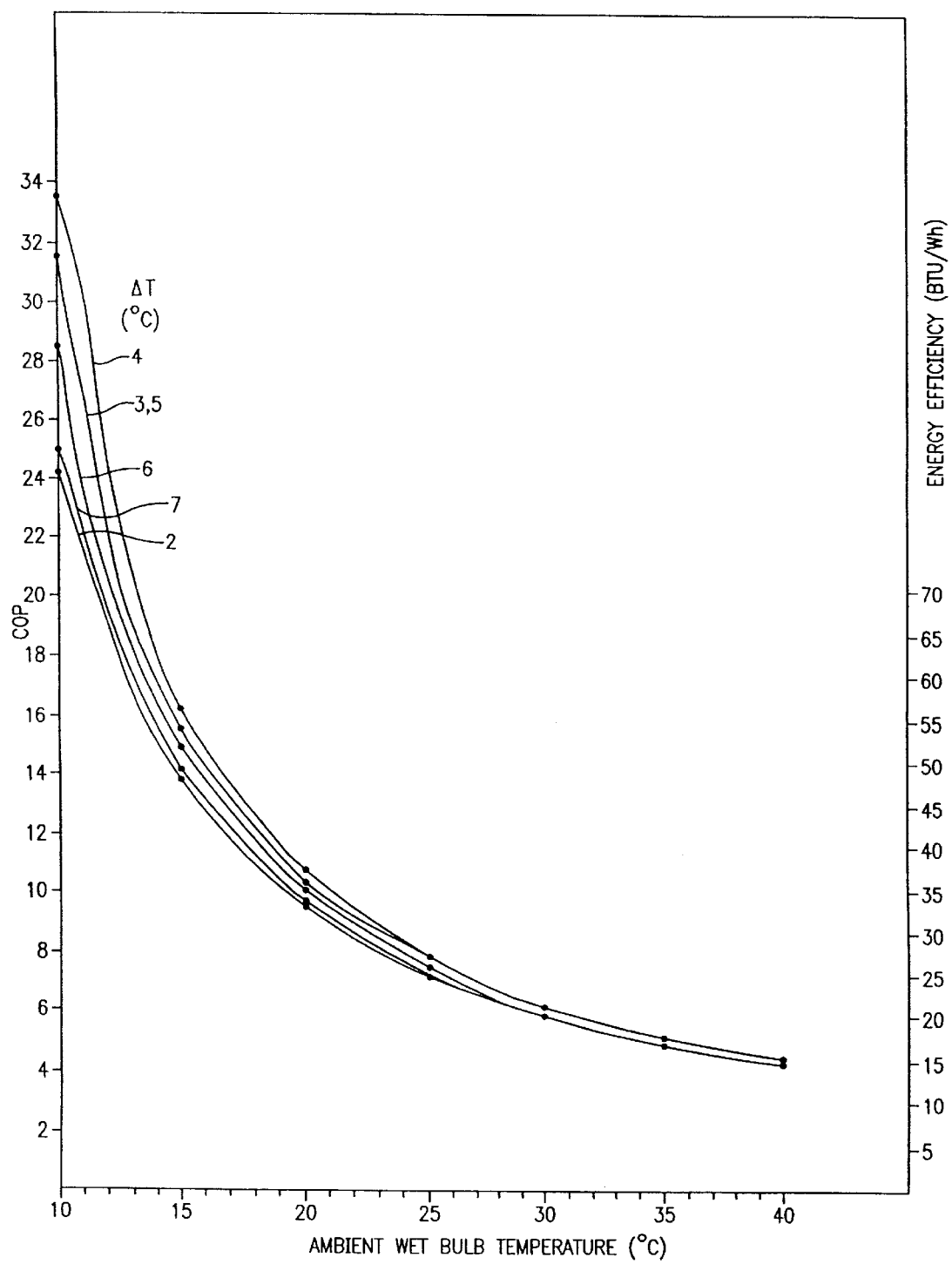
FIG. 3 Depiction of the coefficient of performance of cooler 101 under various conditions.

FIG. 3 shows the COP under a variety of environmental conditions. The X axis is the ambient wet-bulb temperature (° C.). The Y axis is the coefficient of performance calculated using Equation 11. The $\Delta T$ that results in the greatest system efficiency is 4° C.

The coefficient of performance for a conventional R-12 air conditioning system is $$COP = \eta_{ref} \eta_{comp} \eta_{motor} \frac{T_E}{T_C - T_E} \quad (12)$$

where $\eta_{comp}$ is the compressor efficiency (assumed to be 0.7), $\eta_{motor}$ is the motor efficiency (assumed to be 0.8), $T_E$ is the evaporator temperature, $T_C$ is the condenser temperature, and $\eta_{ref}$ is given by FIG. 2 in the paper Reducing Energy Costs in Vapor-compression Refrigeration and Air Conditioning Using Liquid Recycle—Part I: Comparison of Ammonia and R-12, Mark Holtzapple ASHRAE Transactions, Vol. 95, Part 1, 179–186 (1989).

Figure 4:
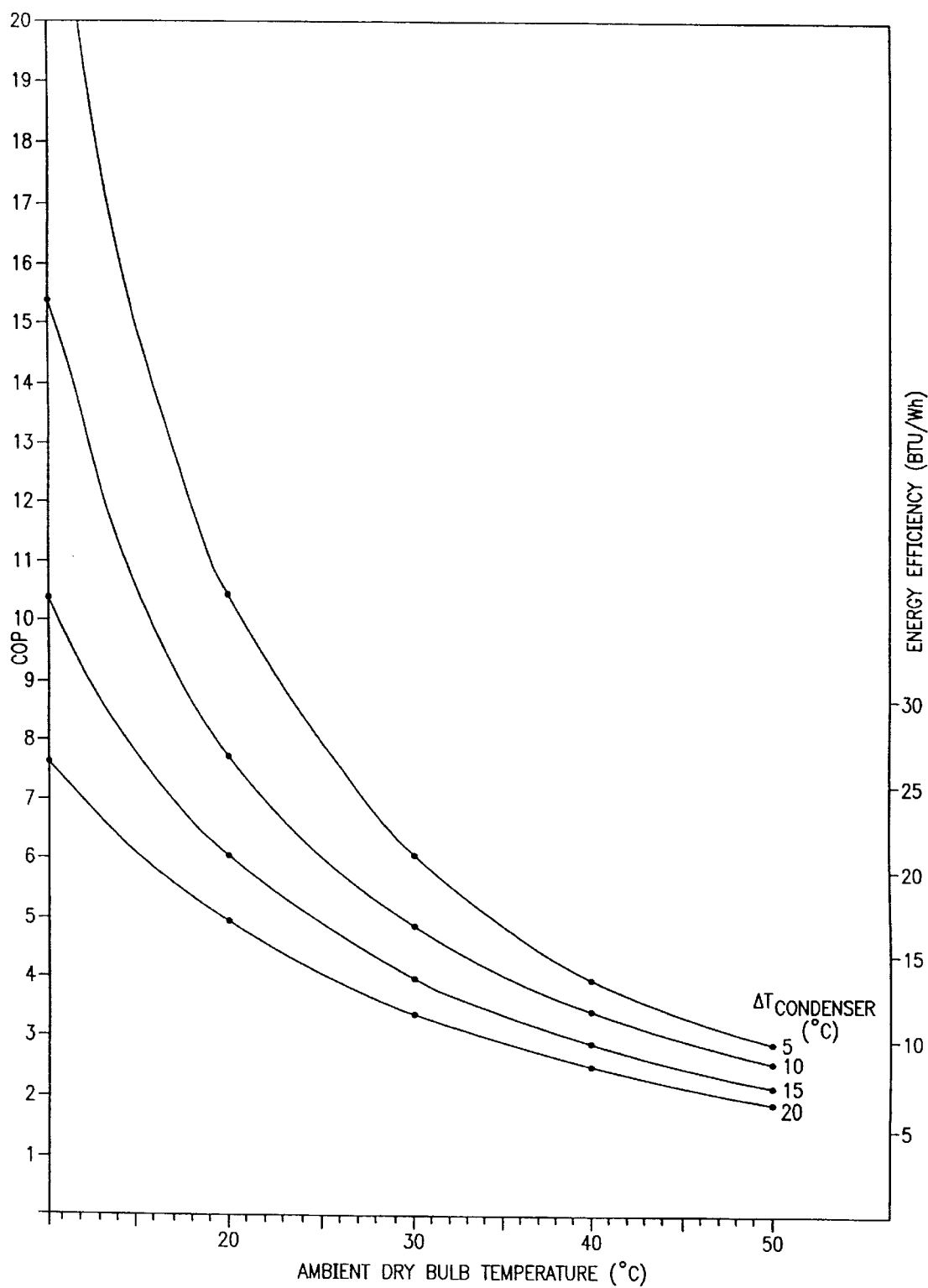
FIG. 4 Depiction of the coefficient of performance of R-12 vapor compression refrigeration.

The evaporator temperature is assumed to be 10° C., which is 5° C. cooler than the room air dew point and 15° C. cooler than the room air dry-bulb temperature. FIG. 4 shows the COP for R-12 vapor compression refrigeration using a variety of dry-bulb temperatures and condenser $\Delta T$. The X axis is the ambient dry-bulb temperature (°C.). The Y axis is the coefficient of performance calculated by Equation 12.

Table 1 compares the expected performance of the vapor-compression evaporative cooler and the conventional R-12 vapor compression system in a variety of cities in the United States. The dry bulb and wet bulb temperatures are the "2.5 values," meaning only 2.5% of the hours between June and September exceed these values. From this analysis, it is expected that the vapor-compression evaporative cooler is 1.7 to 3.9 times more energy efficient than conventional vapor-compression air conditioning. This energy comparison does not include energy for the ambient air fan or the room air blower.

TABLE 1

Comparison of Conventional Air Conditioning to Vapor-Compression Evaporative Cooler

| City | R-12 Vapor Compression† | | Vapor-Compression Evaporative Cooler | | $\frac{COP_2}{COP_1}$ |
|---|---|---|---|---|---|
| | Dry Bulb Temp (° C.) | $COP_1$ | Wet Bulb Temp (° C.) | $COP_2$ | |
| Albuquerque, New Mexico | 33 | 4.4 | 16 | 15.0 | 3.4 |
| Atlanta, Georgia | 33 | 4.4 | 23 | 8.8 | 2.0 |
| Dallas, Texas | 36 | 3.9 | 24 | 8.2 | 2.1 |
| El Paso, Texas | 37 | 3.8 | 18 | 12.4 | 3.3 |
| Houston, Texas | 34 | 4.2 | 25 | 7.8 | 1.9 |
| Las Vegas, Nevada | 41 | 3.2 | 18 | 12.4 | 3.9 |
| Los Angeles, California | 32 | 4.5 | 21 | 10.0 | 2.2 |
| Miami, Florida | 32 | 4.5 | 25 | 7.8 | 1.7 |
| Minneapolis, Minnesota | 37 | 3.8 | 23 | 8.6 | 2.3 |
| New Orleans, Louisiana | 33 | 4.4 | 26 | 7.3 | 1.7 |
| New York, New York | 32 | 4.5 | 23 | 8.8 | 2.0 |
| Phoenix, Arizona | 42 | 3.2 | 22 | 9.4 | 2.9 |
| Sacramento, California | 37 | 3.8 | 21 | 10.0 | 2.6 |
| Salt Lake City, Utah | 35 | 4.1 | 17 | 13.2 | 3.2 |
| Spokane, Washington | 32 | 4.6 | 17 | 13.2 | 2.9 |
| Washington, D.C. | 33 | 4.4 | 23 | 8.6 | 2.0 |

†Calculations assume the condenser temperature difference is 10° C.

Another embodiment of the invention is directed to vapor-compression evaporative coolers having three concentric chambers. One such cooler is cooler 200 depicted in FIG. 5. The innermost chamber 210 of vapor-compression evaporative cooler 200 is at the lowest pressure, the middle chamber 211 is slightly higher, and the outermost chamber 212 is at atmospheric pressure. The outer diameter of the outermost chamber is preferably two to three feet for a 3-ton home air conditioning unit and preferably stands about three to four feet high. At the top of the outermost and middle chambers and below compressors 230 in the innermost chamber 210 are circular pipes 214 (inner), 216 (middle), and 218 (outer) through which water drips. If desired, packing 220 and 221 can be placed in the middle and outer chambers to increase the water hold Up.

One or more compressors 230 are preferably disposed in innermost chamber 210 creating a vacuum in the chamber. As a result, water in the innermost chamber 210 evaporates and becomes chilled. This chilled water 224 is pumped into room air contactor 1000 located in the house or the space to be cooled where it countercurrently contacts warm air such that the air then becomes cooled. The chilled water is sufficiently low in temperature that humidity in the house air will actually condense; thus, not only is the house air cooled, but it is also dehumidified. A further benefit as that the house air is literally washed which removes dust and allergens.

Because water is evaporating in the innermost chamber, it must be replaced. This is preferably accomplished by float 226 which opens a valve 227 allowing tap water to be introduced to replenish the evaporated water. Because tap water contains salts, a purge stream 228 is be used to remove salt as it becomes concentrated. This may be accomplished by opening valve 229 when the salt concentration exceeds a given level. The valve can be opened based on a timer, a water conductivity meter, purging a continuous flow rate known to be suitable for the tap water salt concentration, or other suitable means known in the art. Alternatively, distilled water or rain water could be used as the system water and as make-up water such tat purging would become unnecessary. However, in such a system, the water must be completely salt free.

Figure 5:
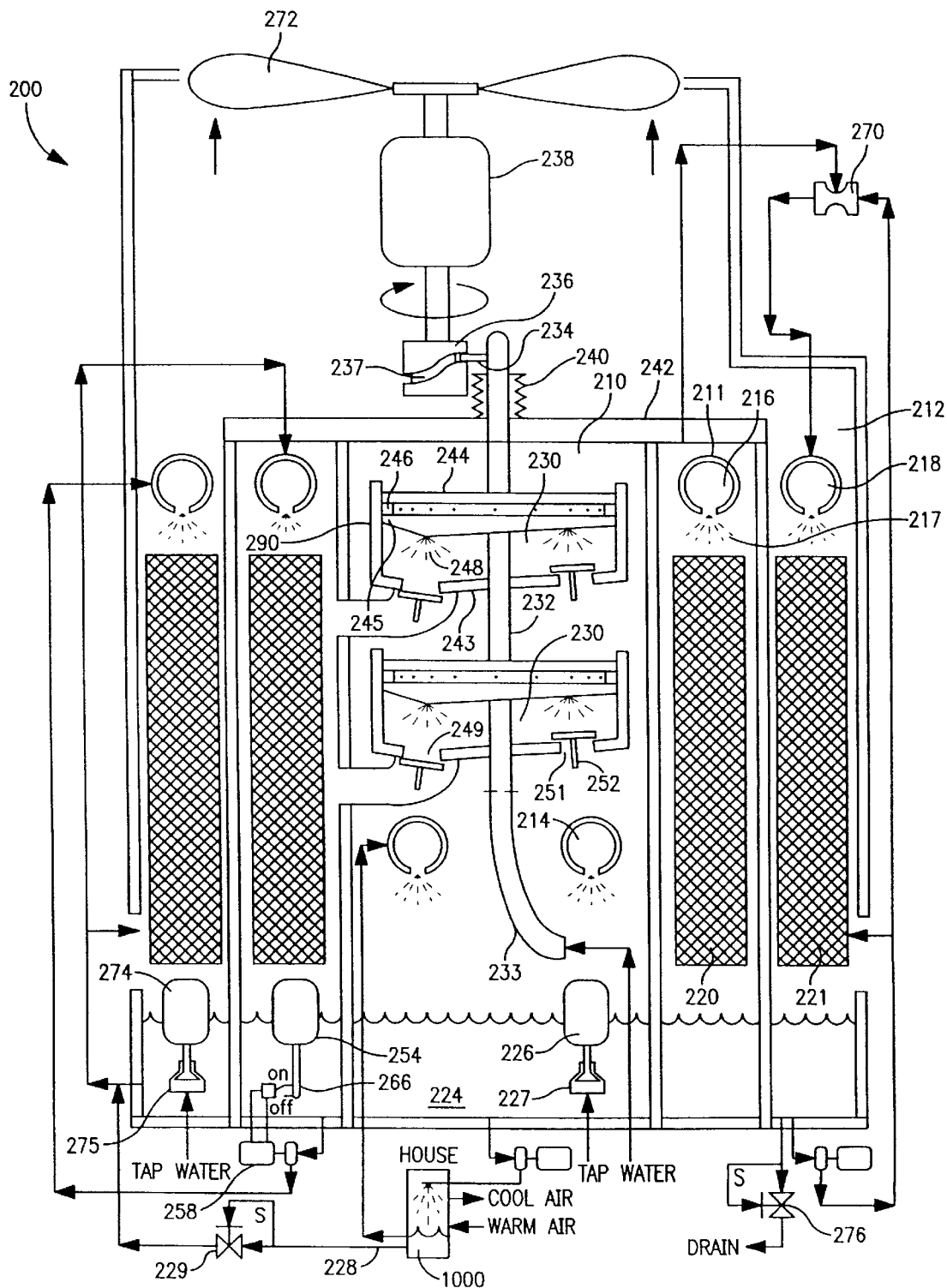
FIG. 5 Schematic cross sectional view of compressor 230 incorporated into cooler 200.
Figure 6C:
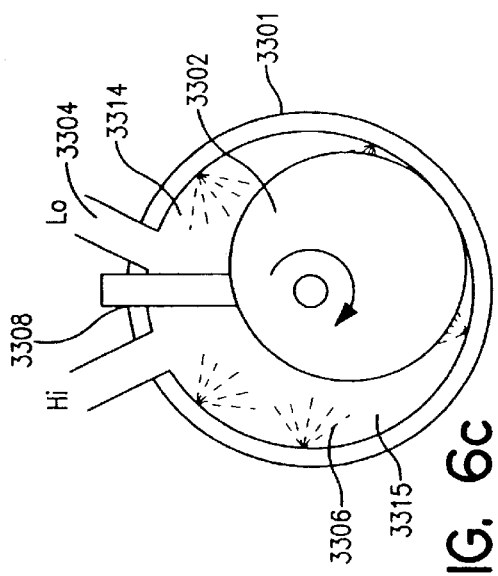
FIG. 6 (a–f) Schematic top views of sliding vane compressor 3300 in different stages of its rotational cycle.
Figure 6F:
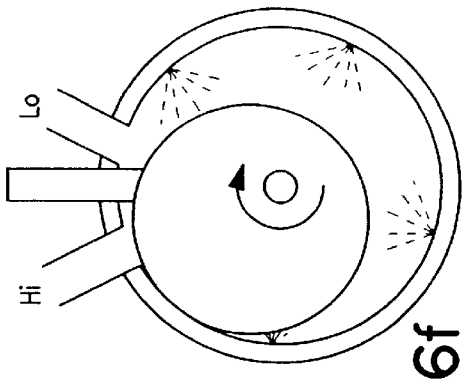
Figure 6B:
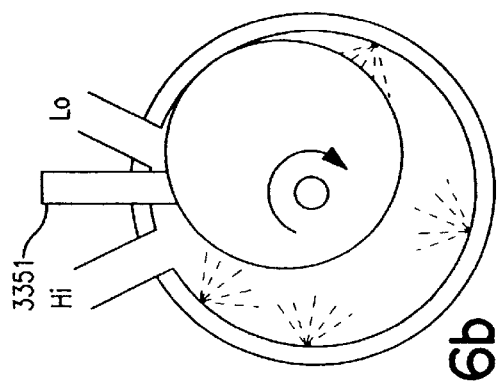
Figure 6E:
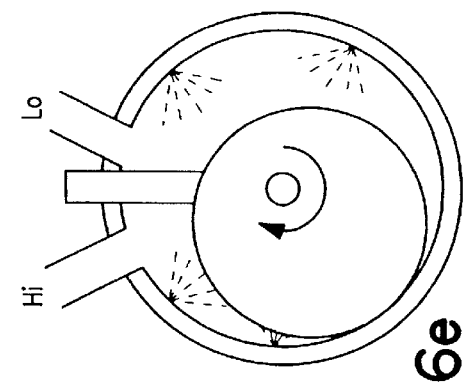
Figure 6A:
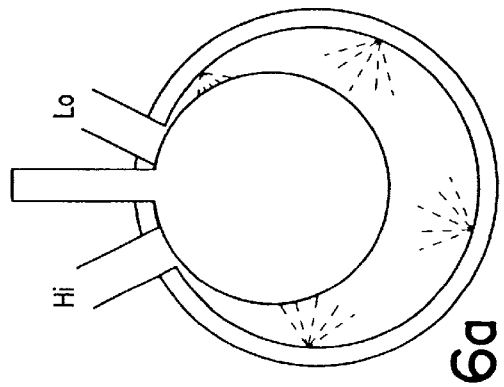
Figure 6D:
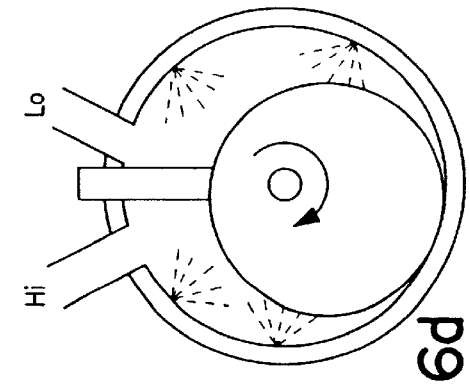

The pressure in the innermost chamber is kept low using one or more compressors 230. Although FIG. 5 depicts two reciprocating compressors operating in parallel, it should be understood that any suitable compressor may be used. Particularly suitable are low-friction positive displacement compressors such as the disclosed reciprocating compressor (FIG. 5), sliding vane compressors (FIGS. 6–14, 16 and 25–31) and actuated flap compressors (FIGS. 32–42 and 43–46 ).

Figure 83:
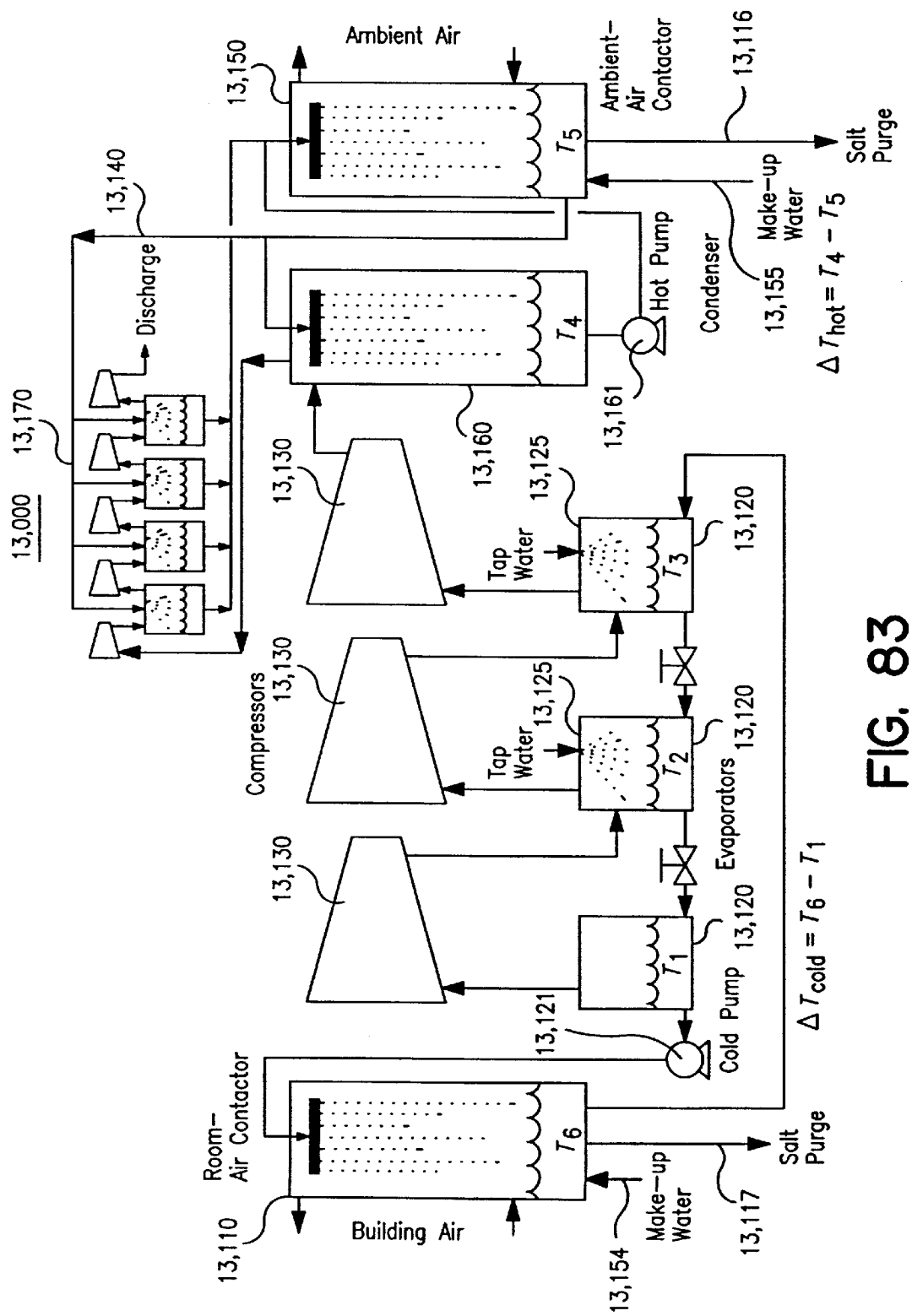
FIG. 83 Schematic of a multistage vapor compressor evaporative cooler 13000.
Figure 88:
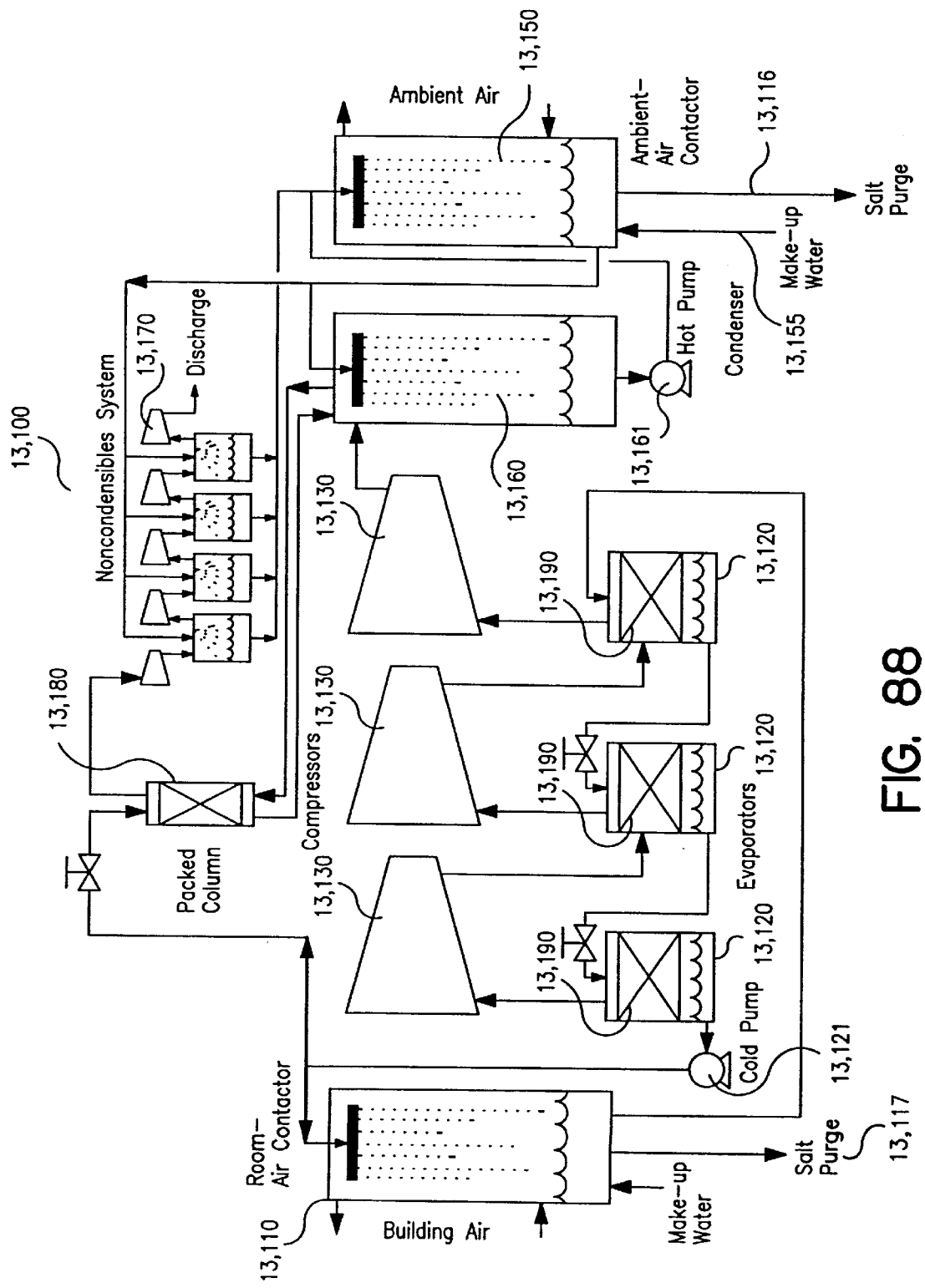
FIG. 88 Schematic of vapor compression evaporative cooler 13100 which employs multistage evaporators.

In the embodiment depicted in FIG. 5, reciprocating compressor 230 is used. Because the vapor density is very low, the compressor feature may consist of many stages. For example, in FIG. 5, two are shown operated in parallel. Alternatively, multiple compressors may be operated in series, as shown in FIGS. 83, 88, and 89. In FIG. 5, the compressor center shaft 232 oscillates vertically. The top of the shaft has a protrusion 234 which rides in a sinusoidal groove 237 in rotating cam 236. A single sinusoid in groove 237 causes the center shaft to cycle once per motor rotation. By placing a groove with two sinusoids in cam 236, the center shaft will oscillate twice per motor rotation. Thus, very rapid center-shaft oscillations are possible using a conventional low-speed motor 238.

The top end of bellows 240 is affixed to the oscillating shaft 232 and the other end is affixed to housing 242, thus maintaining a vacuum-tight seal. The center shaft 232 has plates 244 attached to it that also oscillate vertically within compressor housing 290.

It has been discovered that because of the lower pressures involved in the cooling systems of the present invention, it is not necessary for close contact between the compressor components such as the plates 244 and housing 290. Thus, in the present embodiment, plates 244 preferably have a sizable gap 245 (a few thousandths of an inch) with the housing 290 so they do not touch the housing giving negligible friction. Instead, water is used to make a seal. Specifically, the edges of the plates contain a groove 246 through which tap water flows. Because the tap water is at a higher pressure than the compressor, liquid water flows into the compressor housing 290 rather than vapors leaking out. This water not only provides a seal, but it also cools the compressed vapors. If this water is insufficient to cool the compressed vapors, additional water spray nozzles 248 may be placed on the face of the plates 244. The source of the tap water is through the center shaft 232 which is hollow and has a flexible hose 233 at the bottom. The compressor has an outlet 249 to the middle chamber, regulated by outlet valve 250. The compressor also has an inlet 251 regulated by inlet valve 252. Because the pressures are so low, it is not feasible to open valves 250 and 252 using pressure differences between the compressor interior and exterior. Instead, the inlet valve 252 and outlet valve 250 are active, i.e., actuated by electric solenoids or hydraulic pistons. The compressor housing 290 preferably has a slightly conical bottom 243 so that excess liquid collects at the outlet valve 250 to be discharged when the valve opens. The outlet 249 of the compressor is directed to the middle chamber 211.

In the middle chamber 211, the vapors condense directly onto the water spray 217 from circular pipe 216. If too much liquid collects at the bottom of the middle chamber, an electrical switch 256 is activated by a float 254 which turns on pump 258 to remove liquid. If the water level drops too low, the float 254 turns the switch 256 off. Because noncondensible gases will collect in the middle chamber 211, they may be purged by aspirator 270.

The liquid that is pumped out of the middle chamber 211 goes to the outer chamber 212 where it contacts ambient air and is cooled to approach the wet-bulb temperature. The air is blown by fan 272 located at the top of the unit. The fan 272 and compressor 230 are preferably both powered by the same motor 238 which reduces costs and increases efficiency. Further, the fan 272 acts as a flywheel. Float 274 operates a valve 275 which introduces make-up water to the outer chamber 212 as required. To purge concentrated salts, valve 276 opens periodically to purge some of the liquid out of the outer chamber 212. An ozone generator or other means known in the art may be used to inhibit microorganism growth in the system.

In a preferred embodiment, the following parameters may be used;

1. motor speed=1725 rpm
2. cam causes one center-shaft oscillation per motor rotation
3. the compressor has an 80% volumetric efficiency
4. three stages operating in parallel
5. 3-in stroke
6. a 3-ton unit must compress 1400 ft$^3$/min of low-pressure vapors.

In the embodiment depicted in FIG. 5, the diameter of plate 244 would be 1.3 ft. Smaller diameters are possible by using a higher speed motor, altering the cam to allow more center-shaft oscillations per motor rotation, increasing the stroke, or increasing the number of stages.

Regulation of the system may be accomplished by on-off control as is done with conventional air conditioners. Alternatively, a variable-speed motor may be used to operate the compressor more efficiently; when the load is low, it runs more slowly and when the load is high, it runs more quickly.

Because the pressure differences across all walls are very low (15 psi at most), almost all of the components may be constructed of plastic thus reducing cost. However, any suitable material may be used to make the individual components. Because none of the chambers is completely filled with liquid water, if the water were to freeze in winter, the 10% volume increase of the ice can be accommodated by the vapor space. If desired, the unit could be drained of water to winterize it.

This embodiment may also be adapted to below-freezing applications by adding a nonvolatile antifreeze (e.g., salt, glycerol) to the water. This will lower the vapor pressure of the water thus requiring a larger compressor. In addition, if antifreeze is added to the water, then all make-up water should be distilled water so that no salts must be purged. Alternatively, the complexity and cost associated with adding distilled water may be eliminated if tap-water salts are used as the antifreeze. This could be accomplished simply by operating the system with a very low purge rate.

The present invention is also directed to other types of positive displacement compressors that may be uses in vapor-compression evaporative coolers, including coolers having three concentric chambers. Rotary compressors are one type of compressor which can be used in such coolers. One embodiment of a rotary compressor useful in vapor compression evaporative coolers, rotary sliding vane compressor 3300, is depicted in FIGS. 6–14. In FIGS. 6–14, like reference numerals refer to like elements. The novel rotary compressors of this and later disclosed embodiments employ a sizable gap to reduce friction between the compressing components and use water both as a sealant and a coolant.

FIGS. 6a–f are a schematic of rotary sliding vane compressor 3300 in various stages of the cycle. As the rotor 3302 rotates, it sweeps in vapors from the low-pressure side 3314 during the first rotation and then compresses them during the second rotation. To cool the vapors during the compression and to make seals, liquid water 3306 is sprayed into the compressor during the compression. As shown in FIGS. 6a–f, sliding vane 3308 contacts the rotor 3302 and separates the low-pressure 3314 and high-pressure 3315 sides of the compressor. Alternatively, to reduce friction, the sliding vane 3308 could contact the rotor 3302 through a roller located at the tip of the sliding vane 3308, or the sliding vane 3308 could be actuated by an external mechanism so the rotor 3302 and sliding vane do not touch.

Figure 7:
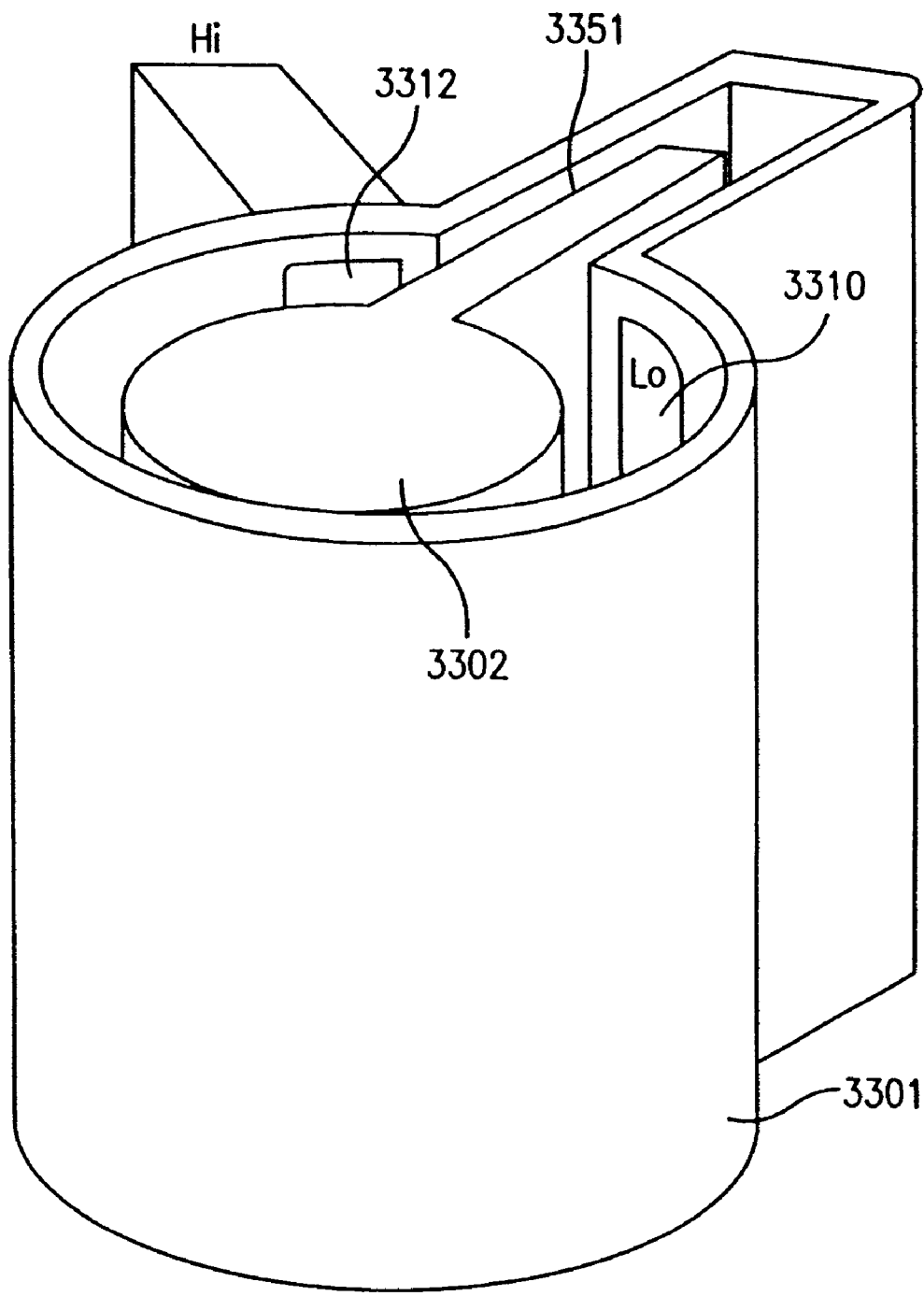
FIG. 7 Three dimensional schematic of sliding vane compressor 3300.

FIG. 7 is a three dimensional schematic of sliding vane rotary compressor 3300. The low-pressure vapors enter inlet hole or port 3310 in the side of compressor housing 3301. No inlet check valve is required. The high-pressure vapors exit through outlet or discharge port 3312. Outlet check valves 3313 (FIG. 13) are provided at the outlet.

Figure 8:
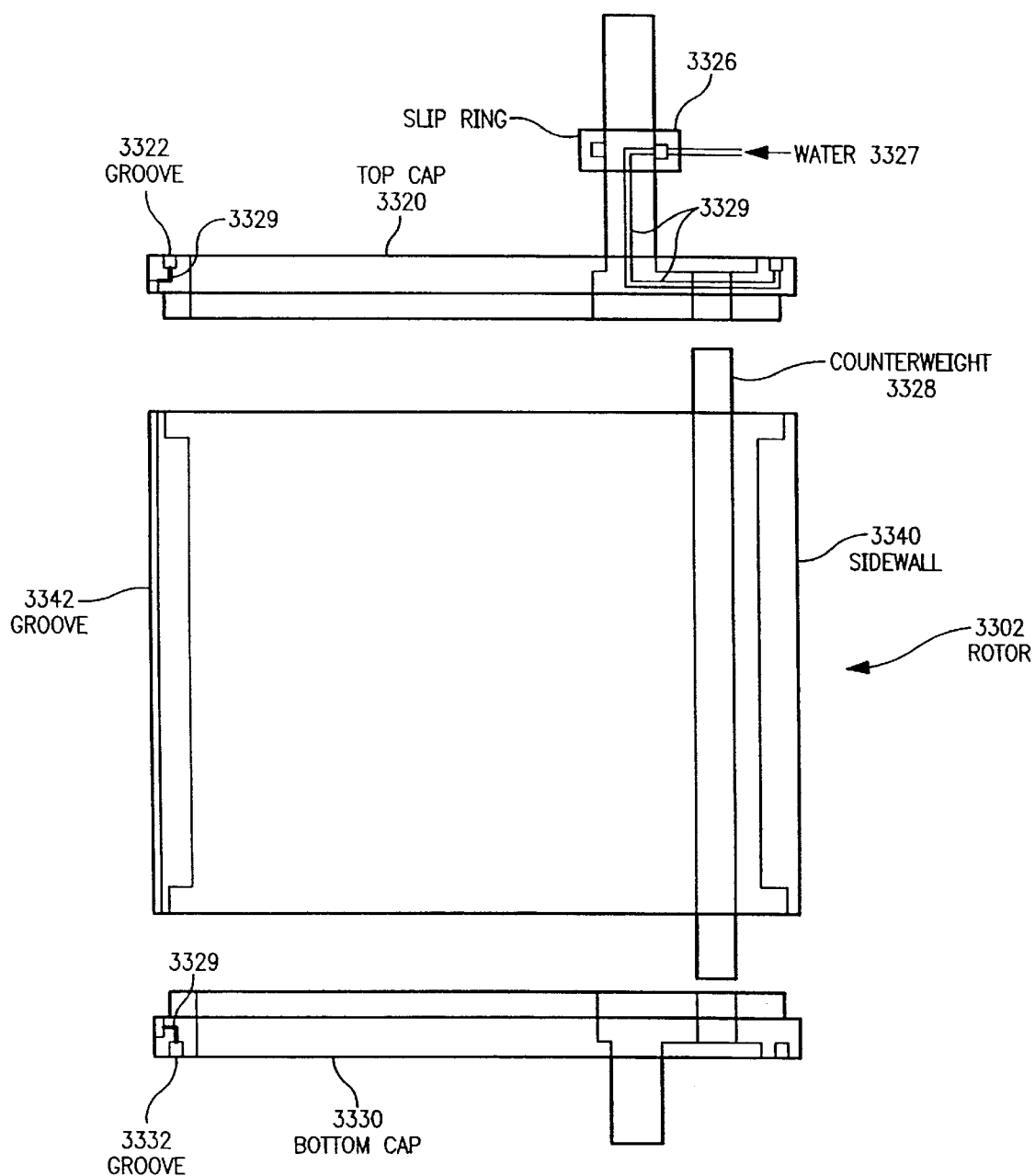
FIG. 8 Exploded side view of rotor 3302 of compressor 3300.
Figure 9:
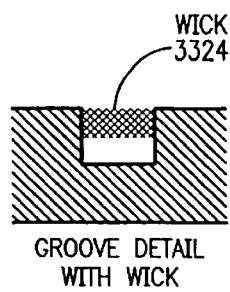
FIG. 9 Schematic cross sectional view of groove 3342 detail of rotor of compressor 3300.
Figure 15A:
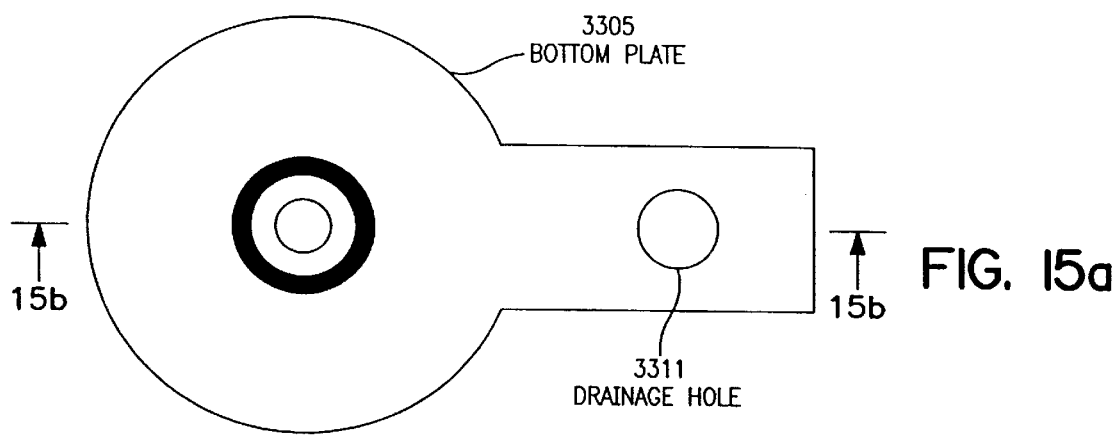
FIG. 15 (a) Top view of bottom housing end plate 3305 of compressor 3300; and (b) side view of bottom housing end plate 3305 taken along plane B—B of (a).

FIG. 8 is a side view of rotor 3302. As depicted in FIG. 8, rotor 3302 consists of a top cap 1110, bottom cap 3330 and sidewall 3340 which is preferably cylindrical. Top sealing groove 3322 and bottom sealing groove 3332 located on the top and bottom caps are filled with liquid water to create a rotating seal against the housing end plates 3303 (FIG. 14a) and 3305 (FIG. 15A). A vertical groove 3342 on the sidewall seals the rotor 3302 against the compressor housing 3301. The grooves may be entirely open, or they may contain a wick 3324 along the open end as depicted in FIG. 9, a drawing of the groove detail with a wick. Grooves 3322, 3332 and 3342 may be actively supplied with low-pressure water 3327 through a slip ring 3326. Distribution channels 3329 ensure that water is distributed to sealing grooves. Alternatively, the water source may be from the water spray 3306 used to cool the compressor. The water spray will wet the interior walls of the compressor housing and be wicked into the grooves 3322, 3332, and 3342, provided wick 3324 is used.

Because the rotor is eccentrically mounted on the shaft, a counterweight 3328 is needed to balance the rotation. FIG. 8 shows the counterweight 3328 may be located inside the sidewall 3340 to save space. Alternatively, the counterbalance or counterweight 3328 may be located on the shaft outside the compressor housing.

FIGS. 8–10 show details of the components of rotor 3302. Top and bottom end caps 3320 and 3330 each have a large hole 3321 (top) and 3331 (bottom) to reduce the mass that must be counterbalanced. The large holes also provide a means to drain the water from the rotor interior.

Figures 11A, 11B, 11C:
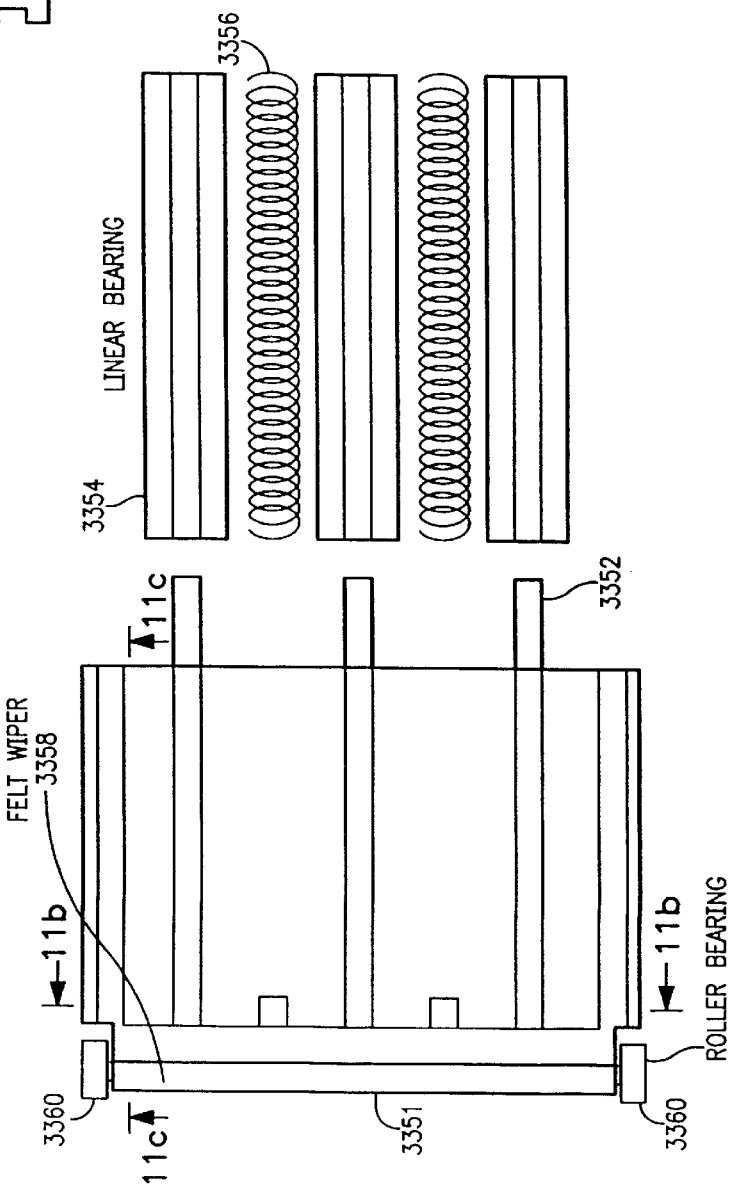
FIG. 11 (a) Side view of sliding vane 3351 of compressor 3300; (b) cross sectional view of sliding vane 3351 taken along plane A—A of (a); and (c) cross sectional view of sliding vane 3351 taken along plane B—B of (a).

FIGS. 11a–c show the details of sliding vane 3351. It has pins 3352 located on the interior which ride on linear bearings 3354. The sliding vane 3351 is forced against the rotor using springs 3356. Felt wiper 3358 becomes water soaked from the cooling water spray 3306, so it seals against the rotor. A novel feature of this embodiment is the means used to create the gap between the felt wiper 3358 and the rotor. Specifically, roller bearings 3360, which protrude farther than the felt wiper, ride on the rotor. The clearance between the felt wiper and the rotor is determined by the amount the roller bearings 3360 protrude from the wiper 3358. As can be seen from the foregoing, there is low friction between the compressing component; of the disclosed embodiment—the rotor, housing and sliding vane.

Figure 12:
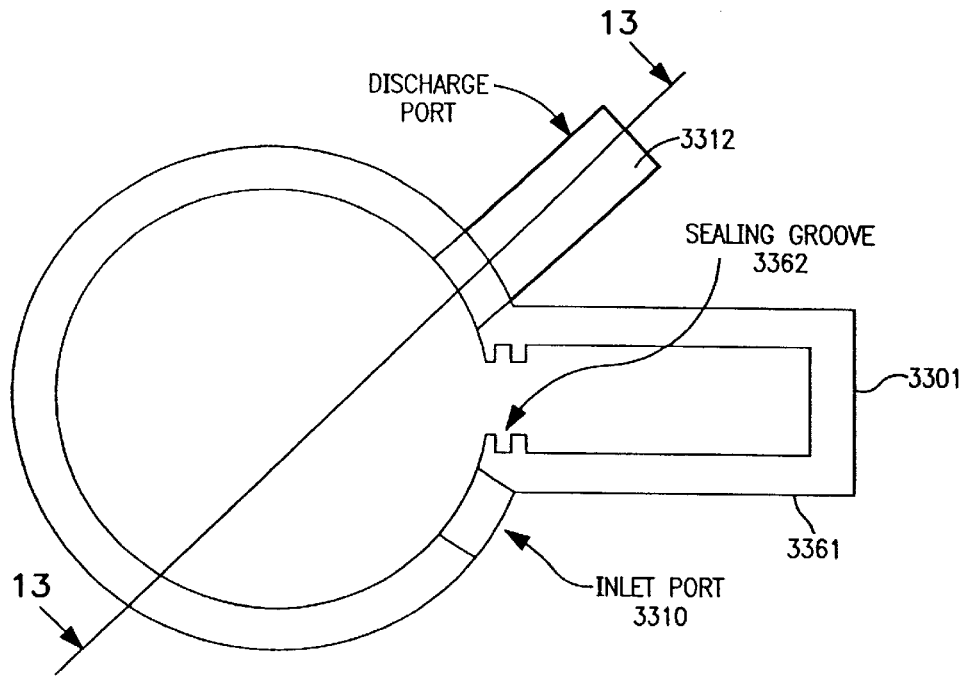
FIG. 12 Top view of compressor housing 3301 of compressor 3300.
Figure 13:
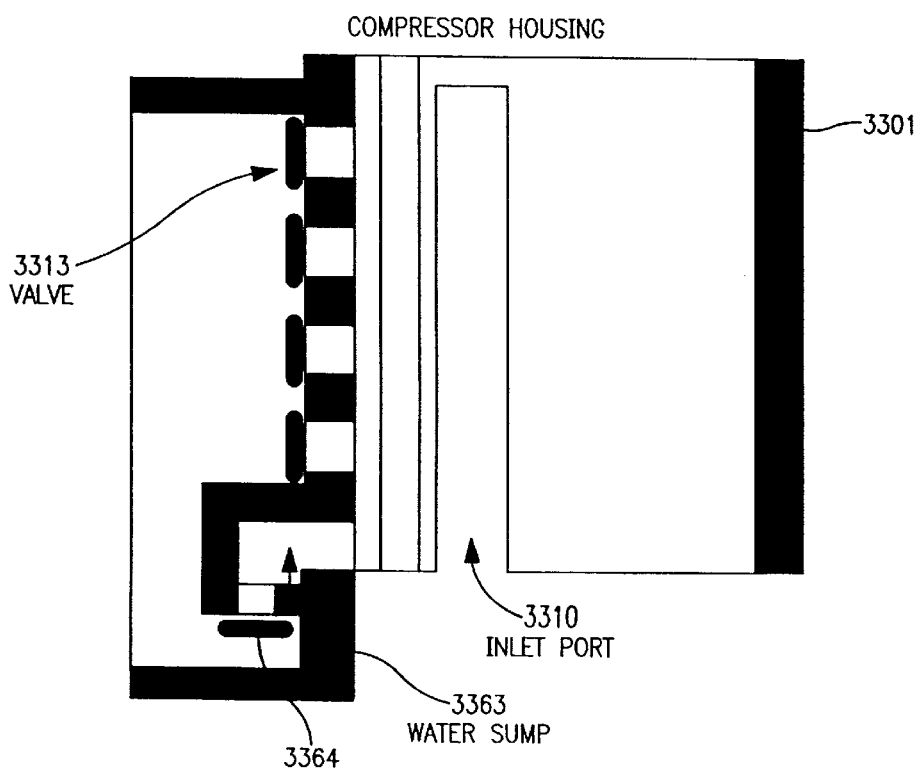
FIG. 13 Side view of compressor housing 3301 taken along plane A—A of FIG. 12.

FIGS. 12–13 show the compressor housing 3301. It contains a section 3361 for sliding vane 3351; sealing grooves 3362 on the side provide a seal. Inlet port 3310 is entirely open, but discharge port 3312 is lined with check valves 3313. Because the pressure generated by the compressor is not sufficient to actuate the check valves, they are preferably activated by solenoids, hydraulic pistons, or other means. Excess water will collect in the water sump 3363 which discharges through sump check valve 3364.

Figure 14A:
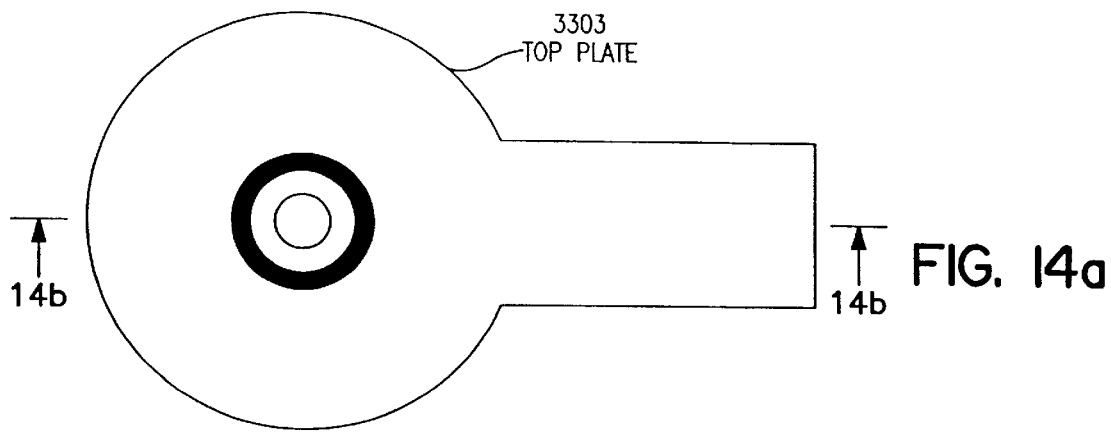
FIG. 14 (a) Top view of top housing end plate 3303 of compressor 3300; and (b) side view of top housing end plate 3303 taken along plane A—A of (a).
Figure 14B:
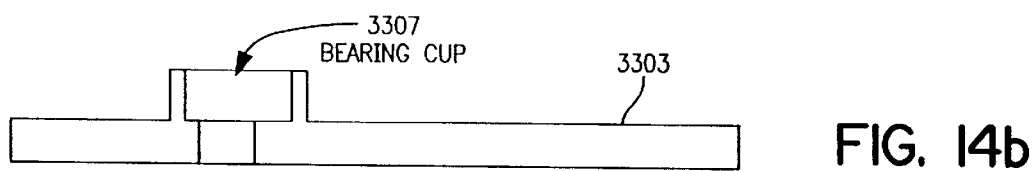
Figure 15B:
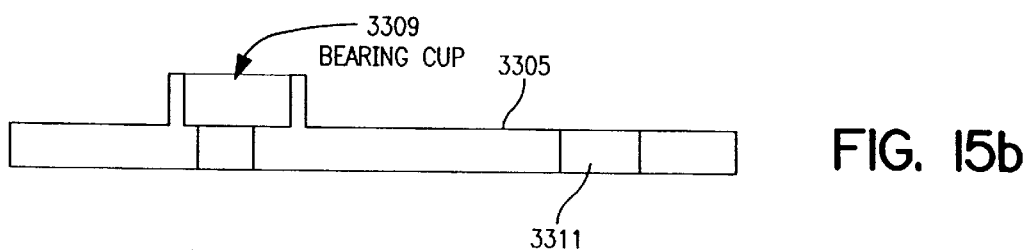

The housing end plates 3303 and 3305 are depicted in FIGS. 14–15. Top end plate 3303 and bottom end plate 3305 have top bearing cup 3307 and bottom bearing cup 3309. Bottom end plate 3305 also has a drainage hole 3311.

Figure 16:
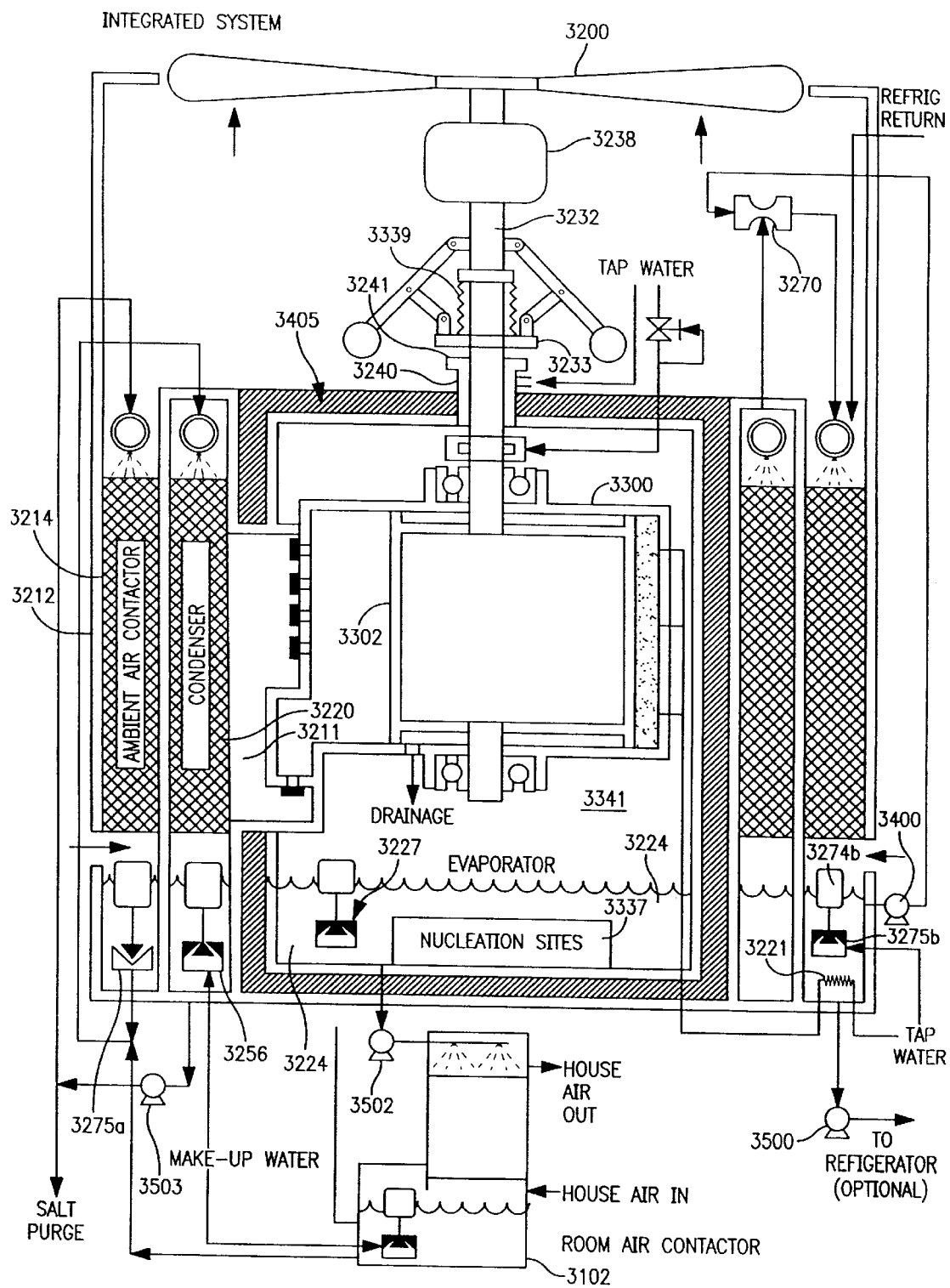
FIG. 16 Schematic cross sectional view of compressor 3300 incorporated into cooler 3200.
Figure 17C:
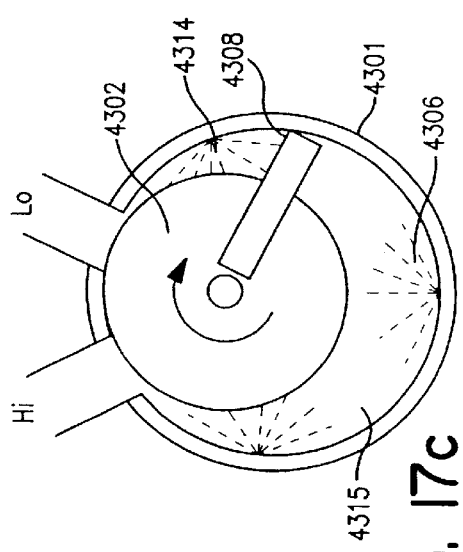
FIG. 17 (a–f) Schematic top views of sliding vane compressor 4300 in different stages of its rotational cycle.
Figure 17B:
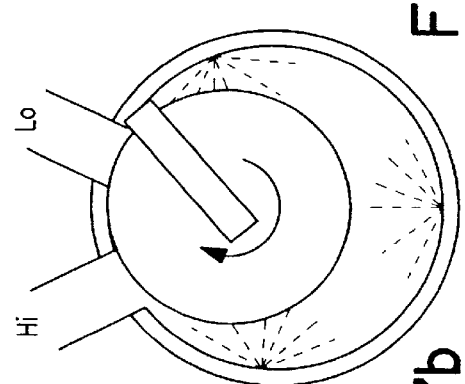
Figure 17A:
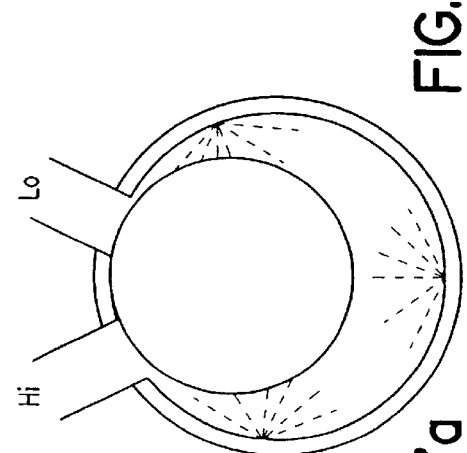
Figure 17F:
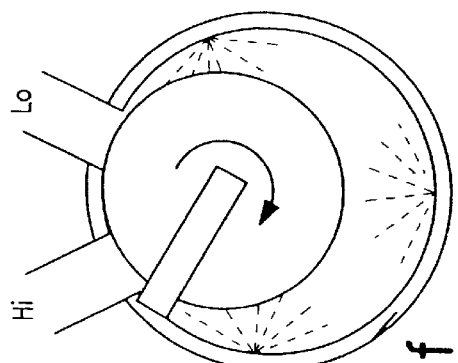
Figure 17E:
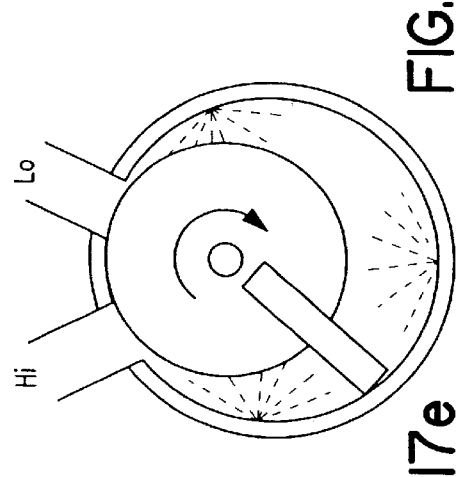
Figure 17D:
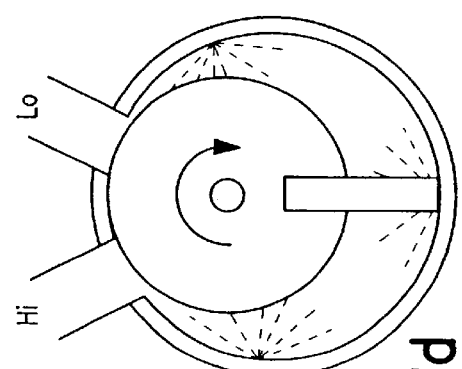

FIG. 16 depicts sliding vane rotary compressor 3300 integrated into vapor-compression evaporative cooler 3200. Like cooler 200, it has three concentric chambers. Drive motor 3238 may be located inside or outside of the evaporator. In a preferred embodiment, it is outside. Locating the drive motor outside the evaporator has the following advantages: 1) waste heat will not put a load on the compressor, 2) a standard motor can be employed rather than one specially designed for use in a low-pressure, water-vapor environment, and 3) easy servicing. Drive motor 3238 is coupled to rotor 3302 by rotary shaft 3232.

A rotary shaft seal 3233 is required. The present invention is also directed to a novel rotary shaft seal useful in compressor 3300 as well as other applications. Specifically, as depicted in FIG. 16, a seal is provided by supplying journal 3240 with water. Water will be drawn into the evaporator 3341 because it is at a low pressure. Provided excess water is supplied to journal 3240, no air will leak into the evaporator 3341. The clearance between shaft 3232 and journal 3240 may be relatively large so there is low friction. To prevent air from leaking into evaporator 3341 when motor 3238 is off, a bellows seal 3339 is employed. Due to centrifugal force, the bellows seal 3339 lifts off the journal face 3241 when shaft 3232 rotates, but seats on the journal face 3241 once the shaft rotation stops. Using this arrangement, there is very little friction due to the shaft seal. Although seal 3233 is described in connection with compressor 3300, as will be clear to those of skill in the art, it may be also used in other applications.

The sliding vane compressor 3300 pulls a vacuum on the evaporator 3341 causing the liquid water to evaporate. Nucleation sites (e.g. "boiling chips") 3337 are preferably provided to increase the evaporation efficiency. As water 3224 evaporates, it becomes chilled. This chilled water is pumped out of the evaporator 3341 and into a room air contactor 3102 via pump 3502. House air directly contacts the chilled water which cools it and removes humidity.

The vapors discharged from the compressor 3300 enter the condenser 3211 which has water trickling over condenser packing 3220. The inlet water is near the wet-bulb temperature of the ambient air, which is cooler than the compressor discharge temperature, so the vapors condense onto the packing 3220. The packing may be a structured packing consisting of corrugated plastic or metal sheet, or a random packing such as ceramic saddles. A pump 3503 removes the warmed water from the condenser and directs it to the ambient air contactor 3212. Moisture evaporates from the cooling of the water so it can be reintroduced into the condenser 3211. To facilitate contact between the ambient air and the warm water, the ambient air contactor 3212 may have a structured or random packing 3214.

Tap water which may be used to cool the compressor 3300 passes through a heat exchanger 3221 in contact with the water in the ambient air contactor. This step is necessary only if the tap water temperature is generally above the wet-bulb temperature.

As an option, a pump 3500 can be added which pumps water out of the ambient air contactor 3212 and sends it to the home refrigerator condensing coil (not shown.) This will increase the refrigerator efficiency because: 1) water has better heat transfer properties than air, and 2) the water temperature will generally be lower than room temperature. Water returning from the refrigerator may be directed back to the ambient air contactor. Pump 3400 is used to flow water through aspirator 3270 in order to remove noncondensibles from condenser 3211.

To regulate the water levels in the various tanks, float valves 3227 (inner), 3275a (outer), 3275b (outer) and 3256 (middle) may be employed. Most of the float valves introduce water into the tank it the water level drops too low. An exception is the left float valve 3275a in ambient air contactor 3212. Because water is constantly being added to the ambient air contactor, it will tend to fill up. The left float valve 3275a is designed to open when the water level gets too high allowing water to be sucked into condenser 3211. The right float valve 3275b in the ambient air contactor 3212 is necessary only if water is sent to the refrigerator. During the winter, the various water make-up systems would not be used because the air conditioner is not required. However, due to the refrigeration load, water will evaporate from the ambient air contactor thus dropping the liquid level. When the water level drops, the right float 3274b opens a valve 3275b allowing make-up water to be introduced.

Because noncondensible gases will accumulate in condenser 3211, an aspirator 3270 is used to pump out the gases. The motive force for aspirator 3270 is provided by circulating pump 3409. Alternatively, a mechanical vacuum pump could be employed. For instance, vacuum pumps 12060, 12402, 12403 and 10060, discussed below, could be employed.

Because the evaporator 3341 and condenser 3211 are operated at very low pressures, pumps 3902 (evaporator) and 3503 (condenser) are provided to remove liquid from these vessels. However, liquid that enters these vessels requires no pump because they are at low pressure. Potentially, turbines may be used to capture the energy of the water as it flows into the low-pressure vessels.

Water evaporates from both the evaporator 3341 and ambient air contactor 3212, which will increase the salt concentration in the water. Water is purged from the room air contactor 3102 and may be added to the condenser 3211 or dumped to the sewer. Additionally, water is purged from the condenser 3211 and may be sent to the sewer. The rate that water is purged from the system can be regulated by a pre-set valve, a timer-controlled valve, a salinity meter, or other means known in the art.

Because the evaporator is cold relative to the ambient environment, insulation 3405 is preferably used to maintain system efficiency.

Except for the oscillating mass of the sliding vane, rotary compressor 3300 will be virtually vibration free. In contrast, a reciprocating compressor produces much vibration. In addition, reciprocating compressors require an inlet check valve which adds expense and lowers efficiency because of flow losses through the valve.

A centrifugal or axial compressor must operate at very high speeds requiring either expensive high-speed motors or gear boxes. Sliding vane compressor 3300 can operate using conventional motors. Also, high-speed centrifugal and axial compressors may not tolerate liquid droplets needed to cool the compressor. A centrifugal or axial compressor will be more expensive because it has many precision components and it must be well balanced.

Still another embodiment of the invention is directed to another low-friction sliding vane compressor useful in a vapor-compression evaporative cooler such as cooler 3200. This compressor is depicted in FIGS. 17–24. Like sliding vane compressor 3300, this compressor uses water both as a sealant and a coolant.

FIGS. 17a–f show a schematic of sliding vane compressor 4300 in various stages of the cycle. As rotor 4302 rotates, it sweeps in vapors from the low-pressure side 4314 during the first rotation and then compresses them during the second rotation. To cool the vapors during the compression and to make seals, liquid water 4306 is sprayed into the compressor 4300 during compression. Sliding vane 4308 nearly contacts the compressor housing 4301 and separates the low-pressure side 4314 and high-pressure side 4315 of the compressor.

Figure 18:
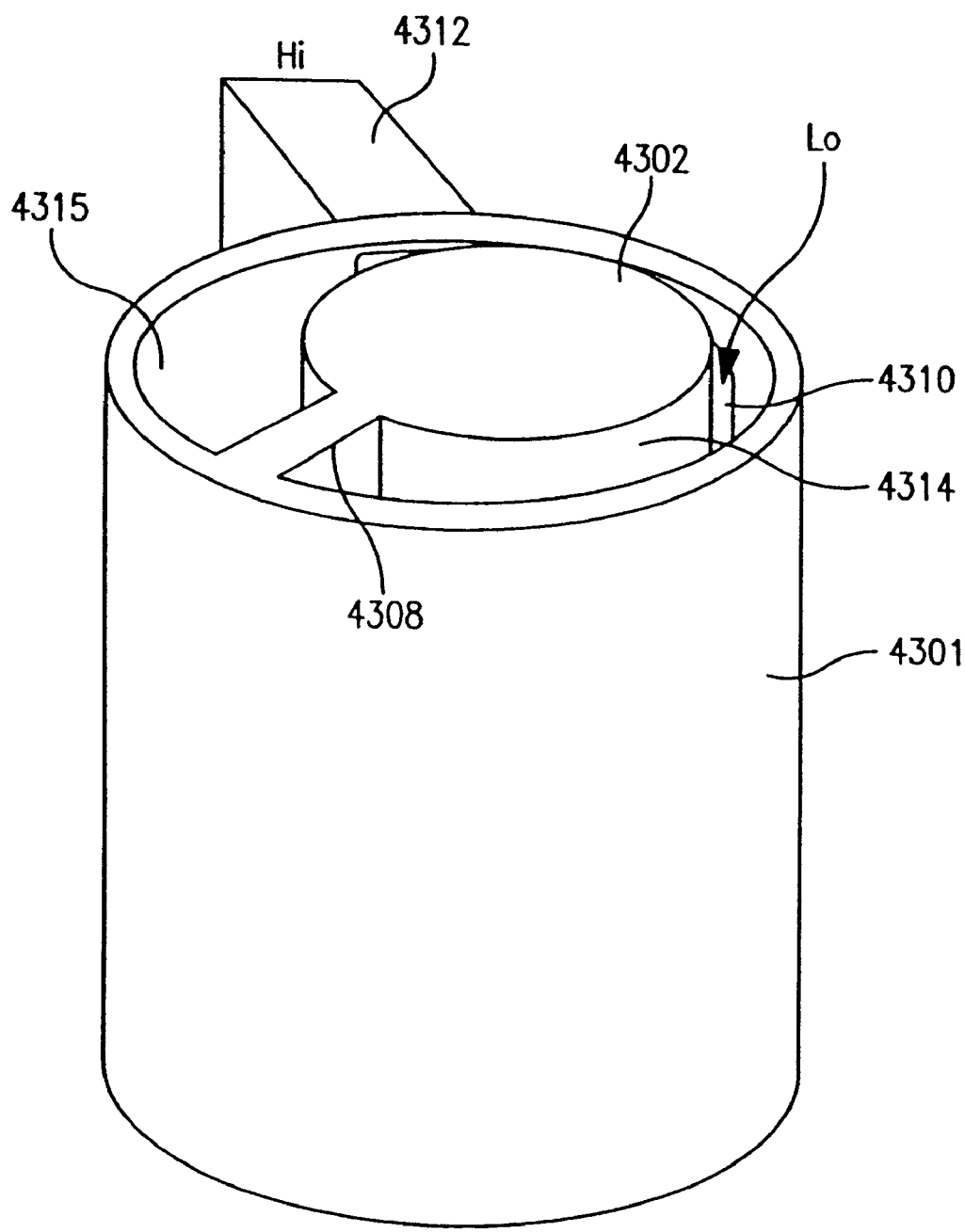
FIG. 18 Three dimensional schematic view of compressor 4300.

FIG. 18 is a three dimensional schematic of sliding vane compressor 4300. The low-pressure vapors enter inlet hole or port 4310 in the side of the compressor housing 4301. No inlet check valve is required. The high-pressure vapors exit through outlet discharge port 4312. Outlet check valves 4313 (FIG. 22) are provided at the outlet.

Figure 19:
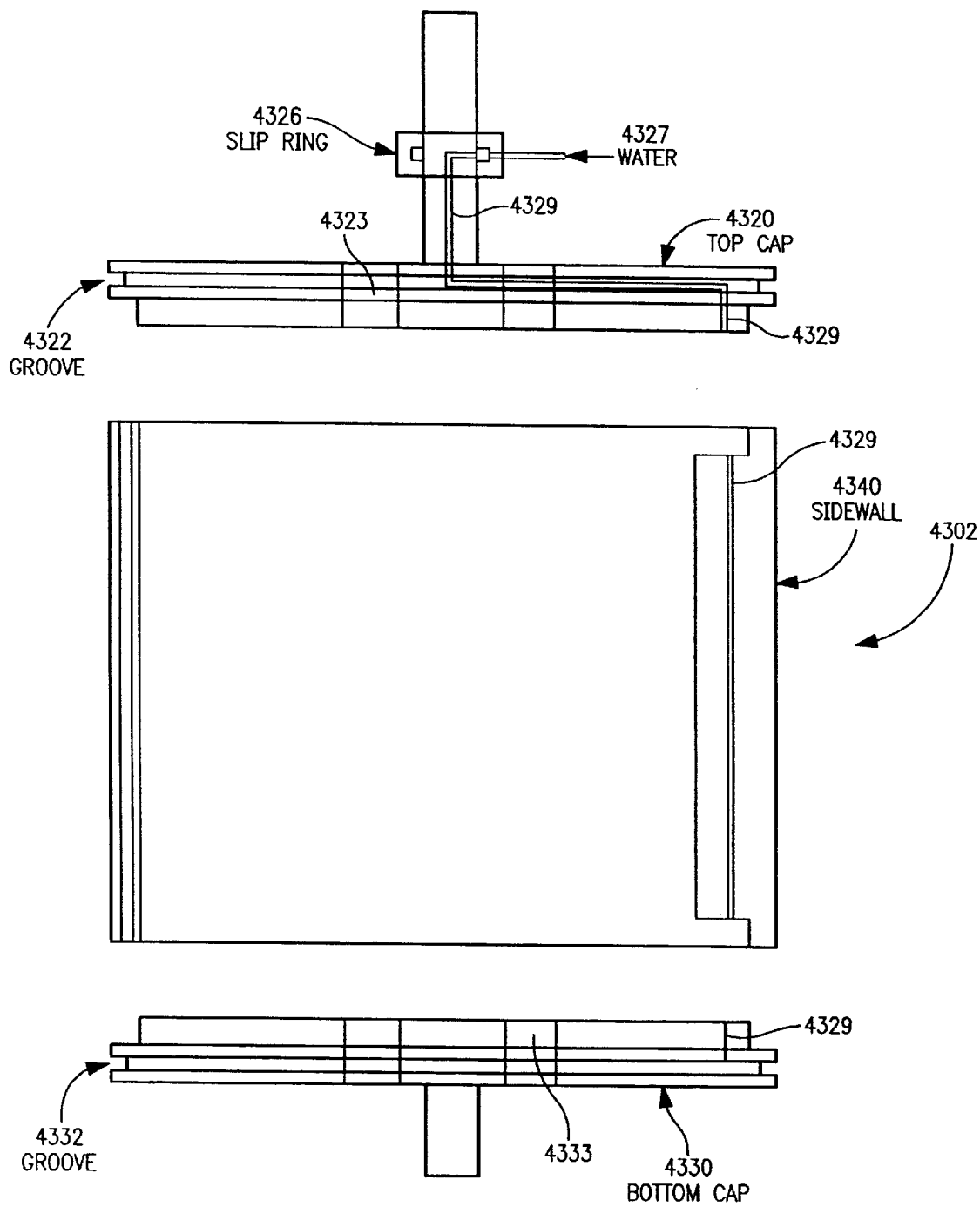
FIG. 19 Exploded side view of rotor 4302 of compressor 4300.
Figure 20:
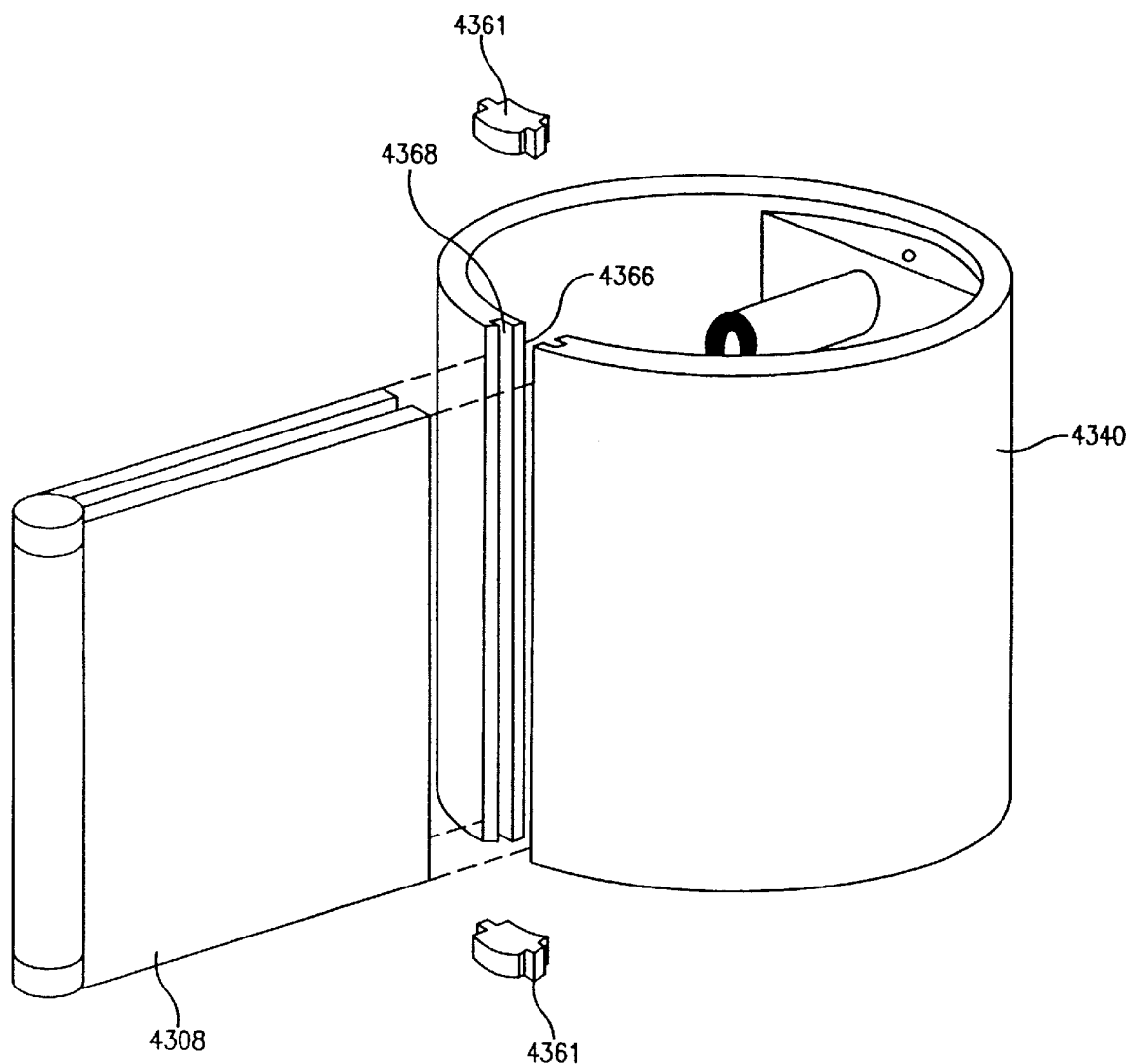
FIG. 20 Perspective view of sidewall 4340 and sliding vane 4308 of compressor 4300.
Figure 23A:
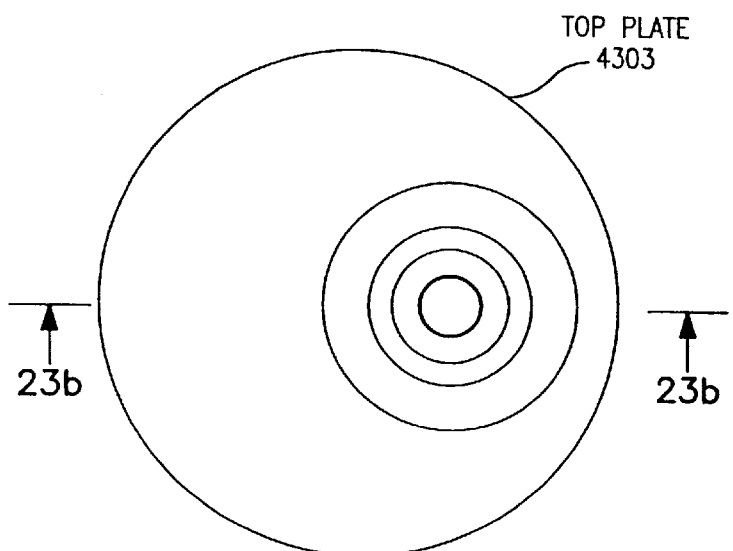
FIG. 23 (a) Top view of top housing end plate 4303 of compressor 4300; and (b) side view of top housing end plate 4303 taken along plane A—A of (a).
Figure 23B:
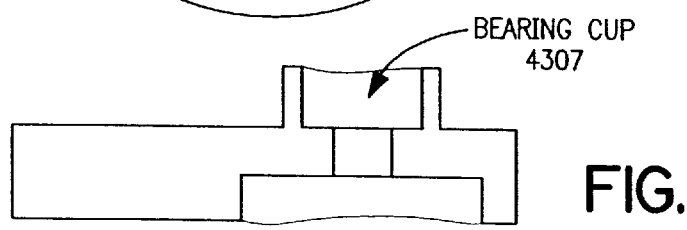
Figure 24A:
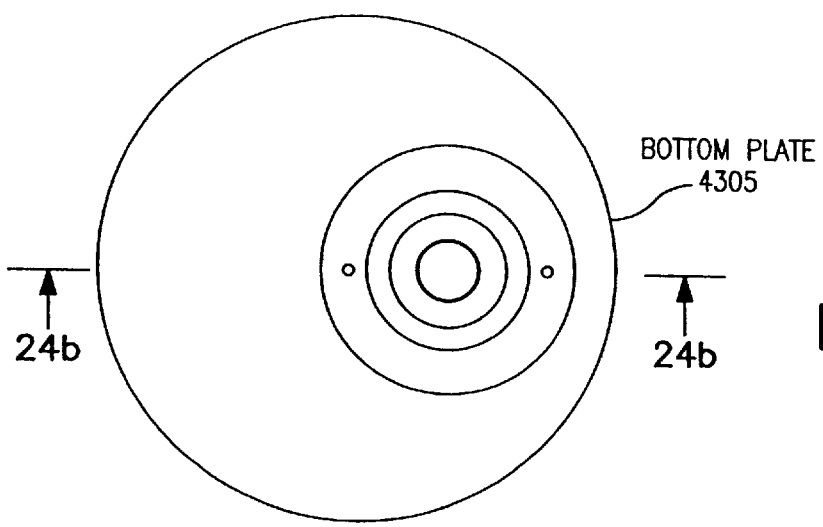
FIG. 24 (a) Top view of bottom housing end plate 4305 of compressor 4300; and (b) side view of bottom housing end plate 4305 taken along plane B—B of (a).
Figure 24B:
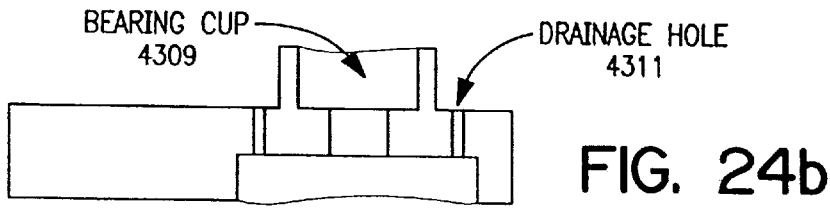
Figure 25C:
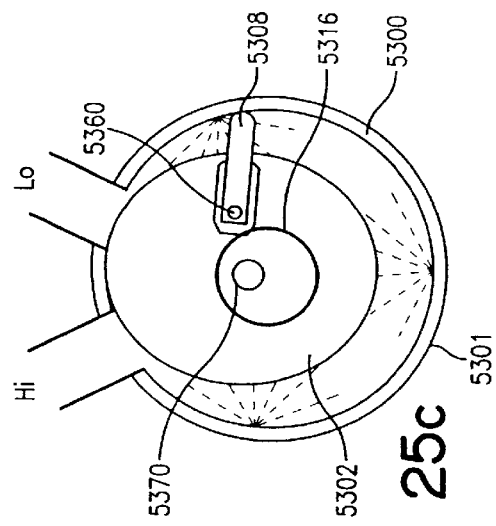
FIG. 25 (a–f) Schematic top views of actuated sliding vane compressor 5300 in different stages of its rotational cycle.
Figure 25B:
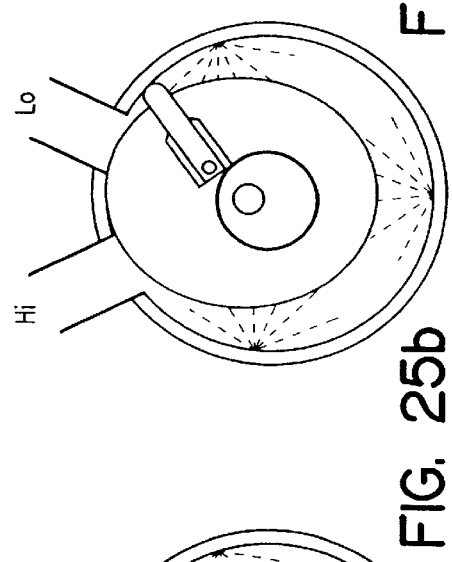
Figure 25A:
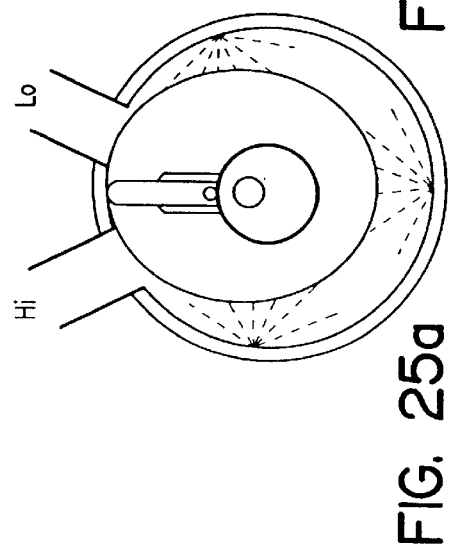
Figure 25F:
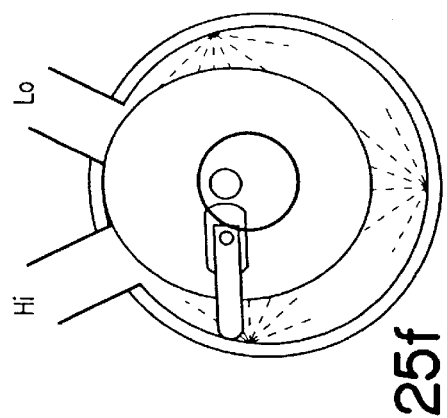
Figure 25E:
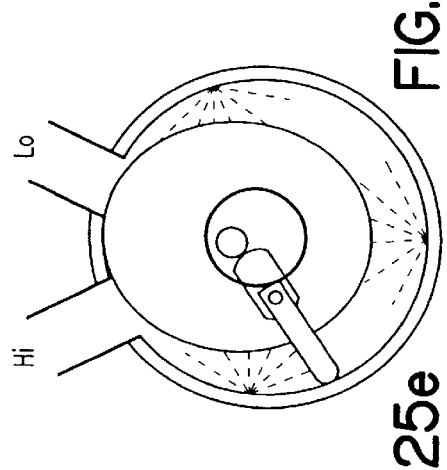
Figure 25D:
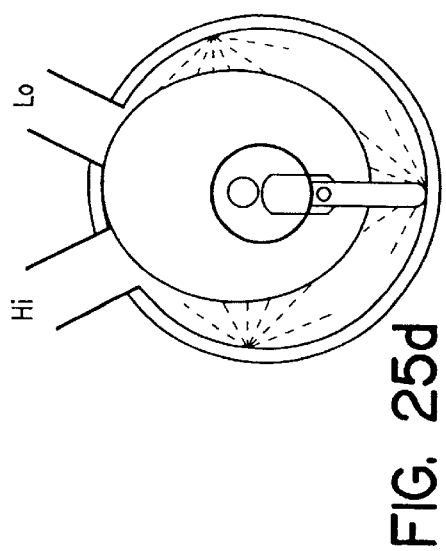

FIG. 19 is a side view of rotor 4302. As depicted in FIG. 19, rotor 4302 consists of a top cap 4320, bottom cap 4330, and sidewall 4340 which is preferably cylindrical. Top cap 4320 has a drainage hole 4323, and bottom cap 4330 has drainage hole 4333. Top sealing groove 4322 and bottom sealing groove 4332 located on the top and bottom caps are filled with liquid water to create a rotating seal against the housing end plates 4303 and 4305 which are depicted in FIGS. 23–24. Also, as shown in FIG. 20, sidewall 4340 has a vertical gap 4366 with a groove 4368 that seals against the sliding vane. Connectors 4361 are inserted into vertical slot 4366 to seal against the upper and lower surfaces of sliding vanes 4308. The grooves 4322 and 4332 shown in FIG. 19 may be entirely open, or they may contain a wick 4324 along the open end similar to that depicted in FIG. 9. The grooves may be actively supplied with low-pressure water 4327 through a slip ring 4326. Distribution channels 4329 ensure that water is distributed to sealing grooves. Alternatively, the water source may be from the water spray 4306 used to cool the compressor. The water spray will wet the interior walls of the compressor housing and be wicked into grooves 4322 and 4332, provided wick 4324 is used.

The rotor components, particularly the sliding vane, have pins 4352, linear bearings 4354, springs 4356, a felt wiper 4358, and roller bearings 4360 similar in structure and operation to those elements 3352, 3354, 3356, 3358, and 3360 depicted in FIGS. 11a–c, so a further description thereof is omitted.

Figure 22:
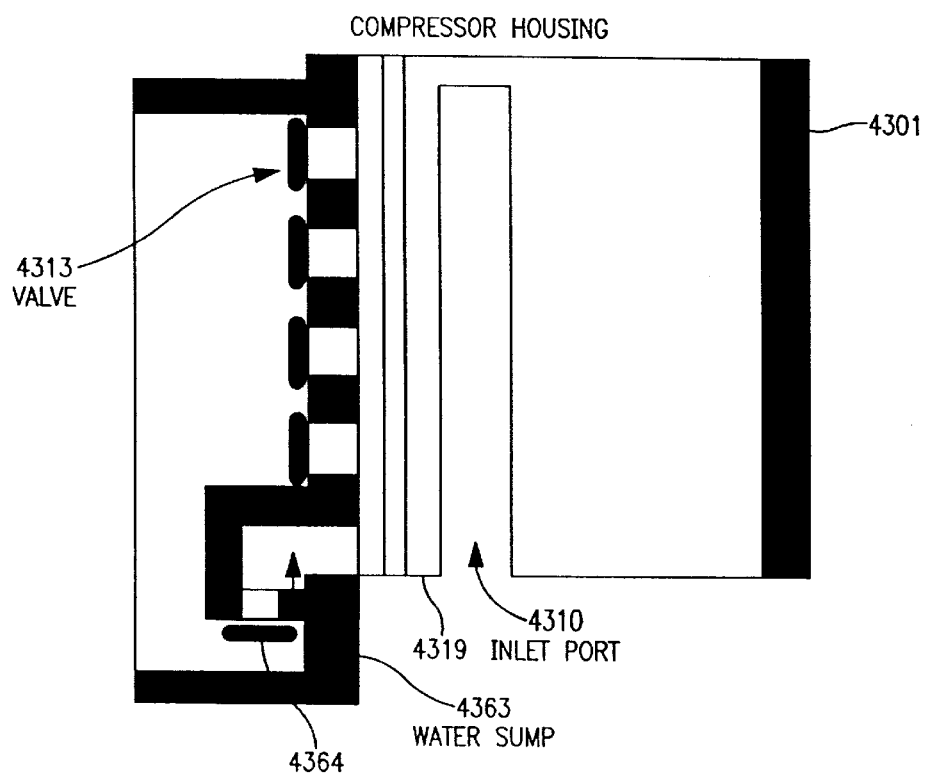
FIG. 22 Side view of compressor housing 4301 taken along plane A—A of FIG. 21.

FIGS. 21–22 show the compressor housing 4301. Inlet port 4310 is entirely open, but discharge port 4312 is lined with check valves 4313. Excess water will collect in the water sump 4363, which discharges through sump check valve 4364. Sealing groove 4319 on housing 4301 seals against the rotating sidewall 4340. The groove may be entirely open, or it may contain a wick 4324 along the open end similar to that depicted in FIG. 9.

The housing end plates 4303 and 4305 are depicted in FIGS. 23–24. Top housing end plate 4303 and bottom housing end plate 4305 have top bearing cup 4307 and bottom bearing cup 4309. Bottom end plate 4305 also has drainage holes 4311.

Sliding vane compressor 4300 may be integrated into vapor-compression evaporative cooler 3200 in place of compressor 3300 depicted in FIG. 16. Except for the oscillating mass of the sliding vane, sliding vane compressor 4300 will be virtually vibration free. In addition, sliding vane compressor 4300 is more compact than compressor 3300.

Still another embodiment of the invention is directed to an actuated sliding vane compressor for use in a vapor-compression evaporative cooler, such as cooler 3200. This compressor is depicted in FIGS. 25–31. Like the previous embodiments, this compressor design minimizes friction and uses water both as a sealant and a coolant.

FIGS. 25a–f show a schematic of actuated sliding vane compressor 5300 in various stages of the cycle. As rotor 5302 spins, sliding vane 5308 is postoned near fe housing 5301 by roller bearings 5360 which ride in grooves 5316.

Referring now to FIGS. 25–31, actuated sliding vane compressor 9300 comprises rotor 5302, which is disposed inside and rotates in compressor housing 5301 in a similar fashion to rotor 4302 and compressor housing 4301, depicted in FIGS. 17–18.

Figure 27A:
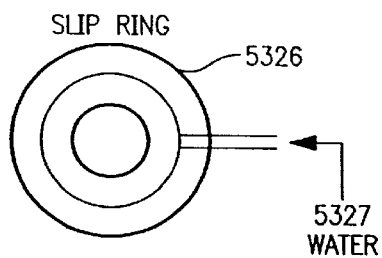
FIG. 27 (a) Top view of slip ring 5326 of rotor 5302; (b) top view of top cap 5320 of rotor 5302; and (c) bottom view of bottom cap 5330 of rotor 5302.
Figure 27B:
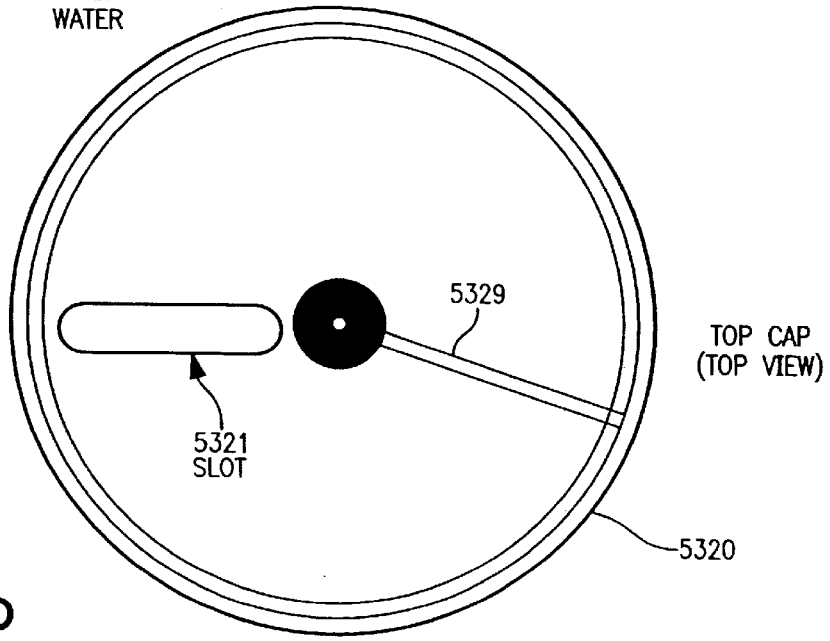
Figure 27C:
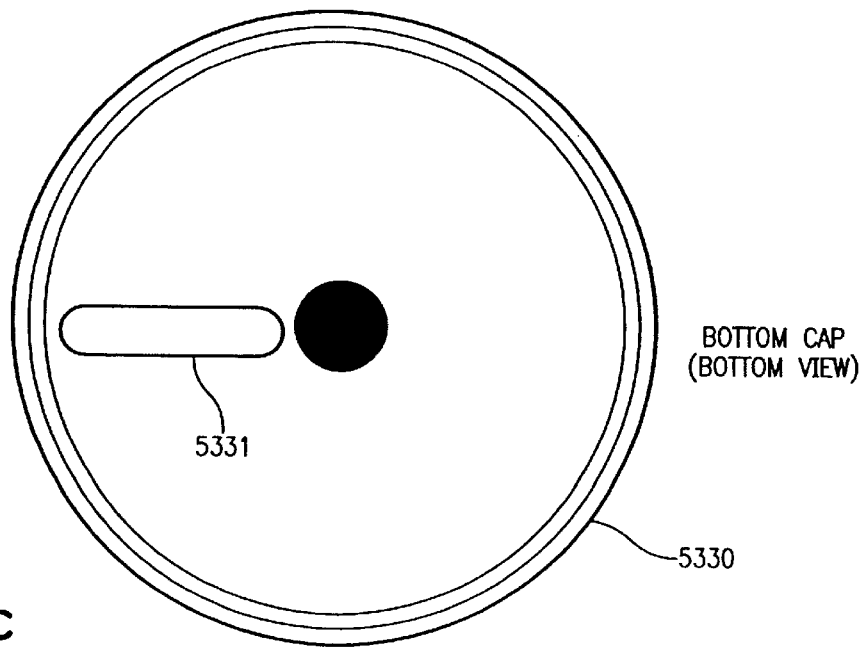
Figure 28:
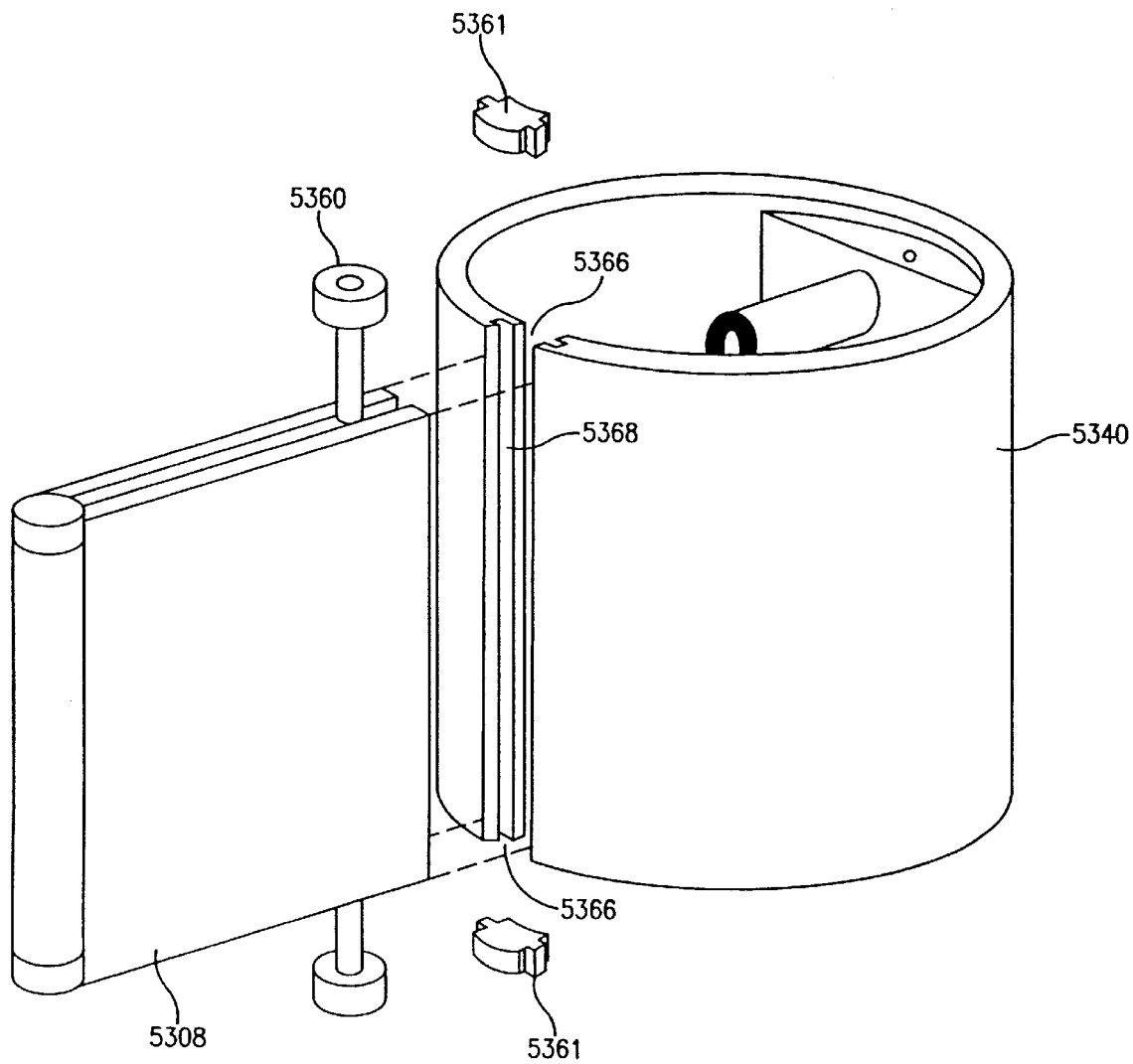
FIG. 28 Perspective view of sidewall 5340 and sliding vane 5308 of compressor 5300.
Figure 30A:
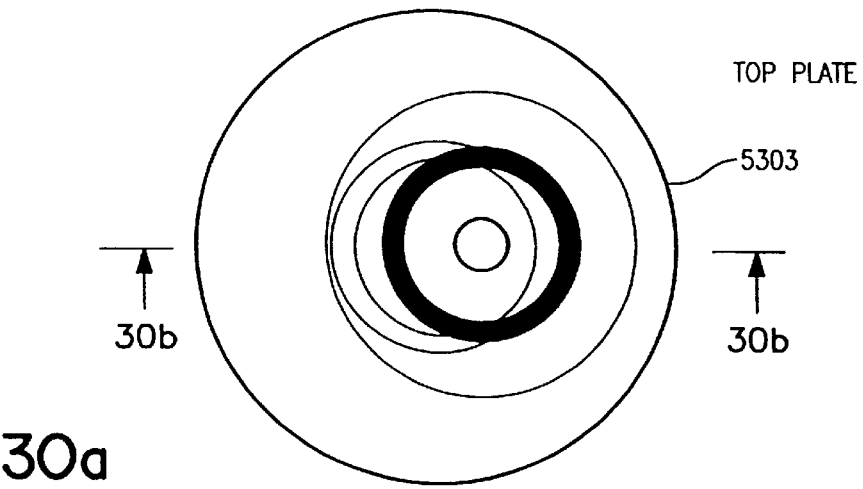
FIG. 30 (a) Top view of top housing end plate 5303 of compressor 5300; and (b) side view of top housing end plate 5303 taken along plane A—A of (a).
Figure 30B:
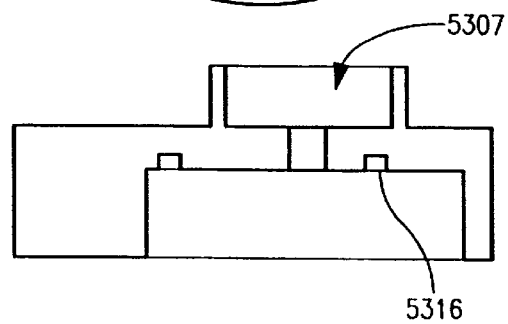
Figure 31A:
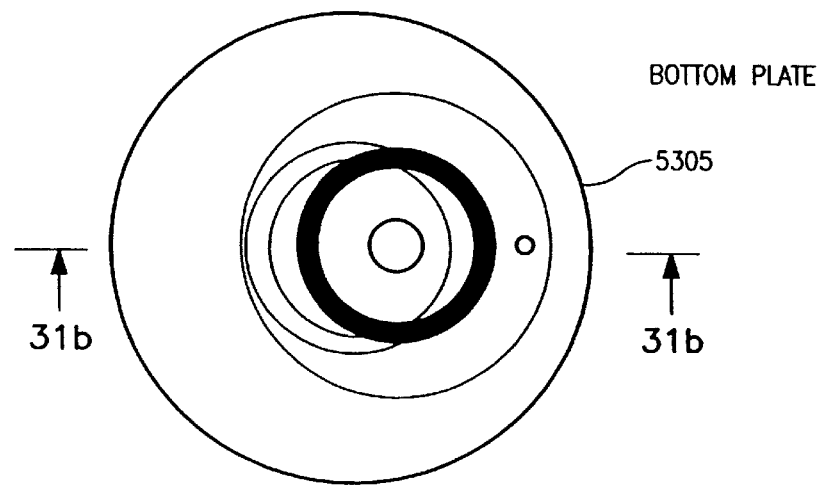
FIG. 31 (a) Top view of bottom housing end plate 5305 of compressor 5300; and (b) side view of bottom housing end plate 5305 taken along plane B—B of (a).
Figure 31B:
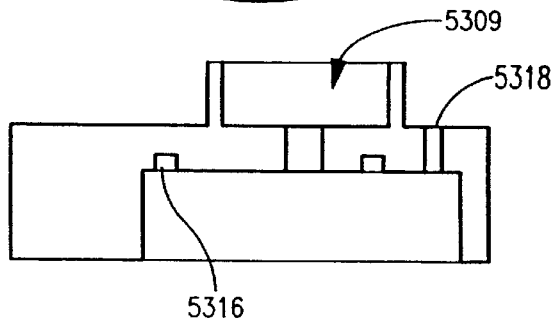
Figure 32A:
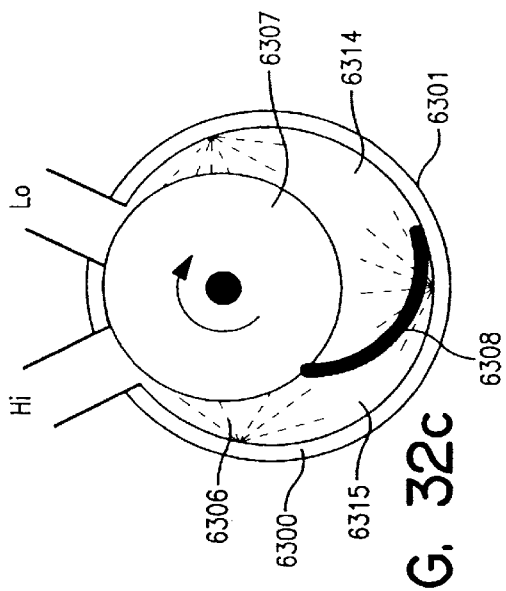
FIG. 32 (a–f) Schematic top views of actuated flap compressor 6300 in different stages of its rotational cycle.
Figure 32B:
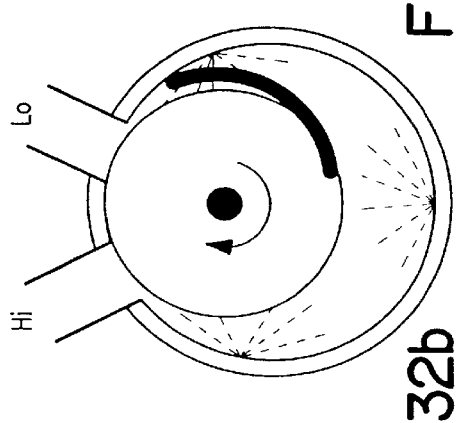
Figure 32C:
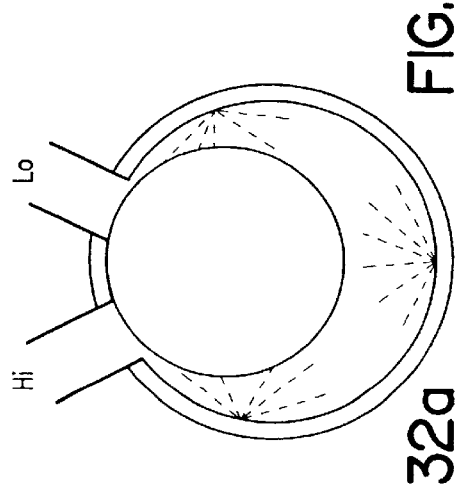
Figure 32D:
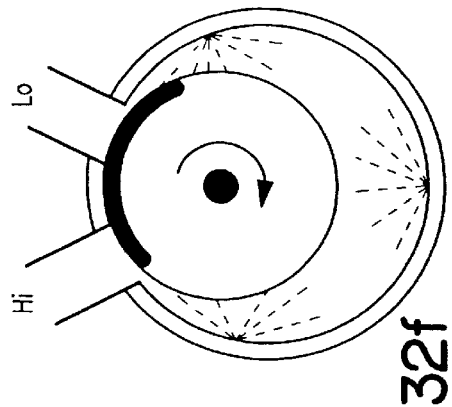
Figure 32E:
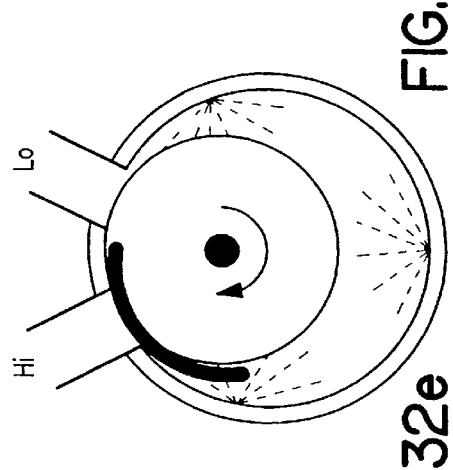
Figure 32F:
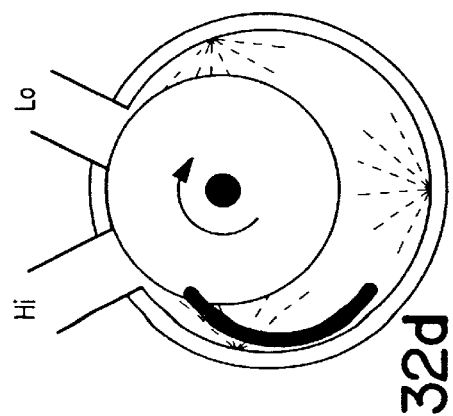

FIGS. 25–29 depict the details of the rotor components of actuated sliding vane compressor 5300. Rotor 5302 consists of a top cap 5320, a bottom cap 5330 and sidewall 5340 which is preferably cylindrical. The rotor caps have grooves 5322 and 5332. As depicted in FIG. 28, sidewall 5340 has vertical grooves 5368 and vertical gap 5366, similar in structure and function to grooves 4368 and gap 4366 in the previous embodiment. Connectors 5361 are inserted into vertical slot 5366 to seal against the upper and lower surfaces of sliding vane 5308. Water 5327 may be supplied to the grooves via slip ring 5326. Distribution channels 5329 ensure that water is distributed to sealing grooves. As shown in FIG. 27, slot 5321 in top cap 5320 and slot 5331 in bottom cap 5330 allow roller bearings 5360 on sliding vane 5308 to protrude from end caps 5320 and 5330. FIGS. 29a–c depict some of the components of sliding vane 5308, including pins 5352 located on the interior which ride on linear bearings 5354. As depicted in FIGS. 29–31, roller bearings 5360 of sliding vane 5308 ride in grooves 5316 located on the housing end plates 5303 and 5305. The springs 5356 shown in FIG. 29a may be in compression so the roller bearings 5360 of sliding vane 5308 ride on the outside edge of grooves 5316. Grooves 5316 may have a circular cross-section or may be non-circular and function as a cam to carefully regulate the position of the sliding vane. Housing end plates 5303 and 5305 have bearing cups 5307 and 5309, respectively, to support shaft 5370. Bottom housing end plate 5309 has a port 5318 to drain excess water. A sintered metal or, alternatively, felt wiper 5358 becomes water soaked from the cooling water spray, so it seals against the housing 911.

The compressor housing of the present embodiment is similar in structure to housing 4301 depicted in FIGS. 21–22 of the previous embodiment, such that a further description thereof is omitted. As in the previous embodiment, the inlet port is entirely open, but the discharge port is lined with check valves. Excess water will collect in a water sump which discharges through a check valve.

Actuated sliding vane compressor 5300 may be integrated into vapor-compression evaporative cooler 3200 depicted in FIG. 16 in place of rotary compressor 3300 or 4300.

To reduce the cost associated with purchasing individual motors for each pump, and to increase the efficiency (one large motor is more efficient than multiple small motors), the pumps (and turbines, if used) may be mounted on the same shaft that drives the compressor 5300. The pumps need not have tight seals because water will leak into the evaporator with no major adverse consequences. The loose seals will reduce friction and increase pump efficiency.

Actuated sliding vane compressor 5300 has an advantage over sliding vane compressor 4300 in that the roller bearings 5360 for gliding vane 5308 will actually rotate relatively slowly. In contrast, roller bearing 4360 must rotate very fast, which may require the use of expensive, high-speed roller bearings.

Still another embodiment of the invention is directed to an actuated flap compressor which may be used in a vapor-compression evaporative cooler, such as cooler 3200. This compressor is depicted in FIGS. 32–42. Like the previous embodiments, this compressor has low friction and uses water both as a sealant and a coolant.

FIGS. 32a–f show a schematic of actuated flap compressor 6300 in various stages of the cycle. As rotor 6302 rotates, it sweeps in vapors from low-pressure side 6314 during the first rotation and then compresses them during the second rotation. To cool vapors during the compression and to make seals, liquid water 6306 is sprayed into the compressor 6300 during the compression. An actuated flap 6308 nearly contacts the interior of compressor housing 6301 and separates the low-pressure side 6314 and high pressure side 6315 of the compressor.

Figure 33:
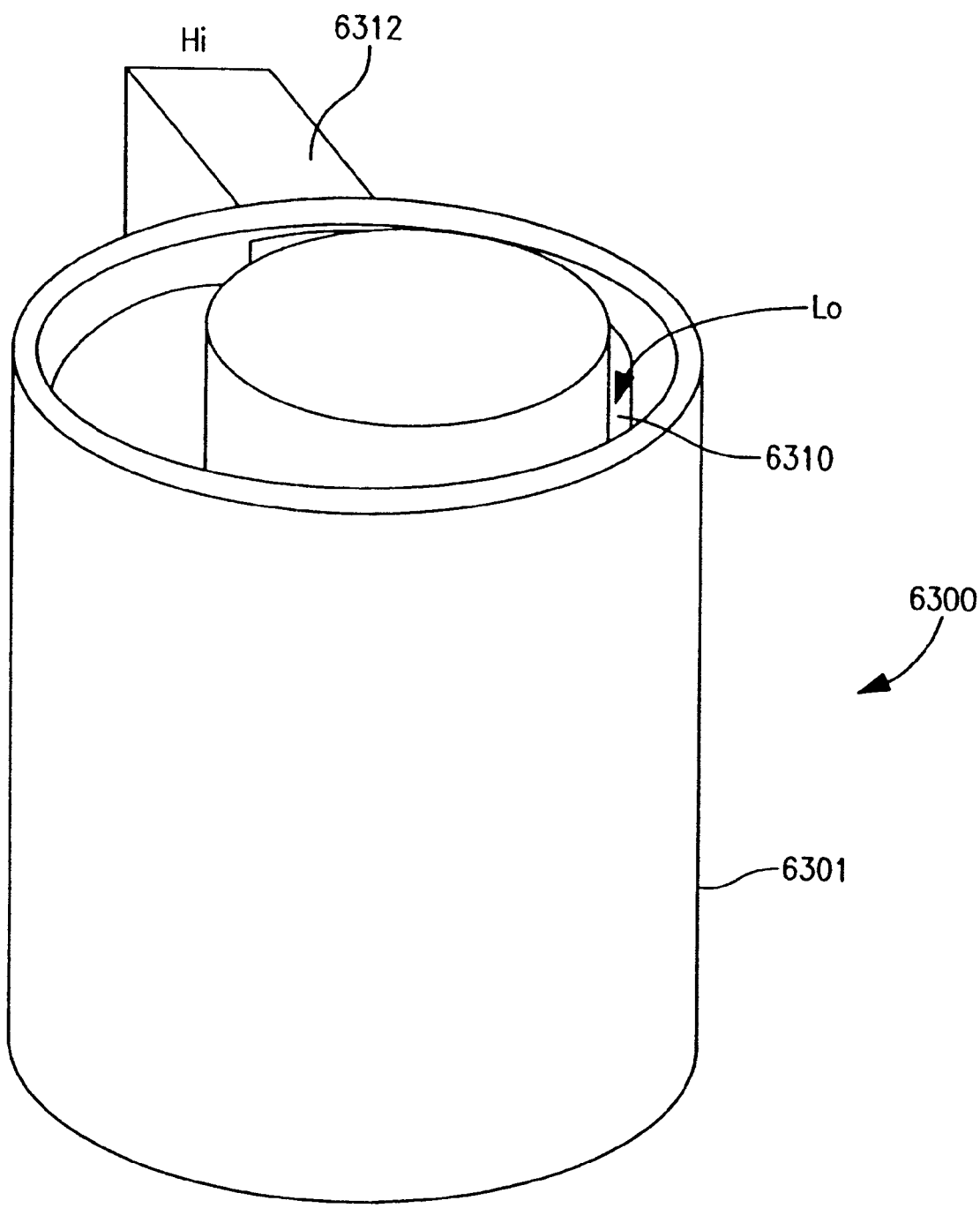
FIG. 33 Three dimensional schematic view of actuated flap compressor 6300.

FIG. 33 is a three dimensional schematic of actuated flap compressor 6300. The low-pressure vapors enter inlet hole or port 6310 in the side of the housing 6301. No inlet check valve is required. The high-pressure vapors exit through outlet or discharge port 6312. Outlet check valves 6313 (FIG. 40) are provided at the outlet.

Figure 34:
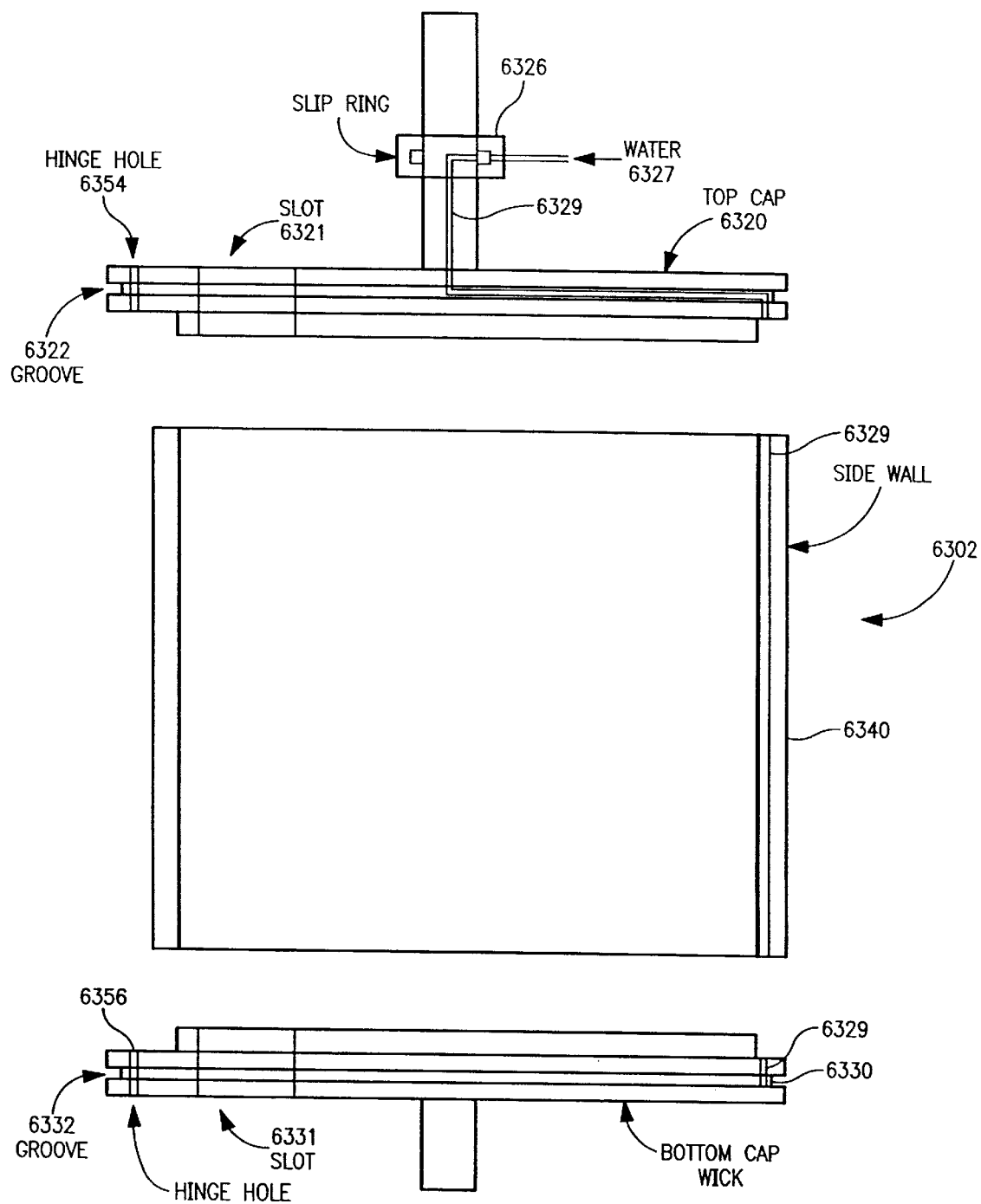
FIG. 34 Exploded side view of rotor 6302 of compressor 6300.
Figure 35A:
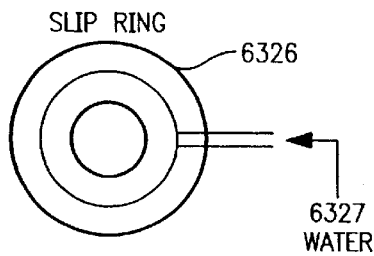
FIG. 35 (a) Top view of slip ring 6326 of rotor 6302; (b) top view of top cap 6320 of rotor 6302; and (c) bottom view of bottom cap 6330 of rotor 6302.
Figure 35B:
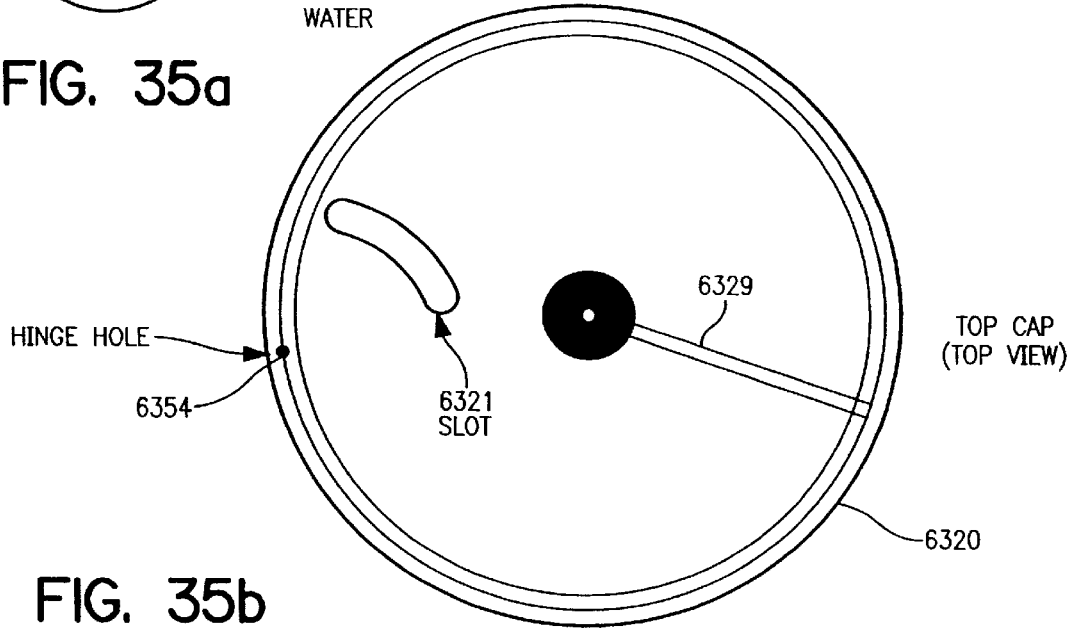
Figure 35C:
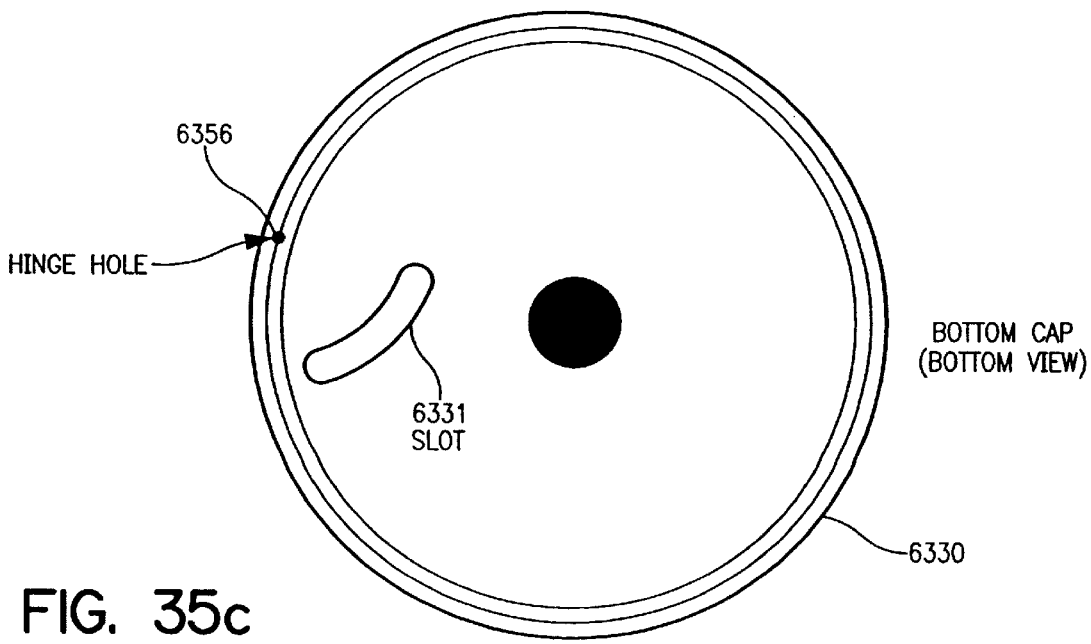
Figure 36:
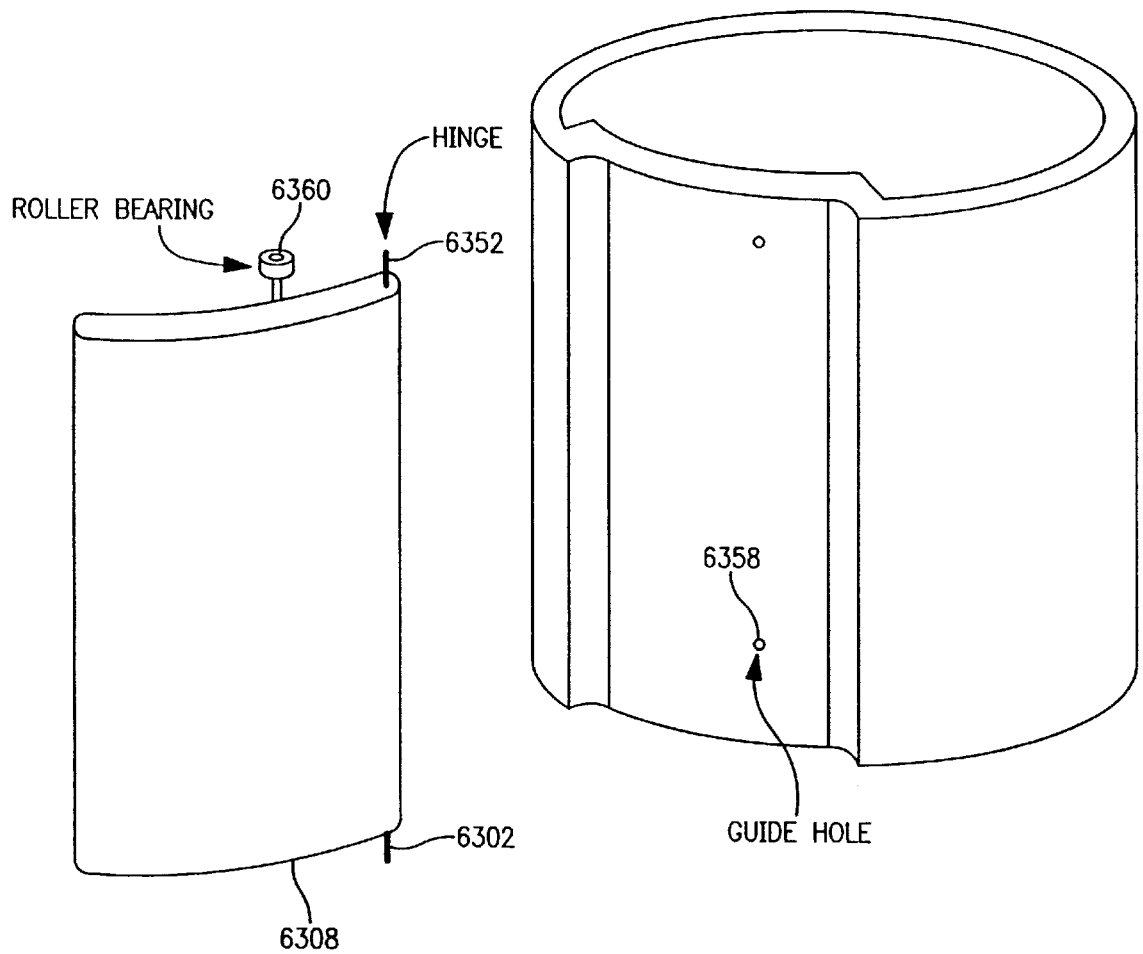
FIG. 36 Perspective view of sidewall 6340 and flap 6308 of rotor 6302 of compressor 6300.
Figure 37:
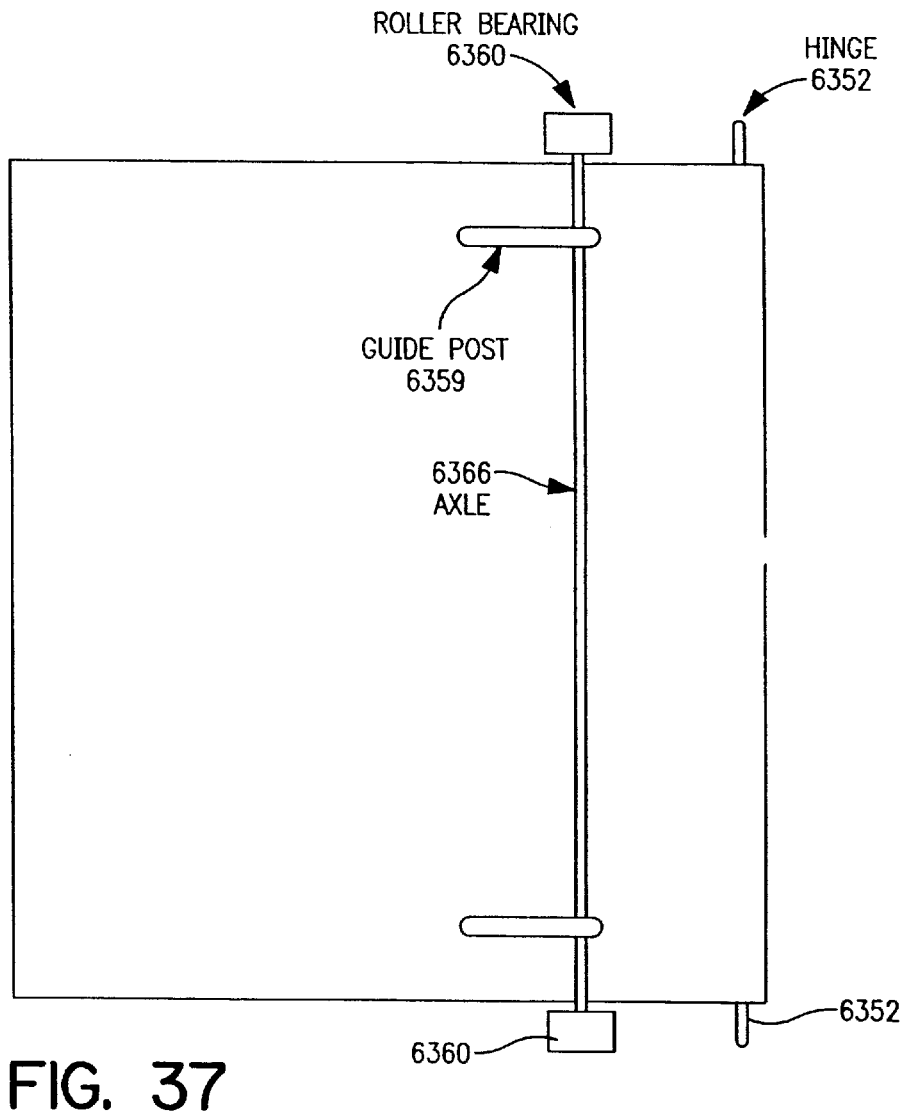
FIG. 37 Side view of flap 6308.
Figure 38:
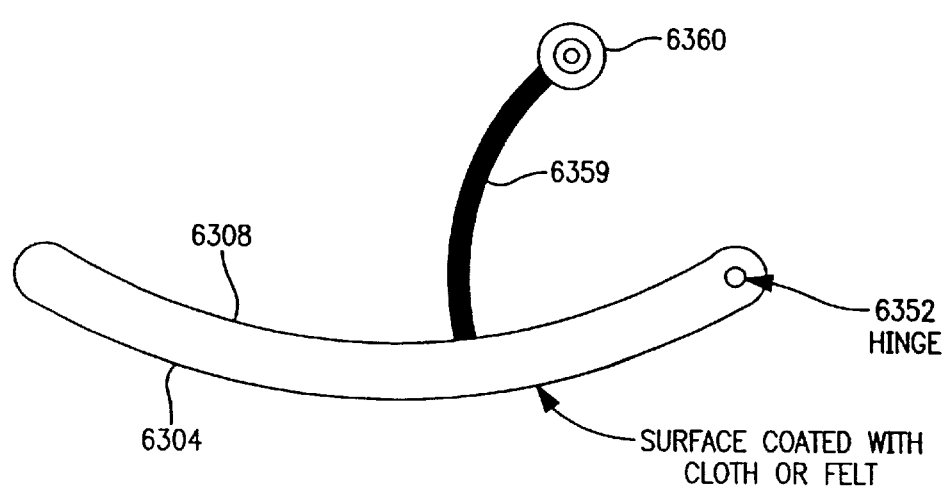
FIG. 38 Top view of flap 6308.
Figure 39:
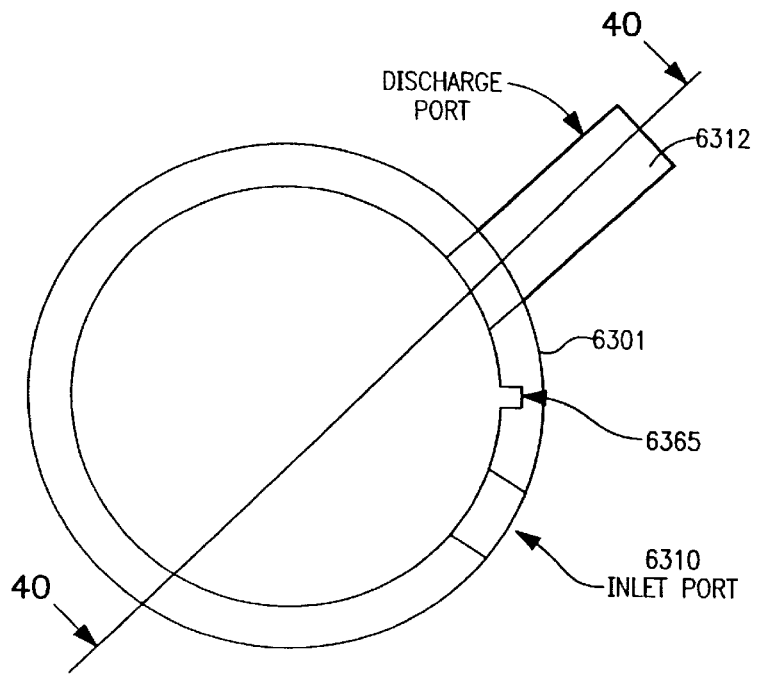
FIG. 39 Top view of compressor housing 6301 of compressor 6300.
Figure 40:
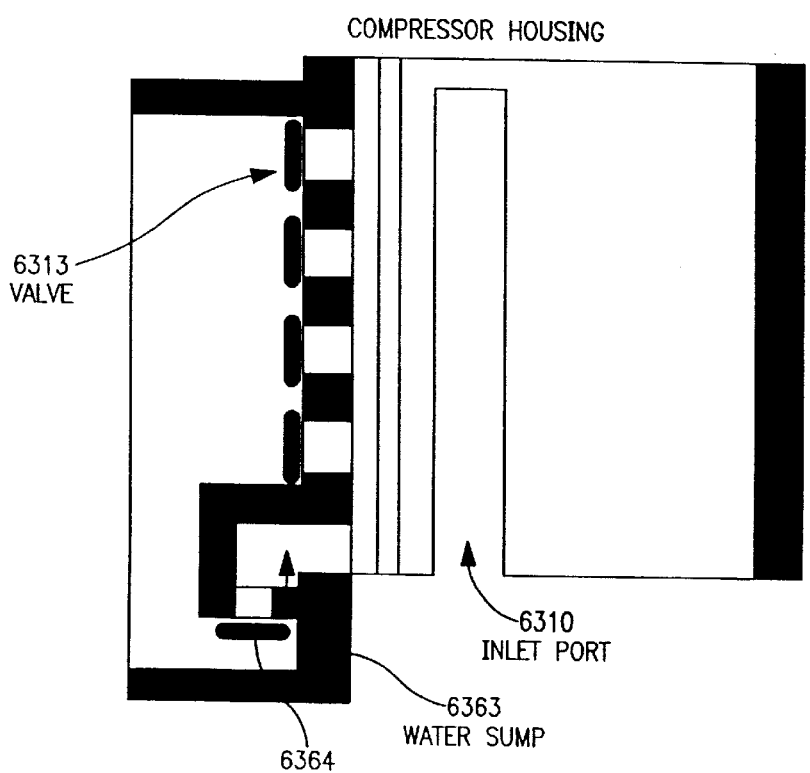
FIG. 40 Side view of compressor housing 6301 taken along plane A—A of FIG. 39.
Figure 41A:
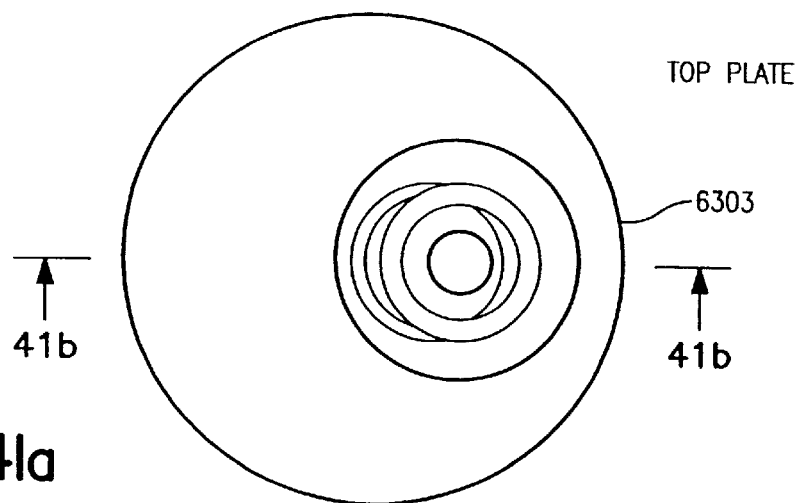
FIG. 41 (a) Top view of top housing end plate 6303 of compressor 6300; and (b) side view of top housing end plate 6303 taken along plane A—A of (a).
Figure 41B:
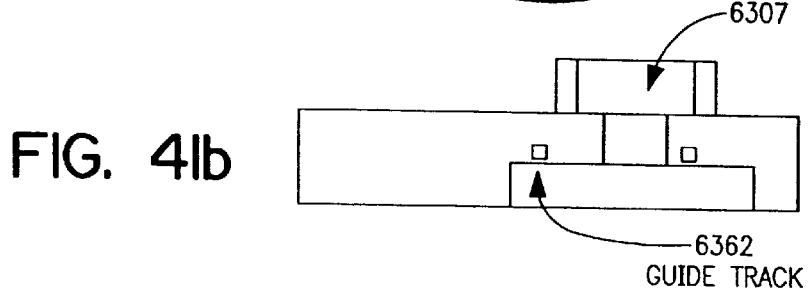
Figure 42A:
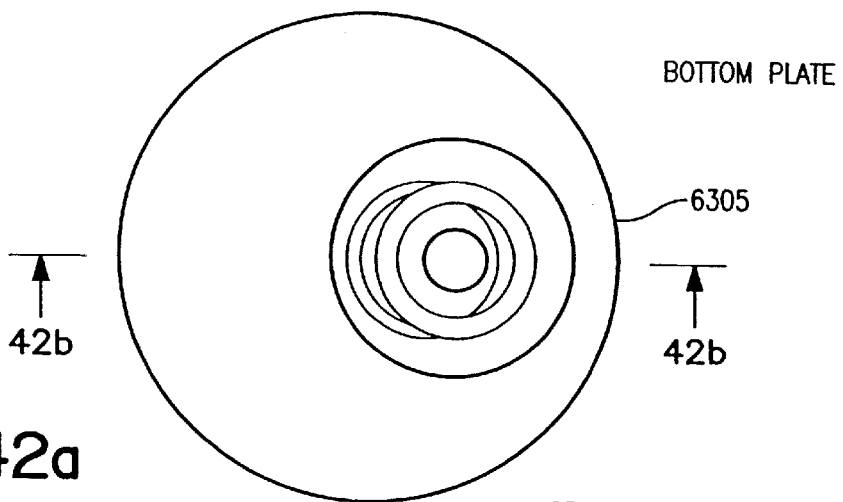
FIG. 42 (a) Top view of bottom housing end plate 6305 of compressor 6300; and (b) side view of bottom housing end plate 6305 taken along plane B—B of (a).
Figure 42B:
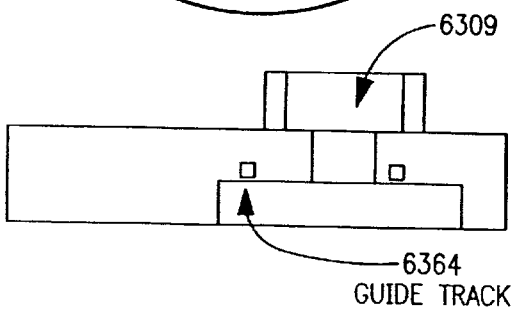
Figure 43G:
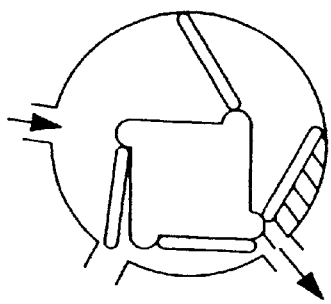
FIG. 43 (a–j) Schematic top views of actuated flap compressor 7300 in different stages of its rotational cycle.
Figure 43H:
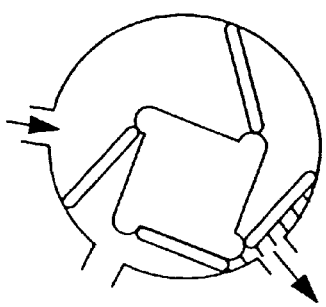
Figure 43I:
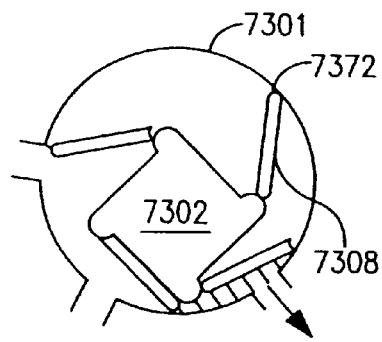
Figure 43J:
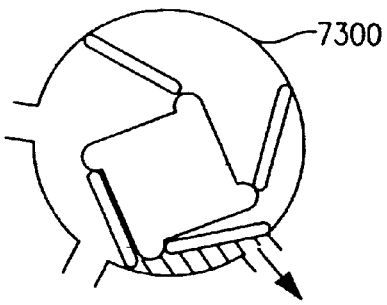

FIG. 34 is a side view of rotor 6302. As depicted in FIG. 34, rotor 6302 consists of a top cap 6320, bottom cap 6330, and sidewall 6340, which is preferably cylindrical. Slots 6321 and 6331 allow the roller bearings 6360 (FIG. 36) to protrude from end caps 6320 and 6330. Top sealing groove 6322 and bottom sealing groove 6332 located on the top and bottom caps are filled with liquid water to create a rotating seal against the housing end plates 6303 and 6305 (FIGS. 41 and 42). The grooves may be entirely open, or they may contain a wick along the open end as described in previous embodiments. The grooves may be actively supplied with low-pressure water 6327 through slip ring 6326. Distribution channels 6329 ensure that water is distributed to sealing grooves. Alternatively, the water source may be from the water spray used to cool the compressor. The water spray will wet the interior walls of the compressor housing and be wicked into grooves 6322 and 6132, provided wick 6324 is used.

FIGS. 35–38 show further details of the rotor components. Referring to FIGS. 35–38, actuated flap 6308 has hinge pins 6352 which fit into hinge holes 6354 and 6356 in rotor top end cap 6320 and bottom end cap 6330. Flap 6308 is forced outward by centrifugal force. As depicted in FIGS. 37–38 and 41–42, roller bearings 6360 ride in top guide track 6362 of top end plate 6303 and bottom guide track 6364 in bottom end plate 6305 of the compressor housing 6301 which prevents the flap from touching the compressor housing 6301, thus maintaining a slight gap of a few thousandths of an inch The outer surface 6304 of flap 6308 may be covered with cloth or felt so that water is wicked between the flap and the compressor housing, thus forming a seal. Guideposts 6359 fit through guide hole 6358 so that flap 6308 is actuated when roller bearings 6360 mounted on axle 6366 ride in guide tracks 6362 and 6364. Rotor 6302 nearly contacts housing 6301 at sealing groove 6365 which may be open, or have a wick such as that depicted in FIG. 9. As can be seen from the foregoing, the present embodiment has minimal friction between the compressor components—the rotor, flap and housing.

FIGS. 39–42 show the compressor housing 6301. Inlet port 6310 is entirely open, but the discharge port 6312 is lined with check valves 6313. Excess water will collect in the water sump 6363 which discharges through sump check valve 6364. The housing end plates 6303 and 6305 are shown in FIGS. 41–42. Top end plate 6303 has a top bearing cup 6307 and a guide track 6362. Bottom and plate 6305 has a bottom bearing cup 6309 and a guide track 6364.

Because the final compression pressure is not great enough to open the check valves, they are actively opened preferably with a solenoid or hydraulic pistons. The timing of the opening/closing may be based upon measurements of the evaporator and condenser temperature. A "look-up" table on a computer chip may be used to open the valves at the optimal rotation angle. The optimal rotation angle may be determined experimentally by varying the opening angle and measuring the ones giving the maximum coefficient of performance under a variety of evaporator/condenser temperatures.

As with the previously disclosed compressors 3300, 4300 and 5300, actuated flap compressor 6300 may be integrated into vapor-compression evaporative cooler 3200 depicted in FIG. 16.

The present embodiment enjoys several advantages over other compressors. Except for the oscillating mass of the flap, compressor 6300 will be virtually vibration free. In contrast, a reciprocating compressor will have much vibration. In addition, a reciprocating compressor requires an inlet check valve which adds expense and lowers efficiency because of flow losses through the valve. Actuated flap compressor 6100 is also more compact than rotary compressor 3300.

Further, a dynamic compressor (centrifugal or axial) must operate at very high speeds requiring either expensive high-speed motors or gear boxes. Actuated flap compressor 6300 can operate using conventional motors. Also, high-speed centrifugal and axial compressors may not tolerate liquid droplets needed to cool the compressor. A centrifugal or axial compressor may also be more expensive because they have many precision components and must be well balanced.

Another embodiment of the invention is directed to a simple, valveless, cost-effective water vapor compressor with a variable compression ratio, which can be used in vapor-compression evaporative cooling systems, such as cooler 3200. This low-friction compressor, depicted in FIGS. 43–46, uses multiple swinging vanes.

As depicted in FIGS. 43–46, actuated flap compressor 7300 comprises a swinging vane 7308, a rigid connecting rod 7370 for vane angle control, a multiple vane configuration which eliminates the need for a discharge valve, and an adjustable discharge port opening 7312 for compression ratio variation.

In this embodiment, multiple vanes 7308 are actuated in a radial fashion from an inner drum 7302, such that the vane tips 7372 seal against an outer drum 7301 forming a cavity of decreasing volume upon rotation. The high pressure side of the vane can be curved with an arc with the same radius as the outer drum, to insure complete discharge by minimizing dead volume. Actuation means eliminates the frictional losses suffered due to contact between tie vane tips 7372 and the outer drum 701.

FIGS. 43a–j show the progression of an arbitrarily chosen cavity through the compression and discharge stages. Note that tie vanes 7308 do not quite touch the outer drum 7301. For clarity, the means of achieving this actuation are not shown in this figure. The compression occurs by collapsing the encapsulated volume 7374 (hatched area in FIGS. 43a–j) between two successive vanes 7308 beginning immediately after the trailing vane passes the final intake port 7310. Compression ends and discharge begins as the leading vane passes the opening of the discharge port 7312, allowing the compressed vapor to be expelled by continued volume collapse without further compression. Although only one cavity has been described, all cavities perform the same function; therefore, four of the processes described above occur per revolution. Variable compression ratio is achieved by adjusting the leading edge location of the discharge port 7312 circumferentially on the outer drum 1301 (which determines port opening time and thus compression ratio). As noted, in this embodiment, the ports can be valveless.

FIG. 44 shows the configuration of the vane connecting rod 7370. As the square inner drum 7302 rotates about its axis 7378, a very small clearance or gap 7380 between the vane tip 7372 and the outer drum 7301 can be maintained by rotating the vane connecting rod 7370 about the outer drum axis 7382.

Figure 45:
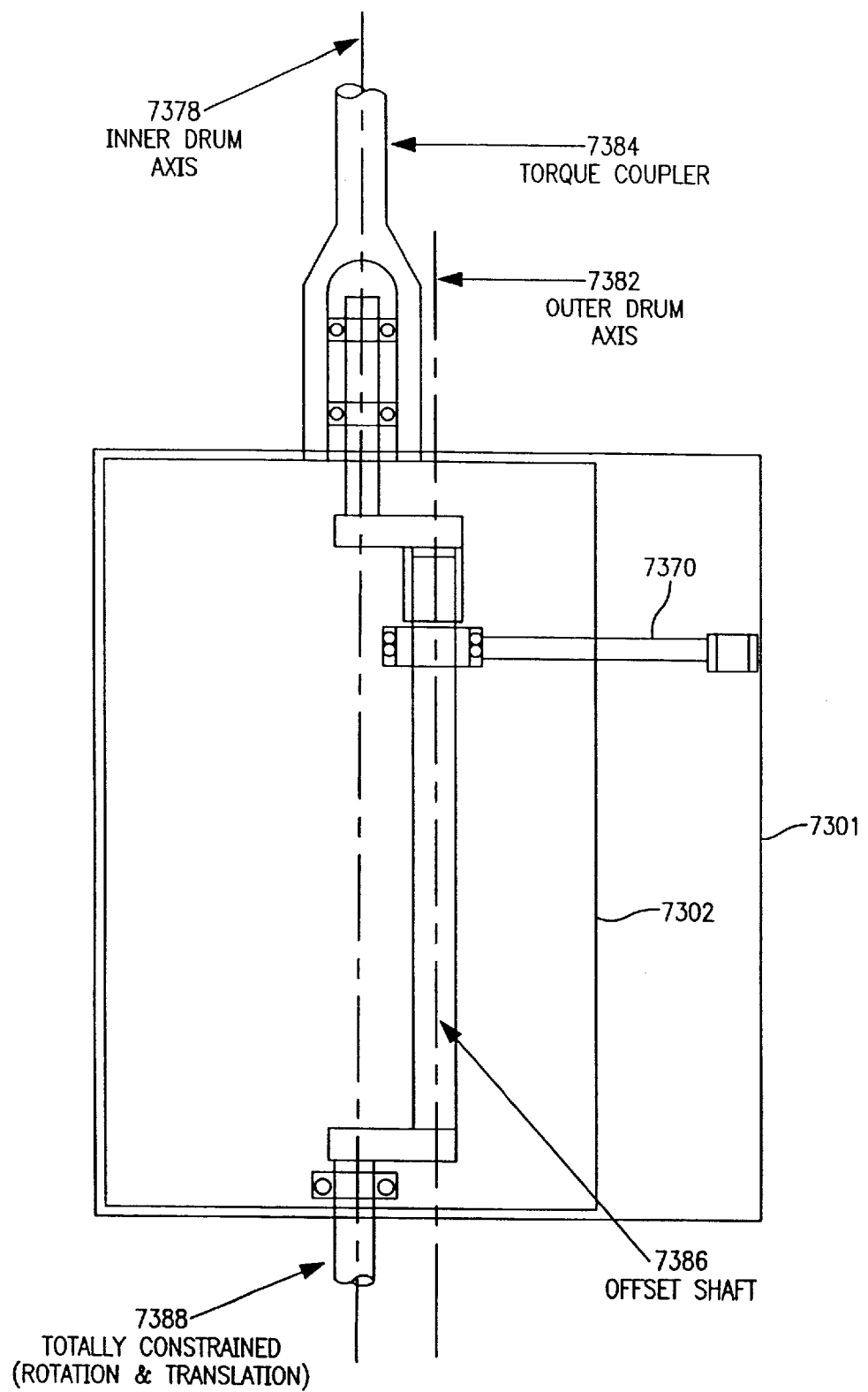
FIG. 45 Side view of shaft configuration to permit two axes of rotation of compressor 7300.

FIG. 45 shows the method by which the two axes of rotation can be provided. The torque coupler 7384 is driven by a power source (such as an electric motor) and transmits the torque to the inner drum 7302. It also provides adequate translational constraints to the offset shaft 7386 which is coaxial with the outer drum 7301. All degrees of freedom are constrained in the offset shaft 7386 by proper shaft shouldering and rotation constraint at the base 7388. One end of the vane connecting rod 7370 is fixed to the portion of the offset shaft 7386 which is coaxial with the outer drum 7301.

Figure 46:
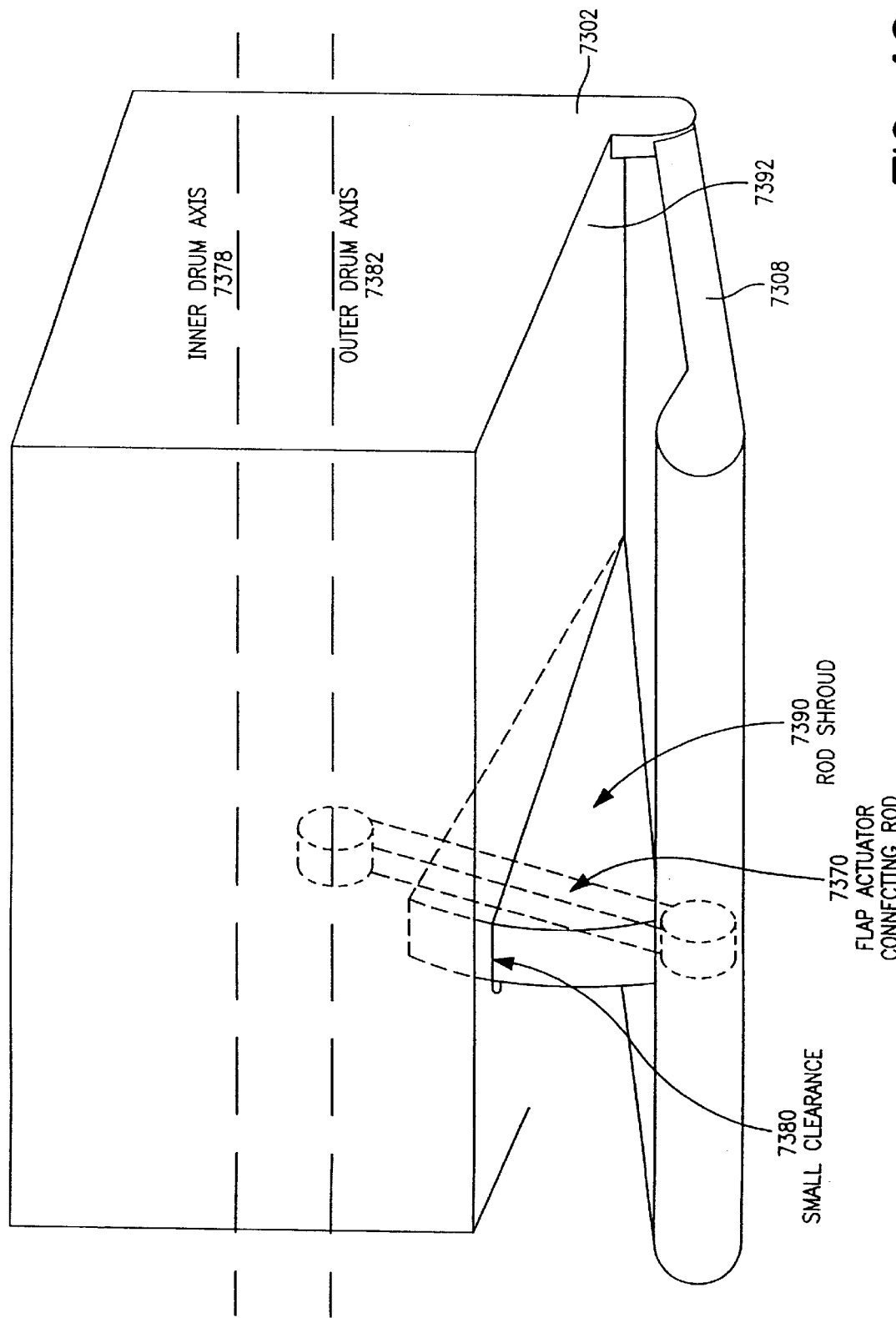
FIG. 46 Perspective view of rod shroud 7390 of compressor 7300.
Figure 47A:
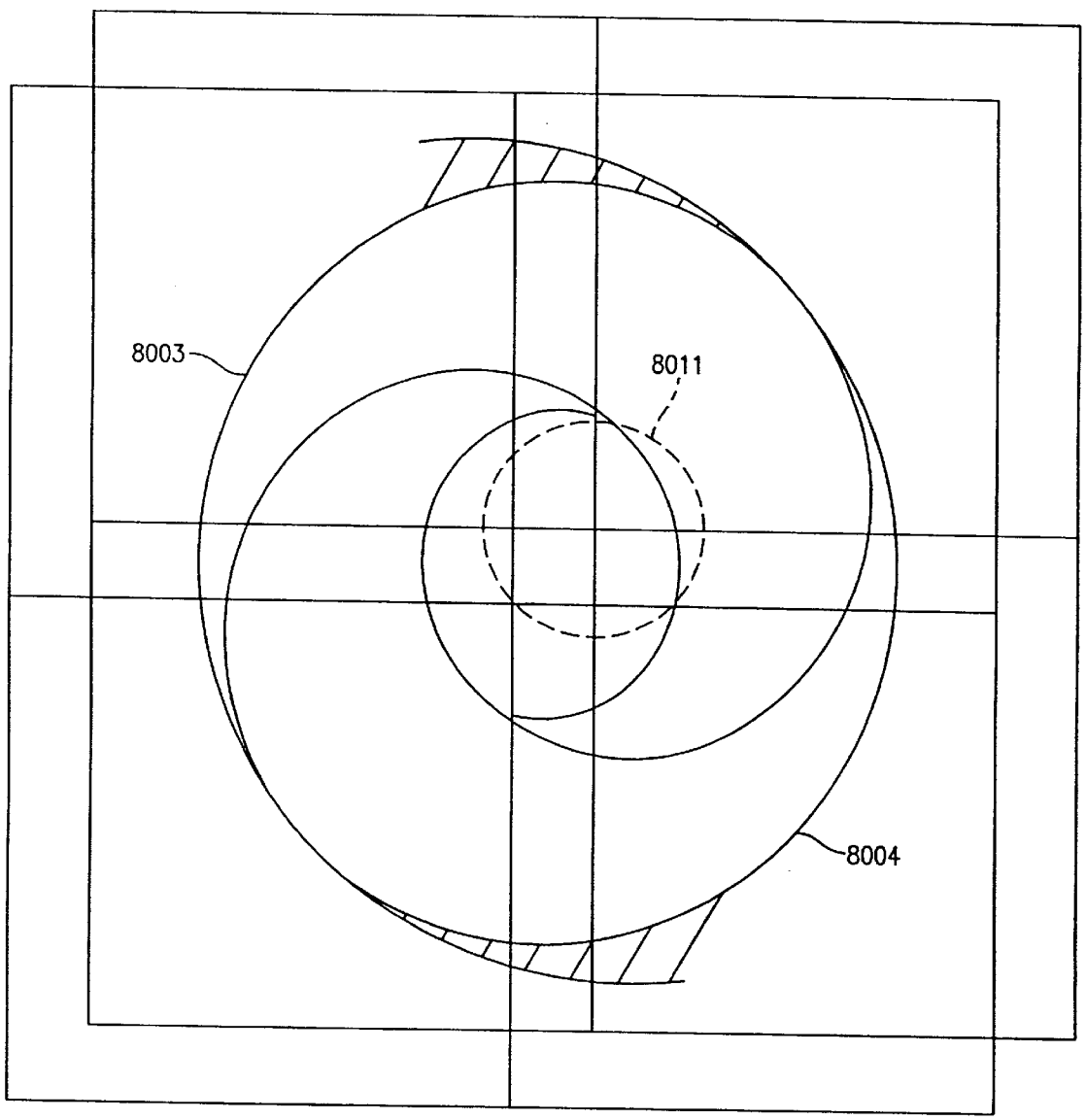
FIG. 47 (a–p) Schematic views of orbiting scrolls of compressor 8000 in different stages of the orbiting cycle.
Figure 47B:
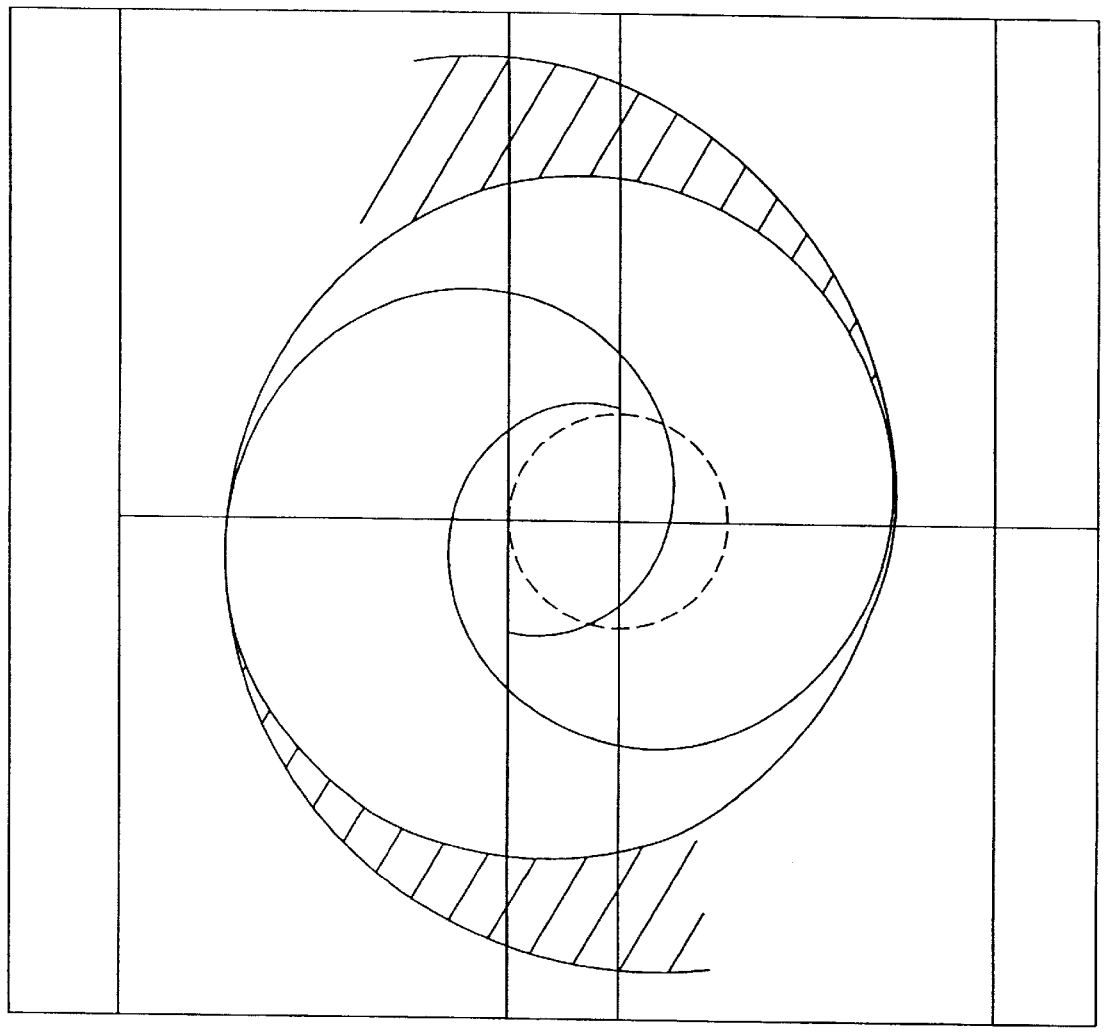
Figure 47C:
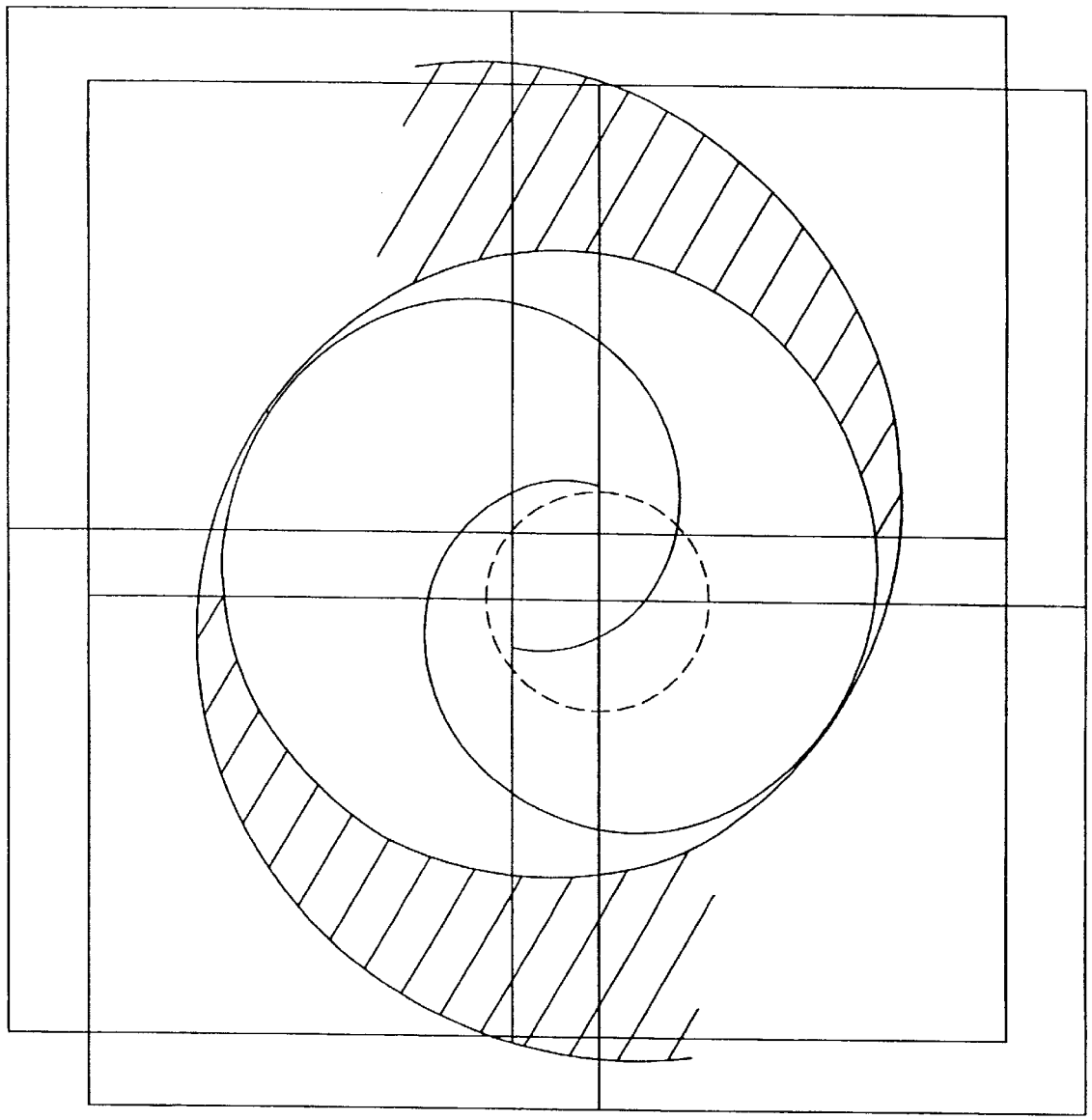
Figure 47D:
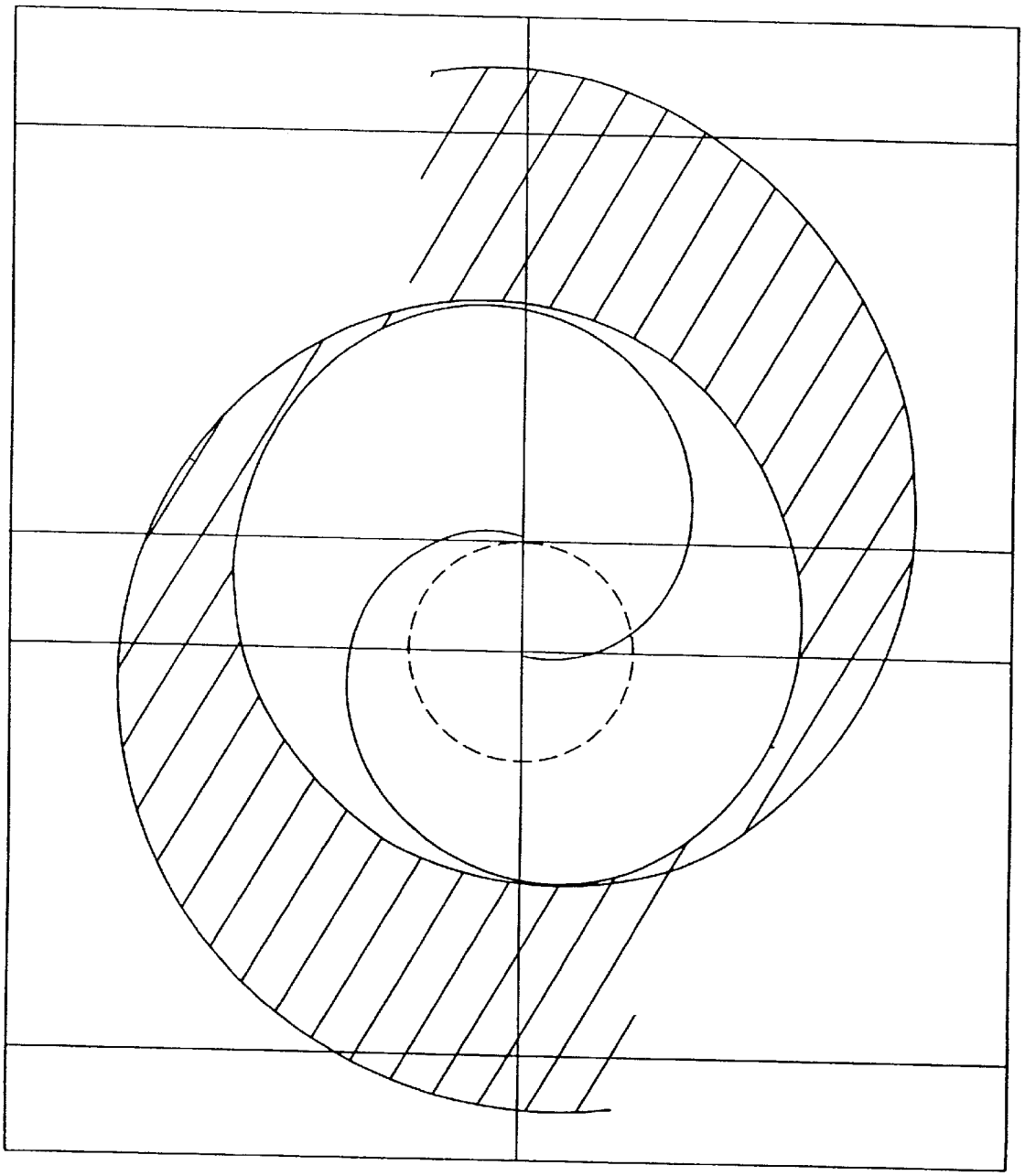
Figure 47E:
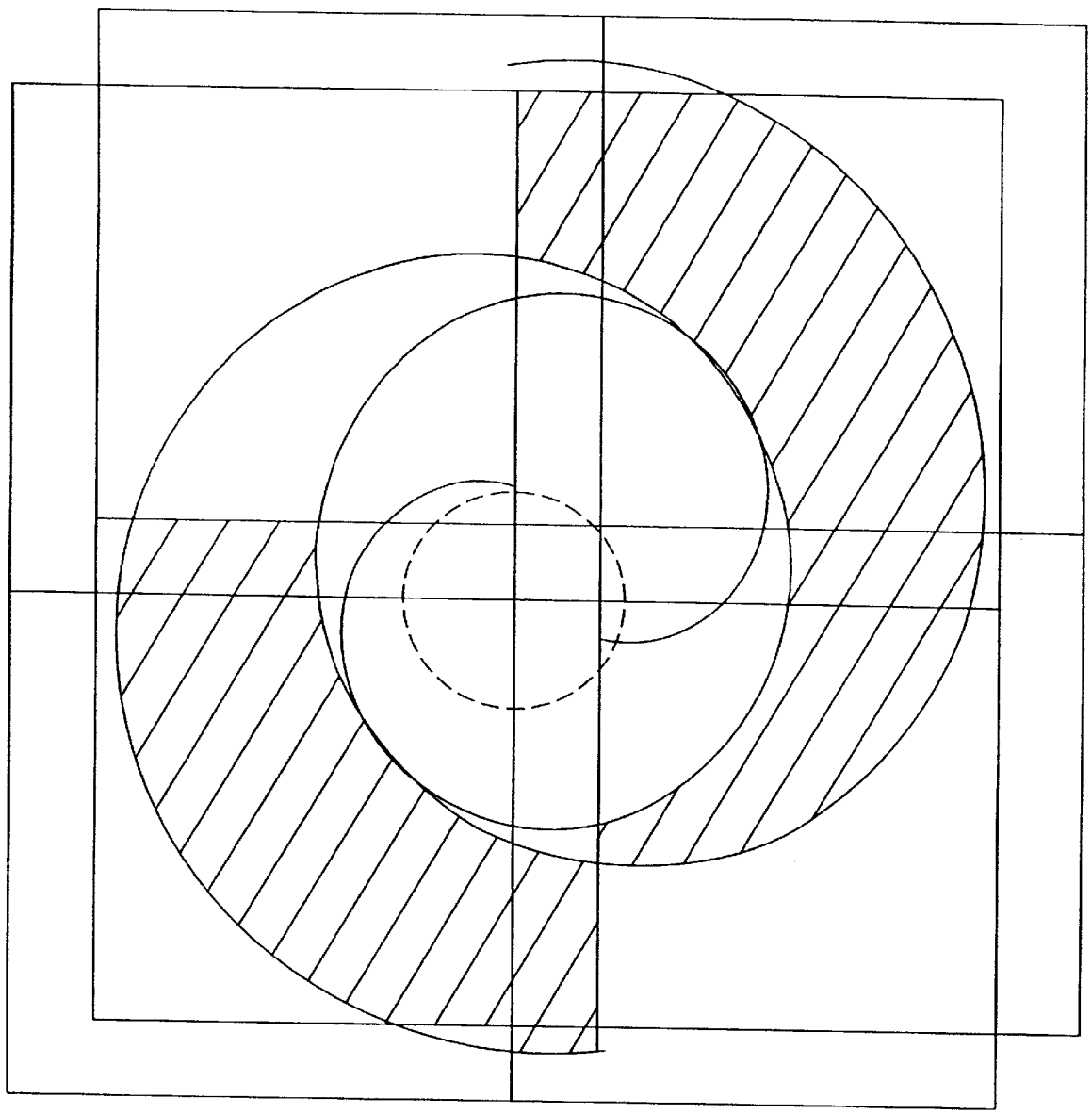
Figure 47F:
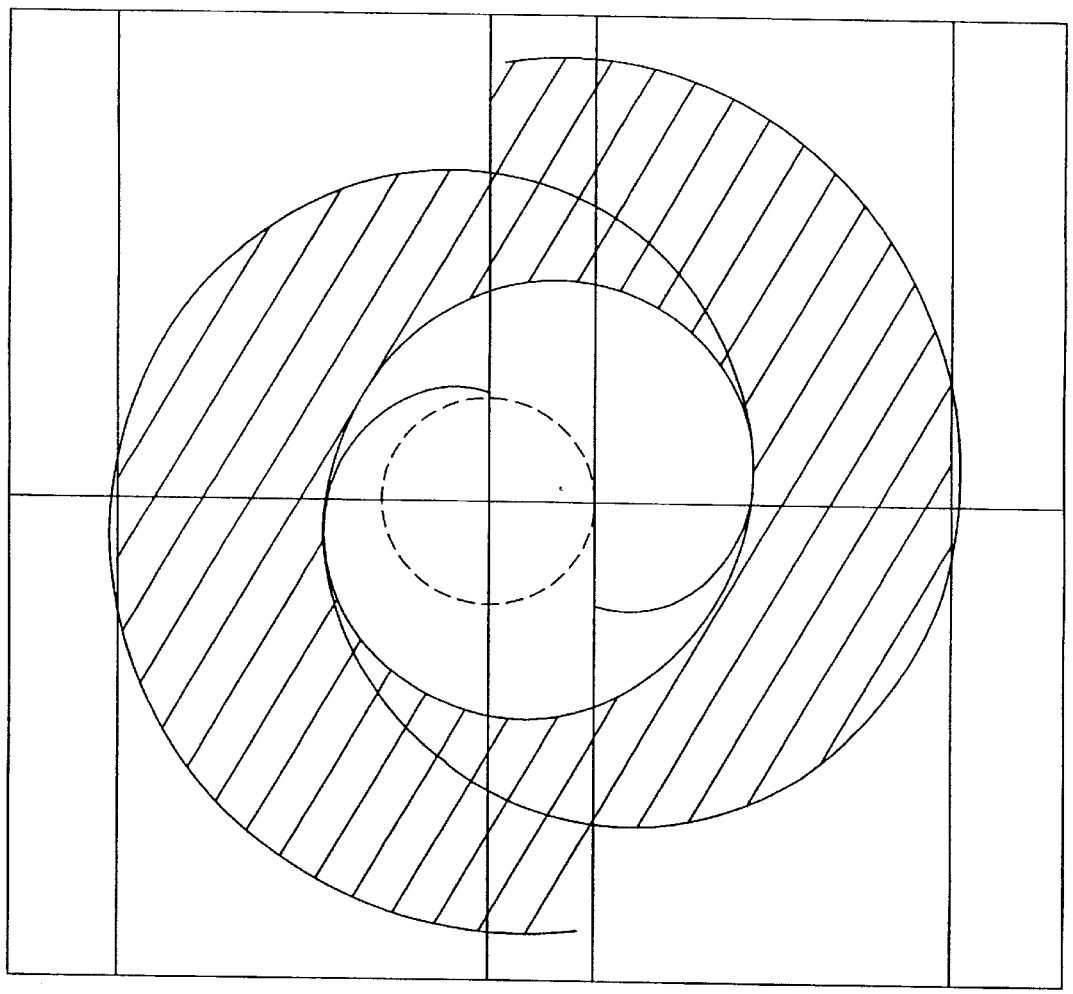
Figure 47G:
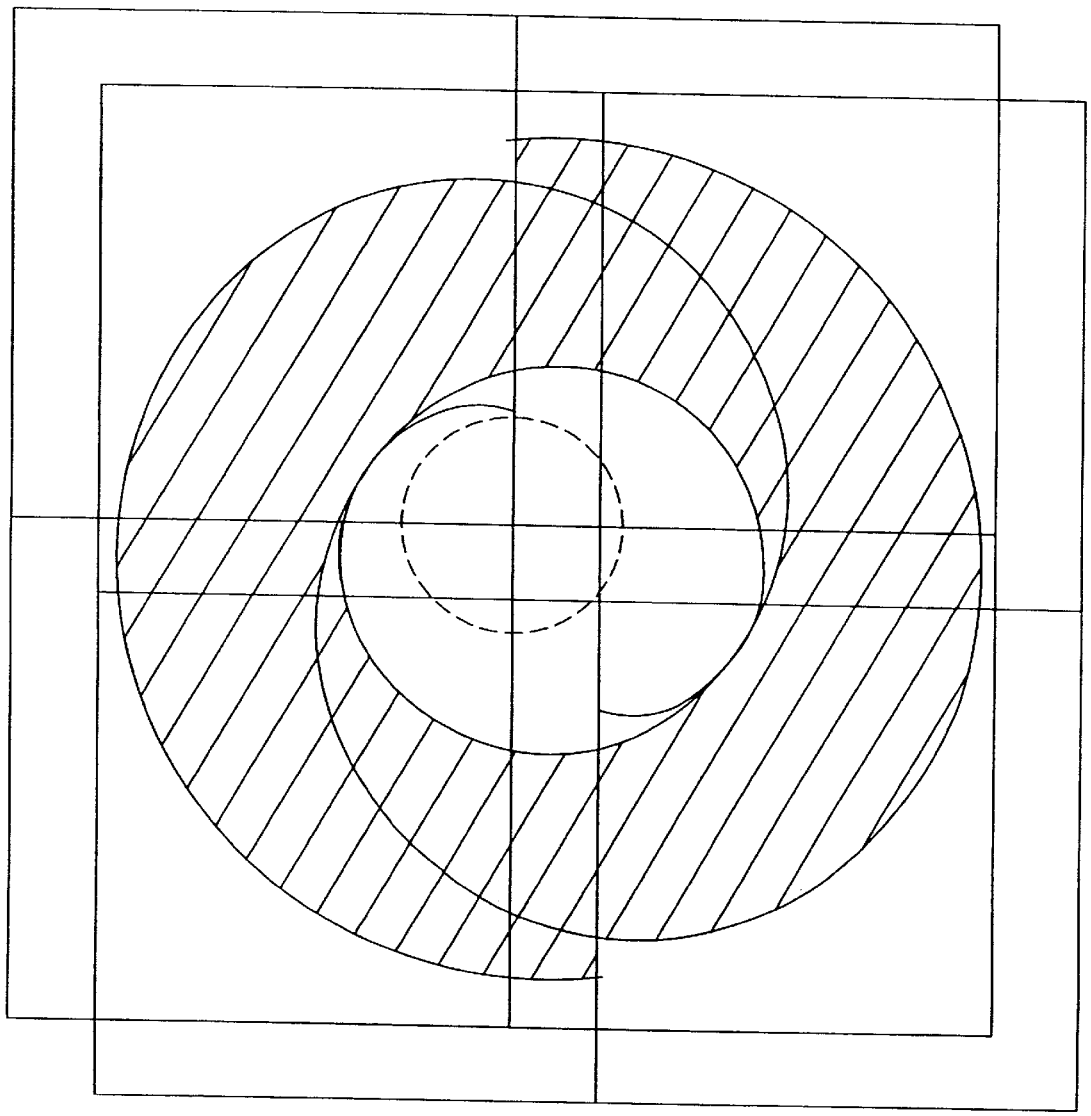
Figure 47H:
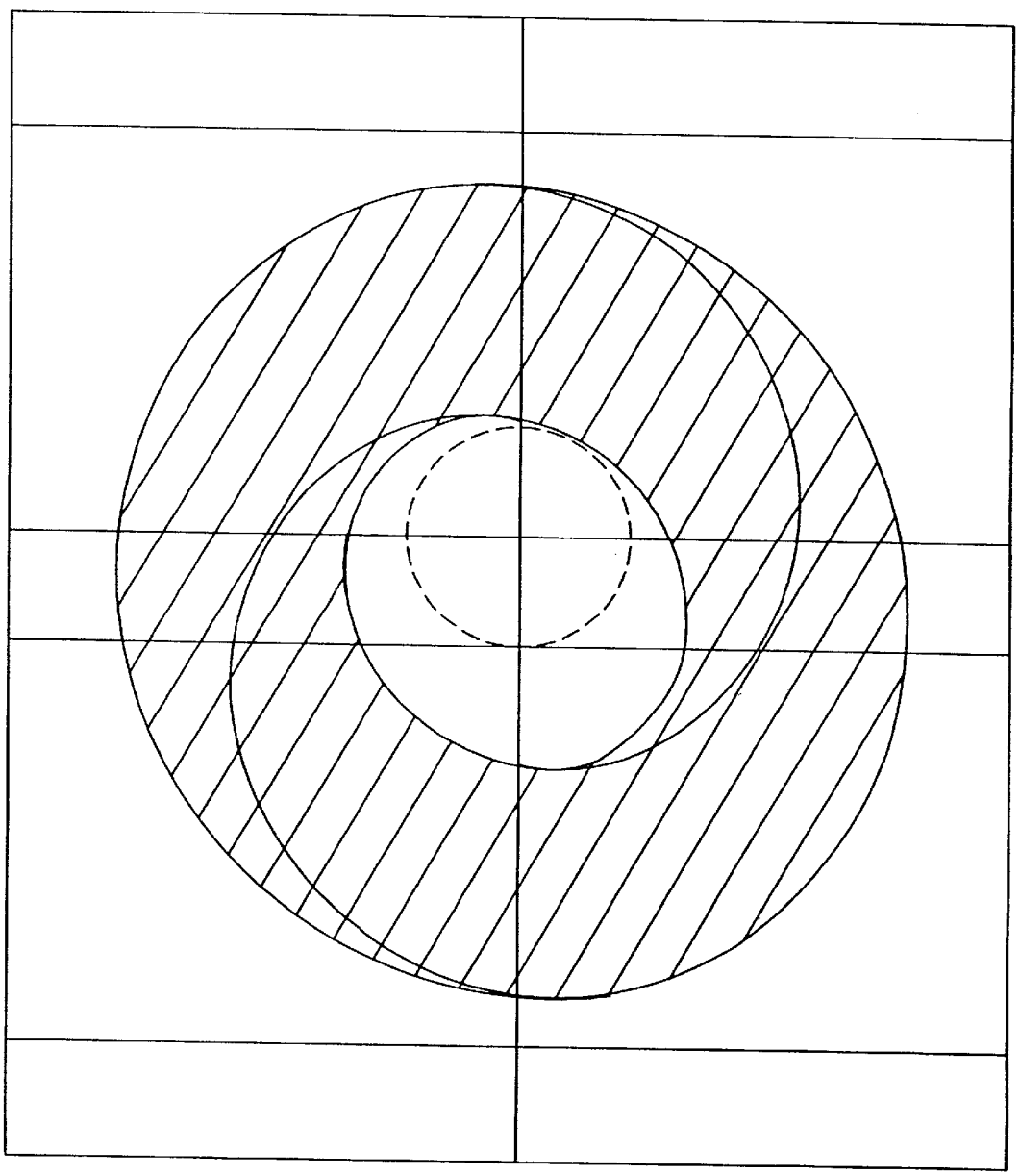
Figure 47I:
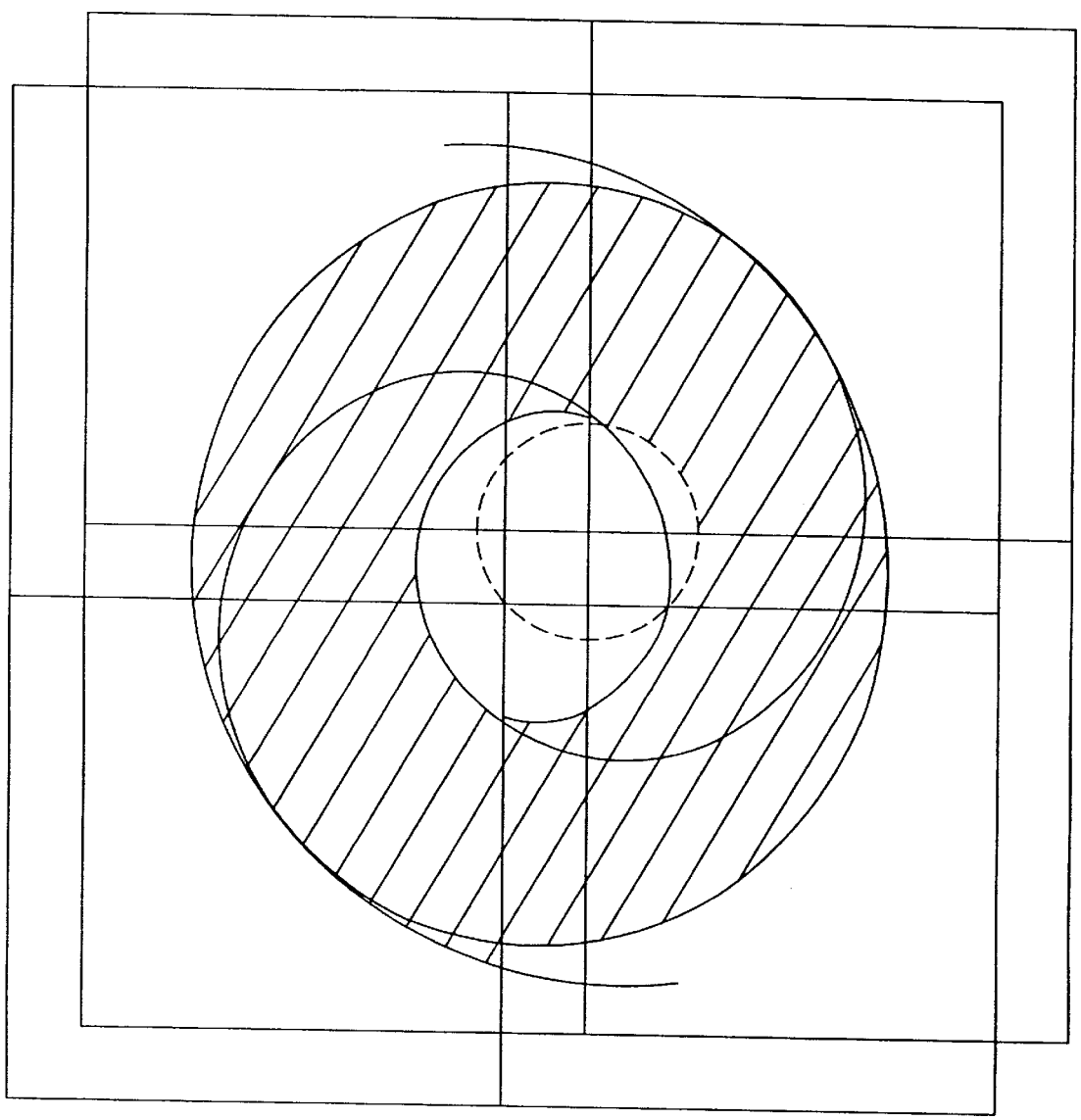
Figure 47J:
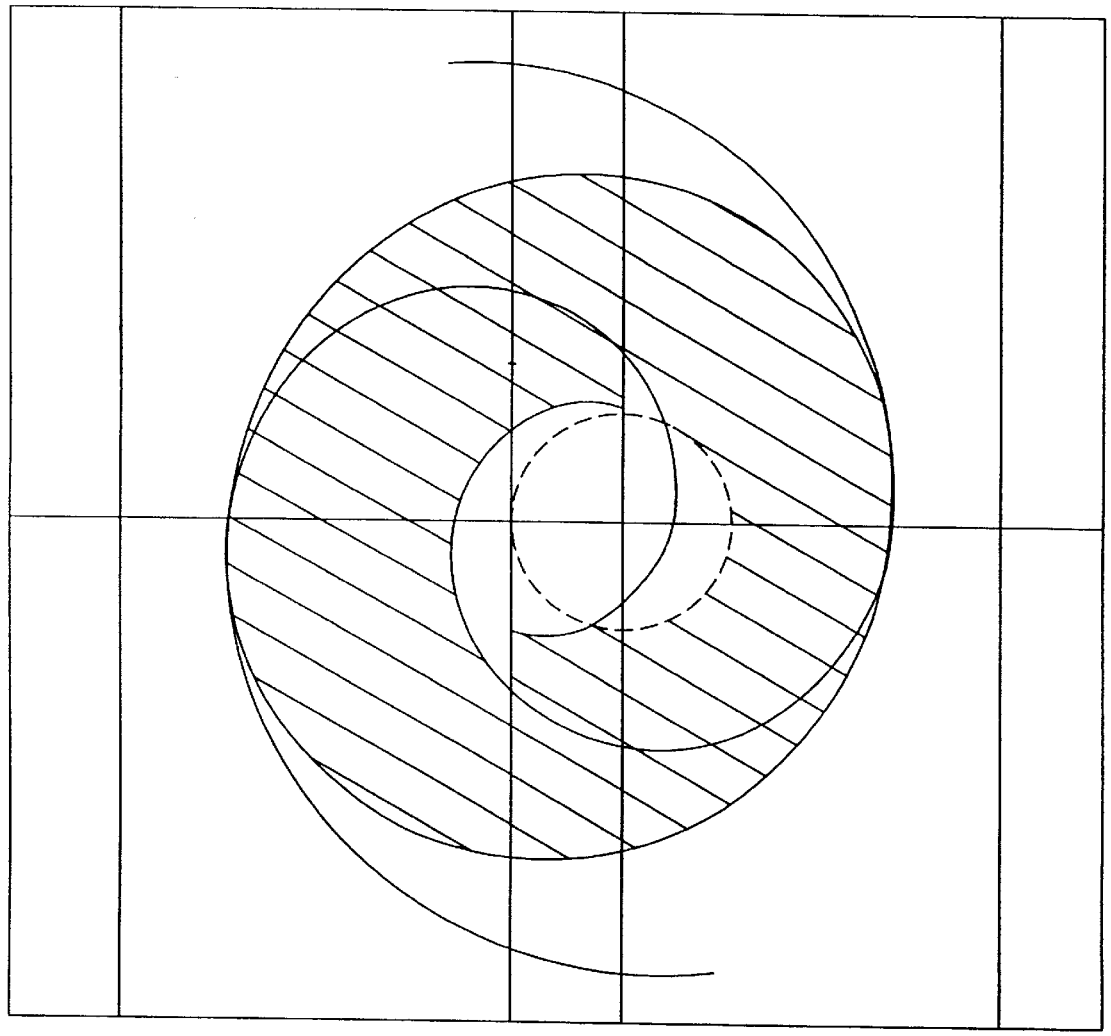
Figure 47K:
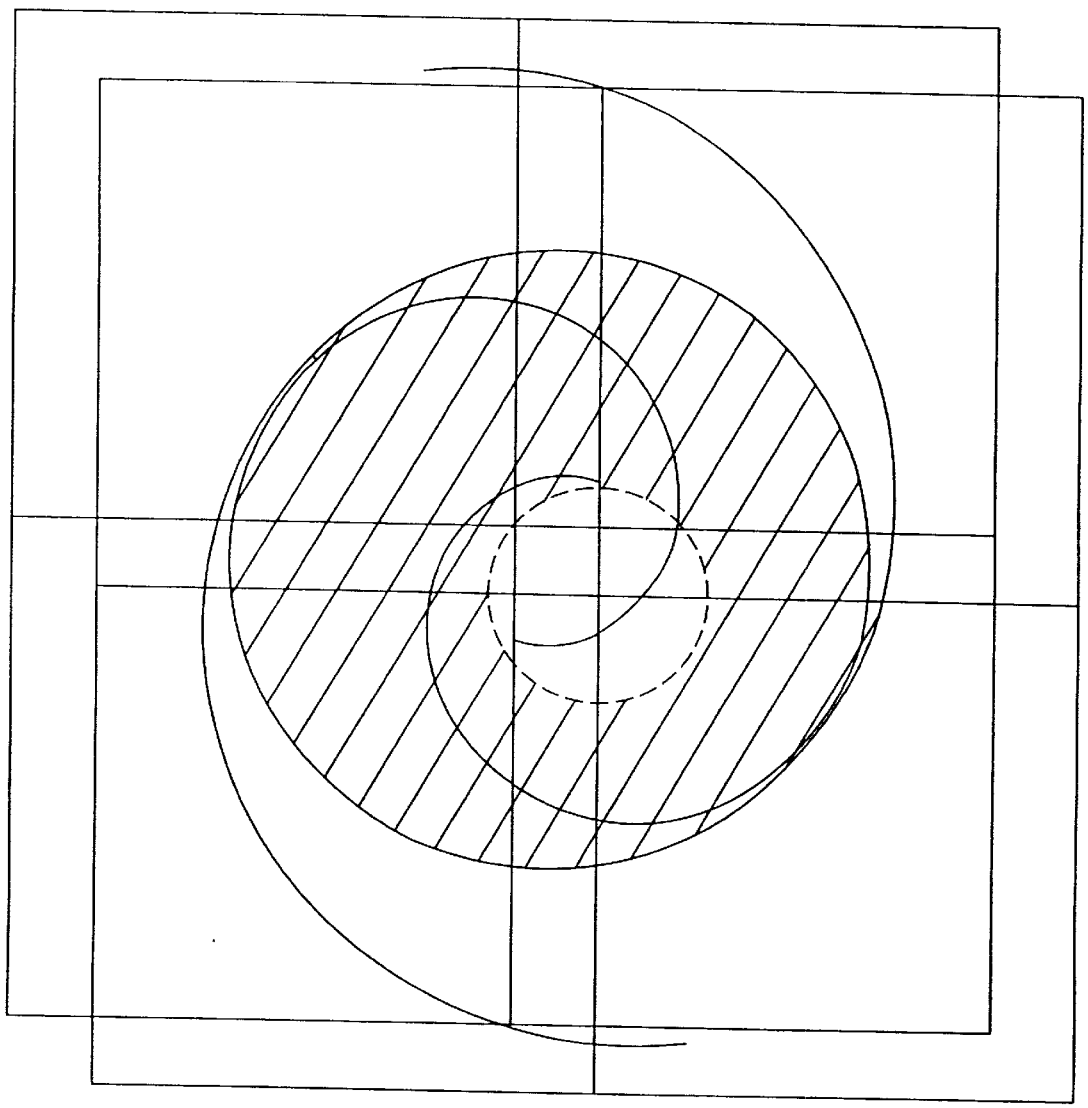
Figure 471:
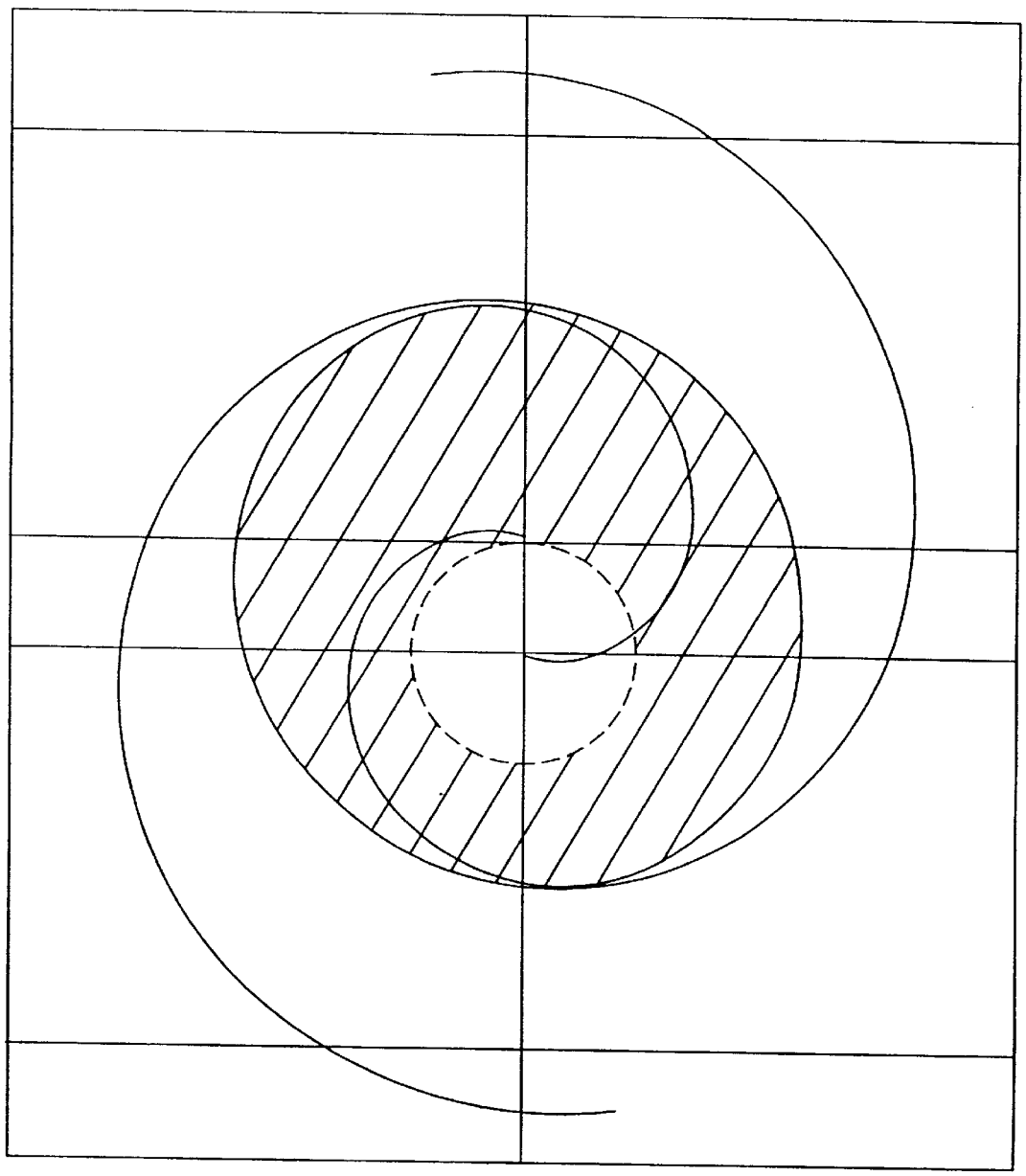
Figure 47M:
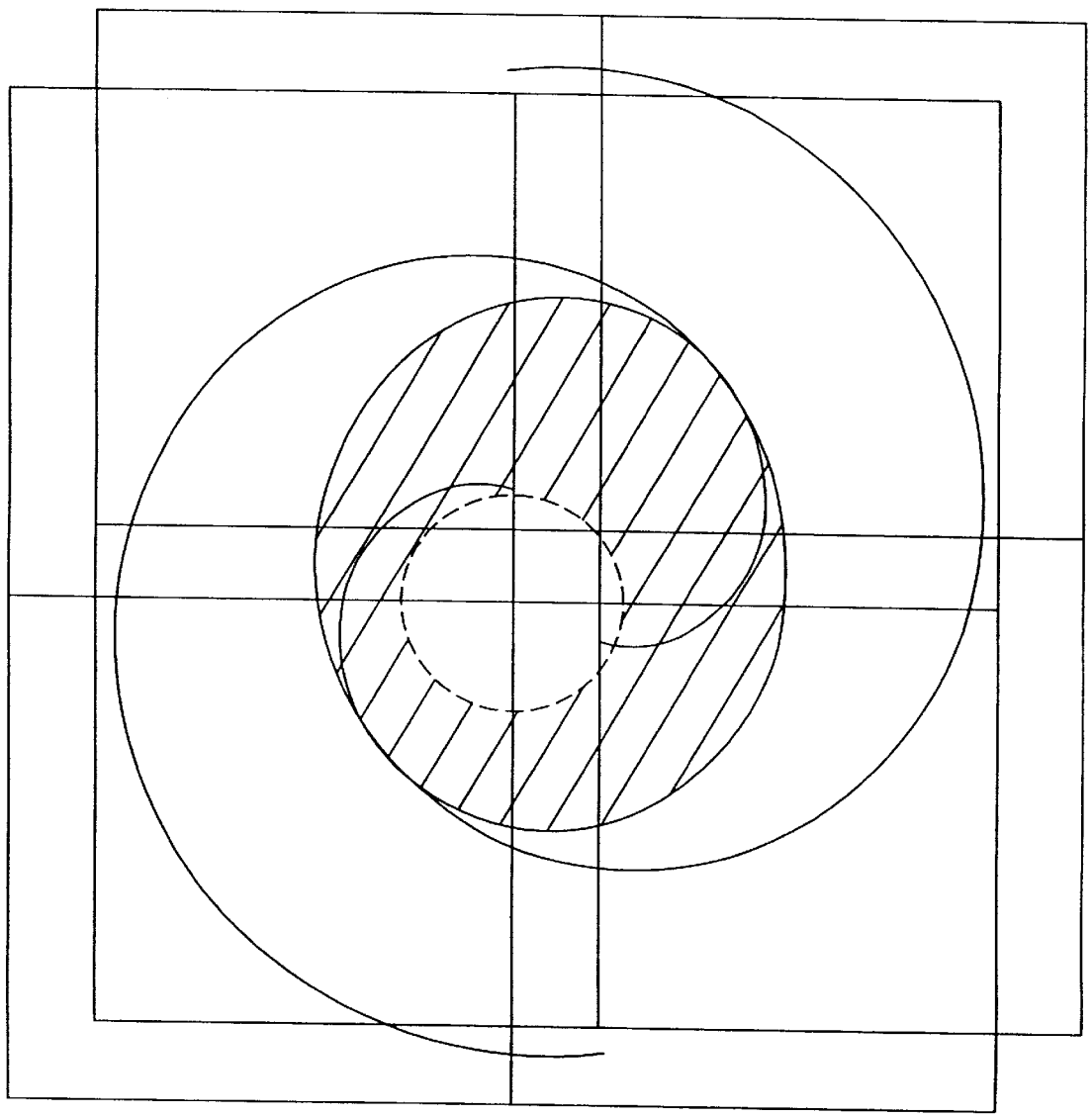
Figure 47N:
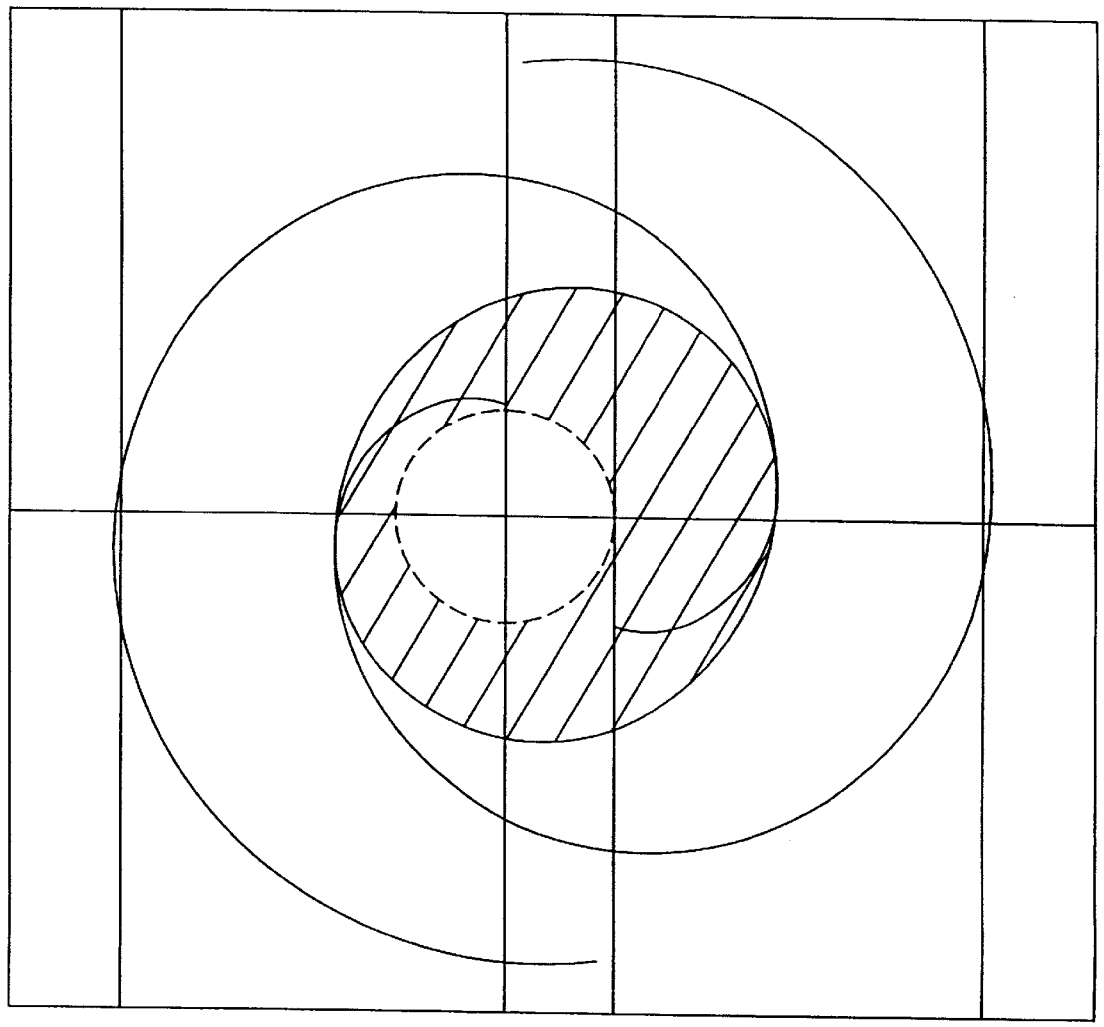
Figure 47O:
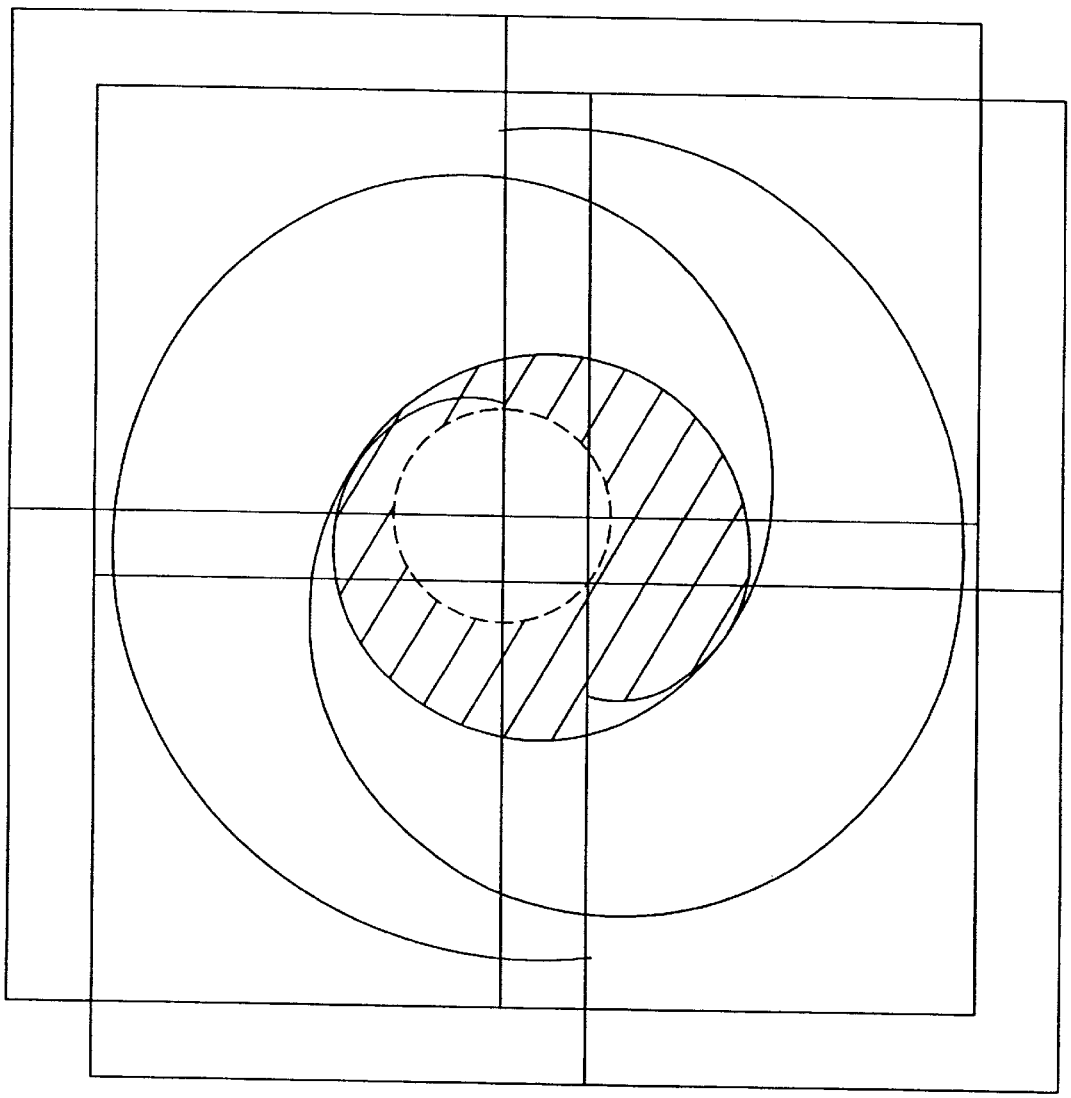
Figure 47P:
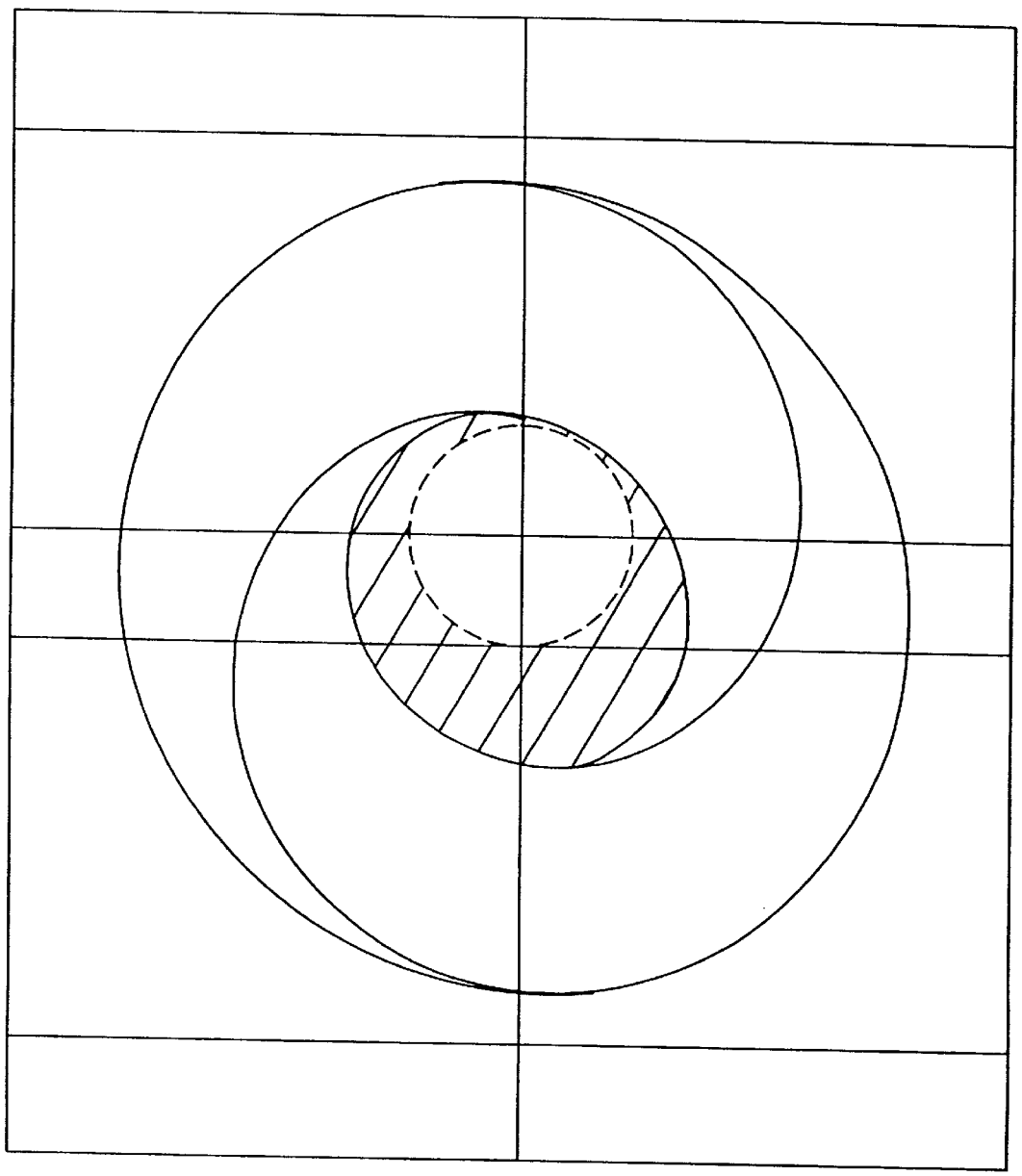

The center of the inner drum 7302 is not part of the encapsulated compression volume, so the penetration of the vane connecting rods 7370 through the wall of the inner drum 7302 should not permit flow of the compressed water vapor. A barrier is provided by a shroud 7390 as shown in FIG. 46. This shroud 7390 mounts on the inside of the swinging vane 7308 and moves in and out of the inner drum wall 7392 as dictated by the angle between the vane 7309 and the inner drum 7302.

Actuation of the swinging vane 7308 is simple and can be achieved without dry friction losses caused by contact between vane 130s and the outer drum 7301. Conventional sliding vane compressors are very small, making these frictional losses acceptable. The application of vapor compression for an air conditioning system requires very large flow rates and thus a compressor with large geometry, making dynamic contact between the vanes and the outer drum unacceptably inefficient. In the swinging vane compressor, a very thin gap 7380 can be maintained between the vane tips and the outer drum by a simple connecting rod as described above, thus eliminating contact frictional losses. Further, no check valves are required which greatly simplifies the design.

Still another embodiment of the present invention is directed to cooling systems having two concentric chambers. The outer chamber contains an ambient air contactor. The inner chamber is subdivided into a compression and condenser chamber with the compressor in between. In one embodiment, the condenser chamber is disposed on the top and the evaporator chamber is on the bottom. The present invention is also directed to positive displacement, low-friction compressors useful in such coolers. These include scroll compressors and rotary compressors such as gerotor compressors. One such scroll compressor is depicted in FIGS. 47–48. This embodiment is incorporated into a cooler that can process the very large volumetric flow rate of water vapor and in addition, novel means are provided to remove noncondensibles from the system. In addition, the scroll compressor of the embodiment described herein requires no valves which greatly simplifies the design.

Scroll compressor 8000 is depicted in FIGS. 47–48. FIGS. 47*a–p* show a sequence of images indicating changes in the volume of gas as mobile scroll 8004 orbits around stationary scroll 8003. During the first few stages, gas is taken in at a low pressure. Once it is sealed off, the volume reduces and the pressure rises. The high-pressure gas is released through a hole 8011 in the stationary scroll 8003.

FIG. 48 depicts a schematic cross section of scroll compressor 8000 integrated into vapor-compression evaporative cooler 8800. Cooler 8800 uses scroll compressor 8000 to pressurize water vapor. Electric motor 8001 drives scroll compressor 8000 through flexible coupling 8002. The scroll compressor 8000 has two stages connected in series: first stage 8000*a* and second stage 8000*b*. As depicted in FIG. 48, the stationary scroll 8003 of the second stage compressor 8000*b* has a drive shaft 8007 located on the center axis with crank 8009 which drives mobile scroll 8004 in an orbital motion. Webbing 8010 provides stiffness to the stationary scroll 8003. There is a sloppy fit between the crank 8009 and the mobile scroll 8004. Precision positioning of the mobile scroll 8004 relative to the stationary scroll 8003 is obtained through rotors 8008. Although FIG. 48 shows two rotors 8008 per scroll, preferably three would be employed. The three rotors 8008 confine the mobile scroll 8004 to an orbiting motion. The rotors can be counterbalanced such that there is no vibration in the orbiting scrolls.

Referring again to FIG. 48, first-stage compressor 8000*a* has a stationary scroll 8005 and a mobile scroll 8006 that orbit in a similar fashion to scrolls 80003 and 8004. First-stage compressor 8000*a* pulls a vacuum on water 8015 in fist-stage evaporator 8041 causing it to evaporate and cool. The compressed vapors exiting stage one are de-superheated in packing 8020 which has water dripping over it. The vapors entering the second-stage compressor 8000*b* from second-stage evaporator 8038 are compressed and enter condenser chamber 8025 where they condense onto packing 8030.

Using pump 8031, the chilled water 8015 is pumped to packing 8035 which is in countercurrent contact with house air, thus cooling the air. The warmed water 8036 is sucked through filter 8039 into the second-stage evaporator 8038 where some of it flashes thus cooling the water. The flow rate is regulated by float valve 8037. Float valve 8040 regulates the addition of water into the first-stage evaporator 8041 where some additional water flashes, thus cooling the water further. This chilled water 8015 is removed by pump 8031 and contacts house air, thus completing the cycle.

Water 8045 from condenser 8025 is removed by pump 8032 and directed to drip over cooling tower packing 8050 which has ambient air flowing countercurrently driven by fan 8054. As depicted in FIG. 48, the fan is preferably driven by magnetic coupling 8055. Alternatively, it may be driven by an independent electric motor. As the water flows through the packing 8050, it is cooled approaching the wet-bulb temperature of the ambient air. The cooled water 8051 is sucked through filter 8052 and is drawn into condenser 8025. The water flow rate is regulated by float valve 8053 which directs the incoming water to drip over packing 8030.

Because both chilled water 8015 and condenser water 8045 directly contact air, dissolved gases will be released in the vacuum of the evaporators 8038 and 8041 and condenser 8025. The noncondensible gases will accumulate in condenser 8025; therefore, a vacuum pump or aspirator is needed. Accordingly, novel vacuum pump 8060 is provided. Specifically, as depicted in FIG. 48, novel vacuum pump 8060 is driven by gear 8065 located on the main drive shaft 8007. Two reduction gears 8066 and 8067 slow the rotation rate substantially. Two cammed surfaces 8073*a* and 8073*b* are located on the slowest gear 8067. Roller 8070 rides on cam 8073*b* and drives piston 8071. Roller 8072 rides on cam 8073*a* and drives inlet valve 8075. Water 8051 is drawn into the cylinder of 8062 of vacuum pump 8060 through sprayer

Figure 80B:
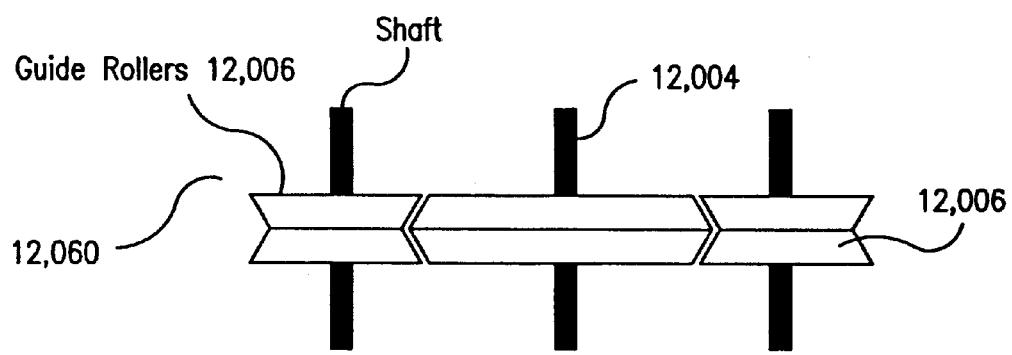

8077. As piston 8071 moves upward, it compresses the trapped vapors causing the water vapor to condense. The compressed noncondensible gas and excess water sprayed into the vacuum pump exit through vent 8080. To ensure better contact of water vapor with liquid water, packing 8078 may be placed in the head space of vacuum pump 8060. Pump 8060 operates flooded with liquid which cools the compressor and allows water vapor to condense. Also, the water seals and lubricates the piston. Further, the water can fill dead volume allowing this pump to have an exceptional compression ratio of approximately 400:1. Although this embodiment depicts one form of vacuum pump, it is clear to one of skill in the art that one could substitute the vacuum pumps depicted in other embodiments disclosed herein, including, but not limited to, pumps 10060 (FIGS. 69–70), 12060 (FIGS. 80*a*–*b*), 12402 (FIG. 81), and 12403 (FIG. 82).

Because water evaporates in evaporators 8041 and 8038 and cooling tower packing 8050, make-up tap water 8012 and 8013 is added to the ambient air contactor (8012) and room air contactor (8013). To purge salts that would accumulate in the system, overflow weirs 8085 and 8086 are provided.

The use of multiple-stage compressors as depicted in FIG. 48 provides the following benefits:

multi-stage compression is more energy efficient than single-stage compression;

an individual compressor stage is smaller than if the entire compression were done in a single compressor; and the energy efficiency is not lowered as much by mismatches between the fixed compression ratio of the scroll compressor and the compression ratio required by the evaporating and condensing temperatures, which varies with the ambient temperature. By using two stages, poorly timed vapor discharge results in less extra work compared to a single-stage compressor.

One advantage of this embodiment is that it has no valves. Because the pressures are so low, it is not possible to use traditional check valves that are opened by a slight over pressure. Instead, actuated valves would be required which creates additional mechanisms and a control problem. The scroll compressor eliminates the complexities associated with compressor valves. Multiple staging reduces the energy penalties associated with compression ratio mismatches.

Figure 49:
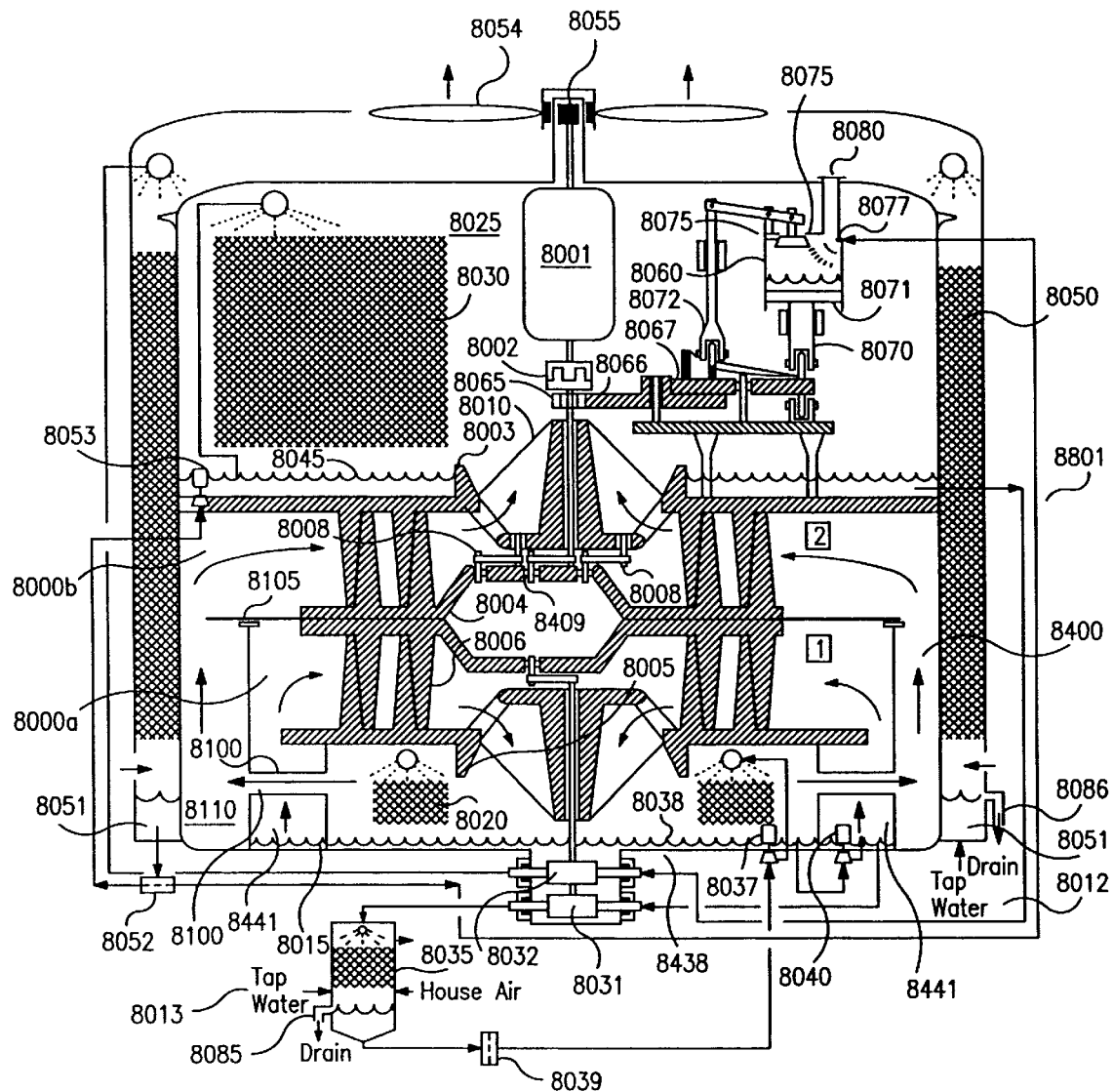
FIG. 49 Schematic cross sectional view of scroll compressor 8400 incorporated into cooler 8801.

Still another embodiment of a scroll compressor is depicted in FIG. 49 which shows a two-stage scroll compressor 8400 incorporated into cooler 8801 in which the two compressors are driven by the same crank 8409. The advantage of this arrangement is that fewer bearings are required.

Reference numerals in FIG. 49 correspond to like elements previously described components in FIG. 48, so a further description is omitted. In FIG. 49, most of the components are analogous to those in FIG. 48; however, they are ranged slightly differently. The first-stage evaporator 8441 is concentric with the second-stage evaporator 8438. Pipes 8100 emanate radially from the second-stage evaporator 8438 and connect to duct 8110 which directs the low-pressure vapors to the inlet of the second-stage compressor. Sliding seal 8105 separates the inlets of the two compressors.

Figure 50:
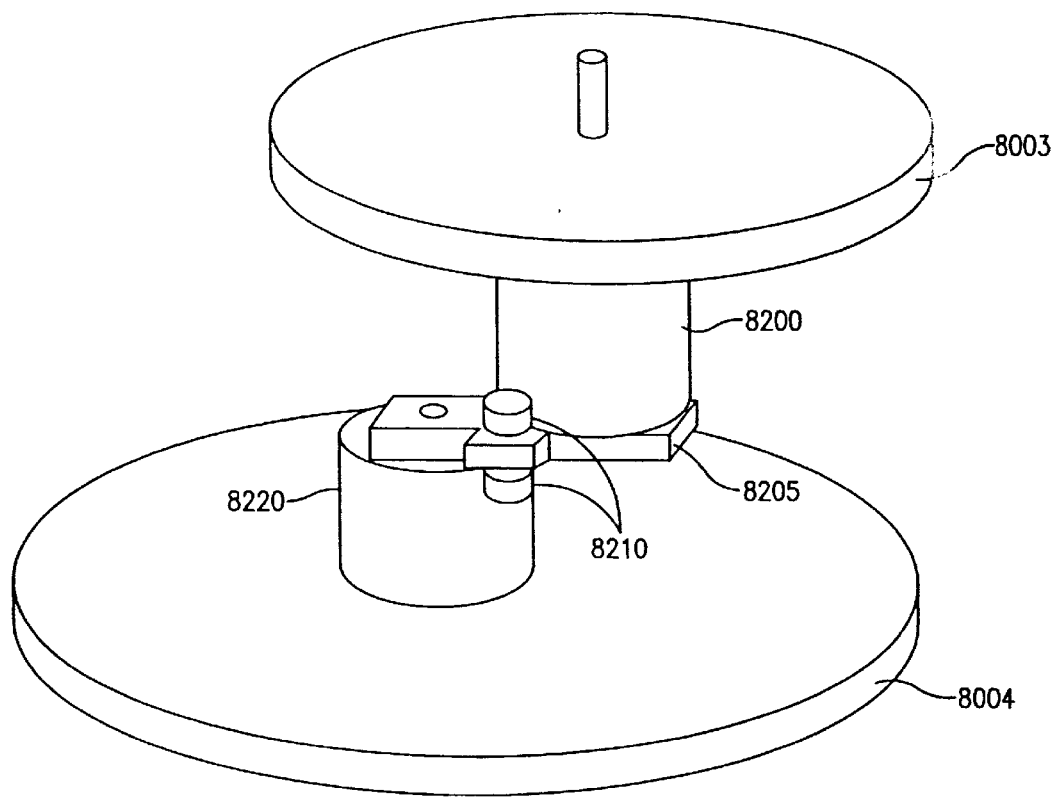
FIG. 50 Schematic perspective view of a gear arrangement for creating orbiting motion.
Figure 51:
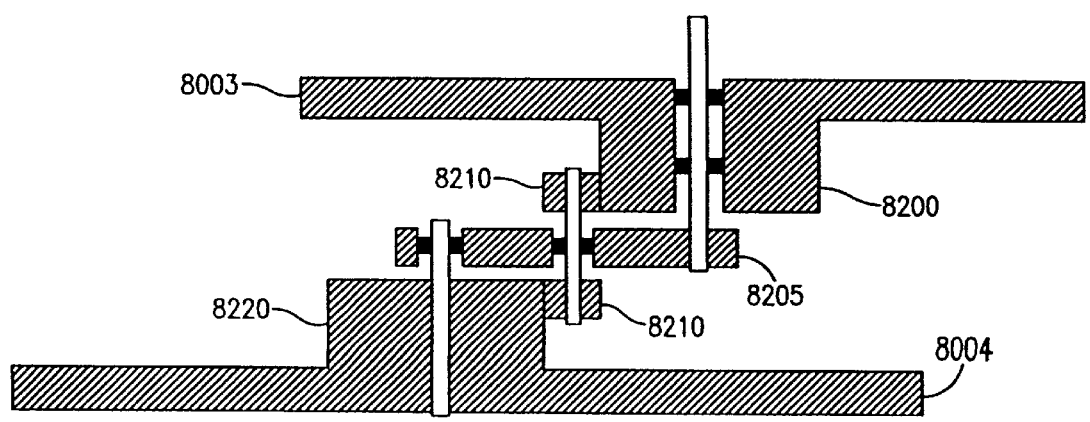
FIG. 51 Cutaway side view of the gear arrangement of FIG. 50.

FIGS. 50–51 show an alternate and novel means of moving the mobile scroll 8004 in an orbital motion. Stationary scroll 9003 has an attached gear 8200. (For illustration purposes, the flutes of all scrolls are removed to reveal the internal mechanism. Also, the gear teeth are removed to simplify the drawing.) Orbiting arm 8205 has an intermediary gear 8210 which drives gear 8220 which is attached to mobile scroll 8004.

Figure 52:
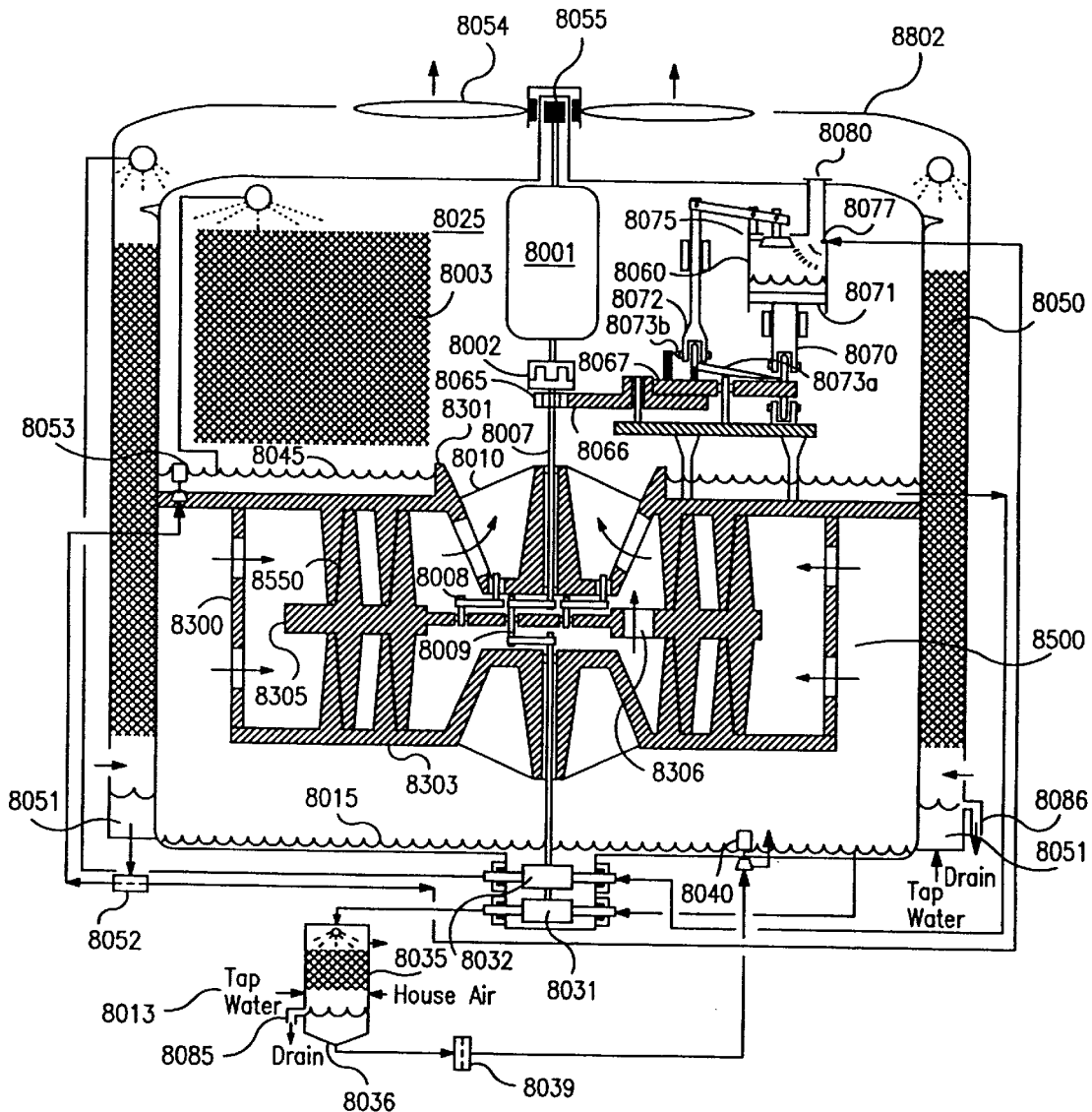
FIG. 52 Schematic cross sectional view of compressor 8500 incorporated into cooler 8802.
Figure 53E:
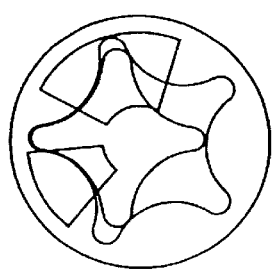
FIG. 53 (a–j) Schematic top views of gerotor compressor 9300 in different stages of its rotational cycle.
Figure 53D:
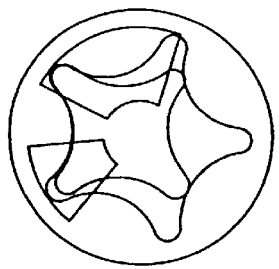
Figure 53C:
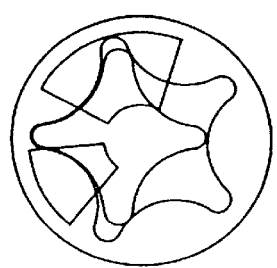
Figure 53B:
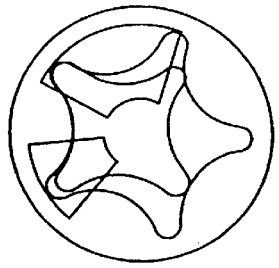
Figure 53A:
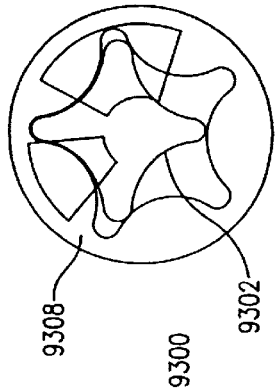
Figure 53J:
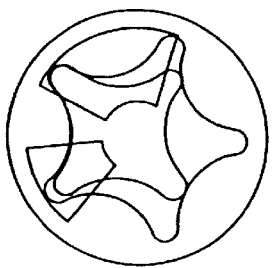
Figure 53I:
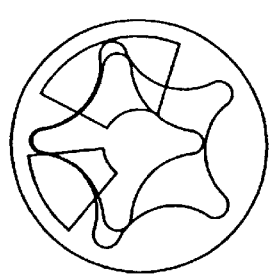
Figure 53H:
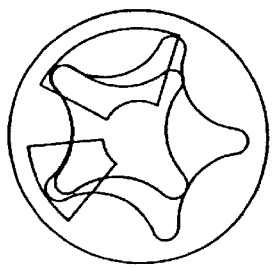
Figure 53G:
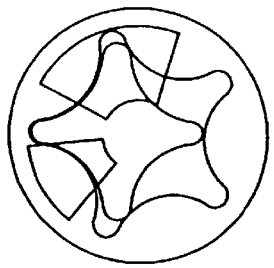
Figure 53F:
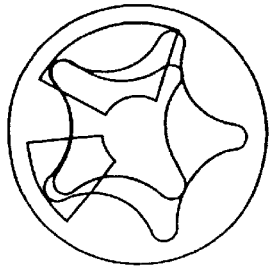
Figure 55:
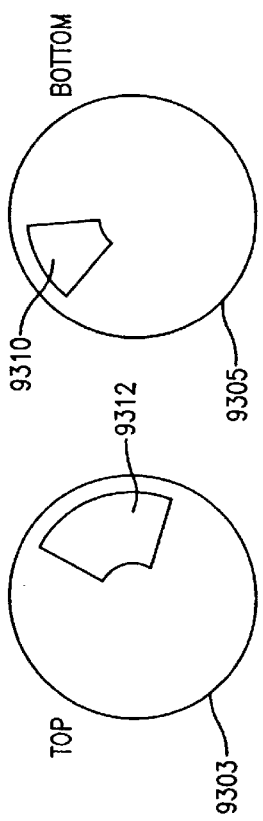
FIG. 55 Top view of bottom outlet end plate 9303 of compressor 9300.
Figure 54:
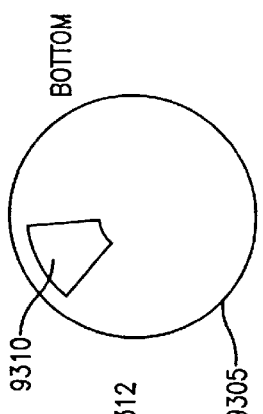
FIG. 54 Top view of top inlet end plate 9303 of compressor 9300.

FIG. 52 shows yet another embodiment of the present invention: a single-stage, back-to-back scroll compressor 8500 incorporated into cooler 9802. The advantage of this compressor is that the scroll diameter can be smaller to achieve the same flow. Because of the pressure difference, the stationary scrolls must support a load. To make them rigid requires reinforcing. Smaller diameters require less reinforcing because there is less load, and because there is less span. Another advantage of the back-to-back scrolls is that the flutes of each scroll can be rotated 180° with respect to each other so that the torque is more uniform across the entire rotation.

Reference numerals on FIG. 52 correspond to previously described components so that further description is omitted. First stationary scroll 8301 and second stationary scroll 8303 are joined by spacer 8300 which provides axial, radial and angular alignment. Mobile scroll 8305 has holes 8306 so that the compressed vapors in the lower chamber can escape. For simplicity, FIG. 52 shows only a single stage; however, multiple stages may be employed as well.

To reduce friction, all the scroll compressors 8000*a* and 8000*b* (FIG. 48), 8400 (FIG. 49), and 9500 (FIG. 52) have a gap of a few thousandths of an inch between the overlapping faces of the flutes. For instance, as depicted in FIG. 52, gaps 8550 separate the flutes. If desired, a fine mist of liquid water can be sprayed into the compressor inlet to wet the surfaces and provide sealing as well as cooling.

Additional embodiments of the invention are directed to novel low-friction gerotor compressors 9300, 9400 and 9500, as depicted in FIGS. 53–67, useful in vapor-compression evaporative coolers as well as other applications. Unlike conventional gerotors, in which one gerotor directly drives the other through the gerotor teeth, these low-friction gerotors have gaps between the gerotors, and incorporate novel means to support and drive the gerotors. These compressors can be incorporated into systems such as cooler 8800 depicted in FIG. 48, or in other embodiments such as cooler 10000 depicted in FIG. 71. These gerotor compressors require no valves which greatly simplifies their design. In addition, all motion is purely rotary which is simpler to achieve than the orbital motion required in scroll compressors. In addition, the relative motion of the two gerotors is very slow, thus minimizing any friction in the wetted interior of the components. Unlike scroll compressors, the compression ratio of the gerotor compressor, while operating, can be matched to the changing compression needs of the air conditioning system, thus eliminating energy waste associated with under compressing, or over compressing, the high-pressure vapors.

One embodiment of a novel gerotor compressor having actuation means is depicted in FIGS. 93–97. FIGS. 53*a*–*j* depict a sequence of images as the components of gerotor compressor 9300 rotate about their respective axes. The inner gerotor 9302 has one less tooth than the outer gerotor 9308 causing a void volume to appear between the two gerotors. The rightmost volume expands drawing low-pressure vapors into the gerotor and the leftmost volume contracts, thus expelling high-pressure vapors. Top inlet end plate 9303 and bottom outlet end plate 9305 of gerotor housing 9301 have inlet port 9312 and outlet port 9310, respectively, that allow low-pressure vapors to enter from the top and high-pressure vapors to exit from the bottom.

Figure 56:
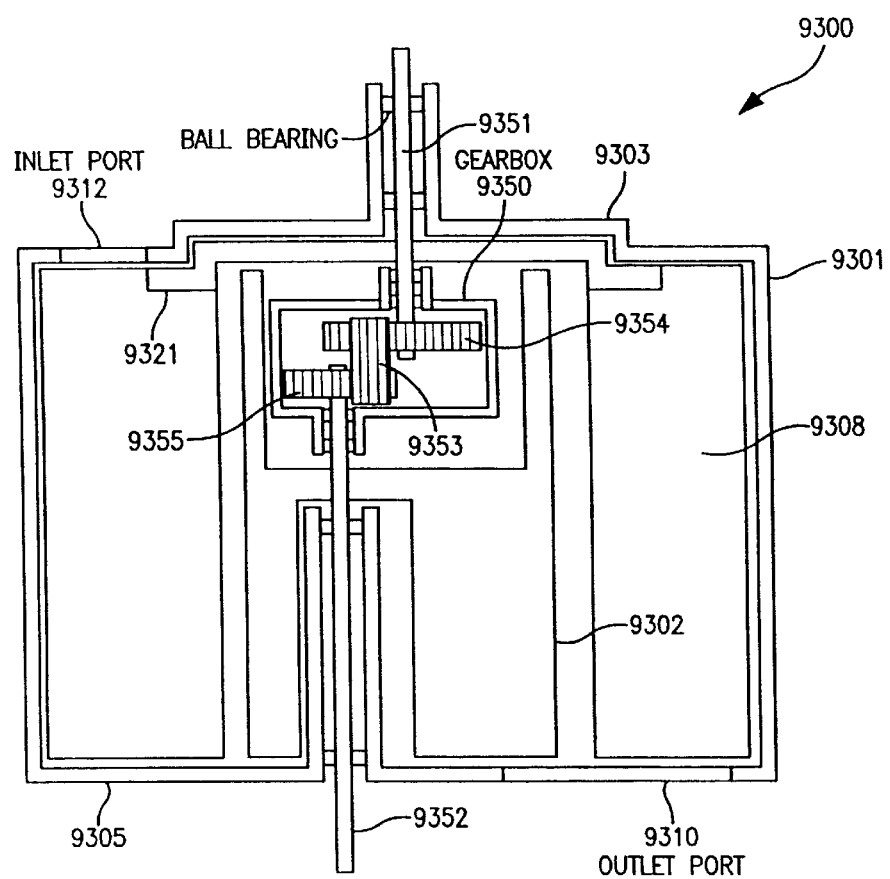
FIG. 56 Schematic cross sectional view of gerotor compressor 9300 (with gear box).

FIG. 56 shows a schematic cross section of gerotor compressor 9300. Because the gerotor compressor must be large to compress the large volumes of water vapor, friction losses and wear resulting from touching gerotor teeth will be unacceptable; therefore it is necessary to actuate the gerotors. The present embodiment uses novel means to actuate and support the gerotors. Specifically, as shown in FIG. 56, the actuation is provided by an internal gearbox 9350 that has the appropriate gear ratio (i.e., in FIGS. 53–57, a 5:4 gear ratio is used). The gearbox 9350 is suspended between two shafts, input shaft 9351 and output shaft 9352. Because the two shafts do not have a common center, the housing of gearbox 9350 will not rotate as the shafts rotate. The input shaft 9351 and output shaft 9352 of the gearbox 9350 rotate in the same direction because there are an odd number of spur gears; an idler gear 9353 connects the input gear 9354 and output gear 9355.

Figure 57:
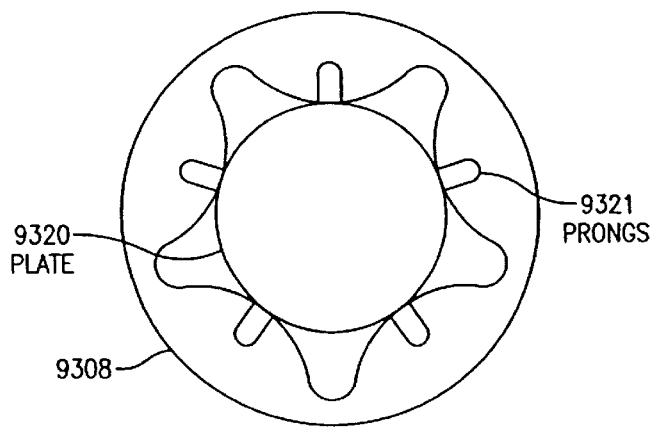
FIG. 57 Top view of outer gerotor 9308 and plate 9320.

As depicted in FIG. 57, the plate 9320 that couples the upper shaft 9391 to the outer gerotor 9308 preferably has five prongs 9321 that are recessed into the outer gerotor 9308. Because the prongs 9321 are recessed, this allows both gerotors to be flush with the upper plate 9303 of the housing 9301 which eliminates potential dead volume associated with the inlet port 9412.

As depicted in FIG. 56, the housing outlet port 9310 may have a fixed opening, thus fixing the compression ratio of the gerotor compressor. Alternatively, the outlet port 9310 may have a variable port mechanism. In a preferred embodiment, the discharge port has one of the variable port mechanisms depicted in FIGS. 58–60, which show three possible and novel variable port mechanisms.

Figure 58:
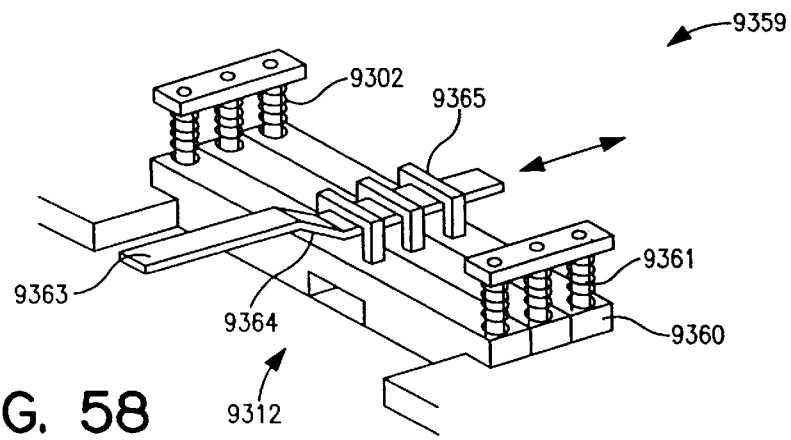
FIG. 58 Perspective view of variable port mechanism 9359.

FIG. 58 depicts a variable port mechanism 9359 which has plates 9360 guided by pins 9631. Springs 9632 force plates 9360 in the closed (downward) position. When actuator 9363 is slid to the right, ramp 9364 forces guides 9365 to lift plates 9630 one by one, thus giving outlet port 9312 a variable opening. Alternatively, rather than using actuator 9363 to open plates 9360, each plate 9360 could be opened individually by a solenoid, or a hydraulic or pneumatic actuator.

Figure 59:
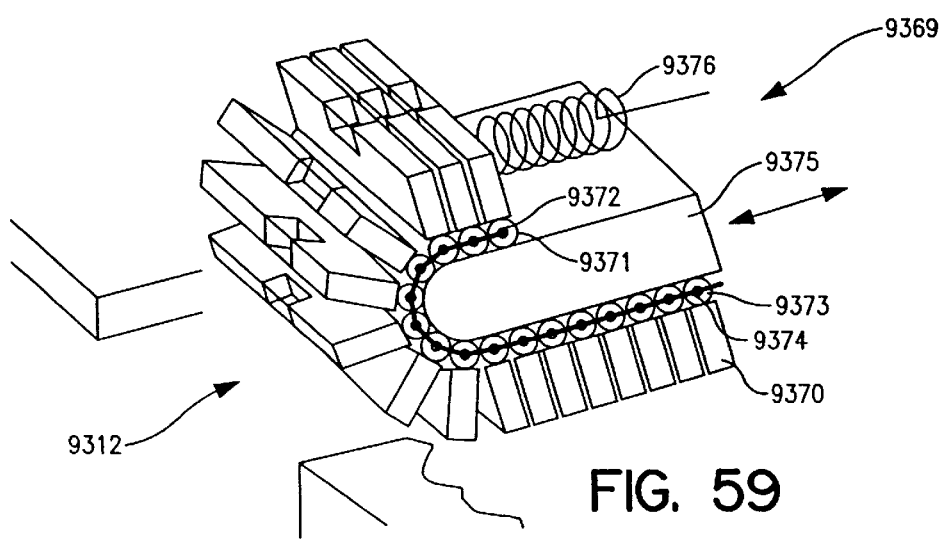
FIG. 59 Perspective view of variable port mechanism 9369.

FIG. 59 shows a variable port mechanism 9369 employing a plurality of rigid plates 9370 that have guide loops 9371 attached to the top. Each guide loop 9371 has a center pin 9372 and two links 9373 and 9774. This arrangement allows rigid plates 9730 to be connected together in a manner analogous to a bicycle chain. As slider 9375 moves leftward, it closes outlet port 9312 and when it moves rightward, it opens outlet port 9312. Spring 9376 stretches the linked plates 9370 tightly against slider 9375.

Figure 60:
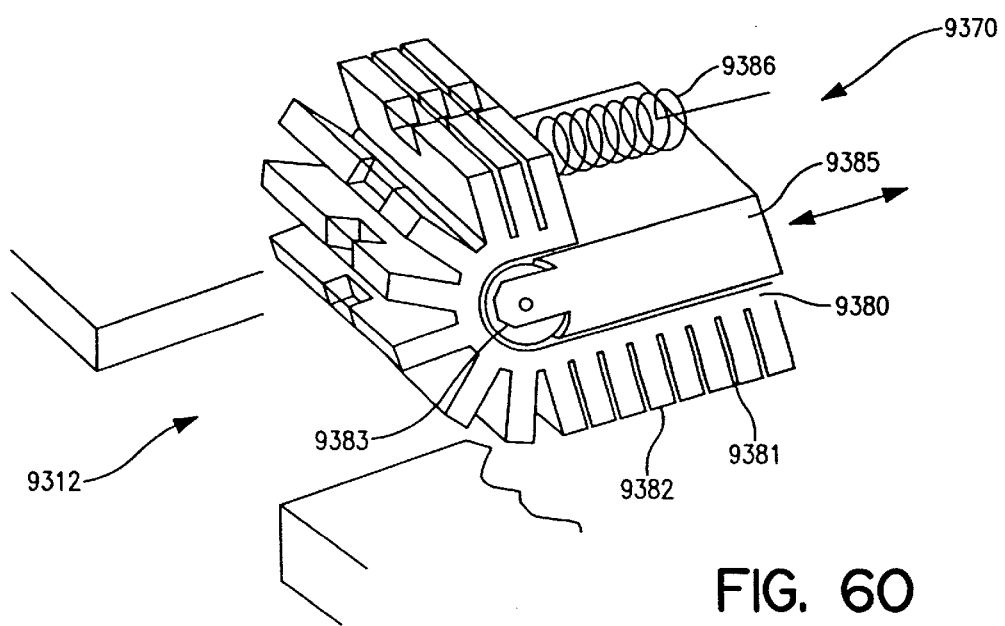
FIG. 60 Perspective view of variable port mechanism 9379.

FIG. 60 shows a variable port mechanism 9379 employing an elastomer pad 9380 that has a plurality of slits 9381 that divides the pad into plates 9382. As slider 9385 moves leftward, it closes outlet port 9312 and when it moves lightward, it opens outlet port 9312. Spring 9386 stretches the pad 9380 tightly against slider 9385. Roller 9383 reduces friction of pad 9380 against slider 9385. These mechanisms (9359, 9369 and 9379) can be flush with end plate 9305. Also, when incorporated into later disclosed embodiments such as compressor 10300 depicted in FIG. 68, which has actuating spur gears 10360 and 10361, grooves may be added to plates 9360, 9370 and 9382 to accommodate the actuating gears.

Figure 61:
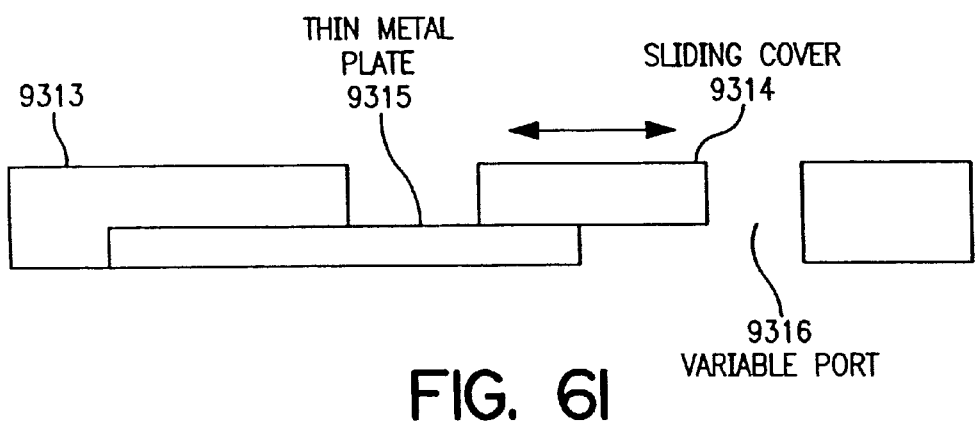
FIG. 61 Side view of another embodiment of a variable discharge mechanism.
Figure 62:
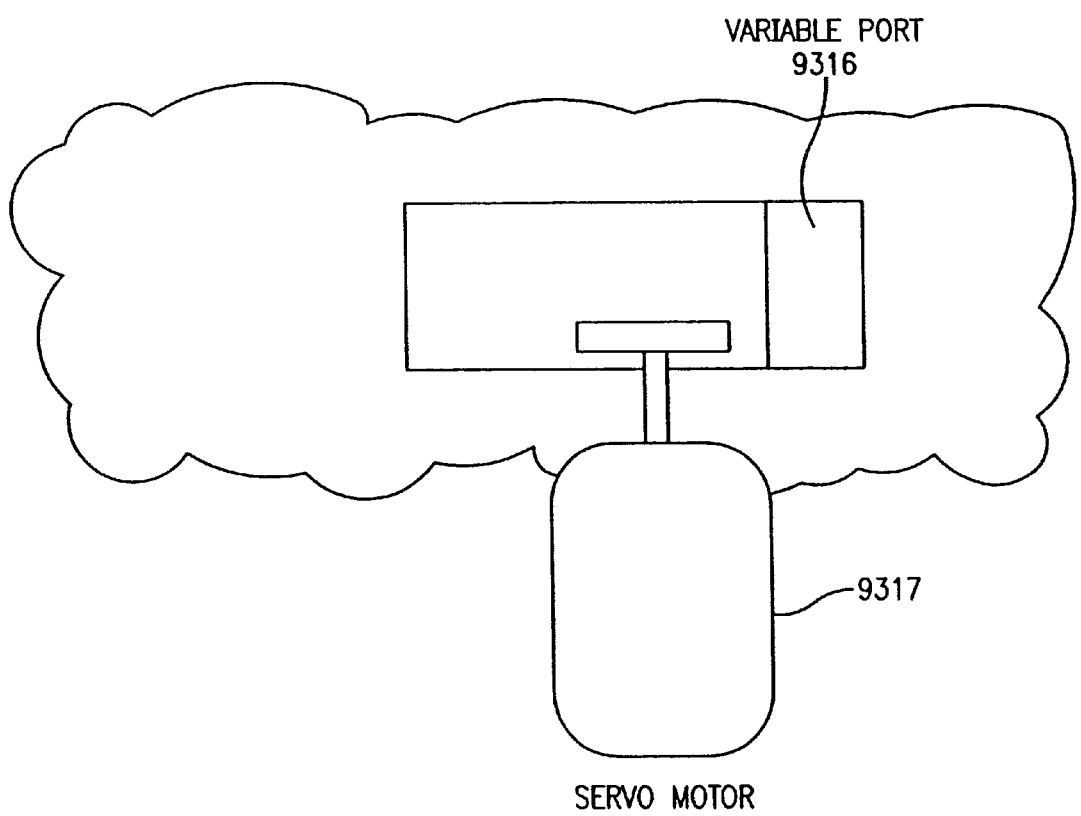
FIG. 62 Top view of the variable discharge mechanism of FIG. 61 being driven by a servo motor.

Alternatively, the outlet port 9310 may have a variable port mechanism such as sliding mechanism 9313 depicted in FIGS. 61–62, that changes the position of the leading edge of the discharge port, thus allowing the compression ratio to be controlled. Sliding mechanism 9313 has a sliding cover 9314, a thin metal plate 9315 and a variable port 9316. The sliding mechanism may be activated by servo motor 9317.

In still other embodiments, the variable port mechanism can be controlled by the other various mechanisms disclosed herein.

Gerotor compressor 9300 may be incorporated into many types of coolers, such as cooler 8800 depicted in FIG. 48, in place of scroll compressor 8000. In addition, this novel gerotor compressor could be used in a number of applications, such as an air compressor, a compressor of industrial gases, a compressor for an engine (e.g., Brayton cycle), or operated in reverse as an expander or air motor.

A primary advantage of gerotor compressor 9300 is that it has no valves. Because the pressures are so low, it is not possible to use traditional check valves that are opened by a slight over pressure. Instead, actuated valves would be required which requires additional mechanisms to instantaneously open and close the valve at the precise time in the compressor cycle, which presents a formidable control problem. Gerotor compressor 9300 eliminates the complexities associated with instantaneously actuated compressor valves. The variable port mechanisms shown in FIGS. 58–60 or sliding mechanism or valve 9313 shown in FIGS. 61–62 can be adjusted to change the compression ratio of the gerotor compressor, but this valve does not require instantaneous actuation; rather, it can be moved slowly (during a few seconds) to the desired location. The position of this valve may be controlled by thermocouples that determine the evaporator and condenser temperatures. This temperature information would be fed to a computer that determines the required compression ratio, and electrically actuates the sliding valve using a servo motor 9317, a stepper motor or other means known in the art.

Figure 63:
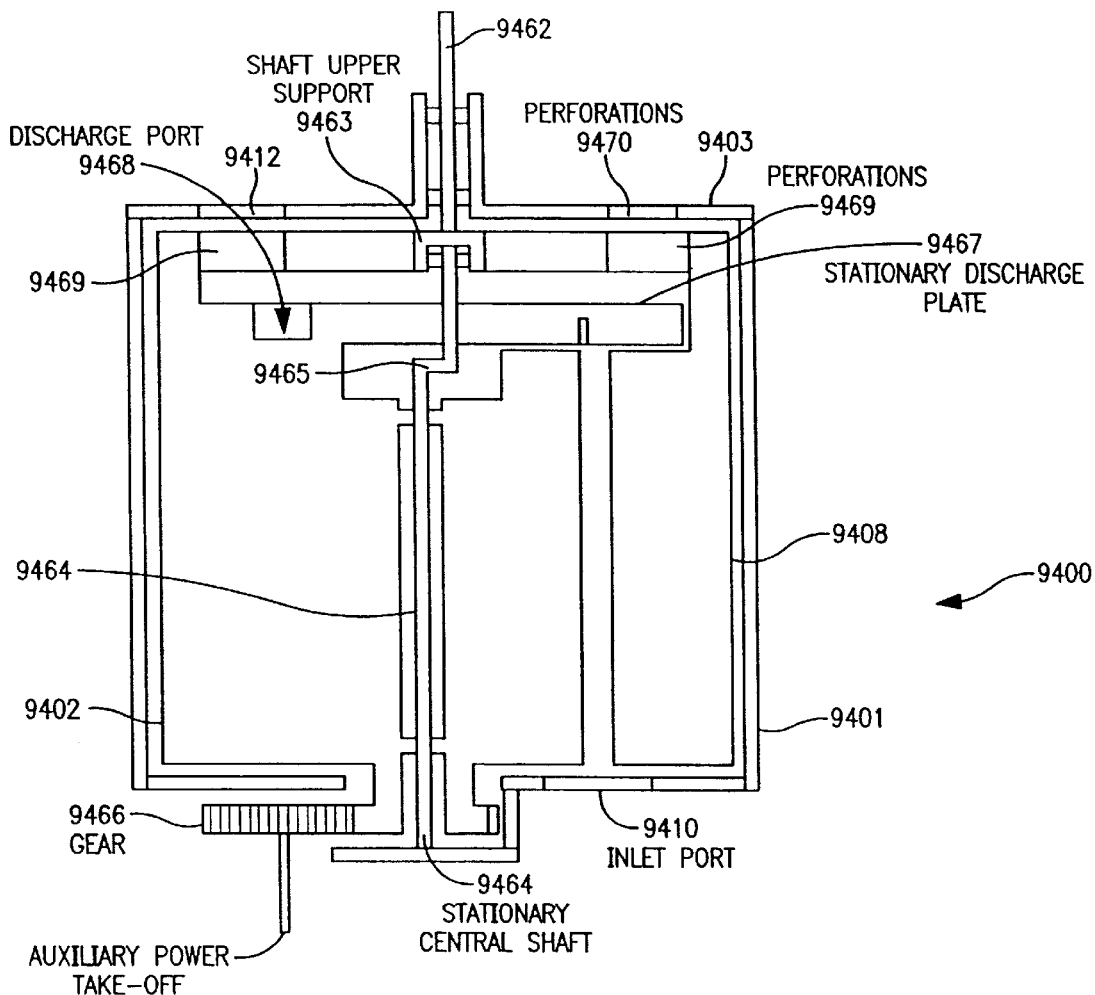
FIG. 63 Schematic cross sectional view of gerotor compressor 9400.
Figure 64:
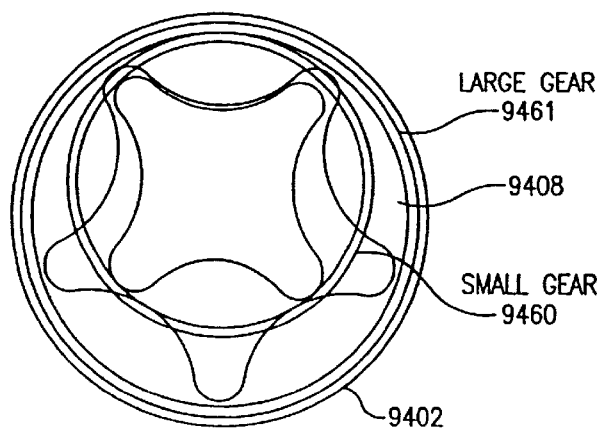
FIG. 64 Top view of gears 9461 and 9460 and gerotors 9402 and 9409.

FIGS. 63–64 depict gerotor 9400, which is an alternate embodiment of a novel actuated low-friction gerotor compressor. In this embodiment, the relative rotation of the two gerotors is produced by two spur gears, rather than contact of the gerotor teeth. The smaller gear 9460 has teeth on the outside diameter and the larger spur gear 9461 has teeth on the inner diameter. The gear ratio of these two spur gears is the same as the ratio of the number of teeth on the gerotor (in this case, 5:4). The gear set can be located at the top of the gerotors, as depicted in FIG. 63, or at the bottom. In addition to being useful in the cooling systems disclosed herein, novel gerotor 9400 can also be used in other applications, such as an air compressor, a compressor of industrial gases, a compressor for an engine (e.g., Brayton cycle), or operated in reverse as an expander or air motor.

As depicted in FIG. 63, the upper shaft 9462 rotates and drives the hub 9462 connected to the outer gerotor 9408. As the outer gerotor spins, the larger gear 9461 drives the smaller inner gear 9460 causing the inner gerotor 9402 to rotate. The inner gerotor spins about a fixed, nonrotating central shaft 9464. The central shaft has a crook 9465 that establishes the required offset off the axes of rotation for the two gerotors. If desired, a gear set 9466 can be attached to the bottom of the inner gerotor allowing power to be taken off for ancillary equipment, such as the pumps.

The top stationary discharge plate 9467 with the discharge port 9468 is located directly against the two gerotors. The discharged high-pressure vapors also must pass through perforations 9469 in the upper part of the outer gerotor and perforations 9412 in the upper plate 9403 of the housing. There is an inlet port 9410 in the bottom of the housing 9401.

Figure 65:
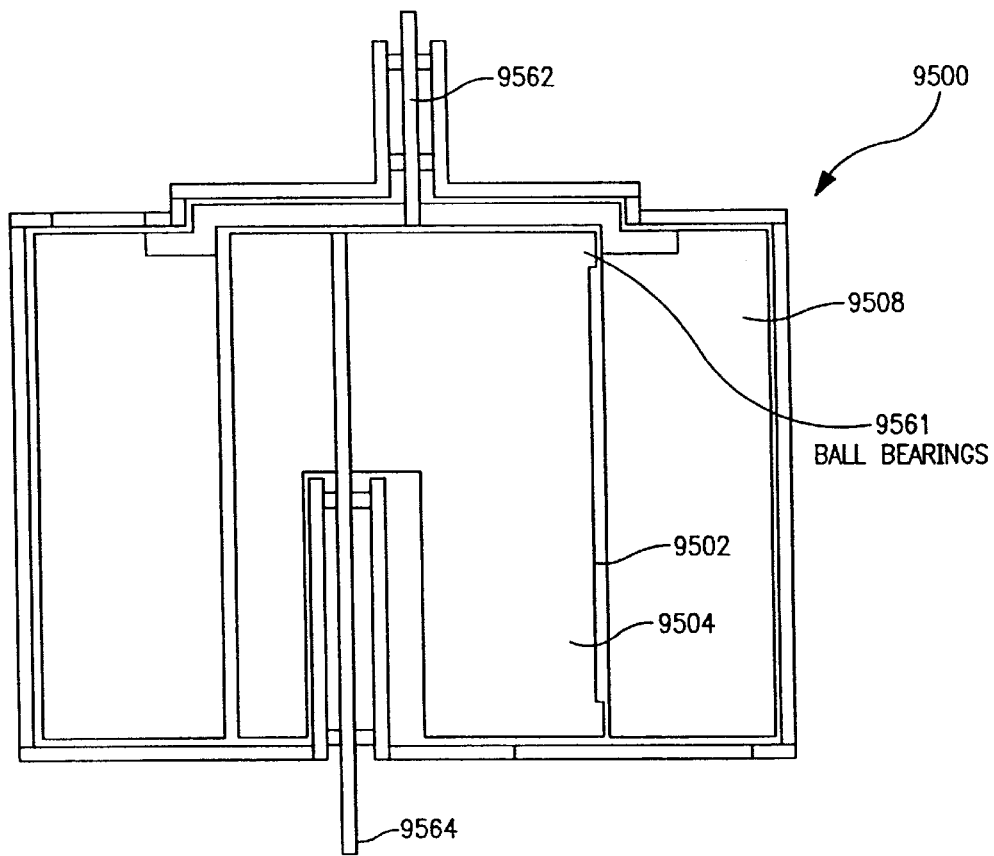
FIG. 65 Schematic cross sectional view of gerotor compressor 9500.
Figure 66:
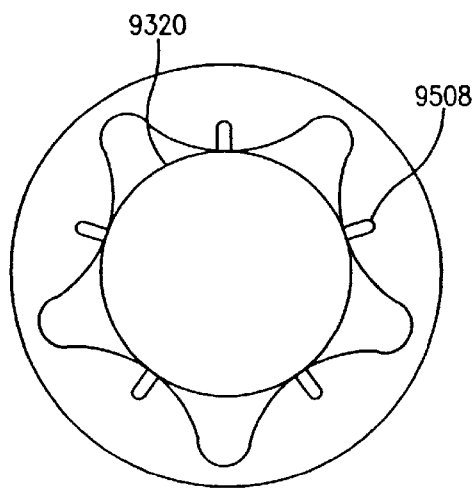
FIG. 66 Top view of outer gerotor 9508 and coupling plate 9320.
Figure 67:
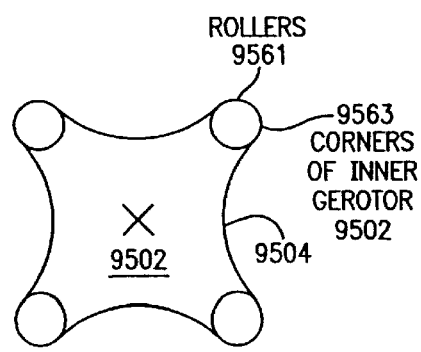
FIG. 67 Top view of inner gerotor 9502.

FIGS. 65–67 depict yet another low-friction embodiment, gerotor compressor 9500, in which the outer gerotor 9508 is driven by the upper shaft 9562. The inner gerotor 9502 has rollers 9561 at the corners 9563 that extend just slightly beyond the walls 9504 of the inner gerotor; thus, the rollers 9561 contact the outer gerotor 9508, but the walls 9504 of the inner gerotor 9502 do not. The clearance between the walls of the inner and outer gerotors is determined by the amount the rollers 9961 extend beyond the inner gerotor wall (perhaps 0.005 inches). The outer gerotor 9508 drives the inner gerotor 9502 through the roller contacts. The inner gerotor 9502 is mounted on a rotary shaft 9564 that extends out of the housing allowing auxiliaries (e.g., pumps) to be driven from the rotating shaft. Because the relative speed of the inner and outer gerotors is relatively small (for example 300 rpm), the roller rotation speed is not excessive (for example 2000–3000 rpm).

As noted, the present invention is directed to cooling systems having two concentric chambers. The ambient air contactor is disposed in the outer chamber. The inner chamber is divided into two chambers, containing the condenser and the evaporator with the compressor in between. In a preferred embodiment of this cooler, the condenser is on the bottom and the evaporator is on the top. This embodiment preferably utilizes low-friction gerotor compressor 10300 and vacuum pump 10060 incorporated into vapor-compression evaporative cooler 10000 as depicted in FIGS. 68–71. Compared to previously described coolers, the cooler described in this embodiment allows for water spray to drain from the compressor by locating the evaportor above the condenser. Water is sprayed into the compressor inlet to remove superheat during compression and provide sealing.

In addition, the novel vacuum pump 10060 disclosed herein can operate at a higher frequency because liquid water is not oscillating. The higher frequency allows for a more compact size, and also reduces forces in the drive train.

Figure 68:
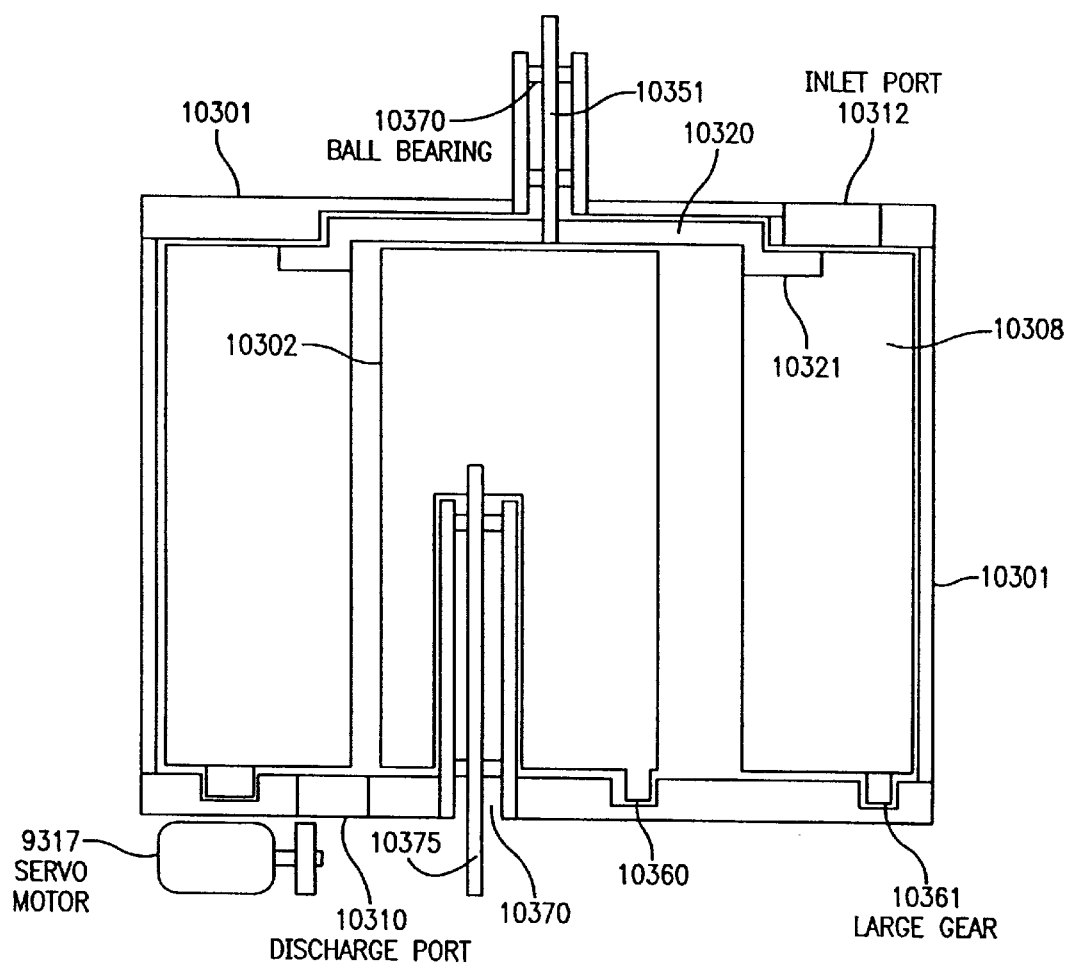
FIG. 68 Schematic cross sectional view of gerotor compressor 10300.
Figure 71:
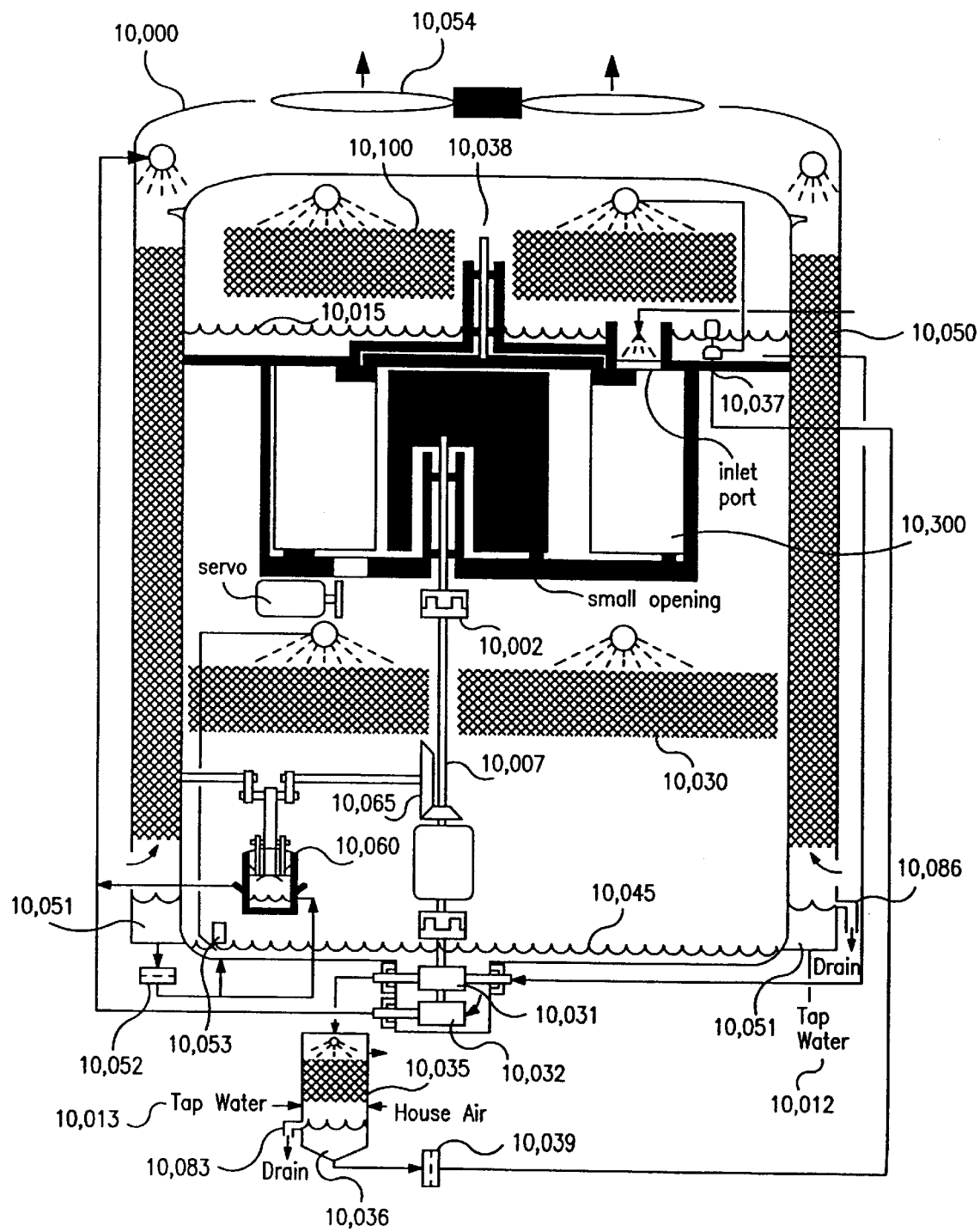
FIG. 71 Schematic cross sectional view of gerotor compressor 10300 incorporated into cooler 10000.

FIG. 68 depicts gerotor compressor 10300, and FIG. 71 shows a schematic cross section of gerotor compressor 10300 incorporated into cooler 10000. Because the gerotor compressor must be large to compress the large volumes of water vapor, friction losses and wear resulting from touching gerotor teeth will be unacceptable; therefore it is necessary to actuate the gerotors. Gerotor compressor 10300 is actuated in a novel fashion, similar to the embodiment depicted in FIG. 63–64, using a large gear 10361 with internal teeth and with a small gear 10360 with external teeth except that the gears are located on the bottom of the compressor.

Like the gerotor compressor depicted in FIGS. 56–57, the plate 10320 that couples the upper shaft 10351 to the outer gerotor 10308 has five prongs 10321 that are recessed into the outer gerotor 10308. Because the prongs 10321 are recessed, this allows inner gerotor 10302 to be flush with plate 10320 and outer gerotor 10308 to be flush with housing 10301 which eliminates potential dead volume. Ball bearings 10370 allow shafts 10351 and 10375 to rotate within the housing 10301.

The discharge port 10310 located at the bottom of the housing may have a fixed opening, thus fixing the compression ratio of the gerotor compressor. Alternatively, the discharge port 10310 may have a variable port mechanism that changes the position of the leading edge of the discharge port, thus allowing the compression ratio to be controlled. The variable port mechanism may be in any of the forms disclosed herein, such as the ones depicted in FIGS. 58–62, or the port may be controlled using any other means known to one skilled in the art. In FIG. 68, servo motor 9317 is shown to indicate the possible use of the variable port mechanisms previously described. Although gerotor compressor 10300 has been described in connection with the cooling systems disclosed herein, it may be used in other applications, such as an air compressor, a compressor of industrial gases, a compressor for an engine (e.g., Brayton cycle), or operated in reverse as an expander or air motor.

Figure 69:
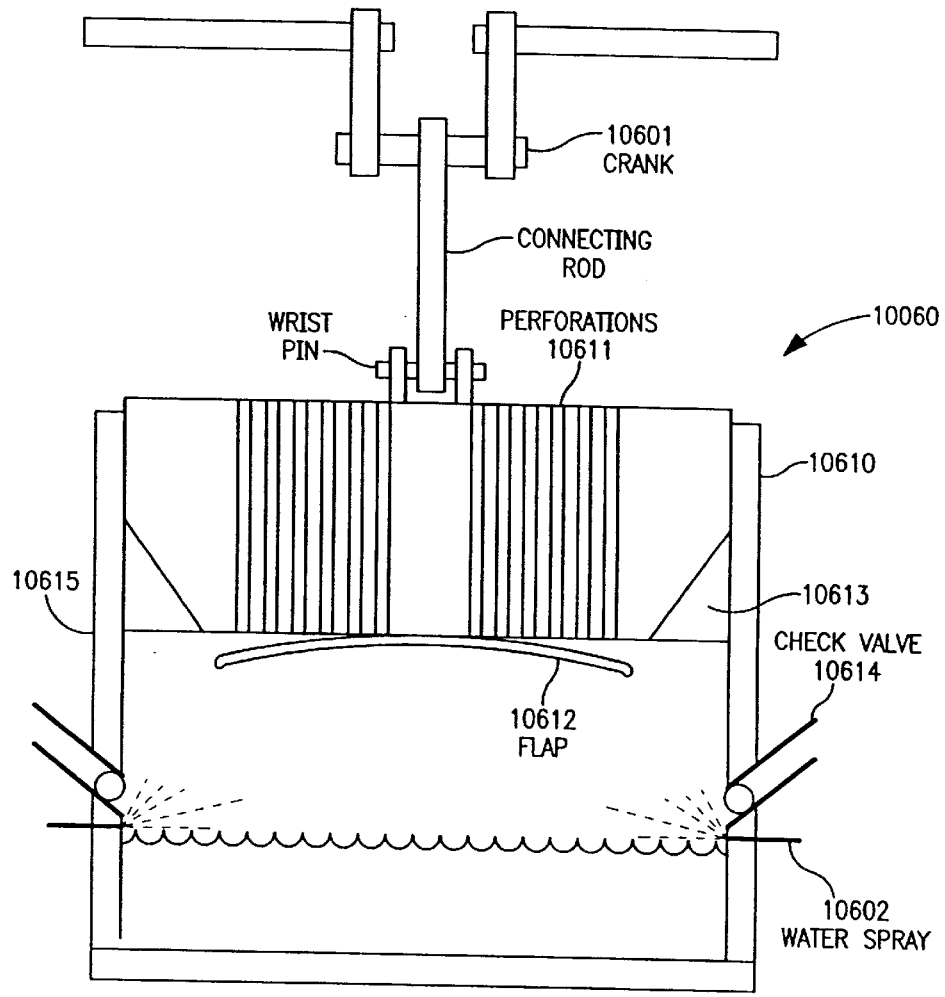
FIG. 69 Cross sectional view of vacuum pump 10060.
Figure 70:
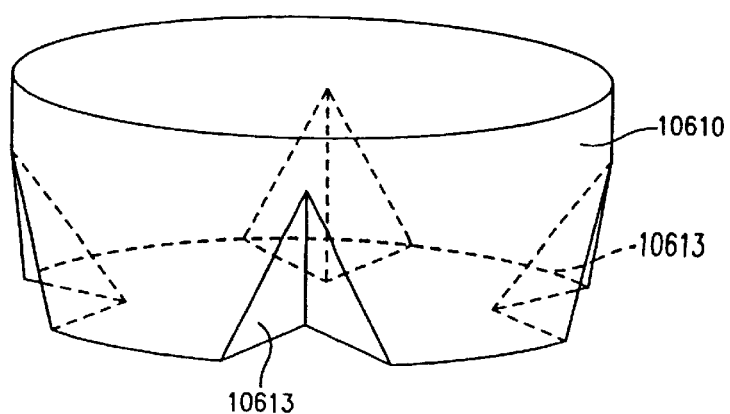
FIG. 70 Perspective view of piston 10610 of vacuum pump 10060.

FIGS. 69–70 depict a novel vacuum pump 10060 which removes noncondensibles from the condenser. The piston 10610 is driven by a crank 10601. The piston 10610 has numerous perforating 10611 in the top that allow vapor to flow into the cylinder 10615. A flexible flap 10612 is located at the bottom of the piston 10610 which opens when the piston 10610 moves upward and closes when the piston 10610 moves downward. The opening and closing of the flap 10612 is driven both by inertia, and pressure differences across the flap 10612. During the entire operation of the vacuum pump, water 10602 is sprayed into the chamber which condenses water vapor as the volume reduces. Notches 10613 in the piston 10610 allow liquid and compressed noncondensibles to access the check valve 10614 and exit the system. Although described in connection with this particular embodiment, vacuum pump 10060 may be incorporated in place of the vacuum pumps or aspirators of the other cooler embodiments described herein.

FIG. 71 is a schematic representation of gerotor 10300 incorporated into a vapor-compression evaporative cooler 10000. Electric motor 10001 drives the gerotor compressor 10300 through flexible coupling 10002. The gerotor compressor pulls a vacuum on water 10015 causing it to evaporate and cool. Using pump 10031, the chilled water 10015 is pumped to packing 10035 which is in countercurrent contact with house air, thus cooling the air. The warmed water 10036 is sucked through filter 10039 into the evaporator 10038 where some of it flashes on packing 10100, thus cooling the water; the flow rate is regulated by float valve 10037.

Cooler 10000 operates similarly to previous embodiments. Water 10045 from condenser 10025 is removed by pump 10032 and directed to drip over cooling tower packing 10050 which has ambient air flowing countercurrently driven by fan 10054. As the water flows through the packing, it is cooled approaching the wet-bulb temperature of the ambient air. The cooled water 10051 is sucked through filter 10052 and is drawn into condenser 10025. The water flow rate is regulated by float valve 10053 which directs the incoming water to drip over packing 10030.

Because both chilled water 10015 and condenser water 10045 directly contact air, dissolved gases will be released in the vacuum of evaporator 10038 and condenser 10025. The noncondensible gases will accumulate in condenser 10025; therefore, a means for removing them, such as vacuum pump 10060, is provided. Vacuum pump 10060 is driven by gear 10065 located on the main drive shaft 10007. Using sprayers 10602, water 10051 is drawn into the vacuum pump 10060 by the vacuum. Further, as piston 10610 is driven upward by crank 10601, elastomer flap 10612 opens due to its inertia. The open flap allows noncondensibles and water vapor to enter through perforations 10611. As piston 10610 is driven downward by crank 10601, elastomer flap 10612 closes due to inertia, sealing the water vapor and noncondensibles inside. As the piston 10610 compresses further, the water vapor condenses onto liquid water spray leaving noncondensible gases and condensed water to exit through check valve 10614, into cooling tower 10050. Grooves or notches 10613 ensure the check valve 10614 is not blocked when piston 10610 is fully downward.

Because water evaporates in evaporator 10038 and cooling tower packing 10090, make-up water 10012 and 10013, such as tap water, is added. To purge salts that would accumulate in the system, overflow weirs 10085 and 10086 are provided.

Like the previous gerotor embodiments, a primary advantage of gerotor compressor 10300 is that it has no valves. In this embodiment, liquid water will be sprayed into the compressor to eliminate superheat. The gerotor compressor in this disclosure has low-pressure vapors entering the top and high-pressure vapors exiting the bottom. This arrangement allows liquid water to drain from the compressor.

Figure 72:
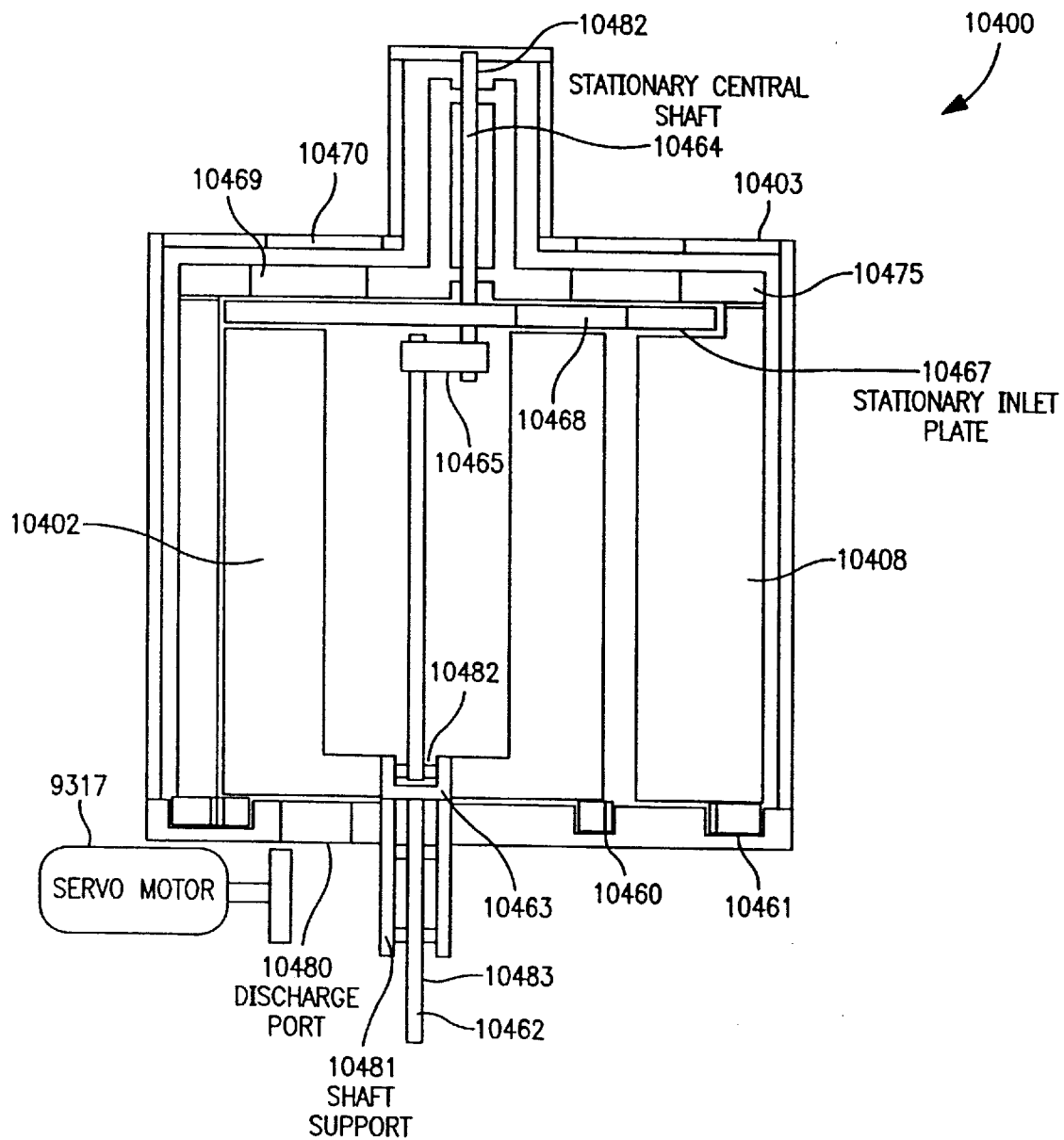
FIG. 72 Schematic cross sectional view of gerotor compressor 10400.

FIG. 72 shows an alternative novel gerotor compressor embodiment that can also be used in cooler 10000 as well as the previously described applications. This compressor 10400 has gerotors in which the relative rotation of the two gerotors also is produced by two spur gears, the smaller one 10460 with teeth on the outside diameter and the larger one 10461 with teeth on the inner diameter. The gear ratio of these two spur gears is the same as the ratio of the number of teeth on the gerotor (in this case, 5:4).

As depicted in FIG. 72, lower shaft 10462 rotates and drives the hub 10463 connected to the inner gerotor 16402. As the inner gerotor 10402 spins, the small gear 10460 drives the large gear 10461 causing the outer gerotor 10408 to rotate. The outer gerotor spins about a fixed, nonrotating central shaft 10464. The central shaft has a "crook" 10465 that establishes the required offset of the axes of rotation for the two gerotors.

The top stationary inlet plate 10467 with the inlet port 10469 is located directly against the two gerotors. The inlet low-pressure vapors also must pass through perforations 10469 in the connecting plate 10475 to the outer gerotor 10408, and perforations 10470 in upper plate 10403 of the housing. High-pressure vapors exit through discharge port 10480. The discharge port 10490 can be fixed or have a variable opening employing the mechanisms previously described. Servo motor 9317 is shown to represent an actuation means to adjust the port opening. Shaft support 10481 contains ball bearings 10482 that support rotating shaft 10483.

Figure 73:
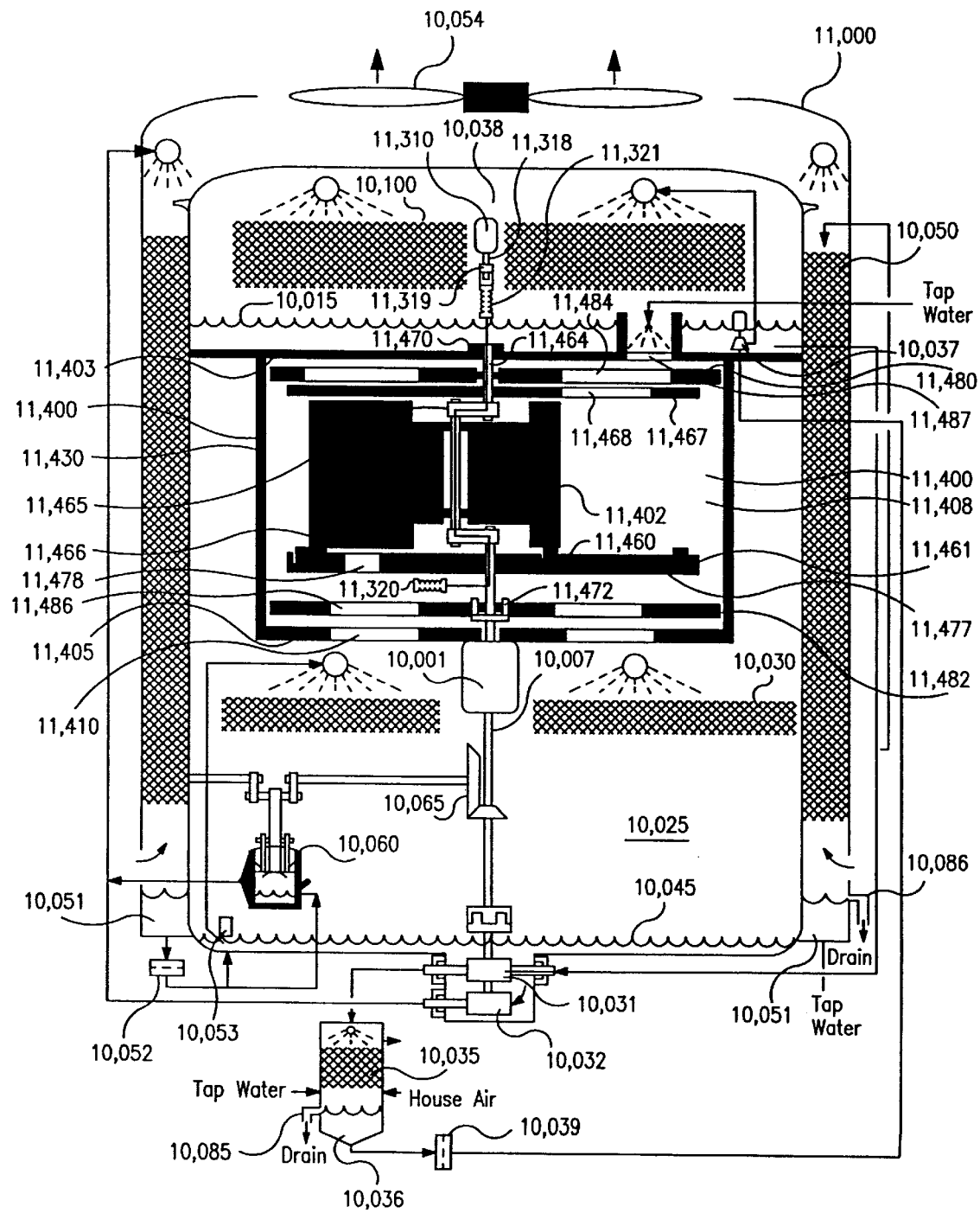
FIG. 73 Schematic cross sectional view of gerotor compressor 11400 incorporated into cooler 11000.
Figure 74A:
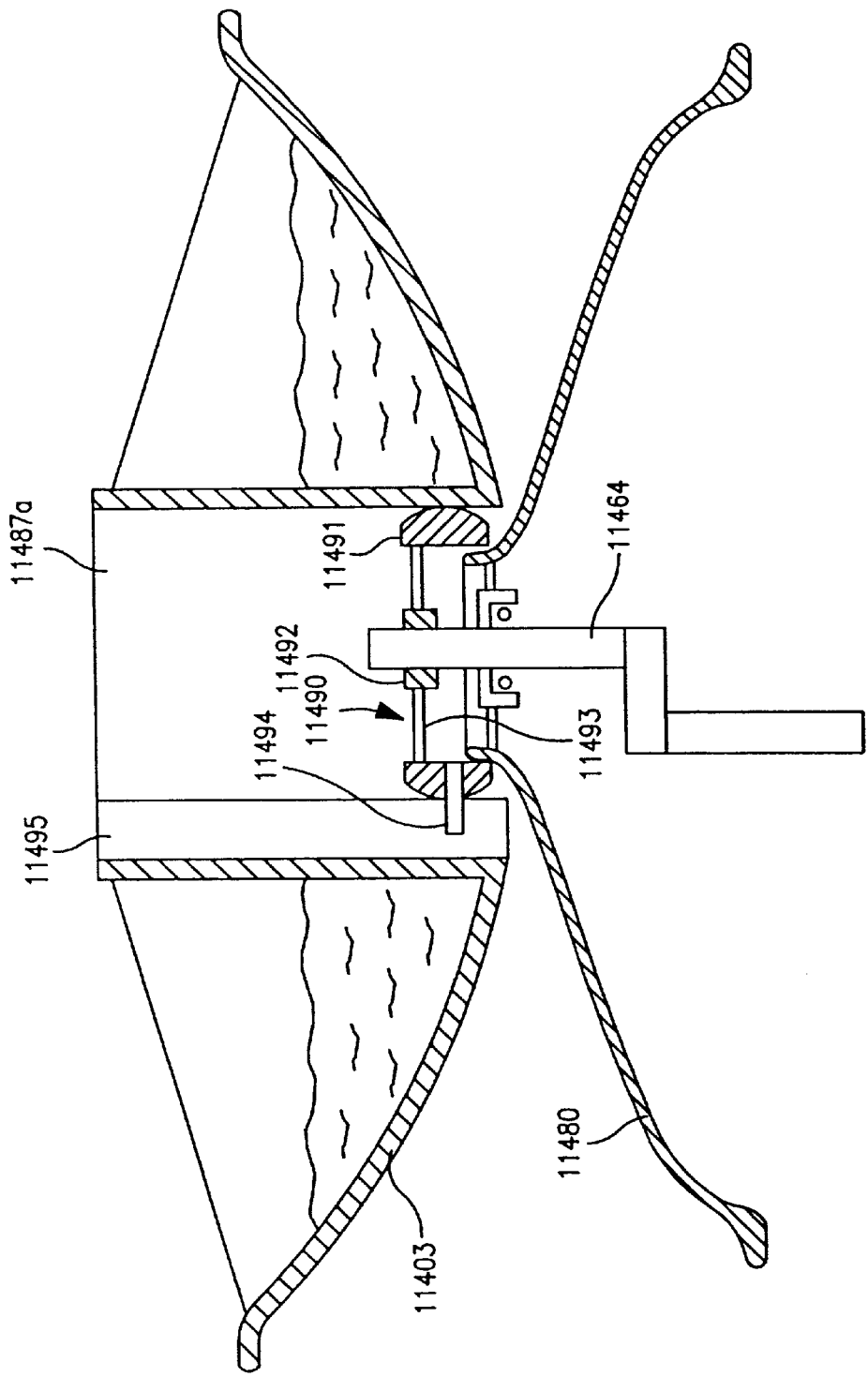
FIG. 74 (a) Schematic cross sectional view of pivotable mount 11490; (b) top perspective view of top housing plate 11403 for use with pivotable mount 11490; (c) top perspective view of rotating plate 11480 for use with pivotable mount 11490; and (d) top perspective view of ring 11491, hub 11492 and spokes 11493 of mount 11490.
Figure 74B:
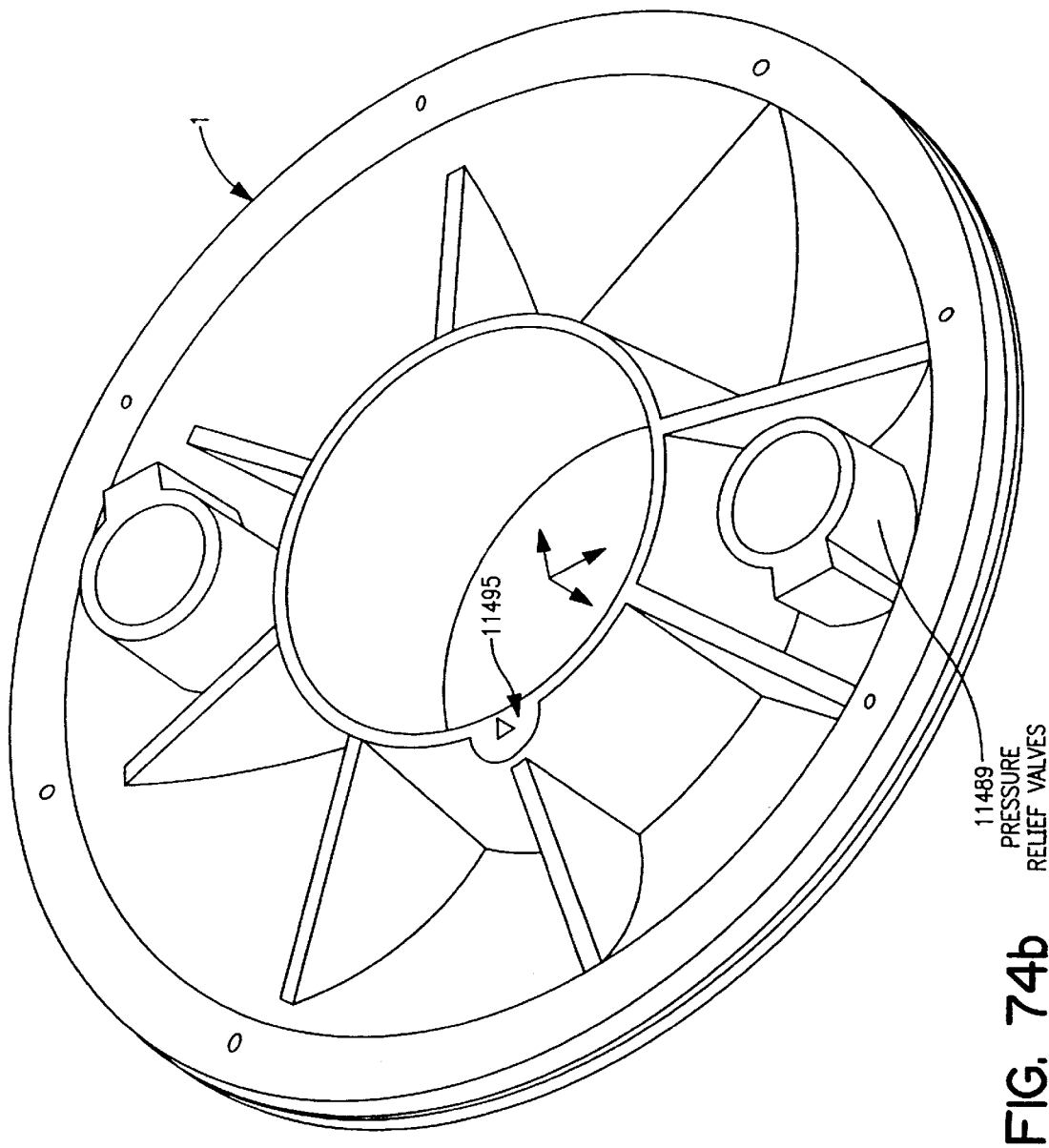
Figure 74C:
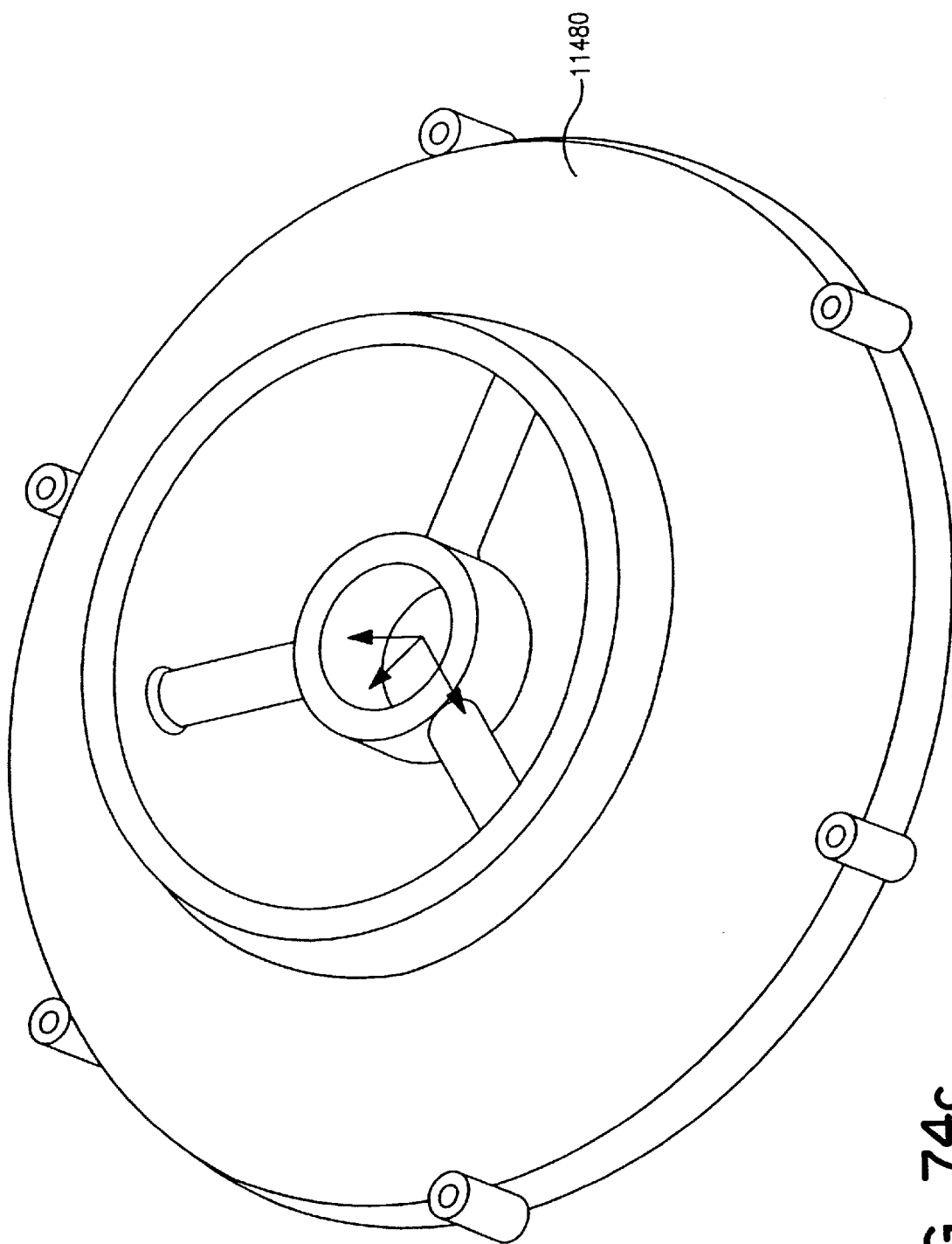
Figure 74D:
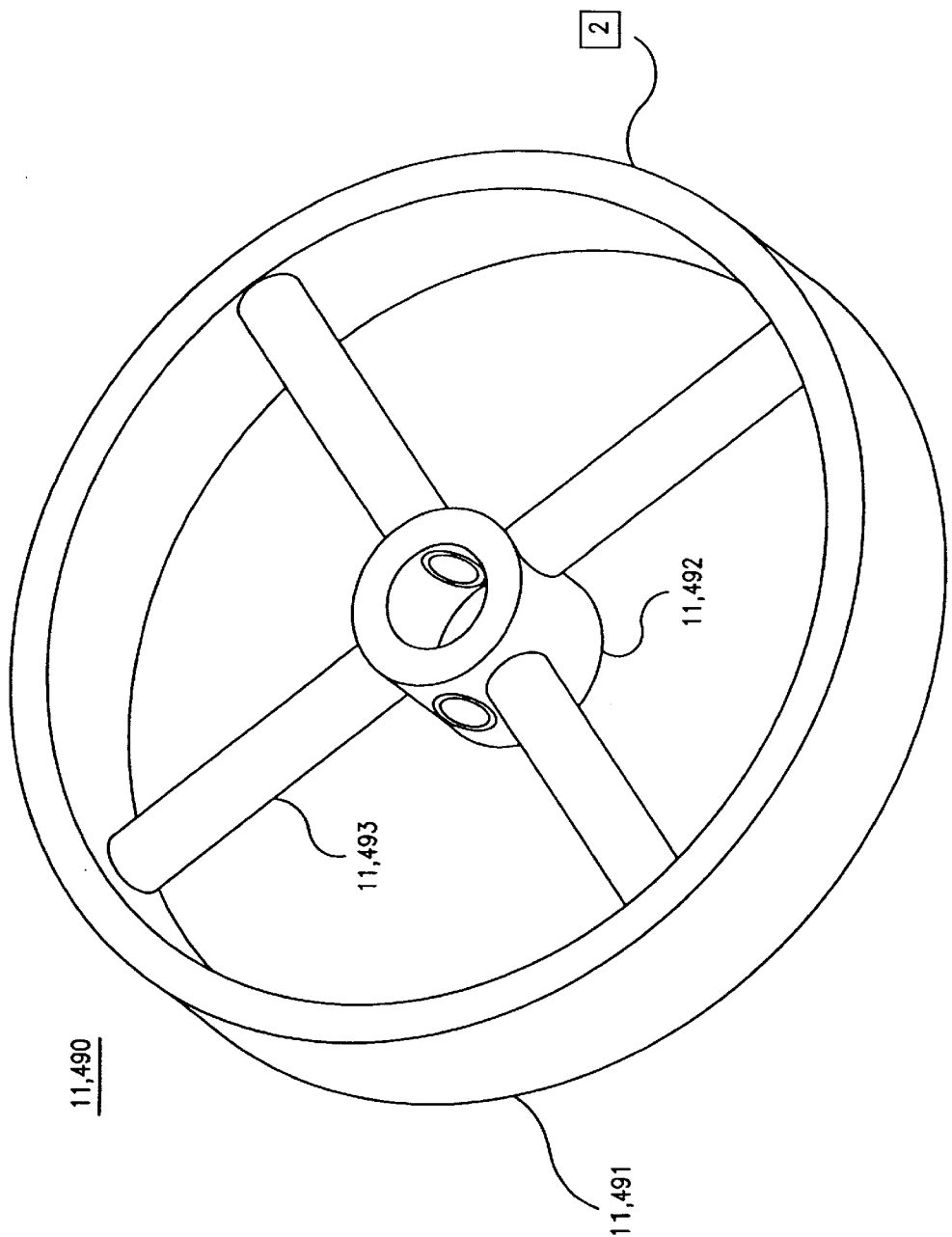

Another embodiment of the present invention is directed to a low-friction gerotor compressor without cantilevers; instead, both gerotors are supported at two points at opposite ends of the gerotor. This gerotor can incorporate a novel means for mounting a stationary shaft (FIGS. 74a–d) which allows for angular and axial variation. As depicted in FIG. 73, gerotor compressor 11400 may be integrated into cooling systems such as cooler 11000, which is similar to cooler 10000 depicted in FIG. 71.

The outer gerotor 11408 and inner gerotor 11402 of compressor 11400 rotate, compress vapors, as in the previous embodiments, such as that depicted in FIGS. 53a–j, so that a further description is omitted. As indicated in FIG. 73, the gerotor is actuated by meshing a large internal gear 11461 and a small external gear 11460 with the same gear ratio as the gerotors (in this case 4:5). As further depicted in FIG. 73, gerotor compressor 11400 has a stationary central shaft 11464 with two crooks 11465 and 11466. One end of the stationary shaft 11464 is fixed in a pivotable mount 11470 that prevents the shaft 11464 from rotating, but allows for angular variation. The pivotable mount could consist simply of a fixed rubber block 11470 (FIG. 73) with a hole in the center to which the stationary shaft connects.

Referring again to compressor 11400 depicted in FIG. 73, the other end of stationary shaft 11464 is located in rotating bearing cup 11472. At the top of the compressor, there is a stationary inlet plate 11467 with an inlet hole 11468. At the bottom of the compressor there is a stationary outlet plate 11477 with an outlet hole 11478 as shown in FIG. 73. On either side of stationary plates 11467 and 11477 are rotating perforated plates 11480 and 11482 that couple to the outer gerotor 11409. Upper rotating perforated plate 11480 has an inlet 11484. Bottom rotating perforated plate 11482 has an outlet 11486. On either side of the rotating perforated plates 11490 and 11482 are perforated housing plates 11403 and 11405 that allow vapors to flow in and out through top inlet 11487 and bottom outlet 11410.

In an alternate embodiment, the housing sidewall 11430 and perforated housing plate 11405 can be eliminated by mounting motor 10001 on a separate frame. Further, the rubber block 11470 can be replaced by the mechanism shown in FIGS. 74a–d.

FIGS. 74a–d show novel pivotable mount 11490 which consists of a ring 11491 with center hub 11492 connected by spokes 11493. The outer surface of ring 11491 is a section of a sphere which allows the ring to angularly rotate within inlet port 11487a of upper housing plate 11403. Stationary shaft 11464 is rigidly attached to center hub 11492. To prevent rotation of stationary shaft 11464, pin 11494 is inserted into slot 11495 in upper housing plate 11403. Referring again to FIG. 73, a fine mist of tap water may be provided through housing inlet port 11487 to cool the compressor and seal rotating components. Pressure relief valves 11488 are preferably provided in ports 11489 of housing plate 11403 to relieve excess pressure differences between the evaporator 10038 and condenser 10025. Excess pressure differences could occur during start up if the evaporator 10038 had a large quantity of noncondensibles (i.e., air). This unique mount allows for variations in both axial and angular alignment while preventing shaft 11464 from rotating. Although described in connection with the present embodiment, this mount could be used in other applications. For example, the impeller of a centrifugal pump could be located on a shaft that is mounted to the housing using the devices illustrated in FIGS. 74a–d.

Figure 75:
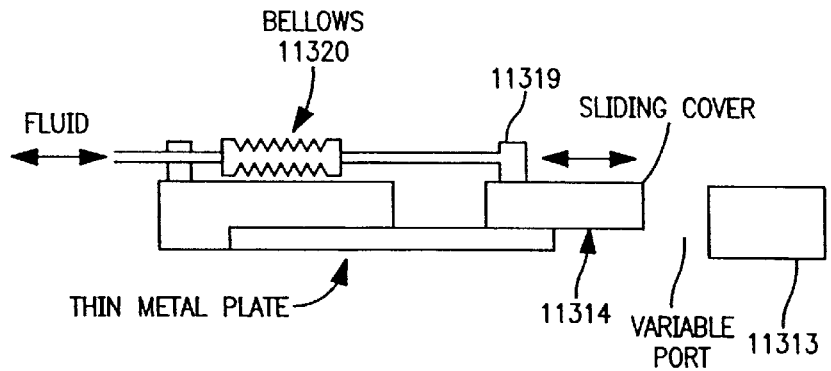
FIG. 75 Cross sectional schematic view of a variable discharge port operated by a bellows.
Figure 76:
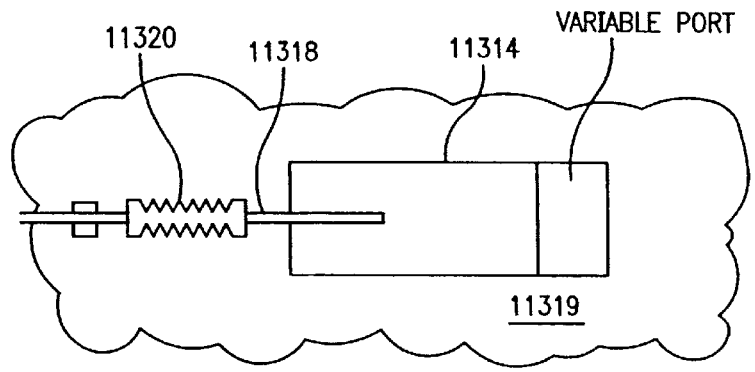
FIG. 76 Top view of the port of FIG. 75.

The discharge port 11478 located on the stationary bottom plate 11477 can have a fixed opening, thus fixing the compression ratio of the gerotor compressor. Alternatively, the discharge port 11478 can have a variable port mechanism such as those shown in FIGS. 58–62, that changes the position of the leading edge of the discharge port, thus allowing the compression ratio to be controlled. The position of the leading edge may be set using the mechanism depicted in FIGS. 73 and 75–76. To save space, the servo motor 11310 that sets the position of the sliding mechanism 11313 may be located outside the compressor. The servo motor rotates a threaded rod 11318 that axially positions a nonrotating nut 11319 that is coupled to a bellows 11321. The bellows 11321 is filled with a noncompressible fluid (e.g., hydraulic oil). As the bellows 11321 is compressed by the servo motor 11310, the noncompressible fluid flows down the hollow center of the stationary shaft 11464 and extends the bellows 11320 located inside the compressor. As this bellows 11320 extends, it actuates the sliding cover 9314 or 11314 (FIGS. 61–62 and 75–76), actuator 9363 (FIG. 58), slider 9375 (FIG. 59) or slider 9385 (FIG. 60).

Figure 77:
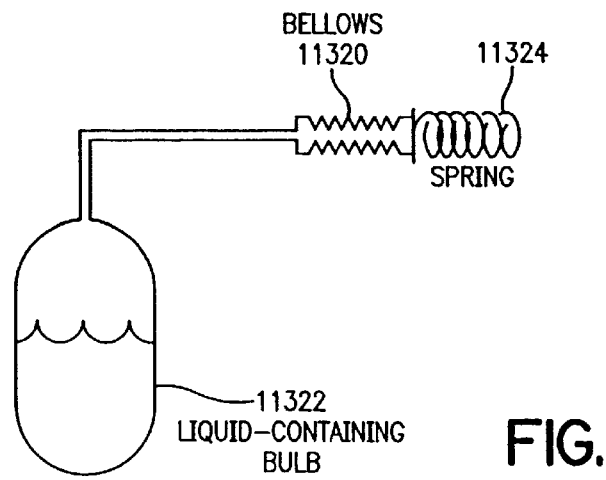
FIG. 77 Cross sectional view of a discharge mechanism control employing a liquid-containing bulb.

Alternatively, as depicted in FIG. 77, a temperature sensor can be constructed from liquid-containing bulb 11322. At higher temperatures, the vapor pressure of the liquid increases, causing bellows 11320 to extend and actuate the sliding discharge port cover 9114 or 11314 (FIGS. 61–62 and 75–76), actuator 9363 (FIG. 58), slider 9375 (FIG. 59) or slider 9385 (FIG. 60). The movement is resisted by spring 11324, which determines the functional relationship between temperature and slide position.

FIG. 73 shows a schematic representation of gerotor compressor 11400 incorporated into vapor-compression evaporative cooler 11000. Reference numerals for elements in FIG. 73 refer to corresponding elements in FIG. 71 so that a further description thereof is omitted. Cooler 11000 operates in a similar fashion to cooler 10000 depicted in FIG. 71, except that electric motor 10001 directly drives the gerotor compressor. No flexible coupling is required because the pivotable mount 11470 or 11490 adjusts for slight misalignments. This design has the advantage that both gerotors are supported at each end, unlike the other designs in which one or more gerotors was cantilevered. Further, the most precise components (e.g., crooks 11465 and 11466) are small, so the precision is fairly easy to achieve. In contrast, many of the other designs require precise housings, which may be expensive given their large size. The design shown in FIG. 73 is tolerant of impression because of the shaft mounts 11470 or 11490 which allow for misalignments.

Like previous embodiments, another primary advantage of gerotor compressor 11400 is that it has no valves and liquid water may be sprayed into the compressor to eliminate superheat. The gerotor compressor of this embodiment has low-pressure vapors entering the top and high-pressure vapors exiting the bottom. This arrangement allows liquid water to drain from the compressor.

Still other embodiments of the invention are directed to integrated systems using novel means to remove water vapor from the noncondensibles. In these embodiments, direct contact with chilled liquid water removes much of the water vapor from the noncondensibles stream, thus increasing the partial pressure of the noncondensibles without using a compressor. This innovation may be employed in a single-stage unit suitable for the home market or it may be used in multistage units for large buildings.

The use of chilled water to condense water vapor from the noncondensibles was suggested in one study by the Thermal Storage Applications Research Center of the University of Wisconsin, *The Use of Water as a Refrigerant*, Report No. TSARC 92-1, March 1992. However, in this case, the author suggested the use of a metal heat exchanger with chilled water on one side and condensing water vapor on the other. This approach has a sever disadvantage because of temperature differences needed to transfer heat. As a consequence, much of the water vapor does not condense because the temperature is not cold enough. In contrast, the embodiment illustrated in FIG. 78 directly contacts the water vapor with chilled water allowing for very low temperature gradients and much greater water removal from the noncondensibles.

Figure 78:
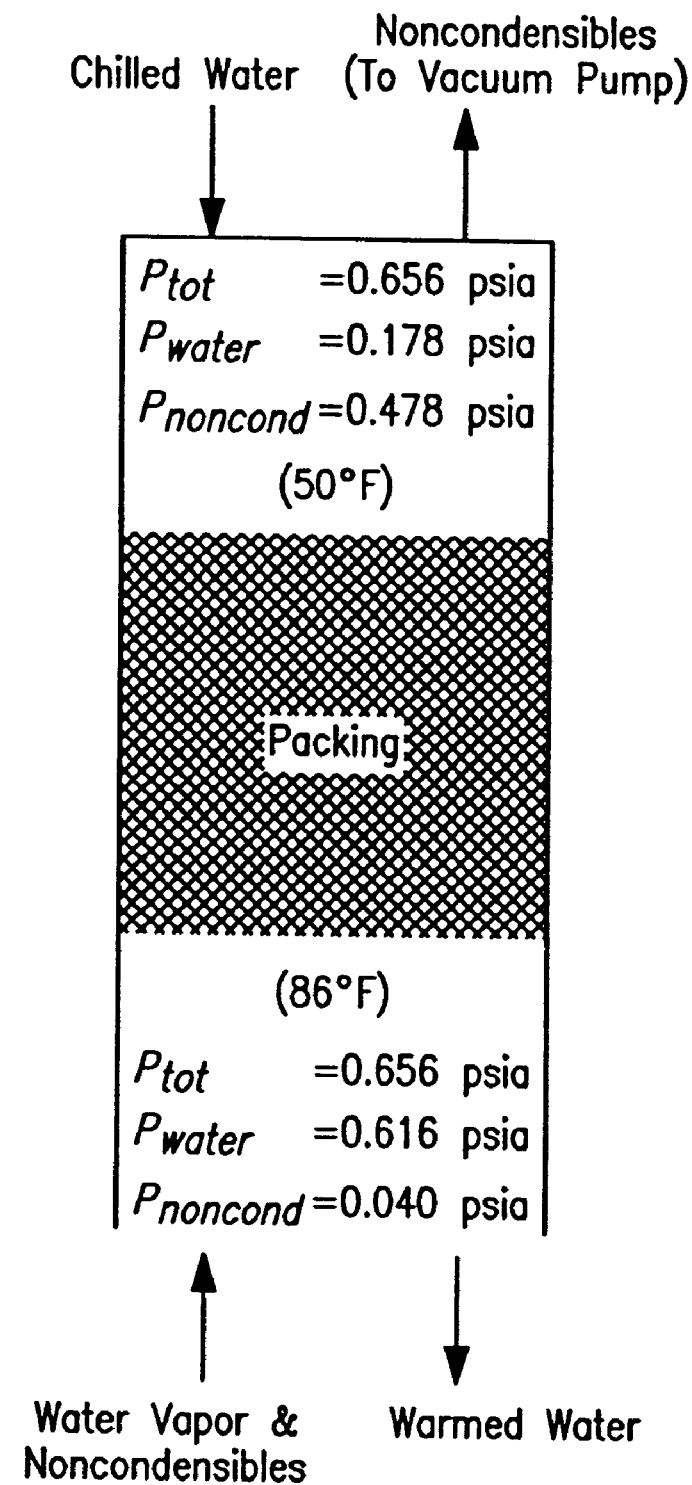
FIG. 78 Depiction of the removal of noncondensibles using packing and chilled water.

As shown in FIG. 78, removal of noncondensibles can be accomplished by passing condenser vapor through a stripper or a packed column with chilled water flowing countercurrently. In a preferred embodiment, the column contains structured packing consisting of thin sheets of PVC, such as CPVC, folded in a corrugated pattern. Alternatively, random packing may be employed, such as ceramic saddles.

The chilled water condenses water vapor which raises the partial pressure of the noncondensibles. For example, as shown in FIG. 78, assume that at the bottom of the column, the noncondensible partial pressure is 0.04 psia and the water vapor pressure in the condenser is 0.616 psia (86° F.). Further, at the top of the column, assume that the chilled water from the evaporator has a vapor pressure of 0.178 psia (50° F.). Assuming negligible pressure drop through the column, the total pressure is 0.656 psia at both the top and bottom of the column. Therefore, the partial pressure of noncondensibles at the top of the column is 0.478 psia. At the bottom of the packed column, the ratio of partial pressures is $$\frac{P_{water}}{P_{noncond}} = \frac{0.616 \text{ psia}}{0.040 \text{ psia}} = 15.4 = \frac{15.4 \text{ lbmol water}}{\text{lbmol noncondesibles}} \quad (13)$$

At the top of the packed column, the ratio of partial pressures is $$\frac{P_{water}}{P_{noncond}} = \frac{0.178 \text{ psia}}{0.478 \text{ psia}} = 0.372 = \frac{0.372 \text{ lbmol water}}{\text{lbmol noncondesibles}} \quad (14)$$

Thus, using this very simple device, the noncondensible pressure ratio increases by a factor of twelve while simultaneously removing almost 98% of the water vapor. Assuming the packing is able to operate near equilibrium, the required amount of chilled water is $$\hat{m} = \left(\frac{15.4 \text{ lbmol water}}{\text{lbmol noncondesibles}} - \frac{0.372 \text{ lbmol water}}{\text{lbmol noncondesibles}}\right) \times \quad (15)$$

$$\frac{\text{lbmol noncondesibles}}{29 \text{ lb}} \times \frac{18 \text{ lb water}}{\text{lbmol water}} \times \frac{1000 \text{ Btu}}{\text{lb water}} \times$$

$$\frac{\text{lb chilled water} \cdot °\text{ F.}}{1 \text{ Btu}} \times \frac{1}{(86-50)° \text{ F.}}$$

$$= \frac{259 \text{ lb chilled water}}{\text{lb noncondensibles}}$$

Based upon the solubility of air in both the chilled water and condenser water, the mass flow rate of noncondensibles is about 0.051 lb/h for a 1-ton (12,000 Btu/h) air conditioner. Therefore, the chilled water flow rate for the water stripper in a 1-ton air conditioner is $$\dot{m}_{stripper} = 259 \frac{\text{lb chilled water}}{\text{lb noncondensibles}} \times \quad (16)$$

$$\frac{0.051 \text{ lb noncondensibles}}{\text{h}}$$

$$= 13.2 \frac{\text{lb chilled water}}{\text{h}}$$

Optimization studies (see FIG. 3) show that the best temperature change for the chilled water that circulates through the house is 4° C. (7° F.); therefore, the required water flow rate for a 1-ton air conditioner is $$\dot{m}_{house} = 12,000 \frac{\text{Btu}}{\text{h}} \times \frac{\text{lb chilled water} \cdot °\text{ F.}}{1 \text{ Btu}} \times \frac{1}{7° \text{ F.}} \quad (17)$$

$$= 1714 \frac{\text{lb chilled water}}{\text{h}}$$

Thus, the chilled water flowing to the stripper is only about 0.8% of the chilled water circulating through the house, which has almost a negligible effect on the compressor power requirements.

Figure 79:
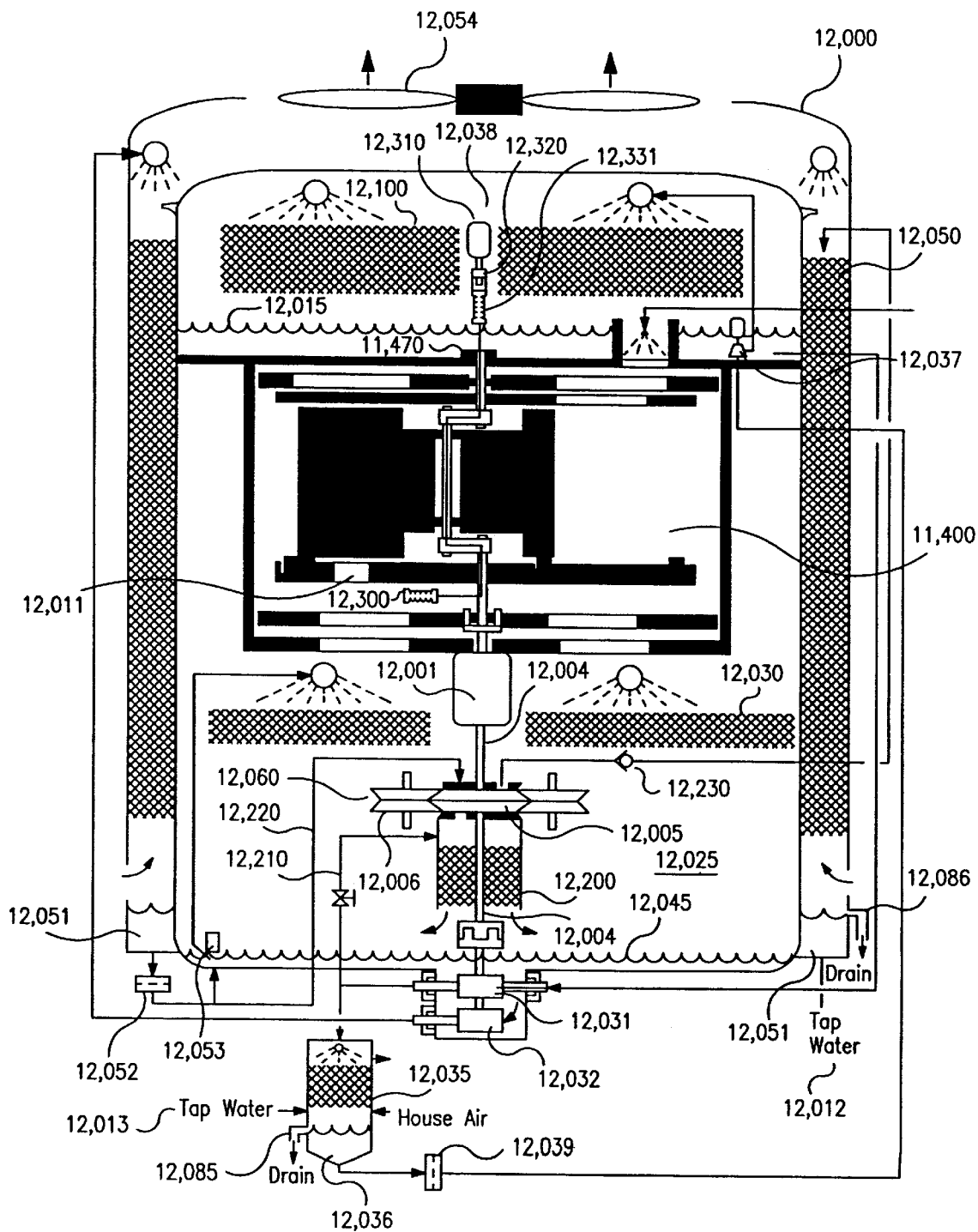
FIG. 79 Schematic cross sectional view of compressor 11400 and vacuum pump 12060 incorporated into cooler 12000.

A variety of coolers may use chilled water to remove noncondensibles including the system depicted in FIG. 73. For instance, FIG. 79 depicts a single-stage evaporator cooling system 12000 that uses a gerotor compressor such as gerotor compressor 11400 depicted in FIG. 71. Cooling system 12000 is similar to cooling system 11000 in FIG. 73, except that a gerotor vacuum pump 12060 is used in place of vacuum pump 10060 to remove noncondensibles.

Figure 81:
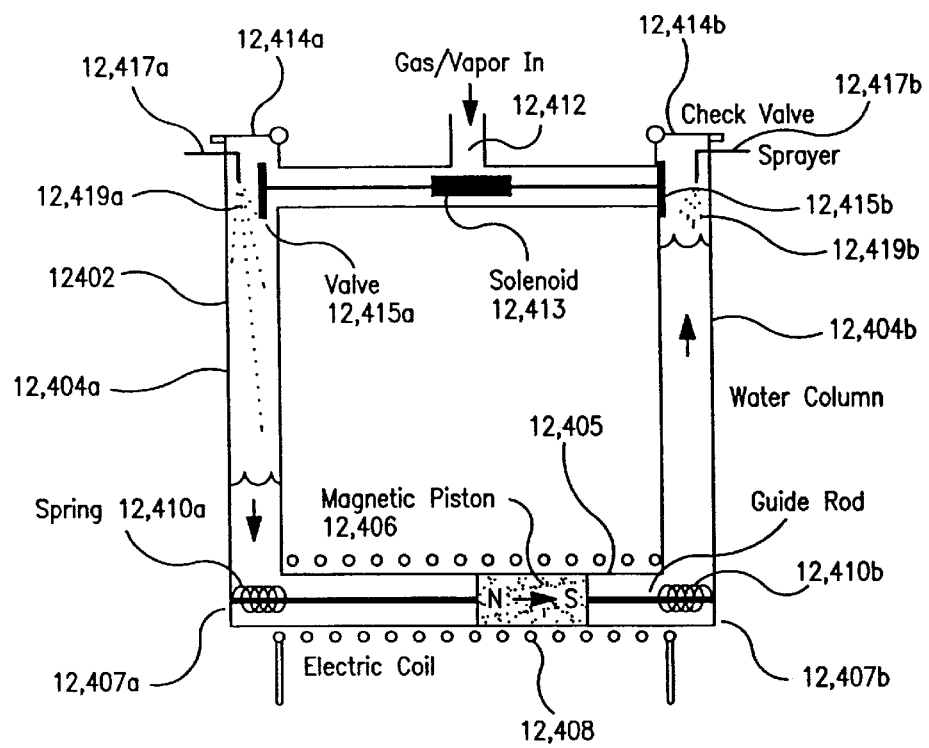
FIG. 81 Schematic of vacuum pump 12402.
Figure 82:
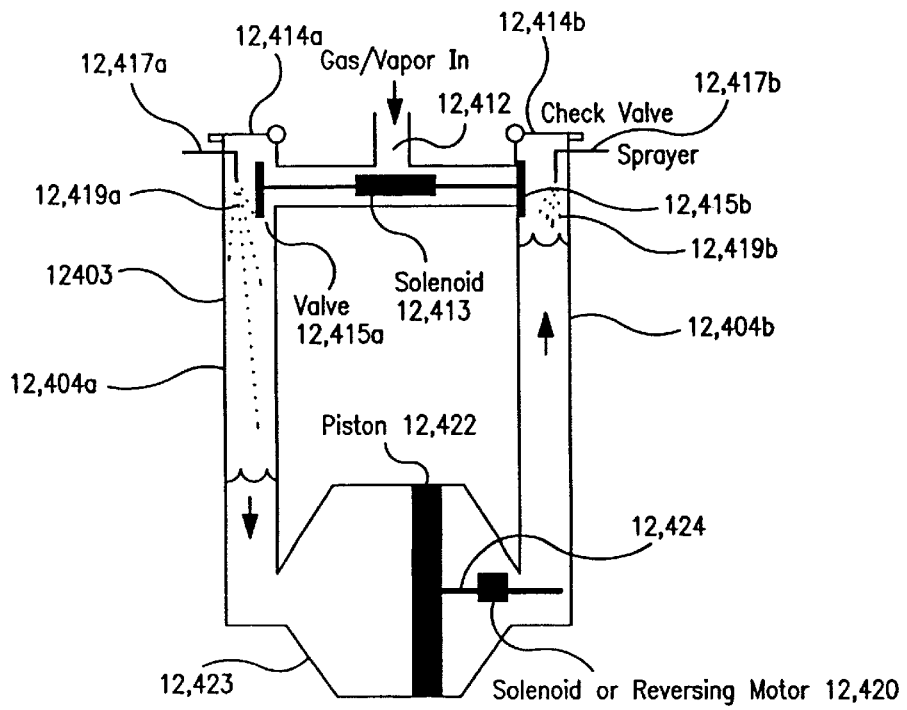
FIG. 82 Schematic of vacuum pump 12403.

FIGS. 79–81 show a gerotor vacuum pump 12060 which operates similarly to the main compressor; however, it is much smaller. For example, the main compressor of a 1-ton air conditioner has a volumetric flow of about 470 ft³/min whereas the vacuum pump must process only 0.24 ft³/min for an identical air conditioner. The center gerotor 12003 is mounted on the lower portion of the main drive shaft 12004 whereas the outer gerotor 12005 is positioned by guide rollers 12006. Alternatively, the outer gerotor may be mounted within a single large ball bearing. A gear on the center gerotor 12003 can drive a gear on the outer gerotor 12005—as with the main compressor—or the inner gerotor can drive the outer gerotor directly without an intervening gear. Because the compression ratio is quite high (about 22:1), the temperature rise of the exhaust gas could be quite dramatic; therefore, it is beneficial to introduce liquid water 12220 into the vacuum pump. The optimal location is to introduce the liquid water immediately after the intake portion of the cycle. Enough liquid water can be introduced to fill void volumes in the gerotor thus allowing very high compression ratios to be achieved. Both atmospheric-pressure air and liquid water will be discharged from the air conditioner. A check valve 12230 is preferably located in the discharge line to prevent leakage of atmospheric air into the air conditioner. Optionally, an accumulator can be placed between the gerotor vacuum pump and the check valve so the check valve does not have to cycle rapidly.

FIG. 79 depicts a schematic of the gerotor compressor 11400 and gerotor vacuum pump 12060 incorporated into a single-stage vapor-compression evaporative cooler 12000. Electric motor 12001 directly drives gerotor compressor 11400. No flexible coupling is required because the pivotable mount 11470 adjusts for slight misalignments. The gerotor compressor 11400 pulls a vacuum on water 12015 causing it to evaporate and cool. Using pump 12031, the chilled water 12015 is pumped to packing 12035 which is in countercurrent direct contact with house air, thus cooling the air. The warmed water 12036 is sucked through filter 12039 into the evaporator 12038 where some of it flashes on packing 12100 thus cooling the water; the flow rate is regulated by float valve 12037.

As shown in FIG. 79, bellows 12300 actuates a variable discharge port 12011. In a preferred embodiment, motor 12310, which is preferably a servo motor, drives a nonrotating nut 12320 which actuates bellows 12331 which, in turn, actuates bellows 12300 which adjusts variable discharge port 12011. Alternatively, the liquid-containing bulb system shown in FIG. 77 could actuate bellows 12300.

Water 12045 from condenser 12025 is removed by pump 12032 and directed to drip over ambient air contactor packing 12050 which has ambient air flowing countercurrently driven by fan 12054. As the water flows through the packing, it is cooled approaching the wet-bulb temperature of the ambient air. The cooled water 12051 is sucked through filter 12052 and is drawn into condenser 12025. The water flow rate is regulated by float valve 12053 which directs the incoming water to drip over packing 12030.

Because both chilled water 12015 and condenser water 12045 directly contact air, dissolved gases will be released in the vacuum of evaporator 12038 and condenser 12025. The noncondensible gases will accumulate in condenser 12025; therefore, a vacuum pump or aspirator is provided. As indicated in the embodiment shown in FIG. 79, gerotor vacuum pump 12060 is preferably used. Chilled water 12210 flows over packing 12200 to remove noncondensibles. In a preferred embodiment this is a structured packing consisting of corrugated PVC sheet. Alternatively, it could be a random packing of ceramic saddles. Some water 12220 may be sprayed into gerotor vacuum pump 12060 for cooling and sealing purposes. Additionally, the volume of water will be sufficiently large to fill voids in the gerotor allowing very high compression ratios to be achieved. Discharge from the gerotor vacuum pump 12060 is directed through check valve 12230 and ultimately is sent to the ambient air contactor 12050.

Because water evaporates in evaporator 12038 and ambient air contactor 11090, make-up water, such as tap water 12012 and 12013, is added. To purge salts that would accumulate in the system, overflow weirs 12085 and 12086 are provided.

Liquid water is preferably sprayed into the compressor 11400 to eliminate superheat. The gerotor compressor in this disclosure has low-pressure vapors entering the top and high-pressure vapors exiting the bottom. This arrangement allows liquid water to drain from the compressor. The gerotor in this embodiment has no cantilevers allowing for more reliable operation.

The method used to purge noncondensibles from the system allows for the use of an aspirator, or a small vacuum pump, such as pump 12060 and the others disclosed herein, because the water vapor has been largely removed. Also, because it is not necessary to condense water vapors inside the vacuum pump, it can be operated at high speed which eliminates the need for gear reduction, a potential maintenance problem.

In addition to vacuum pump 12060, this invention is also directed to other simple, efficient and novel vacuum pumps that can remove noncondensibles from a vapor-compression evaporative cooler or be used in other applications requiring a vacuum pump. These novel vacuum pumps have the unusual ability to isothermally compress a mixture of noncondensible and condensible gases to a very high compression ratio.

FIG. 81 is a schematic depicting a preferred embodiment of this vacuum pump. As depicted in FIG. 81, vacuum pump 12402 consists of two columns 12404a and 12404b which are partially filled with liquid and are joined by lower connecting chamber 12405. The two columns have check valves 12414a and 12414b and inlet valves 12415a and 12415b at their upper ends. The liquid in each column is driven to oscillate by piston 12406 located in lower connecting chamber 12405, between the bottom of columns 12404a and 12404b. In FIG. 81, piston 12406 is magnetic and is driven by a magnetic field induced by electric coil 12408. Springs 12410a and 12410b at each end 12407a and 12407b of lower connecting chamber 12405 act as stops. When applied to the vapor-compression evaporative cooler, the preferred liquid is water. However, for other vacuum pump applications, nonvolatile liquids (e.g., vacuum pump oil) could by employed to achieve high vacuums.

The gas and vapor mixture is introduced into center connecting inlet duct 12412. A solenoid 12413 opens one inlet valve 12415a and closes the other inlet valve 12415b so the gas/vapor is directed to the column, i.e., 12404a, in which the liquid is moving downward. Water is constantly sprayed by sprayers 12417a and 12417b into each water column, creating water sprays 12419a and 12419b. In the water column that is rising (in this example, column 12404b), the water vapors condense on the water spray 12419b and the noncondensible gas becomes compressed. When the water gets to the top of the column, the respective check valve, 12414b, opens and releases the excess water and compressed noncondensible gas.

Another embodiment of a novel vacuum pump useful in removing noncondensibles or in other applications is depicted in FIG. 82. In this embodiment, like reference numerals refer to similar elements described in the previous embodiment so that a further description thereof is omitted. As indicated in FIG. 82, vacuum pump 12403 is similar in configuration and operation to the previous compressor 12402 with the exception of the piston and the lower connecting chamber. Piston 12422 is disposed in lower connecting chamber 12423 and is connected to piston solenoid 12420 by a rod 12424. In compressor 12403, piston solenoid 12420 is in a fixed position and drives piston 12422 back and forth. Alternatively, piston 12422 could be coupled to a reversing motor by a threaded rod. In this third and also novel embodiment, piston 12422 is driven back and forth as the motor reverses direction.

The coolers described above are relatively simple and suitable for home use. To reduce high utility bills, large air conditioning installations can use even more complex systems to achieve greater energy efficiency. Accordingly, this invention is also directed to highly efficient multistage coolers that employ the novel feature of multistage condensation, in addition to multistage evaporation. Although multistage throttling is known with conventional air conditioning systems, multistage evaporators are rarely used. Compressors useful in multistage coolers include both the novel positive displacement, low-friction compressors previously described as well as conventional dynamic compressors. These coolers also utilize novel means to remove noncondensibles.

FIG. 83 depicts one such energy-efficient system which employs multiple evaporator stages. Compared to a single-stage system in which all of the water is evaporated at the lowest pressure, the multistage evaporator in vapor-compression evaporative cooler 13000 allows some of the water to be evaporated at higher pressures which reduces compression energy.

Referring to FIG. 83, in vapor compression evaporative cooler 13000, chilled water countercurrently directly contacts air from the building in room air contactor 13110. Because the water is cold, it both cools the air and condenses moisture out of the air. The warmed water from the room-air contactor 13110 flows countercurrently through a series of evaporators 13120. Water vaporizes in each evaporator making the liquid colder in each successive stage. Once the water is fully chilled, it is returned to the room air contactor 13110 via a cold pump 13121.

Multiple compressors 13130 are used so that vapors can be drawn off of each evaporator. To reduce the superheating of the water, liquid may be injected directly into the compressors 13130 as described in earlier embodiments. Centrifugal or axial compressors generally are not tolerant of liquid droplets, so intercooling can be accomplished by spraying liquid 13125 into the vapor space of the evaporator 13120. In this case, the evaporator chamber serves two purposes: it is an evaporator and a de-superheater. The source of the liquid may be tap water or cooling tower water, whichever is colder.

The vapor discharge from the last compressor 13130 is directed to a condenser 13160 where it contacts water that is near the wet-bulb temperature of the ambient environment. As the vapors condense on the water, the temperature rises. This hot water is pumped out of the condenser via pump 13161 into ambient-air contactor 13150 (cooling tower).

Because water is evaporating both in the evaporators and ambient-air contactor, make-up water 13154 and 13155 is provided. Ordinary tap water is envisioned as the make-up water. Treated water should not be necessary because there are no heat exchange surfaces. Salts will build up due to the evaporation, so salt water purges 13116 and 13117 are provided.

Noncondensible gases are dissolved into the water in both the room-air contactor 13110 and ambient-air contactor 13150. These gases are released in the low-pressure evaporators 13120 and condenser 13160, respectively. A small compressor train 13170 will draw vapors from the condenser 13160 to remove the noncondensible gases. Intercooling is provided by spraying water 13140 from the ambient-air contactor 13150 between the compressor stages to condense the water vapors. The noncondensible partial pressure rises in each stage until it reaches 1 atm and can be discharged directly to the ambient air.

The following analysis describes the energy efficiency of the system depending upon the number of stages employed.

One Stage

The compressor work $W_{comp}$ per unit of heat absorbed in the evaporator $Q_{evap}$ is the inverse of the coefficient of performance (COP)

$$\frac{W_{comp}}{Q_{evap}} = \frac{1}{COP} = \frac{T_4 - T_1}{T_1} \frac{1}{\eta_{motor}} \frac{1}{\eta_{comp}} \frac{1}{\eta_{cycle}} \quad (18)$$

$$= \frac{(T_5 + \Delta T_{hot}) - T_1}{T_1} \frac{1}{\eta_{motor}} \frac{1}{\eta_{comp}} \frac{1}{\eta_{cycle}}$$

where temperatures are defined in FIG. 83 and $W_{comp}$=compressor work $Q_{evap}$=total heat absorbed in evaporator COP=coefficient of performance $T_4$=water temperature exiting condenser $T_1$=water temperature exiting coldest evaporator $\eta_{motor}$=motor efficiency $\eta_{comp}$=compressor efficiency $\eta_{cycle}$=thermodynamic efficiency of the cycle relative to Carnot $\Delta T_{hot}=T_4-T_5$=temperature differences between water exiting the condenser and water exiting the ambient air contactor The work for the cold pump is $$W_{cold} = V\Delta P \frac{1}{\eta_{pump}} = \frac{Q_{evap}}{\rho C_p \Delta T_{cold}} \Delta P \frac{1}{\eta_{pump}} \quad (19)$$

$$\frac{W_{cold}}{Q_{evap}} = \frac{\Delta P}{\rho C_p \Delta T_{cold}} \frac{1}{\eta_{pump}} \quad (20)$$

where $W_{cold}$=work for the cold-water pump

V=volumetric flow rate of water through the cold pump $\Delta P$=pressure differences generated by the pump $\eta_{pump}$=pump efficiency $\rho$=water density $C_p$=water heat capacity $\Delta T_{cold}=T_6-T_1$=temperature difference between water exiting the room-air contactor and the water exiting the coldest evaporator If a turbine is employed to reduce the pumping energy requirements, the work for the cold pump is $$\frac{W_{cold}}{Q_{evap}} = \frac{\Delta P}{\rho C_p \Delta T_{cold}} \left( \frac{1}{\eta_{pump}} - \eta_{turbine} \right) \quad (21)$$

where $\eta$turbine=turbine efficiency

The work for the hot pump is $$\frac{W_{hot}}{Q_{evap}} = \frac{\Delta P}{\rho C_p \Delta T_{hot}} \left( 1 + \frac{1}{COP} \right) \frac{1}{\eta_{pump}} \quad (22)$$

where $$\frac{1}{COP}$$

is from Equation 18. If a turbine is employed to reduce the pumping energy requirements, the work for the hot pump is $$\frac{W_{hot}}{Q_{evap}} = \frac{\Delta P}{\rho C_p \Delta T_{hot}} \left(1 + \frac{1}{COP}\right)\left(\frac{1}{\eta_{pump}} - \eta_{turbine}\right) \quad (23)$$

The total work is $$\frac{W_{tot}}{Q_{evap}} = \frac{W_{comp}}{Q_{evap}} + \frac{W_{cold}}{Q_{evap}} + \frac{W_{hot}}{Q_{evap}} \quad (24)$$

Two Stage

In the case of a two-stage compressor, assuming half the load is taken by each stage, the compression work is $$W_{comp} = \frac{1}{2} Q_{evap}\left(\frac{1}{COP_1}\right) + \frac{1}{2} Q_{evap}\left(\frac{1}{COP_2}\right) \quad (25)$$

$$\frac{W_{comp}}{Q_{evap}} = \frac{1}{2}\left(\frac{1}{COP_1} + \frac{1}{COP_2}\right)$$

$$\frac{W_{comp}}{Q_{comp}} = \frac{1}{COP} \quad (26)$$

$$= \frac{1}{2}\left[\frac{(T_5 + \Delta T_{hot}) - T_1}{T_1} + \frac{(T_5 + \Delta T_{hot}) - \left(T_1 + \frac{1}{2}\Delta T_{cold}\right)}{\left(T_1 + \frac{1}{2}\Delta T_{cold}\right)}\right]$$

$$\frac{1}{\eta_{motor}} \frac{1}{\eta_{comp}} \frac{1}{\eta_{cycle}}$$

When determining the total work using Equation 24, Equation 26 is used to calculate the compressor work. The cold pump Equation 21 will be the same. The hot pump Equation 23 is the same, except that Equation 26 is used for 1/COP.

Three Stage

In the case of a three-stage compressor (as illustrated in FIG. 83), the compressor work is $$\frac{W_{comp}}{Q_{evap}} = \frac{1}{COP} \quad (27)$$

$$= \frac{1}{\eta_{motor}} \frac{1}{\eta_{comp}} \frac{1}{\eta_{cycle}} \frac{1}{3}$$

$$\left[\frac{(T_5 + \Delta T_{hot}) - T_1}{T_1} + \frac{(T_5 + \Delta T_{hot}) - \left(T_1 + \frac{1}{3}\Delta T_{cold}\right)}{\left(T_1 + \frac{1}{3}\Delta T_{cold}\right)} + \right.$$

$$\left.\frac{(T_5 + \Delta T_{hot}) - \left(T_1 + \frac{2}{3}\Delta T_{cold}\right)}{\left(T_1 + \frac{2}{3}\Delta T_{cold}\right)}\right]$$

All other equations and procedures are the same.

n Stage

One can generalize to an n-stage compressor as follows $$\frac{W_{comp}}{Q_{evap}} = \frac{1}{COP} \quad (28)$$

$$= \frac{1}{\eta_{motor}} \frac{1}{\eta_{comp}} \frac{1}{\eta_{cycle}} \frac{1}{n}$$

$$\sum_{i=0}^{n-1} \left[\frac{(T_5 + \Delta T_{hot}) - \left(T_1 + \frac{i}{3}\Delta T_{cold}\right)}{\left(T_1 + \frac{i}{3}\Delta T_{cold}\right)}\right]$$

Analysis

This system was analyzed using the following assumptions $\eta_{motor}$=0.9 (high efficiency due to large scale)

$\eta_{comp}$=0.8 (high efficiency due to large scale)

$\eta_{cycle}$=0.97 (from FIG. 21, Reducing Energy Costs in Vapor-Compression Refrigeration and Air Conditioning Using Liquid Recycle—Part II: Performance, Mark Holtzapple, ASHRAE Transactions, Vol. 95, Part 1, 187–198 (1989))

$\eta_{pump}$=$\eta$turbine=05.

$T_1$=285.4 K=12° C.=54° F.

$\Delta T_{cold}$=11 K=20° F.

$\Delta T_{hot}$=4 K=7° F.

$\rho$=1000 kg/m$^3$ $C_p$=4189 J/(kg·K)

$\Delta P$=101,330 Pa=1 atm

Figure 84:
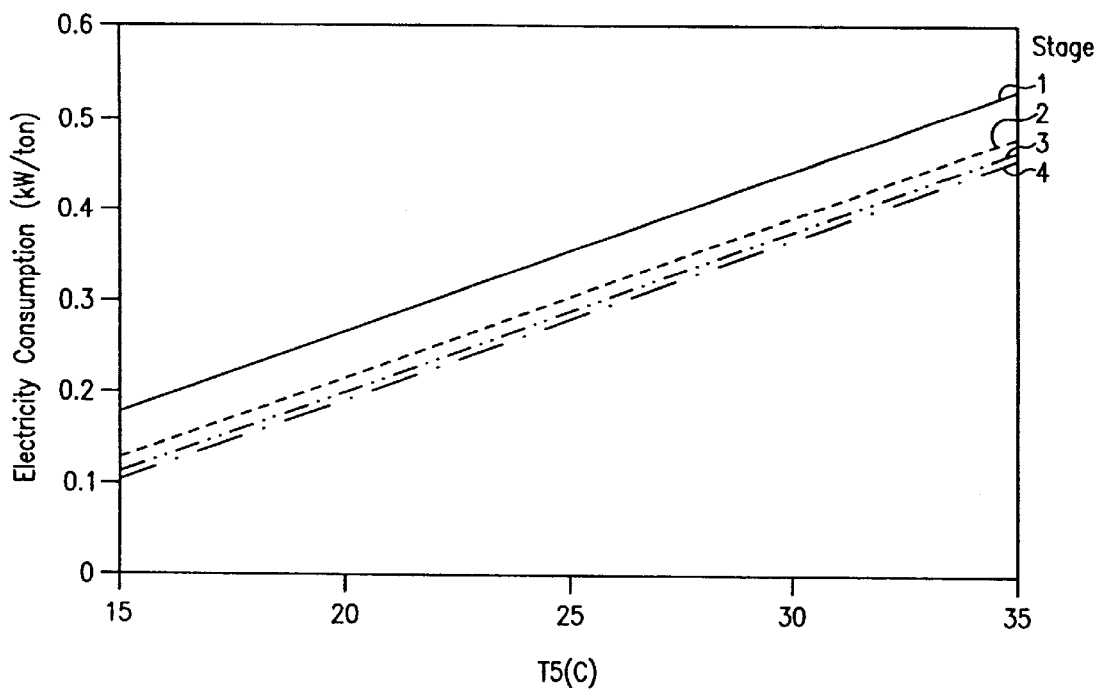
FIG. 84 Energy analysis of a multistage evaporative cooler without turbines.
Figure 85:
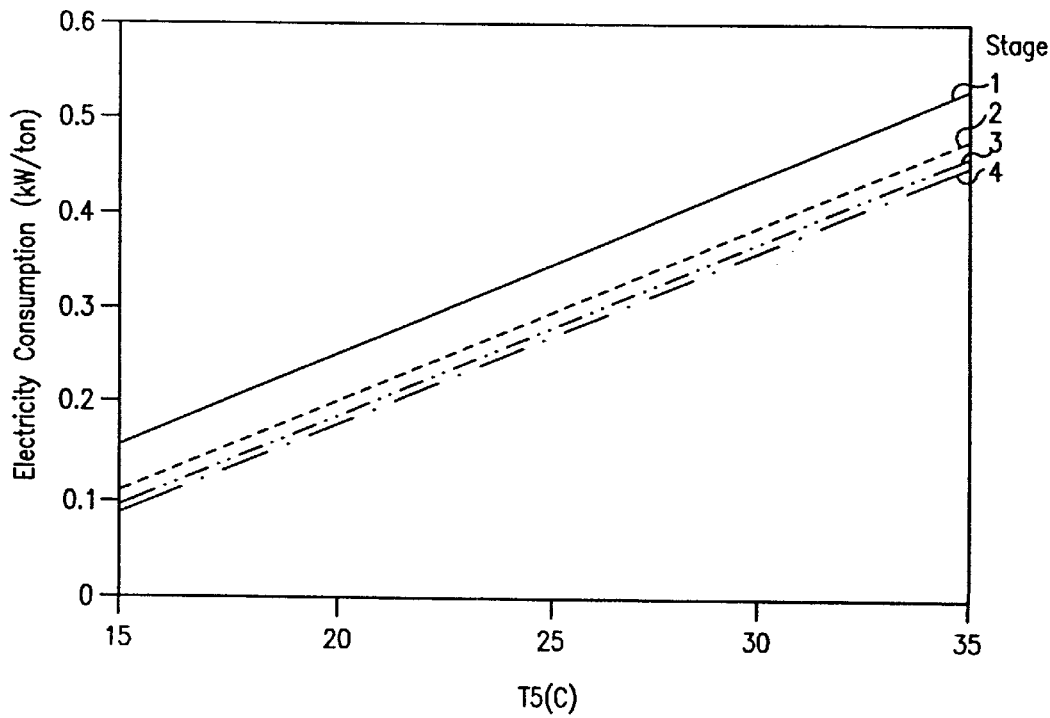
FIG. 85 Energy analysis of multistage evaporative cooler with turbines.

FIG. 84 shows the results of the analysis with no turbines and FIG. 85 shows the results with turbines. For comparison purposes, a state-of-the-art water chiller is available from Trane (CFCs: Today There Are Answers, FIG. 18, CFC-ARTICLE-1, The Trane Company, 3600 Pammel Creek Rd., La Crosse, Wis., 54601-7599) that requires 0.50 kW/ton at standard ARI conditions (cold side=44° F. leaving evaporator, 54° F. entering evaporator; hot side=85° F. entering condenser (our $T_5$), 95° F. leaving condenser; cooling tower=7° F. approach temperature, 78° F. wet bulb temperature). According to FIG. 84 (no turbines, three stages), the disclosed system with $T_5$=85° F. (29.4° C.) requires only 0.37 kW/ton. According to FIG. 85 (with turbines, three stages), the disclosed system with $T_5$=85° F. (29.4° C.) requires only 0.35 kW/ton. Thus, the energy requirement of the multistage vapor-compression evaporative cooler is approximately 70% of the current state-of-the-art system.

An important consideration is the effect of noncondensibles on the system. A 1-ton unit has a noncondensible load of about 0.0023 lbmole/h. If its partial pressure in the condenser is 0.05 psia, then the theoretical work requirement (assuming isothermal compression) is $$\frac{W_{purge}}{Q_{evap}} = nRT \ln \frac{P_2}{P_1} \quad (29)$$

$$= \left(\frac{0.0023 \text{ lbmole}}{\text{ton} \cdot \text{h}}\right)\left(\frac{1.986 \text{ Btu}}{\text{lbmole} \cdot {}^\circ \text{R.}}\right)\left(\frac{\text{kW} \cdot \text{h}}{3413 \text{ Btu}}\right)$$

$$(460 + 85)^\circ \text{ R. } \ln \frac{14.7 \text{ psia}}{0.05 \text{ psia}}$$

$$= 0.00414 \frac{\text{kW}}{\text{ton}}$$

$$= 4.14 \frac{\text{W}}{\text{ton}}$$

where $W_{purge}$=compressor work required to purge noncondensibles n=moles of noncondensibles to be purged
R=universal gas constant
$P_2$=final discharge pressure (ambient pressure)
$P_1$=intake partial pressure of noncondensible gas If the partial pressure of noncondensibles in the condenser is reduced to 0.01 psia, then the work requirement increases to 5.32 W/ton. Assuming the compressor is 50% efficient, then the work requirement for purging noncondensibles is only about 10 W/ton, which falls within the "noise."

For a very large chiller (300 to 2500 ton), the compressor is likely to be centrifugal. To get a sense of the scale, the low-pressure compressor will be designed assuming a 3-compressor 500-ton unit. The low-pressure compressor may actually have a number of stages within it. The required head per stage is $$H = \frac{1{,}545}{M_w} \frac{k}{k-1} T_1 [r^{(k-1)/k} - 1] \tag{30}$$

where
H=head, ftlb$_f$/lb$_m$
$M_w$=molecular weight=18 lb$_m$/lbmole
r=compression ratio, dimensionless
k=1.323 for water
$T_1$=inlet temperature=54° F.=514°R The compression ratio of each stage in the low-pressure compressor can be calculated from $$r = \left(\frac{P_2}{P_1}\right)^{1/n} \tag{31}$$

where
$P_2$=discharge pressure of low-pressure compressor=0.311 psia (assumed)
$P_1$=inlet pressure of low-pressure compressor=0.202 psia (assumed)
n=number of stages within the low-pressure compressor The discharge pressure, $P_2$, was calculated as $$P_2 = 0.202 \text{ psia} \left(\frac{0.744 \text{ psia}}{0.202 \text{ psia}}\right)^{1/3} = 0.311 \text{ psia} \tag{32}$$

where 0.744 psia is the pressure of a 92° F. condenser.

FIG. 86 shows a generalized compressor chart indicating regions where piston, centrifugal, axial, and drag compressors are appropriate. The generalized correlation for a single stage within the low-pressure compressor is made in terms of specific speed, $N_s$, and specific diameter, $D_s$, defined as follows $$N_S = \frac{N\sqrt{Q}}{H^{3/4}} \tag{33}$$

$$D_S = \frac{DH^{1/4}}{\sqrt{Q}} \tag{34}$$

where
N=rotational speed, rpm
Q=inlet volumetric flow rate, ft$^3$/s
H=head, ft·lb$_f$/lb$_m$
D=diameter, ft The volumetric flow at the inlet to the low-pressure compressor for a three-compressor, 500-ton system is $$Q = \frac{1}{3} \times 500 \text{ ton} \times \frac{12{,}000 \text{ Btu}}{\text{ton} \cdot \text{h}} \times \frac{\text{lb}_m \text{ water}}{1065 \text{ Btu}} \times \tag{35}$$

$$\frac{\text{h}}{3600 \text{ s}} \times \frac{1517 \text{ ft}^3}{\text{lb}_m \text{ water}}$$

$$= 791 \text{ ft}^3/\text{s}$$

The factor ⅓ results because the low-pressure compressor takes only a third of the load.

FIG. 86 shows that a centrifugal compressor with $N_s$=60 and $D_s$=2 is about 80% efficient. Using Equations 33 and 34, the corresponding speed and diameter can be calculated.

$$N = \frac{N_S H^{3/4}}{\sqrt{Q}} \tag{36}$$

$$D = \frac{D_S \sqrt{Q}}{H^{1/4}} \tag{37}$$

The tip speed, v, is $$v = \frac{\pi D N}{60} \tag{38}$$

where v is in ft/s.

FIG. 87 shows the results of the compressor analysis. The tip speed for a single stage is acceptable as is the rotational speed, so a single stage should be sufficient for the low-pressure compressor.

Advantages of this system include efficiency. In addition, water chemistry is not so important because there are no heat exchange surfaces.

FIG. 88 depicts a schematic of another multistage cooler, multistage evaporative cooler 13100. This cooler is similar to cooler 13000 except that packed columns 13180 are used to eliminate superheat. Reference numerals in FIG. 88 refer to corresponding elements in FIG. 83, so that a further description thereof is omitted.

Referring now to FIG. 88, in order to eliminate superheat after each compression stage, the vapors exiting the compressors 13130 are passed countercurrently through a packed column 13190 with liquid passing downward. Although centrifugal compressors may be employed in these large-scale systems, it is also possible to use large gerotor compressors. The noncondensibles that accumulate in the condenser are passed countercurrently through the packed column 13180 with chilled water flowing downward in direct contact with the water vapor, which condenses most of the water vapor, as described before. In a preferred embodiment, structured packing of corrugated PVC sheets as described earlier is used. The noncondensibles are then removed by a vacuum pump, shown here as a multistage compressor train 13170.

An even more efficient air conditioning system, vapor compression evaporative cooler 13200 is shown in FIG. 89. Reference numerals in FIG. 89 refer to corresponding elements in FIG. 83, so that a further description is omitted. In cooler 13200, both multistage evaporators 13120 and multistage condensers 13160 are used. In addition, multiple packed columns 13180 are used. The cooling water in the condensers 13160 flows countercurrently to the water in the evaporators 13120. This minimizes the pressure difference between the evaporators and the condensers, thus promoting the greatest energy efficiency. To prevent superheating in each compressor and to promote energy efficiency, liquid water 13135 may be sprayed directly into the compressor 13130. Because high-speed centrifugal compressors can be damaged by liquid water, it is preferred to employ gerotor compressors.

The preferred embodiments disclosed herein include a number of novel cooling systems that use water as the working fluid, a number of novel positive displacement and low-friction compressors that are useful in the disclosed coolers and other applications, and a number of novel means for removing noncondensibles; however, the specific embodiments and features disclosed herein are provided by way of example only and are not intended as limitations on the scope of the invention. As will be clear to one of skill in the art, each of the various compressors may be adapted for use in the different disclosed cooling systems as well as other applications, and are in no way limited to the specific cooling system in which they are depicted. In addition, as is clear to one of skill in the art, the variable port mechanisms, seals, mounting systems and other novel components of the different compressors disclosed herein can be easily interchanged by one of skill in the art, as can the different novel vacuum pumps and compressors useful in removing noncondensibles. In addition, means for inhibiting microorganisms, such as an ozone generator, call be incorporated into any of the disclosed systems. It will be easily understood by those of ordinary skill in the art that variations and modifications of each of the disclosed embodiments can be easily made within the scope of this invention as defined by the following claims.

We claim:

1. A vapor-compression evaporative air conditioning system comprising:

an evaporator;

a room air contactor for directly exchanging heat between room air and a quantity of water from said evaporator;

a positive displacement compressor for compressing a volume of water vapor, thereby creating a vacuum on said water in said evaporator, said compressor comprising an inlet and an outlet, wherein low-pressure water vapors from said evaporator enter said inlet and compressed water vapors exit said outlet;

a condenser for receiving said compressed water vapors from said compressor;

means for reducing a water content of said vapors exiting the condenser;

means for removing noncondensibles from said condenser; and an ambient air contactor for directly exchanging heat between the ambient air and water from said condenser.

2. The system of claim 1, wherein said positive displacement compressor is a low-friction compressor comprising at least two compressing components, and wherein said compressing components do not substantially contact one another.

3. The system of claim 2, wherein said compressing components comprise: an inner gerotor, an outer gerotor and a housing; an orbiting scroll, a stationary scroll and a housing; a housing and a piston; a housing, a rotor, and a flap; an inner drum, an outer drum and a swinging vane; or a housing, a rotor and a sliding vane, and wherein there is a gap between at least two of said compressing components.

4. The system of claim 3, wherein water is used as a sealant in said gap.

5. The system of claim 3, wherein water and a wick are used as a sealant in said gap.

6. The system of claim 1, wherein said compressor comprises a gerotor compressor, said gerotor compressor comprising an inner gerotor and an outer gerotor, said inner gerotor disposed within said outer gerotor, each gerotor comprising a plurality of teeth, and wherein said inner gerotor has one less tooth than said outer gerotor, thereby creating a void volume between said inner gerotor and said outer gerotor.

7. The system of claim 6, wherein said gerotor compressor further comprises an inlet port and a discharge port, said ports communicating with said void volume.

8. The system of claim 7, wherein said discharge port has a variable port mechanism that changes the position of a leading edge of the discharge port.

9. The system of claim 8, wherein said variable port mechanism is positioned using electrically actuated means.

10. The system of claim 9, wherein said electrically actuated means is controlled by a thermocouple signal.

11. The system of claim 7, wherein said variable port mechanism comprises an electrically controlled servo motor, said motor rotating a threaded rod, a bellows, and a non-rotating nut coupled to said bellows, said rod axially positioning said non-rotating nut.

12. The system of claim 7, wherein said variable port mechanism comprises a plurality of plates disposed adjacent to said discharge port and means for sequentially moving the plates to vary said leading edge of said discharge port.

13. The system of claim 7, wherein said variable port mechanism is positioned using a bellows, said bellows being actuated by a bulb containing a liquid, said liquid in said bulb having a vapor pressure which acts on said bellows.

14. The system of claim 6, wherein liquid water is sprayed into said gerotor compressor.

15. The system of claim 6, further comprising an electric motor for driving said gerotor compressor, a first pump for pumping cooled water from said evaporator to a packing in said room air contactor, a filter disposed between said room air contactor and said evaporator, wherein water from said room air contactor flows through said filter to said evaporator, a second pump for pumping water from said condenser to a packing in said ambient air contactor, and a fan for driving ambient air countercurrently against said packing.

16. The system of claim 6, wherein said gerotor compressor has actuation means to reduce friction.

17. The system of claim 16, wherein a first drive shaft drives said outer gerotor and wherein said actuation means comprises an internal gearbox containing a plurality of spur gears, said plurality being an odd number, and wherein one of said spur gears is coupled to said first drive shaft and another of said spur gears is coupled to a second drive shaft, said second drive shaft being offset from said first drive shaft, thereby suspending said gearbox between said first drive shaft and said second drive shaft, and wherein said first drive shaft is coupled to said outer gerotor through a plate that comprises a plurality of prongs in contact with a plurality of holes in said outer gerotor, and wherein said second drive shaft is coupled to said inner gerotor.

18. The system of claim 16, wherein a first drive shaft drives said outer gerotor and wherein said actuation means comprises a spur gear set comprised of a large gear coupled to said outer gerotor, said large gear containing a plurality of teeth on an inside diameter, and a small gear coupled to said inner gerotor, said small gear containing a plurality of teeth on an outside diameter, wherein said large gear meshes with said small gear, and further comprised of a second shaft about which said inner gerotor spins, wherein said second shaft contains a crook establishing an offset between said first shaft and said second shaft.

19. The system of claim 18, wherein said gears are immersed in liquid water.

20. The system of claim 18, further comprising a gear set attached to a bottom portion of said inner gerotor allowing for power take off.

21. The system of claim 16, wherein said actuation means comprises a plurality of rollers attached to said inner gerotor, wherein said rollers extend beyond a plurality of walls of said inner gerotor and are in contact with said outer gerotor, and wherein said outer gerotor drives said inner gerotor through said rollers.

22. The system of claim 21, wherein said inner gerotor is mounted on a rotating shaft and said rotating shaft extends outside of said compressor housing.

23. The system of claim 16, wherein said actuation means comprises a large gear coupled to said outer gerotor, said large gear comprising a plurality of teeth on an inside diameter, a small gear coupled to said inner gerotor, said small gear comprising a plurality of teeth on an outside diameter, said large gear meshing with said small gear, and a stationary central shaft, wherein said stationary central shaft contains two crooks that create an offset between an axis of the inner gerotor and an axis of the outer gerotor, and wherein said stationary shaft comprises a first end and a second end, said first end of said stationary shaft affixed to a first perforated housing end plate through a pivotable mount that prevents rotation of said stationary shaft and said second end of said stationary shaft located in a rotating bearing cup coupled to said outer gerotor.

24. The system of claim 23, said gerotor compressor further comprising a second perforated housing plate, a first perforated rotating plate and a second perforated rotating plate, wherein both said rotating plates are connected to said outer gerotor, and a first stationary plate and a second stationary plate adjacent to both said outer and inner gerotors, said first stationary plate containing an inlet port and said second stationary plate containing a discharge port.

25. The system of claim 23, wherein said gears are immersed in liquid water.

26. The system of claim 1, further comprising means for inhibiting microorganisms in the water in the room air contactor.

27. The system of claim 26, wherein said means for inhibiting comprises an ozone generator or UV radiation.

28. The system of claim 1, wherein said means for removing noncondensibles comprises an aspirator.

29. The system of claim 1, wherein said means for removing noncondensibles comprises a vacuum pump.

30. The system of claim 29, wherein said vacuum pump comprises a cylinder, a piston disposed in said cylinder, an inlet valve disposed in said cylinder, a sprayer that draws water into said cylinder of said vacuum pump, and a vent disposed in said cylinder for discharging noncondensibles and excess water, and wherein said vacuum pump is driven by a gear mounted on a main drive shaft, said gear connected to a plurality of reduction gears, wherein a first cam surface and a second cam surface are mounted on one of said reduction gears, a first roller rides on said first cam surface and a second roller rides on said second cam surface, and said first roller drives said piston and said second roller drives said inlet valve.

31. The system of claim 29, wherein said vacuum pump comprises a cylinder, a piston disposed in said cylinder, a crank, a check valve disposed in said cylinder, and means for spraying water into said cylinder of said vacuum pump, wherein said piston is driven by said crank in a first and a second direction, said piston comprising a first end, a second end, a plurality of notches, a plurality of perforations extending from said first end to said second end, and a flexible flap attached to said second end of said piston and covering one or more of said perforations, wherein said flap opens when said piston moves in said first direction and closes when said piston moves in said second direction.

32. The system of claim 29, wherein said vacuum pump is a gerotor vacuum pump comprising an outer gerotor and a center gerotor disposed within said outer gerotor, wherein said center gerotor is mounted on a main drive shaft and said outer gerotor is positioned by a plurality of guide rollers.

33. The system of claim 29, wherein said vacuum pump is a gerotor vacuum pump comprising an outer gerotor and a center gerotor disposed within said outer gerotor, wherein said center gerotor is mounted on a main drive shaft and said outer gerotor is mounted within a single ball bearing.

34. The system of claim 29, wherein said vacuum pump comprises:

a first column and a second column, said columns being partially filled with liquid and having a vapor space;

means for causing said liquid to oscillate in said columns;

inlet means for allowing uncompressed gas to enter each of said columns;

outlet means for discharging compressed gas from each of said columns; and means for spraying a fine mist of liquid into said vapor space of said first and said second columns.

35. The system of claim 3, wherein said compressor comprises a scroll compressor.

36. The system of claim 3, wherein said compressor comprises:

an outer drum having an axis;

an inner drum rotatably disposed in said outer drum;

a plurality of vanes, each vane having a first end and a second end opposite said first end, said vanes pivotally attached to said inner drum at said first end and having a vane tip at said second end, said vane tips being propelled radially outward during rotation of the inner drum;

a connecting rod coupled to each said vane tip, said rods maintaining a gap between said vane tips and said outer drum; and coupling means for causing said connecting rods to rotate about the axis of the outer drum.

37. The system of claim 2, wherein said compressor comprises:

a compressor housing, said housing having an interior wall, an inlet, and an outlet;

a rotor disposed in said housing;

a flap, said flap having a first end and a second end, said first end being coupled to said rotor and said second end being propelled in an outward direction during rotation of said rotor; and means for preventing the second end of said flap from touching the interior wall of the housing.

38. The system of claim 2, wherein said compressor is a reciprocating compressor, said reciprocating compressor comprising:

a compressor housing;

an oscillating center shaft disposed partly within said housing, said shaft comprising a top end and a bottom end, said top end comprising a protrusion which rides in a sinusoidal groove in a rotating cam driven by a motor; and at least one plate disposed in said housing and attached to said shaft and oscillating therewith, said at least one plate having a groove through which water flows to make a seal between said compressor housing and said plates.

39. The system of claim 38, wherein said cam contains a plurality of sinusoidal grooves.

40. The system of claim 1, comprising three concentric chambers, where said ambient air contactor is disposed in an outermost chamber of said concentric chambers, said compressor and said evaporator are disposed in an innermost chamber of said concentric chambers, and said condenser is disposed in a middle concentric chamber.

41. The system of claim 1 comprising two concentric chambers, wherein said ambient air contactor is disposed in an outermost chamber of said concentric chambers, and said compressor, said evaporator and said condenser are disposed in an innermost concentric chamber.

42. The system of claim 1, further comprising a means for providing make-up water to said evaporator and condenser.

43. The system of claim 42, wherein said means for providing make-up water comprises one or more float valves.

44. The system of claim 1, wherein said room air contactor comprises a spray tower to place water from the evaporator in contact with said room air.

45. The system of claim 1, wherein said room air contactor comprises a packing, said water from the evaporator passing over said packing, and said room air passing through said packing.

46. The system of claim 45, wherein said packing comprises corrugated chlorinated polyvinyl chloride.

47. The system of claim 1, wherein said condenser is a spray condenser.

48. The system of claim 1, wherein said condenser is a jet condenser.

* * * * *